US009613588B2

(12) United States Patent
Phan et al.

(10) Patent No.: US 9,613,588 B2
(45) Date of Patent: Apr. 4, 2017

(54) IMAGE DEVICE WITH IMPROVED CHROMINANCE QUALITY

(71) Applicant: VP ASSETS LIMITED, Road Town Tortola (VG)

(72) Inventors: Gia Chuong Phan, Hong Kong (CN); Maggie Phan, Hong Kong (CN); Anthony Phan, Hong Kong (CN)

(73) Assignee: VP ASSETS LIMITED, Road Town Tortola (VG)

( * ) Notice: Subject to any disclaimer, the term of this patent is extended or adjusted under 35 U.S.C. 154(b) by 208 days.

(21) Appl. No.: 14/533,971

(22) Filed: Nov. 5, 2014

(65) Prior Publication Data

US 2016/0055821 A1 Feb. 25, 2016

Related U.S. Application Data

(63) Continuation-in-part of application No. 14/465,496, filed on Aug. 21, 2014.

(51) Int. Cl.
*G02F 1/1335* (2006.01)
*G09G 5/02* (2006.01)

(52) U.S. Cl.
CPC ....... *G09G 5/026* (2013.01); *G02F 1/133514* (2013.01); *G02F 2201/52* (2013.01); *G09G 2300/0404* (2013.01)

(58) Field of Classification Search
CPC ................ G06T 11/001; G06T 11/203; G09G 3/28–3/38
USPC ........................... 345/87, 690; 349/106, 144
See application file for complete search history.

(56) References Cited

U.S. PATENT DOCUMENTS

| | | | |
|---|---|---|---|
| 4,800,375 | A | 1/1989 | Silverstein et al. |
| 4,892,391 | A | 1/1990 | Stewart et al. |
| 5,757,452 | A | 5/1998 | Masaki et al. |
| 7,248,314 | B2 | 7/2007 | Yun |
| 7,286,136 | B2 | 10/2007 | Phan |
| 7,583,279 | B2 | 9/2009 | Elliott et al. |
| 7,742,205 | B2 | 6/2010 | Lor et al. |
| 7,864,271 | B2 | 1/2011 | Nakamura et al. |
| 7,995,019 | B2 | 8/2011 | Ben-David et al. |

(Continued)

OTHER PUBLICATIONS

International Search Report and Written Opinion of the International Searching Authority for corresponding International Application No. PCT/IB2015/056322 mailed Nov. 5, 2015.

*Primary Examiner* — Calvin C Ma
(74) *Attorney, Agent, or Firm* — Birch, Stewart, Kolasch & Birch, LLP

(57) ABSTRACT

An image device with improved chrominance quality includes a plurality of RGBW pixels, a plurality of RGBY pixels, and a plurality of RBGB pixels. Each RGBW pixel includes a red sub-pixel, a green sub-pixel, a blue sub-pixel and a white sub-pixel. Each RGBY pixel includes a red sub-pixel, a green sub-pixel, a blue sub-pixel and a yellow sub-pixel. Each RBGB pixel includes a red sub-pixel, a green sub-pixel, and two blue sub-pixels. At least one row or at least one column comprises sub-pixels of having a same first color. The RGBW pixels, RGBY pixels, and RBGB pixels are mixed in the image device. The image device can solve the problem of dark yellow in the conventional RGBW display while achieving a white balance status. As a result the chrominance quality is improved.

62 Claims, 205 Drawing Sheets

(56) References Cited

U.S. PATENT DOCUMENTS

| | | | | |
|---|---|---|---|---|
| 8,248,440 | B2 | 8/2012 | Ben-David et al. | |
| 8,441,601 | B2 | 5/2013 | Lee et al. | |
| 8,558,857 | B2 | 10/2013 | Ben-David et al. | |
| 8,749,727 | B2 | 6/2014 | Itsumi et al. | |
| 2005/0140907 | A1* | 6/2005 | Yun | G02F 1/133514 349/144 |
| 2008/0316235 | A1* | 12/2008 | Okazaki | G02F 1/133514 345/694 |
| 2009/0128755 | A1 | 5/2009 | Roth et al. | |
| 2012/0062824 | A1 | 3/2012 | Lee et al. | |
| 2012/0249610 | A1* | 10/2012 | Katagami | G09G 3/3426 345/690 |

* cited by examiner

IMAGE DEVICE WITH IMPROVED CHROMINANCE QUALITY

This application is a Continuation-in-Part of co-pending application Ser. No. 14/465,496 filed on Aug. 21, 2014. The entire contents of the above application are hereby incorporated by reference.

BACKGROUND OF THE INVENTION

Field of the Invention

The invention relates to an image device with improved chrominance quality by the utilization of RGBW pixels, RGBY pixels, and RBGB pixels.

Description of the Related Art

Referring to FIG. 52, it shows a conventional RGBW display. The conventional RGBW display 10 includes a plurality of RGBW pixels 11. Each RGBW pixel 11 includes a green sub-pixel 111, a red sub-pixel 112, a blue sub-pixel 113 and a white sub-pixel 114 arranged in a 2×2 matrix. The conventional RGBW display 10 has the merit of enhanced color space and improved brightness and contrast, compared with traditional RGB display. U.S. Pat. No. 4,892,391, U.S. Pat. No. 5,757,452, U.S. Pat. Nos. 7,286,136, 7,742,205, and U.S. Pat. No. 7,583,279 teach RGBW displays. However, the conventional RGBW display 10 has the deficiency of dark yellow. U.S. Pat. No. 4,800,375, U.S. Pat. No. 7,864,271, and U.S. Pat. No. 8,749,727 teach RGBY displays which claim to have better yellow color. However, RGBY display lacks the merits of RGBW displays. U.S. Pat. No. 7,248,314, U.S. Pat. No. 7,995,019, U.S. Pat. No. 8,248,440, U.S. Pat. No. 8,441,601 and U.S. Pat. No. 8,558,857 teach displays with five color sub-pixels. However five color displays have the deficiency of high cost and low brightness and contrast. Moreover, the color conversion from RGB to five colors is also more difficult.

SUMMARY OF THE INVENTION

The present invention provides an image device. The image device includes a plurality of RGBW pixels, a plurality of RGBY pixels, and a plurality of RBGB pixels. Each RGBW pixel includes a red sub-pixel, a green sub-pixel, a blue sub-pixel and a white sub-pixel. Each RGBY pixel includes a red sub-pixel, a green sub-pixel, a blue sub-pixel and a yellow sub-pixel. Each RBGB pixel includes a red sub-pixel, a green sub-pixel, and two blue sub-pixels. At least one row or at least one column comprises sub-pixels of the same first color. The RGBW pixels, RGBY pixels, and RBGB pixels are mixed in the image device.

By the addition of RGBY pixels, the problem of dark yellow in the conventional RGBW display can be solved and chrominance quality can be improved. The present invention adds both RGBY pixels and RBGB pixels. The RBGB pixels are used to offset the chrominance change caused by the addition of RGBY pixels. The present invention thus can solve the dark yellow problem of conventional RGBW display and at the same time achieve a white balance status.

BRIEF DESCRIPTION OF THE DRAWING

Further advantageous measures are described in the dependent claims. The invention is shown in the attached drawing and is described hereinafter in greater detail.

FIG. 30C shows an image device according to an embodiment of the invention;

FIG. 30D shows an image device according to an embodiment of the invention;

FIG. 31A shows an image device according to an embodiment of the invention;

FIG. 31B shows an image device according to an embodiment of the invention;

FIG. 31C shows an image device according to an embodiment of the invention;

FIG. 31D shows an image device according to an embodiment of the invention;

FIG. 32A shows an image device according to an embodiment of the invention;

FIG. 32B shows an image device according to an embodiment of the invention;

FIG. 32C shows an image device according to an embodiment of the invention;

FIG. 32D shows an image device according to an embodiment of the invention;

FIG. 33A shows an image device according to an embodiment of the invention;

FIG. 33B shows an image device according to an embodiment of the invention;

Figure 33A:
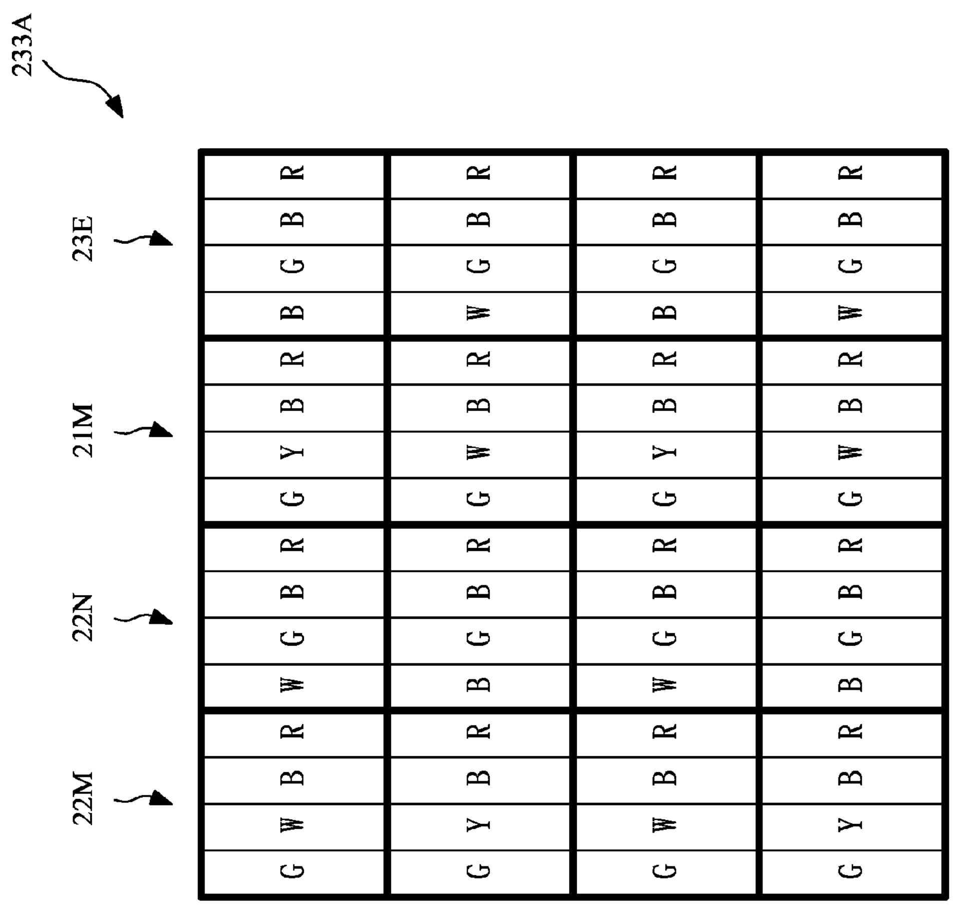
Figure 33B:
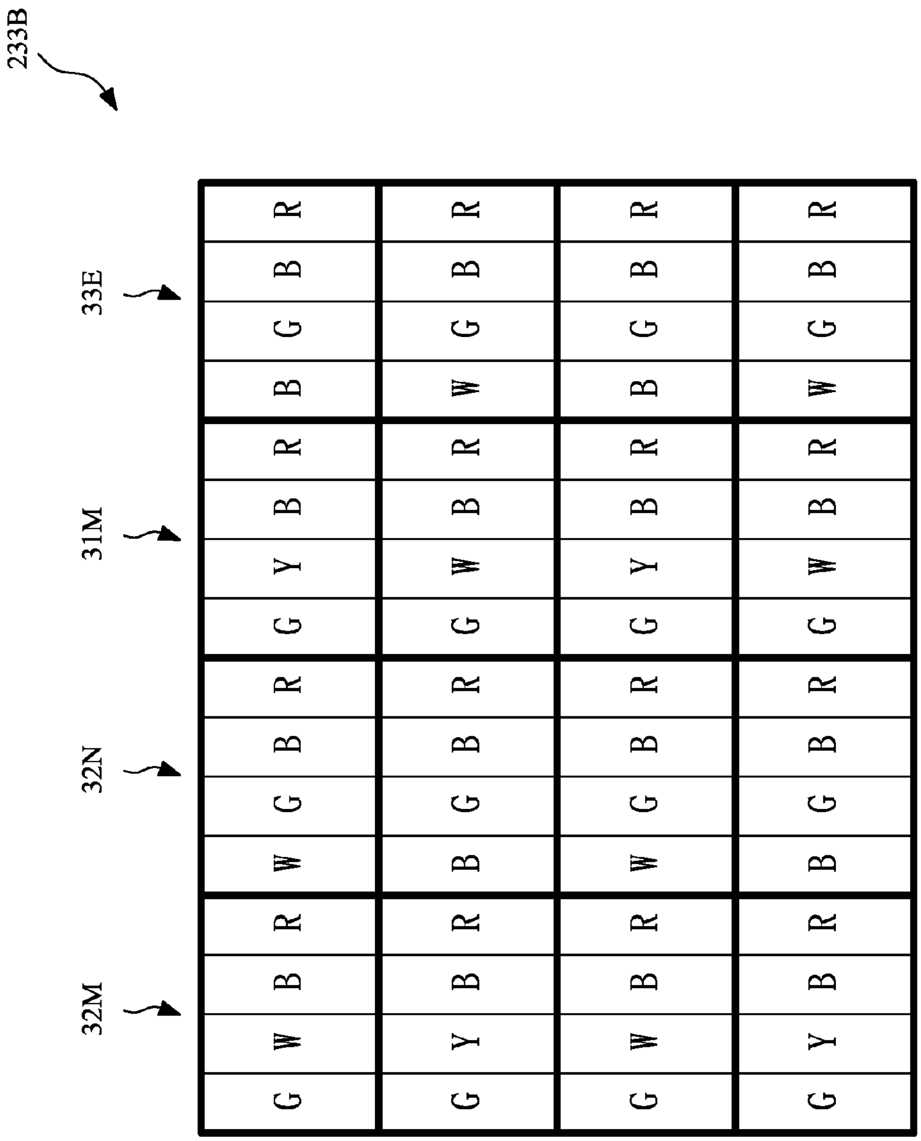
Figure 33C:
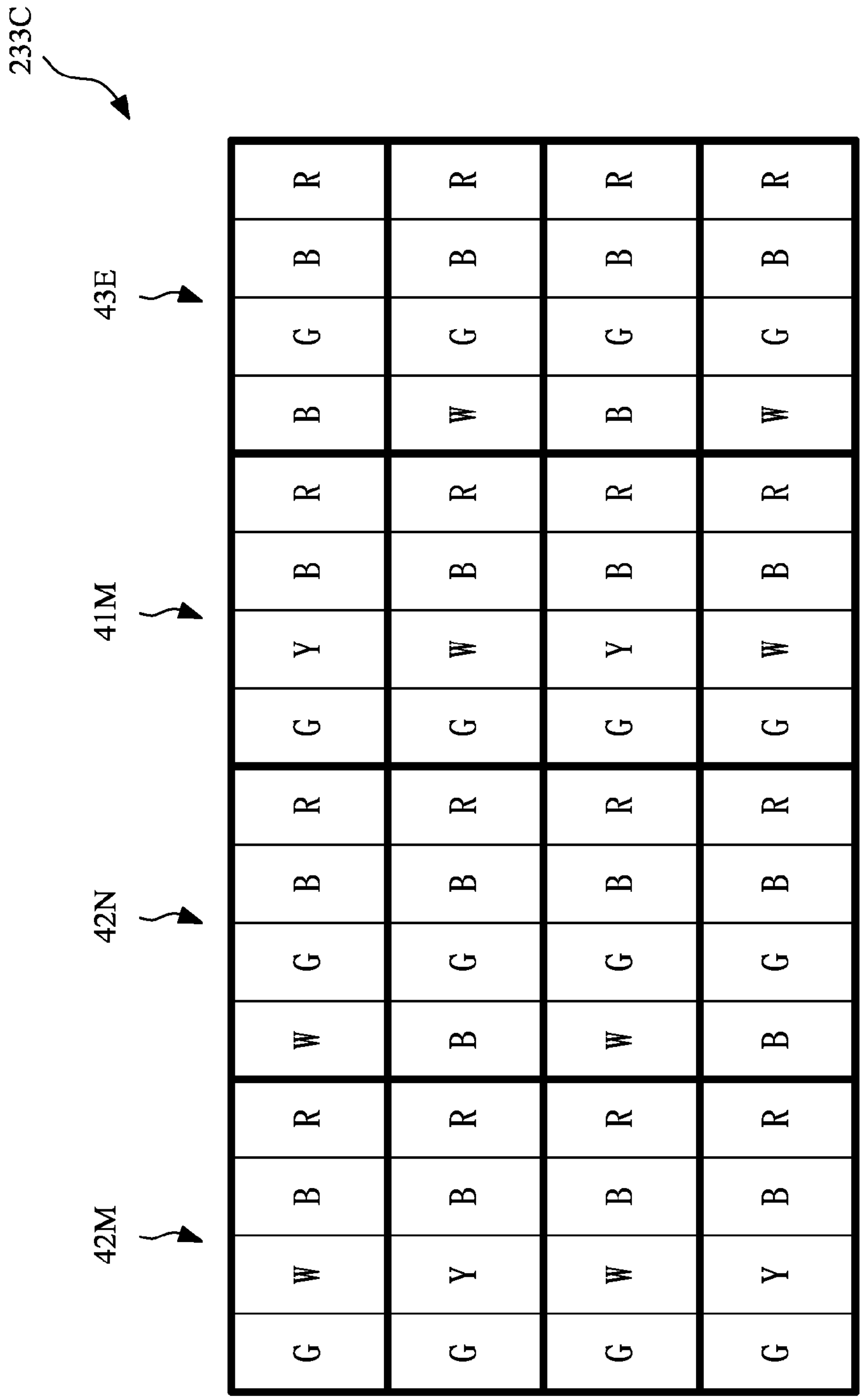
Figure 33D:
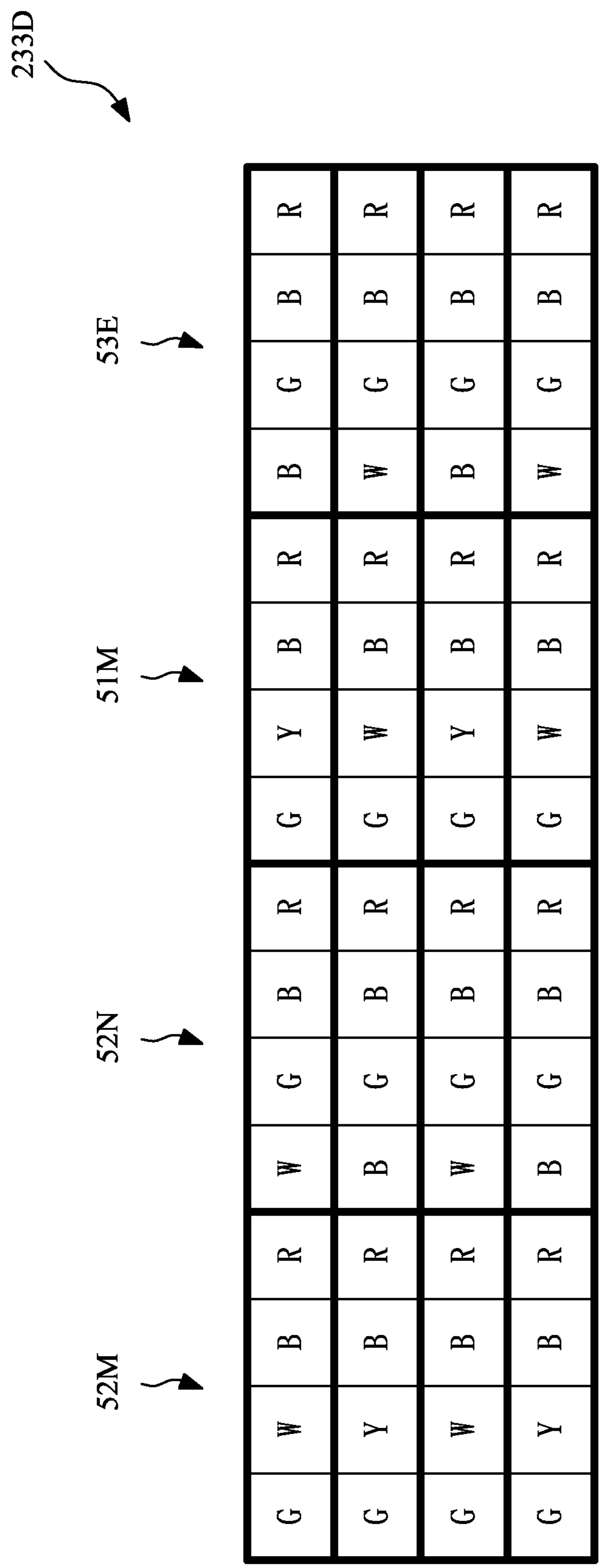
Figure 34A:
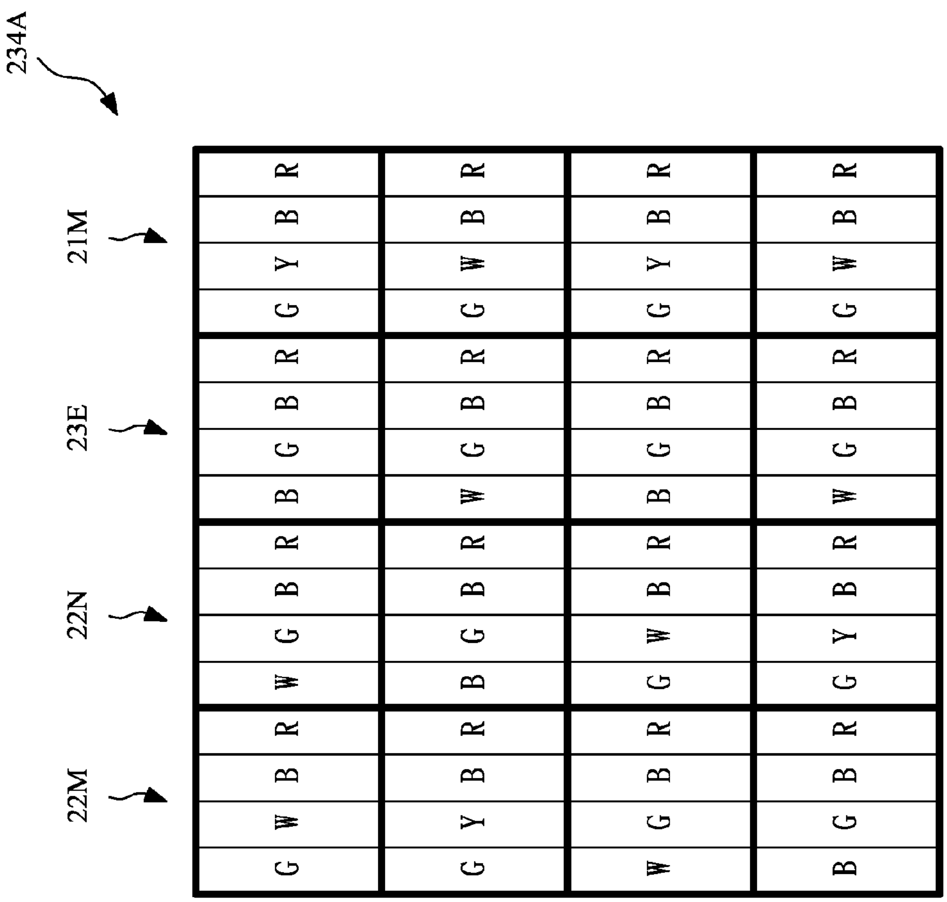
Figure 34B:
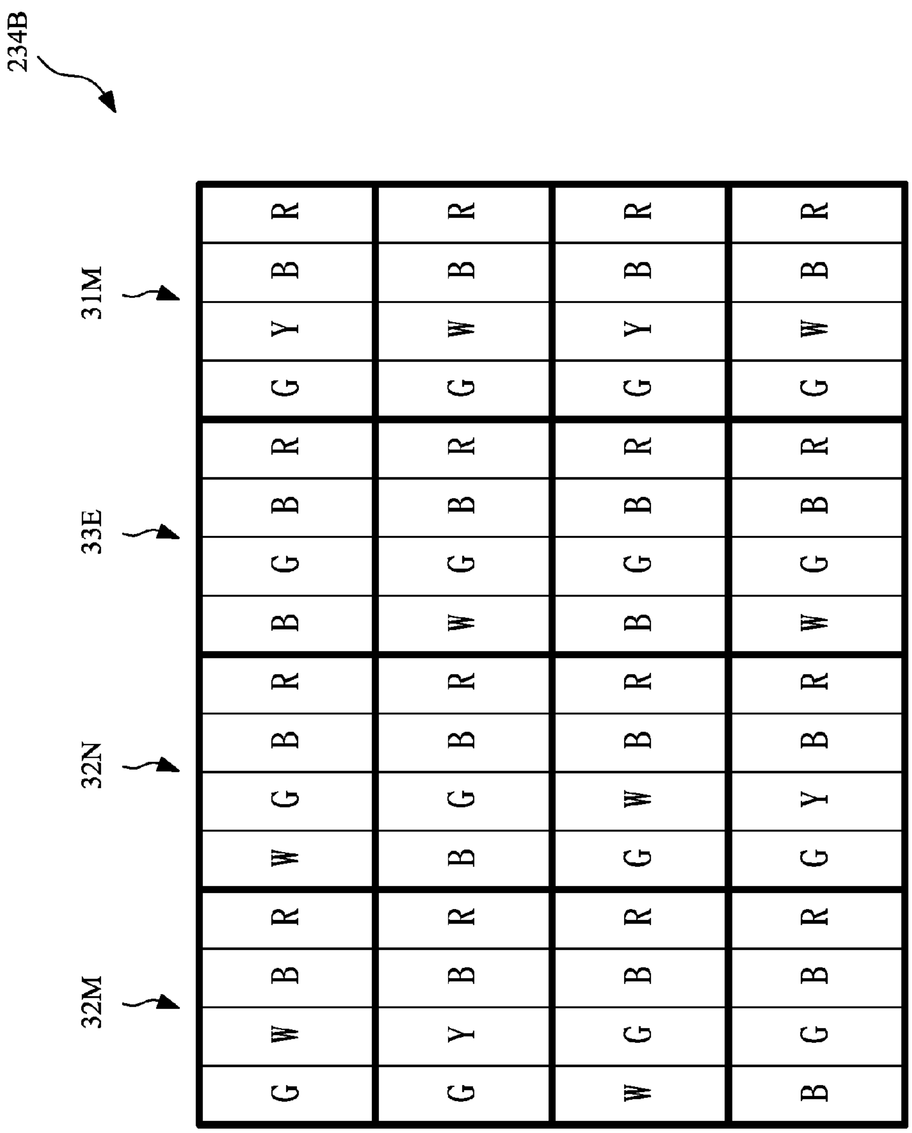
Figure 34C:
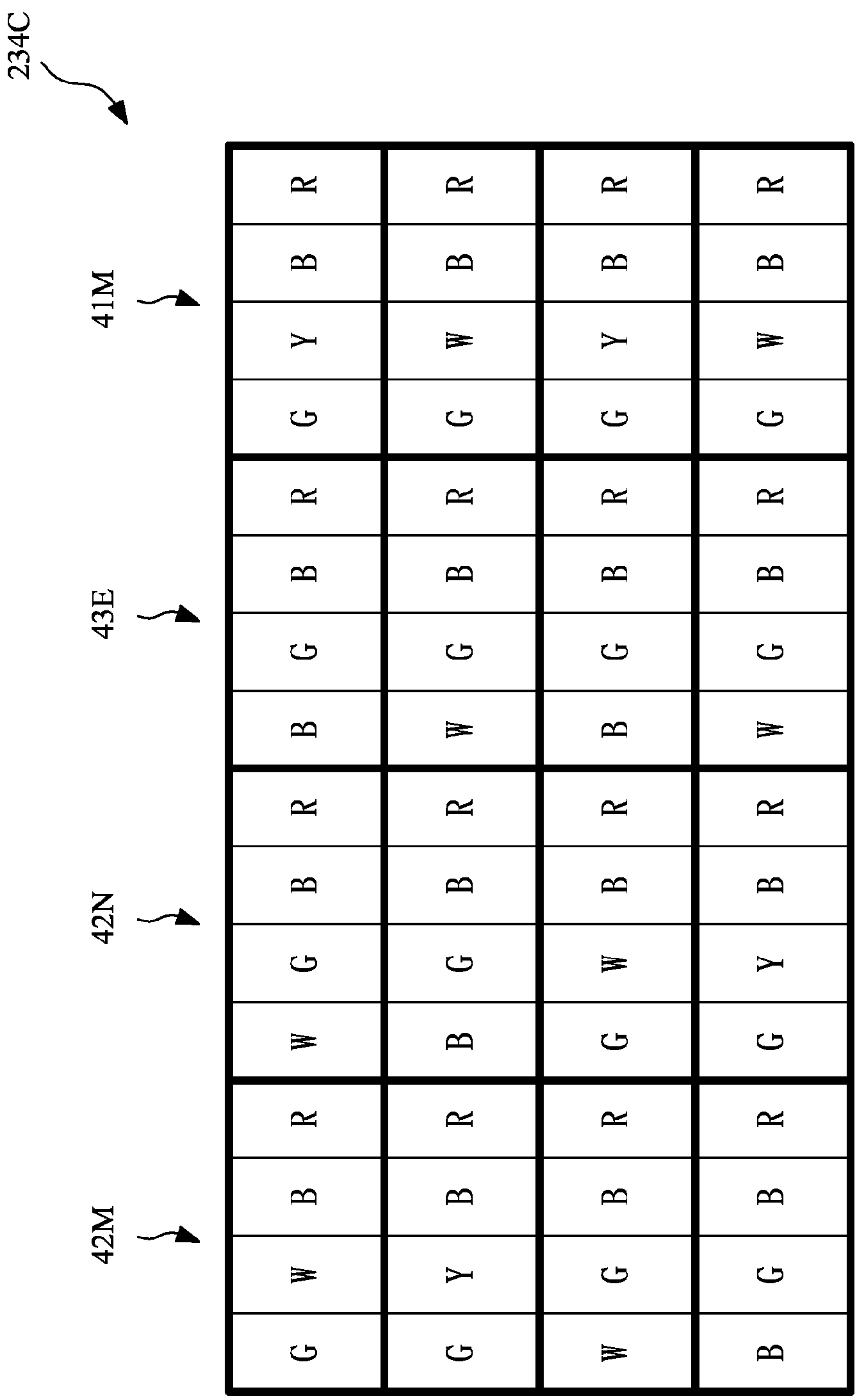
Figure 34D:
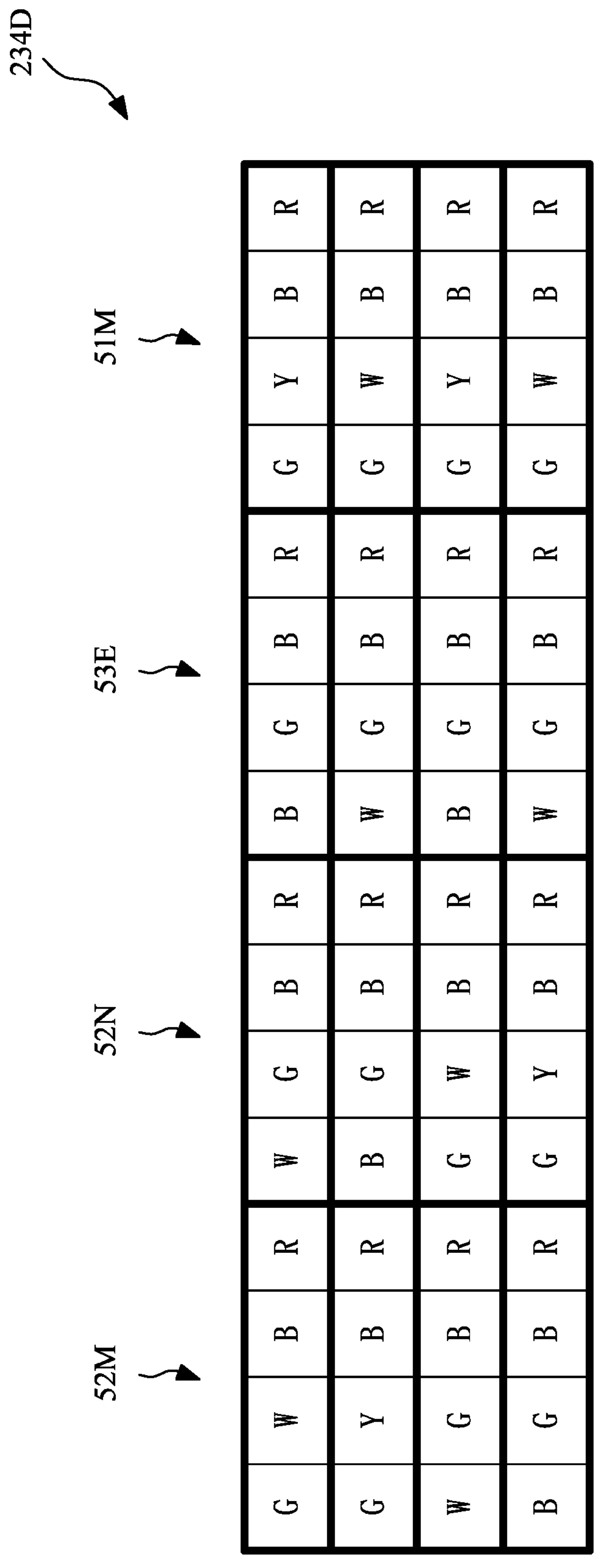
Figure 35A:
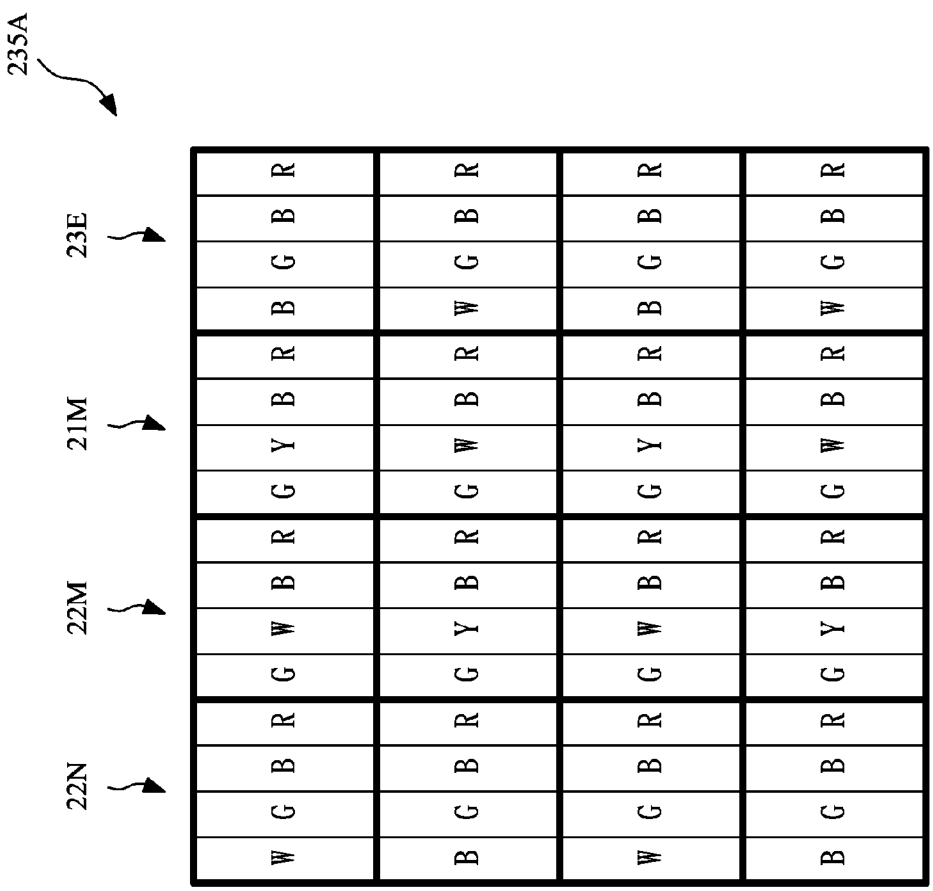
Figure 35B:
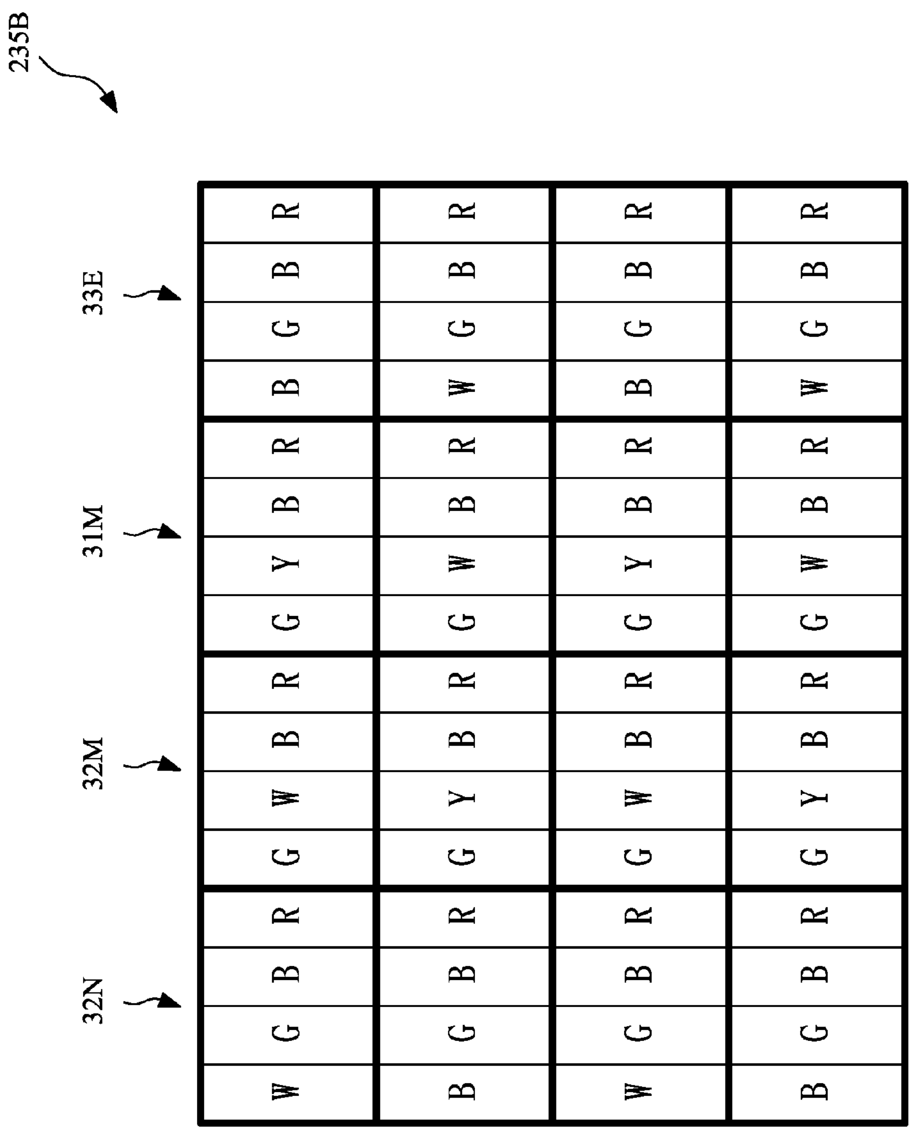
Figure 35C:
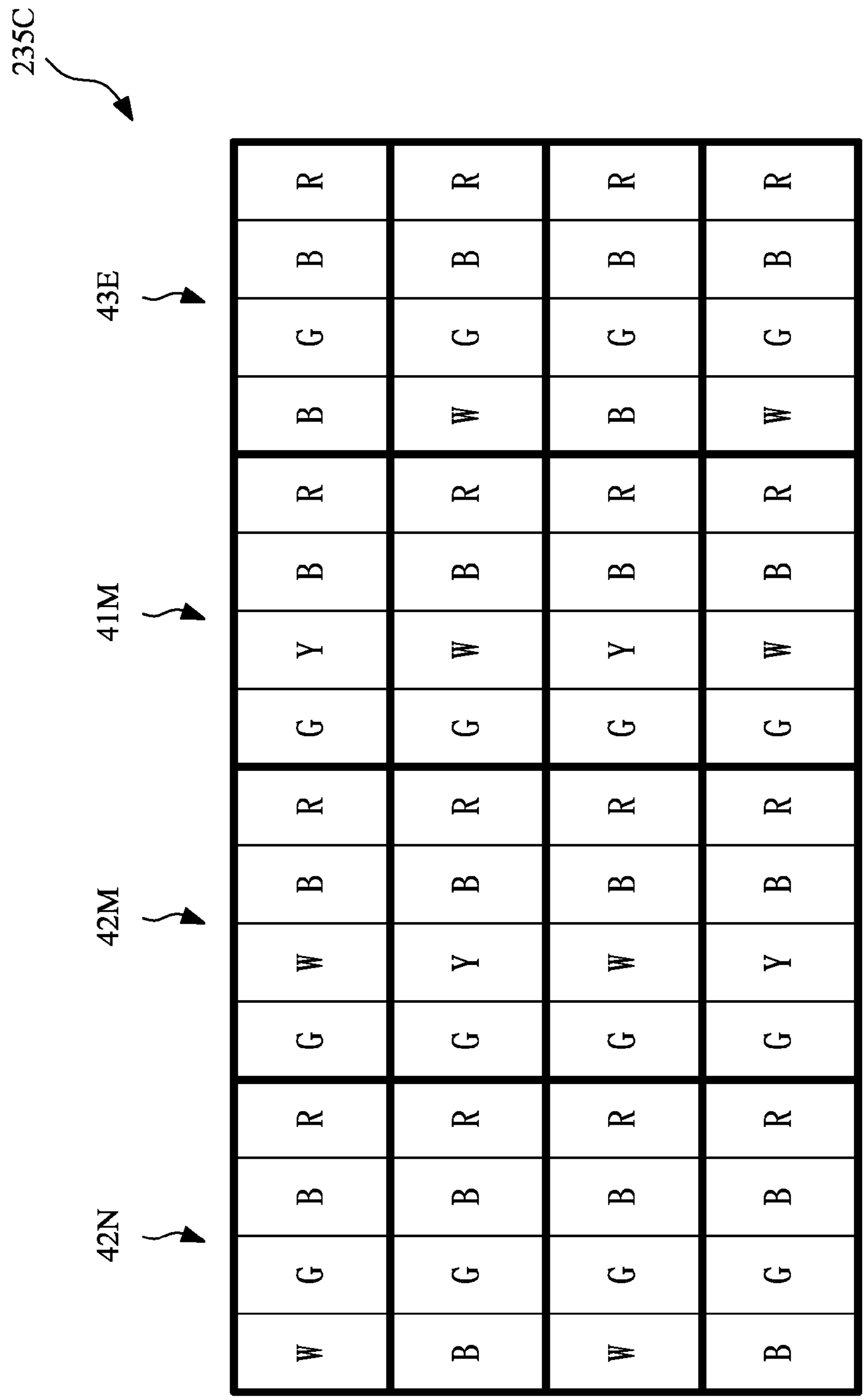
Figure 35D:
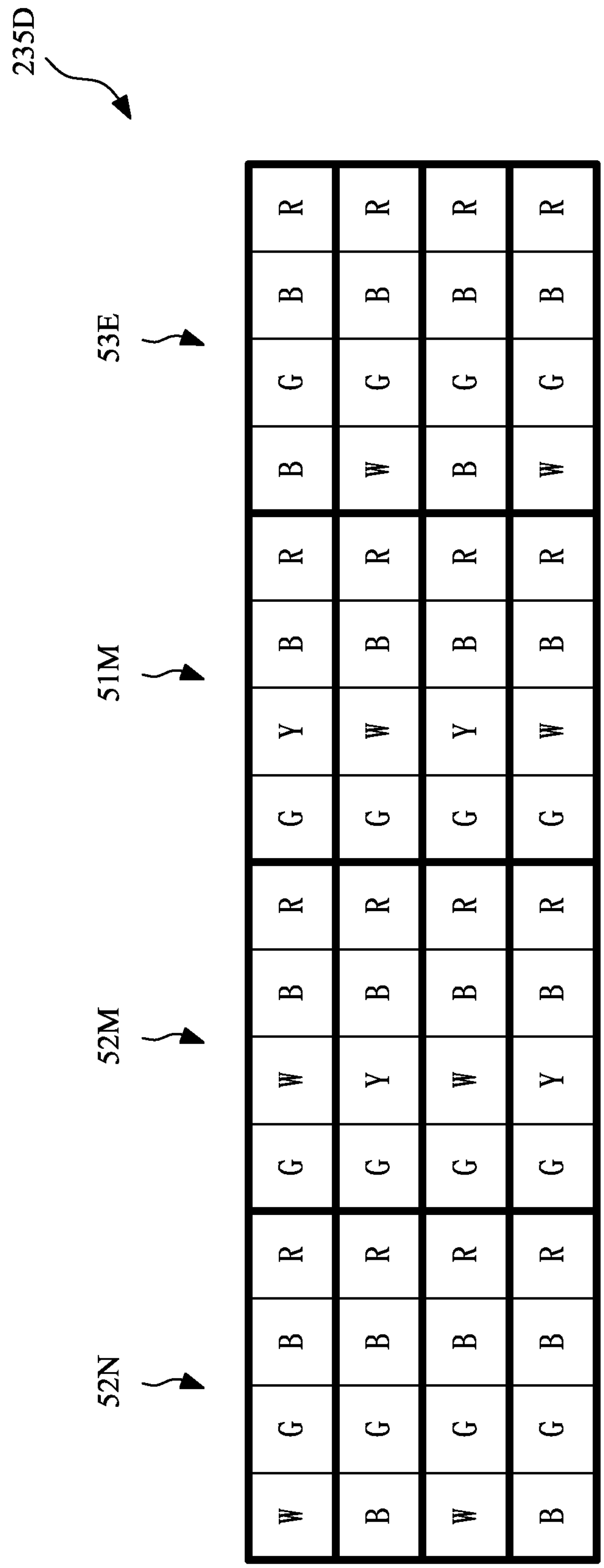
Figure 36A:
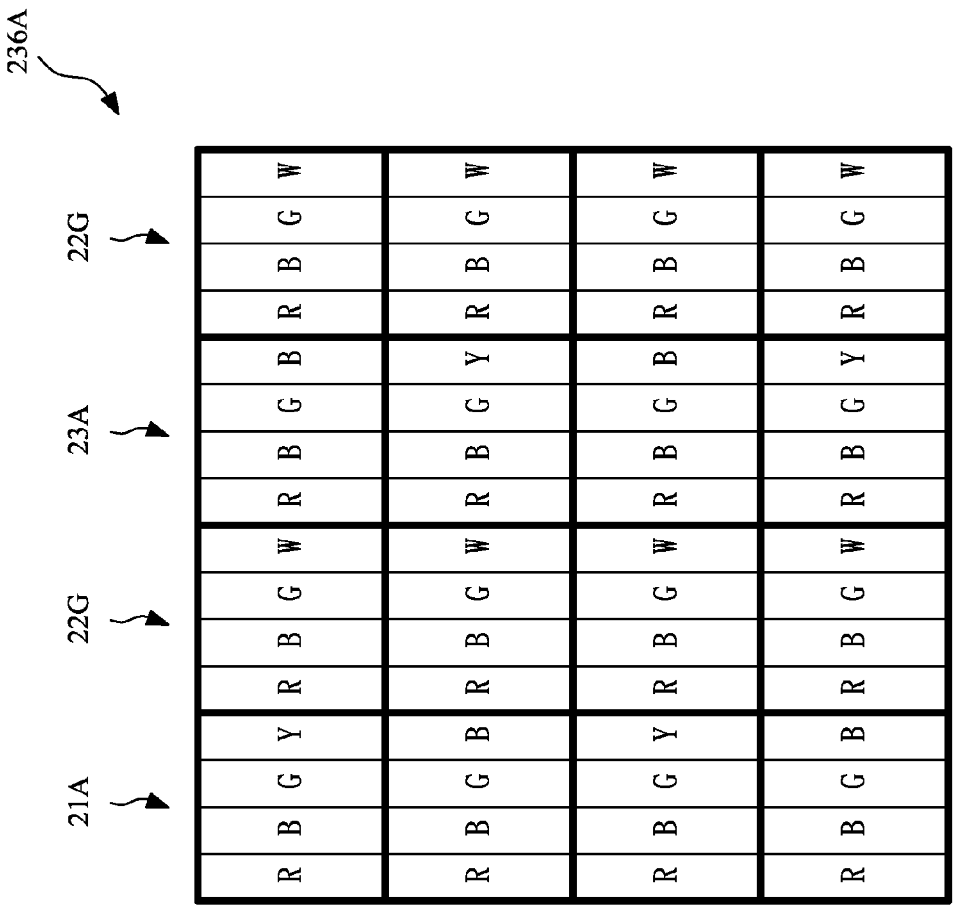
Figure 36B:
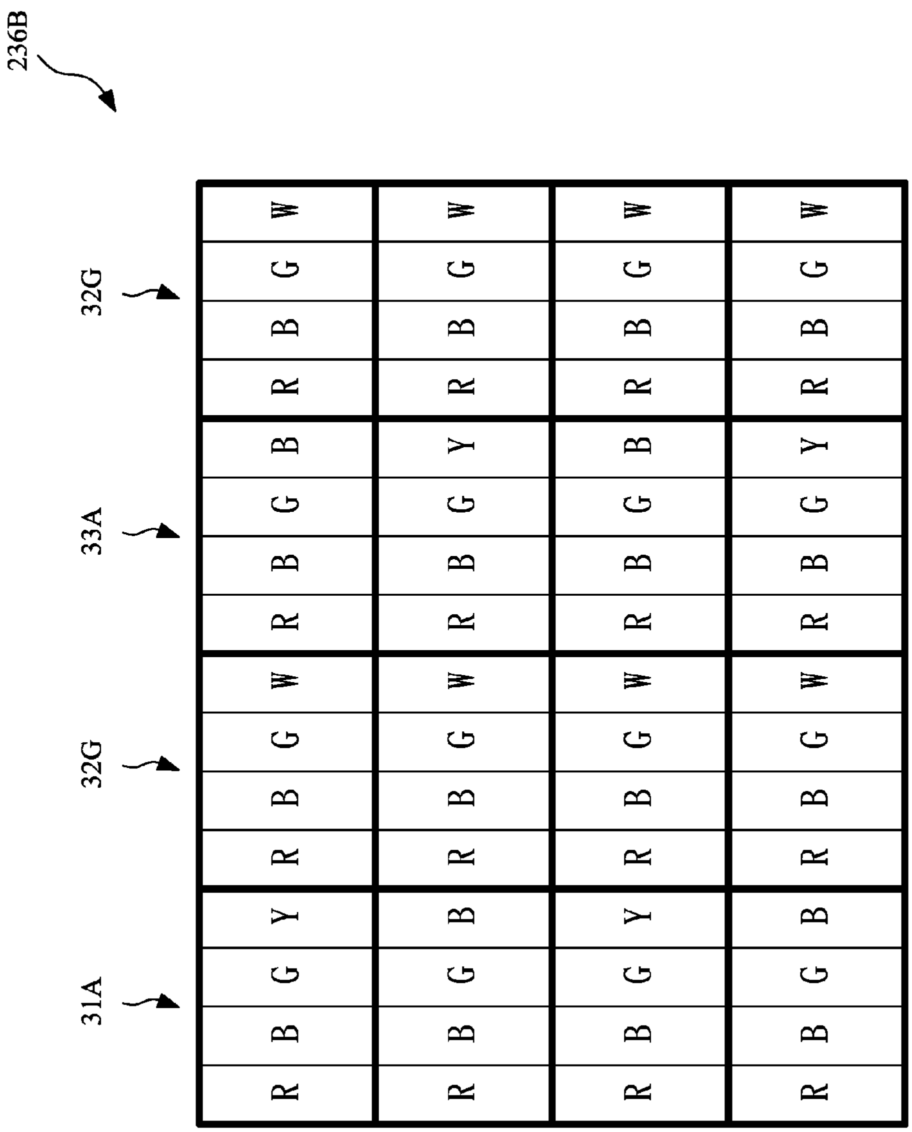
Figure 36C:
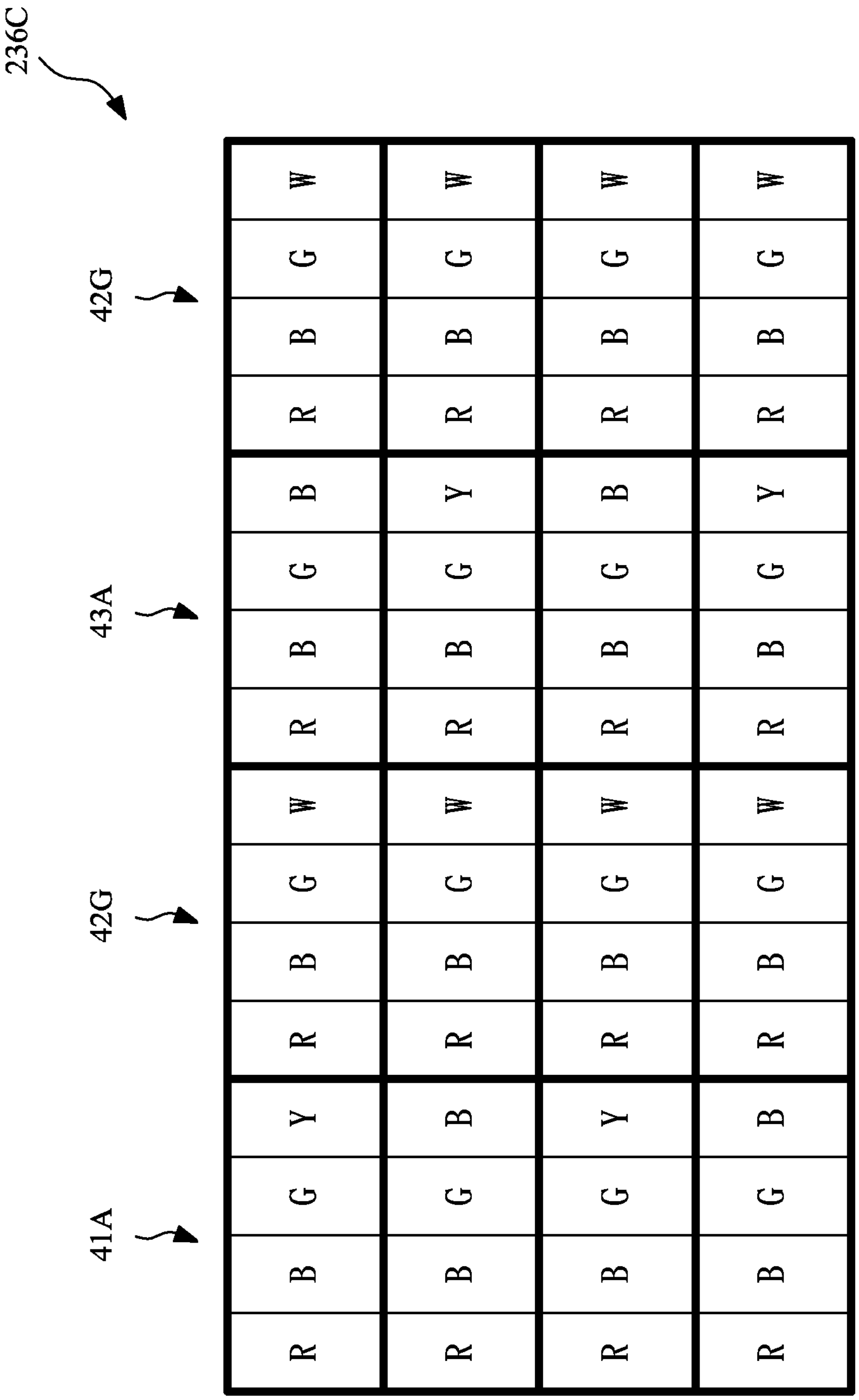
Figure 36D:
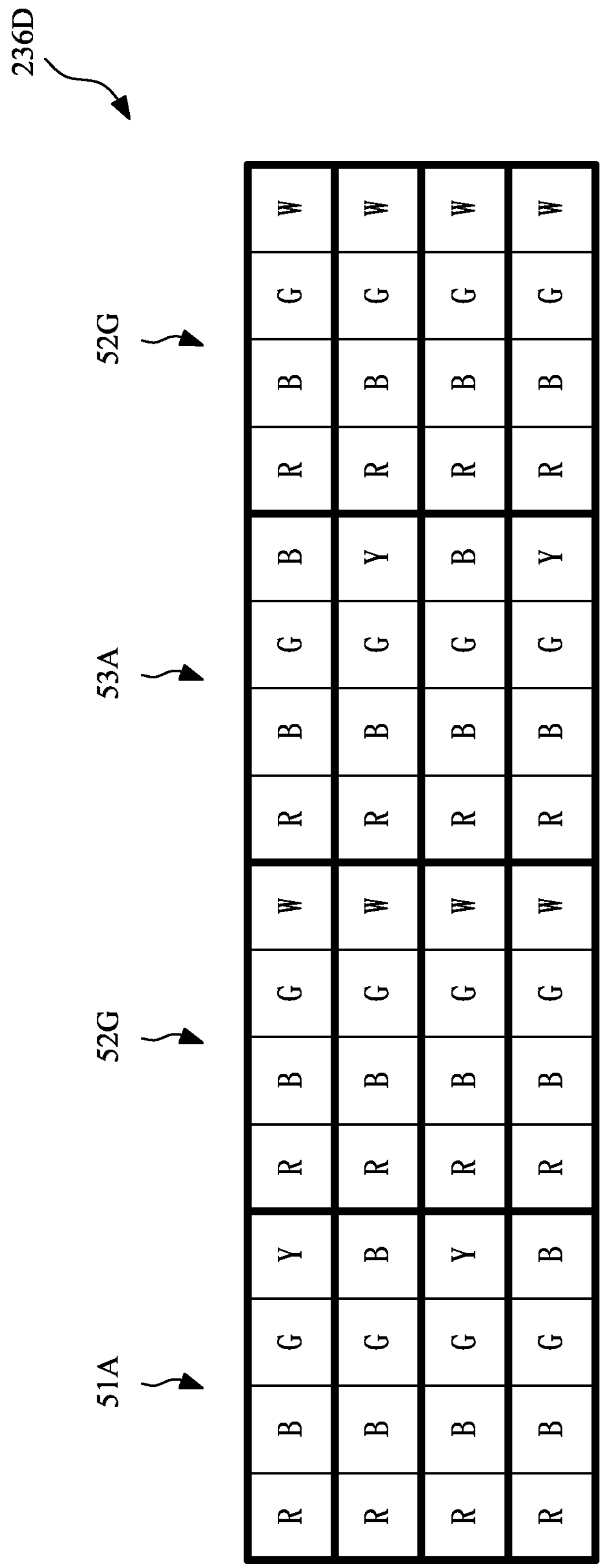
Figure 37A:
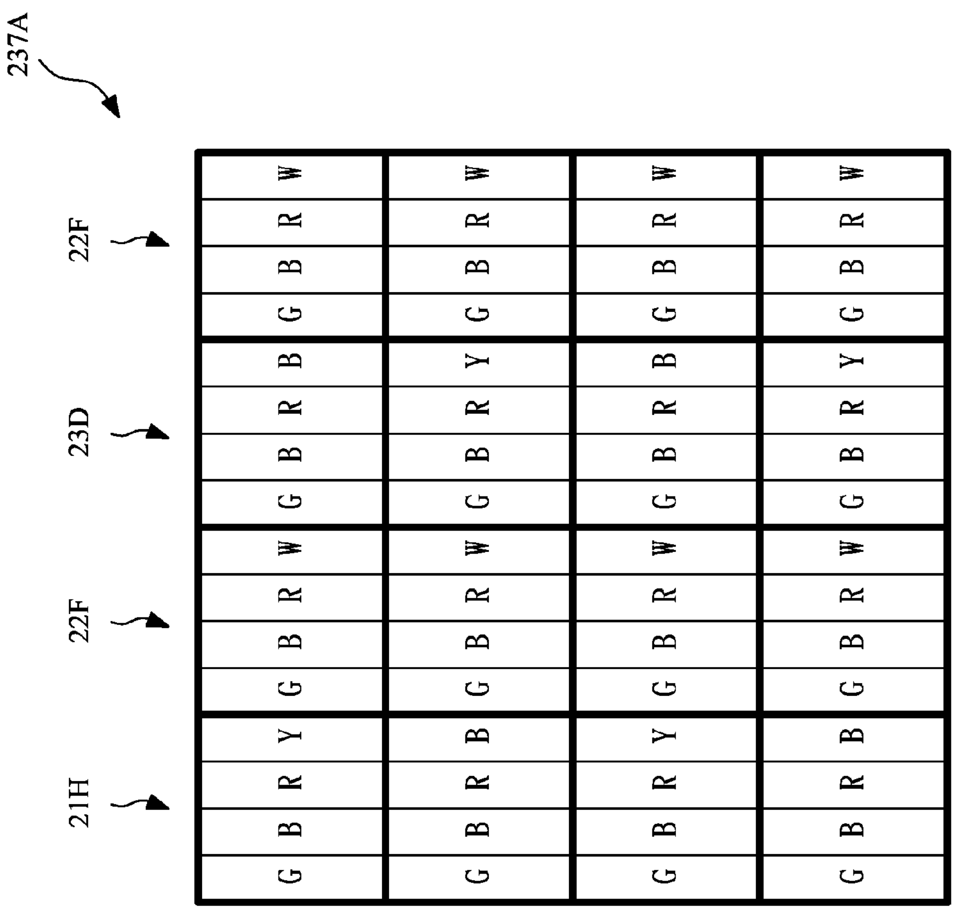
Figure 37B:
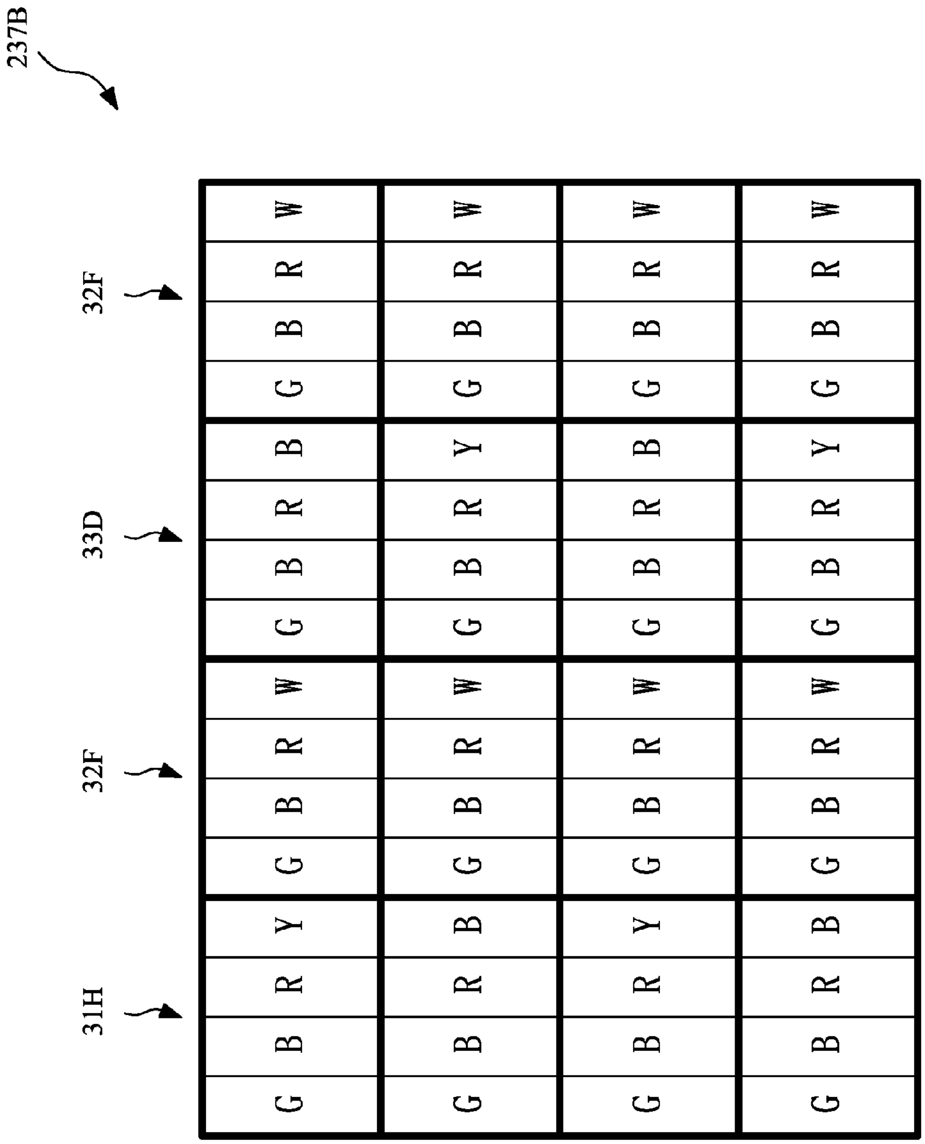
Figure 37C:
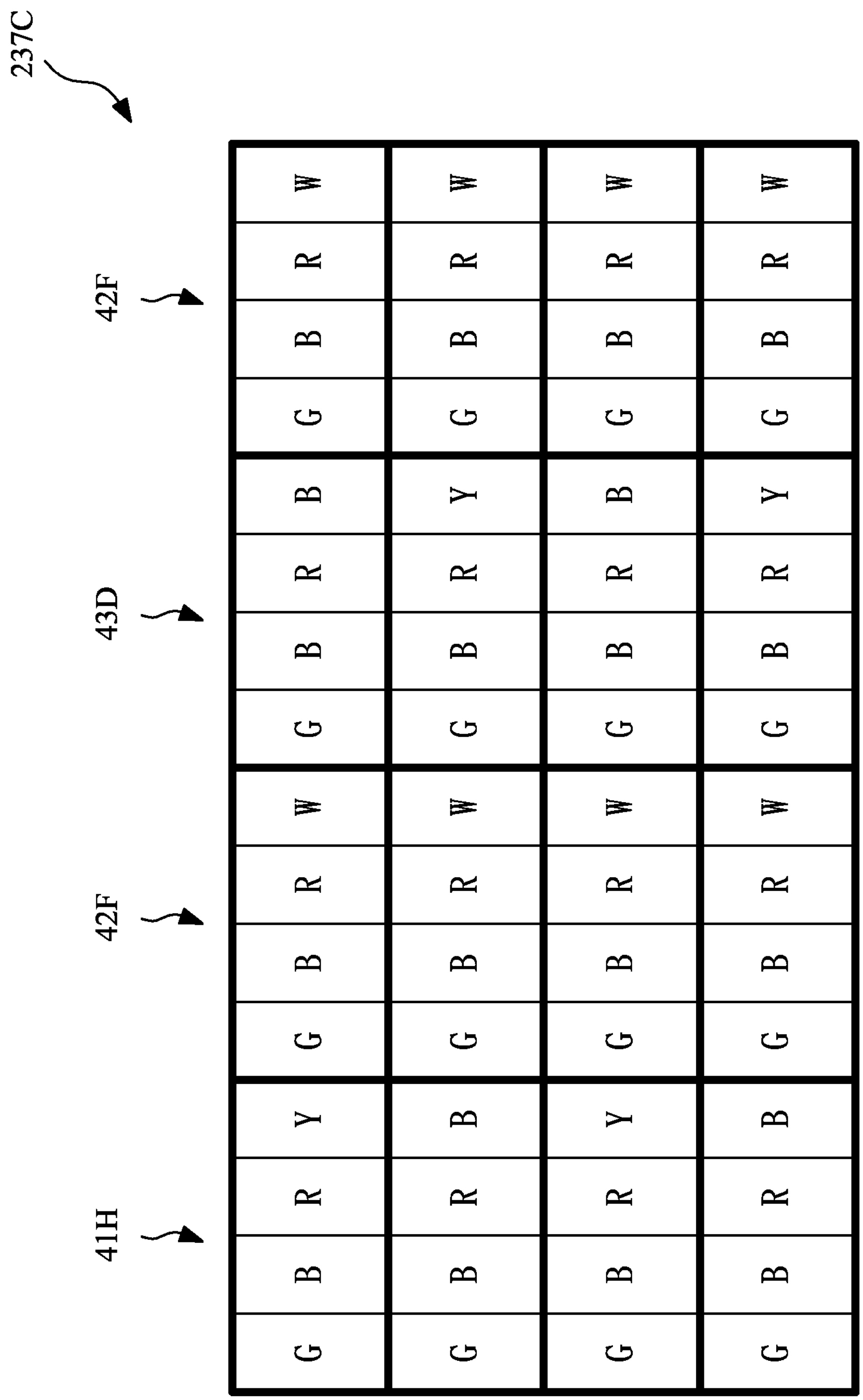
Figure 37D:
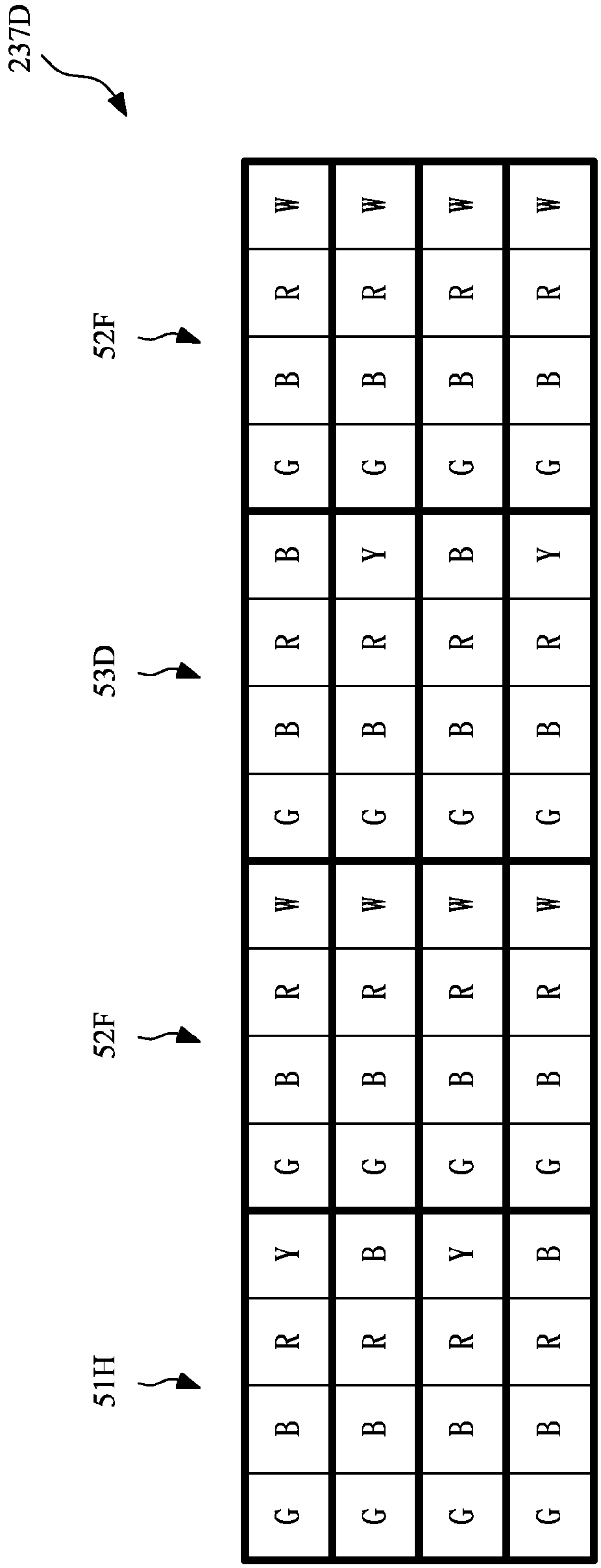
Figure 38A:
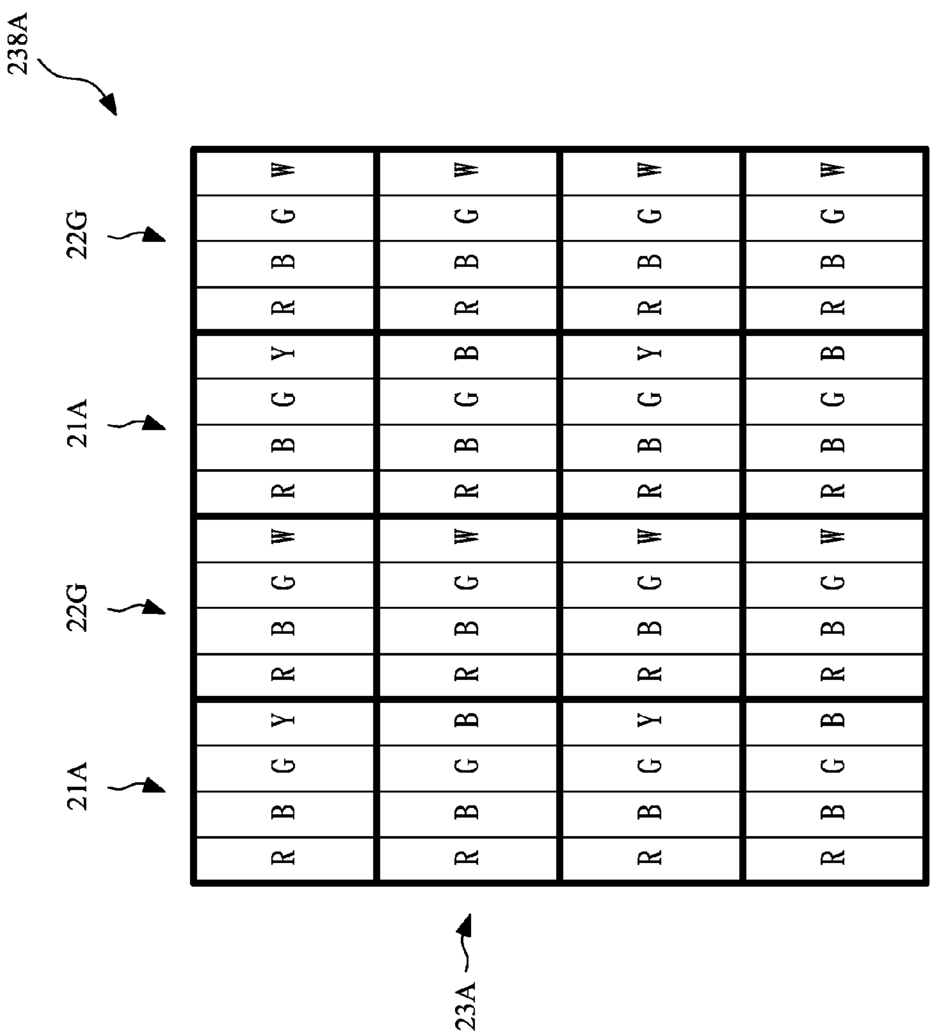
Figure 38B:
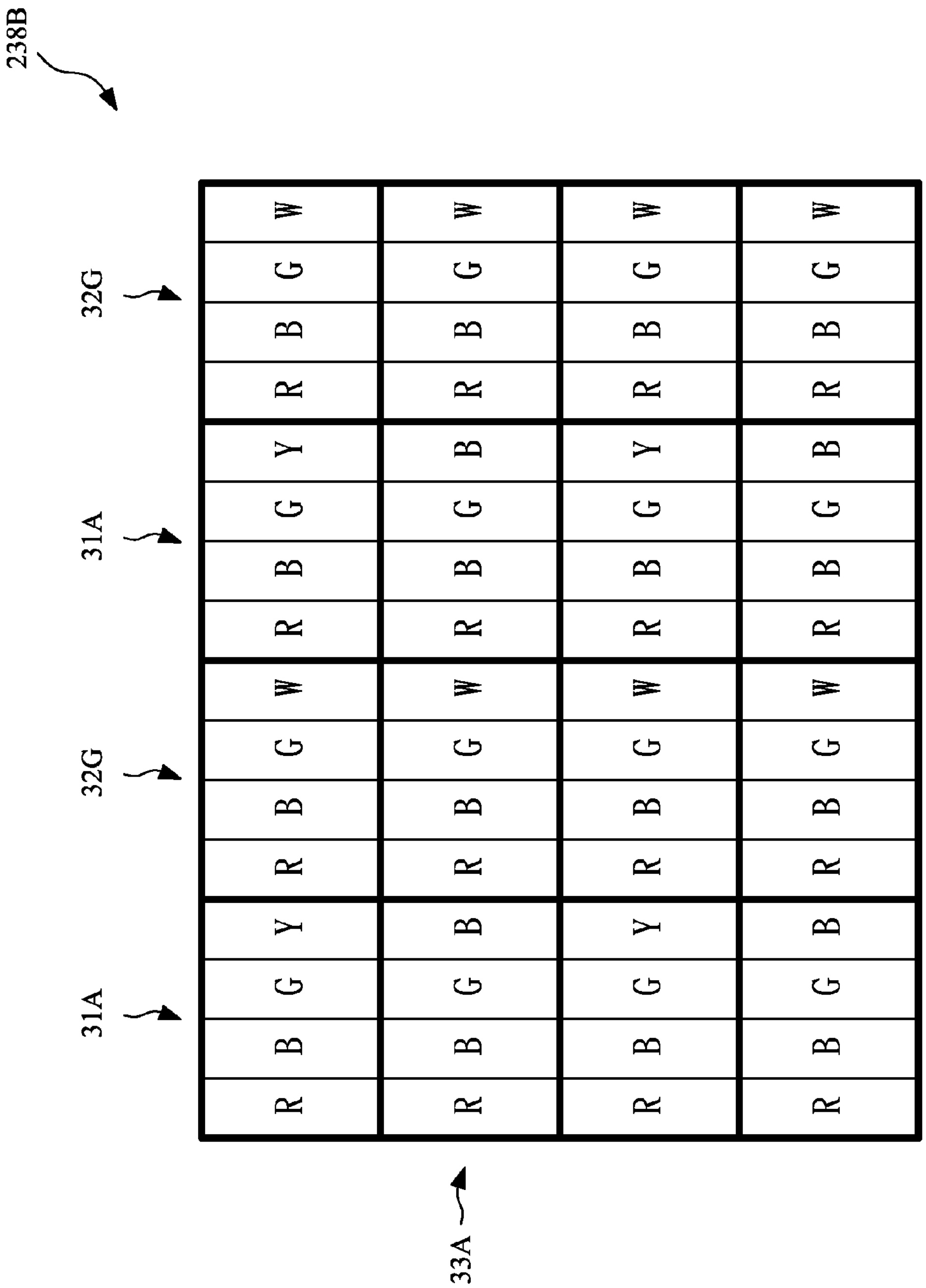
Figure 38C:
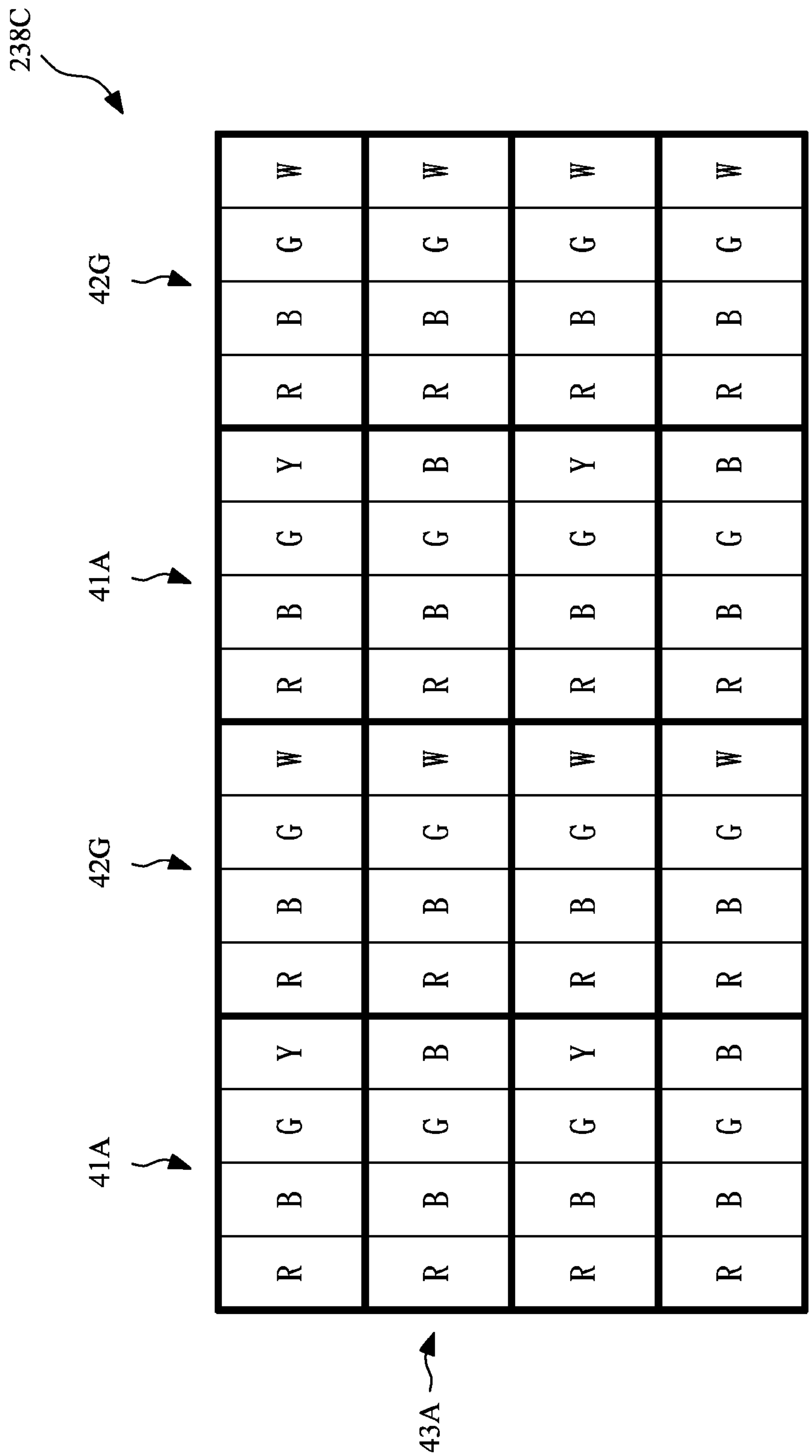
Figure 38D:
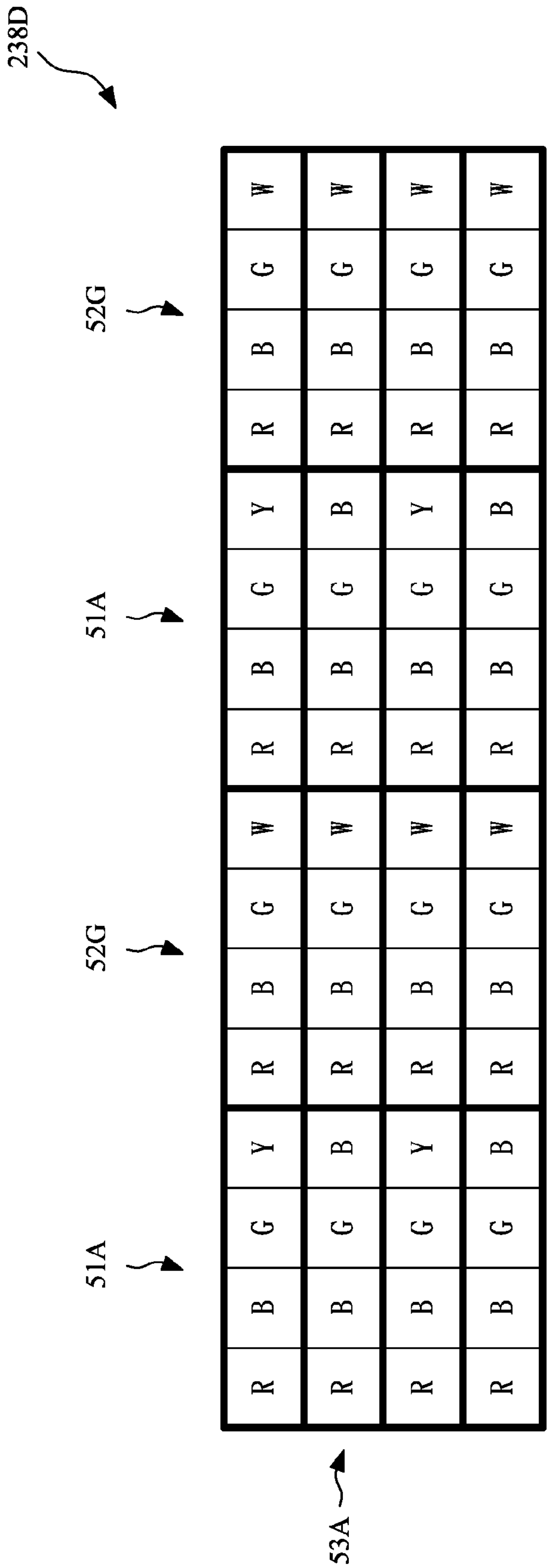
Figure 39A:
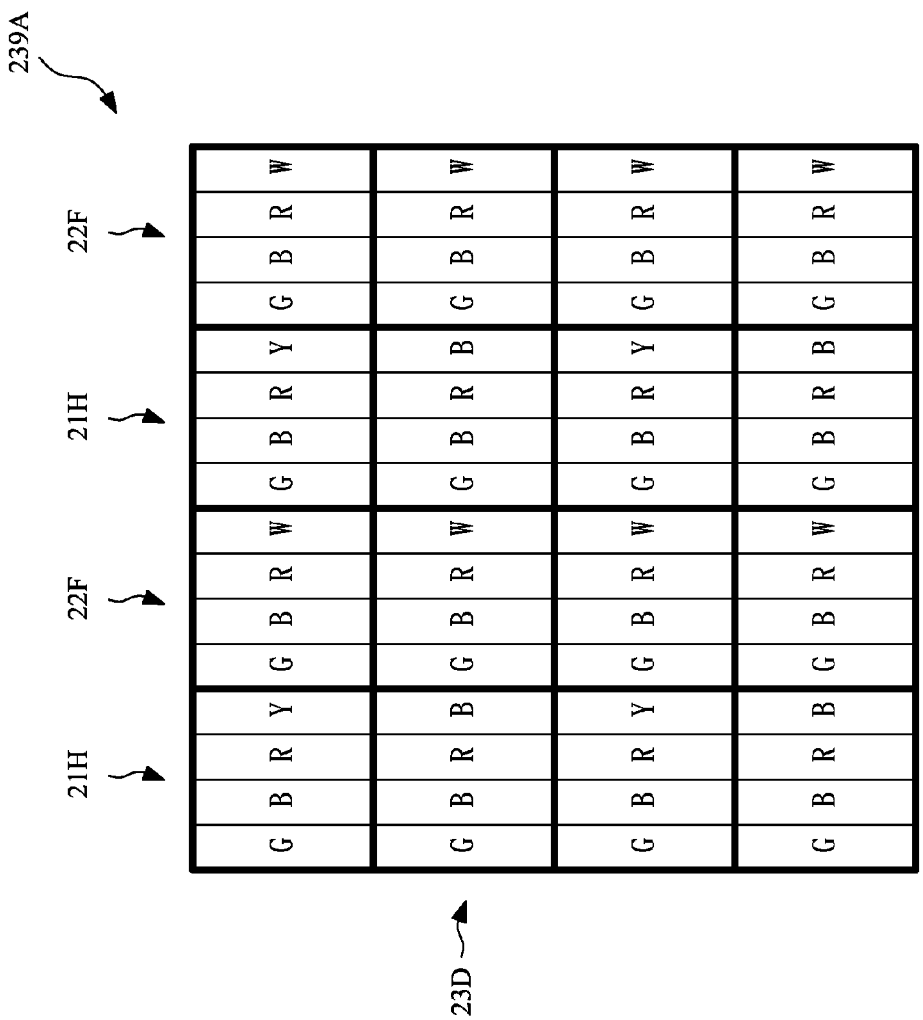
Figure 39B:
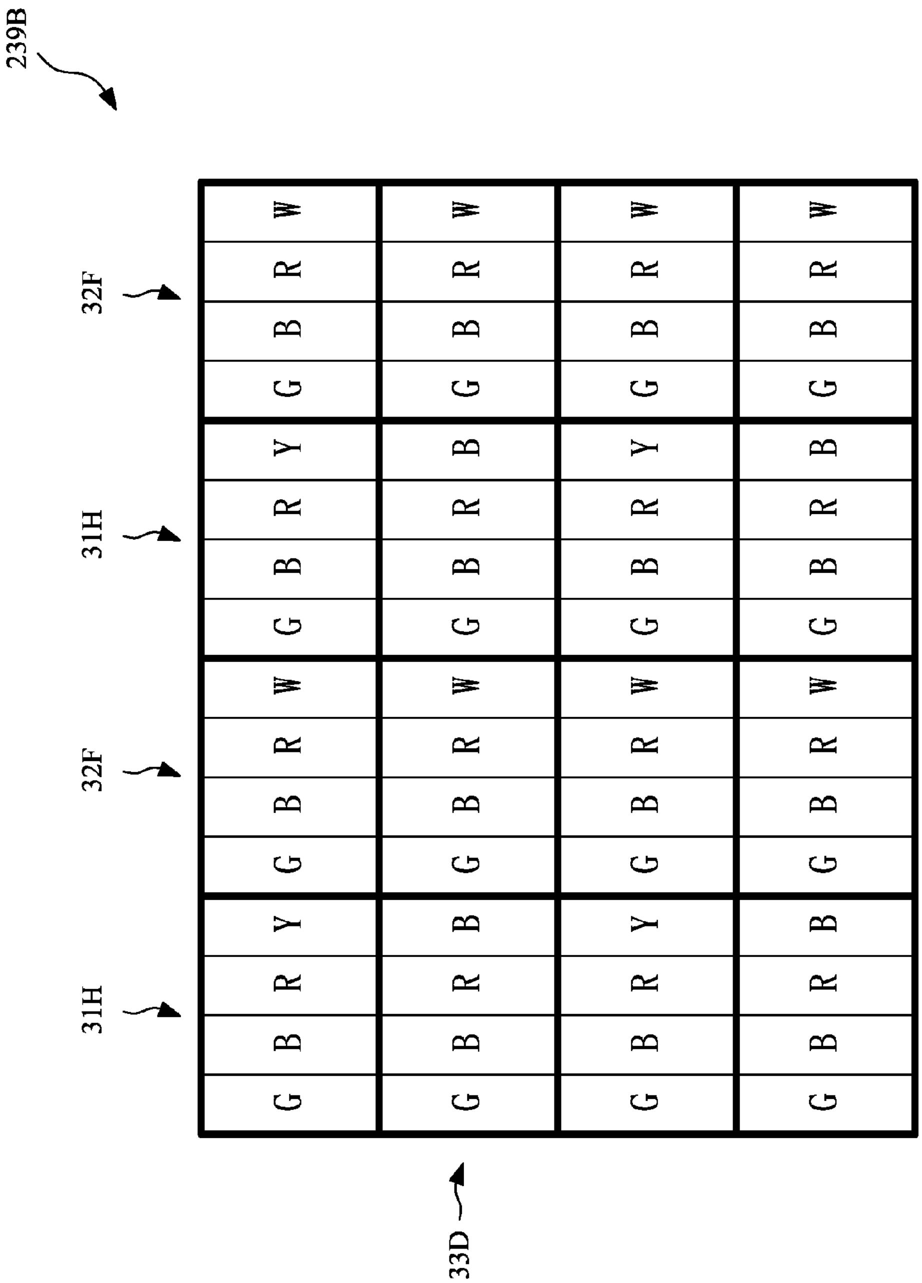
Figure 39C:
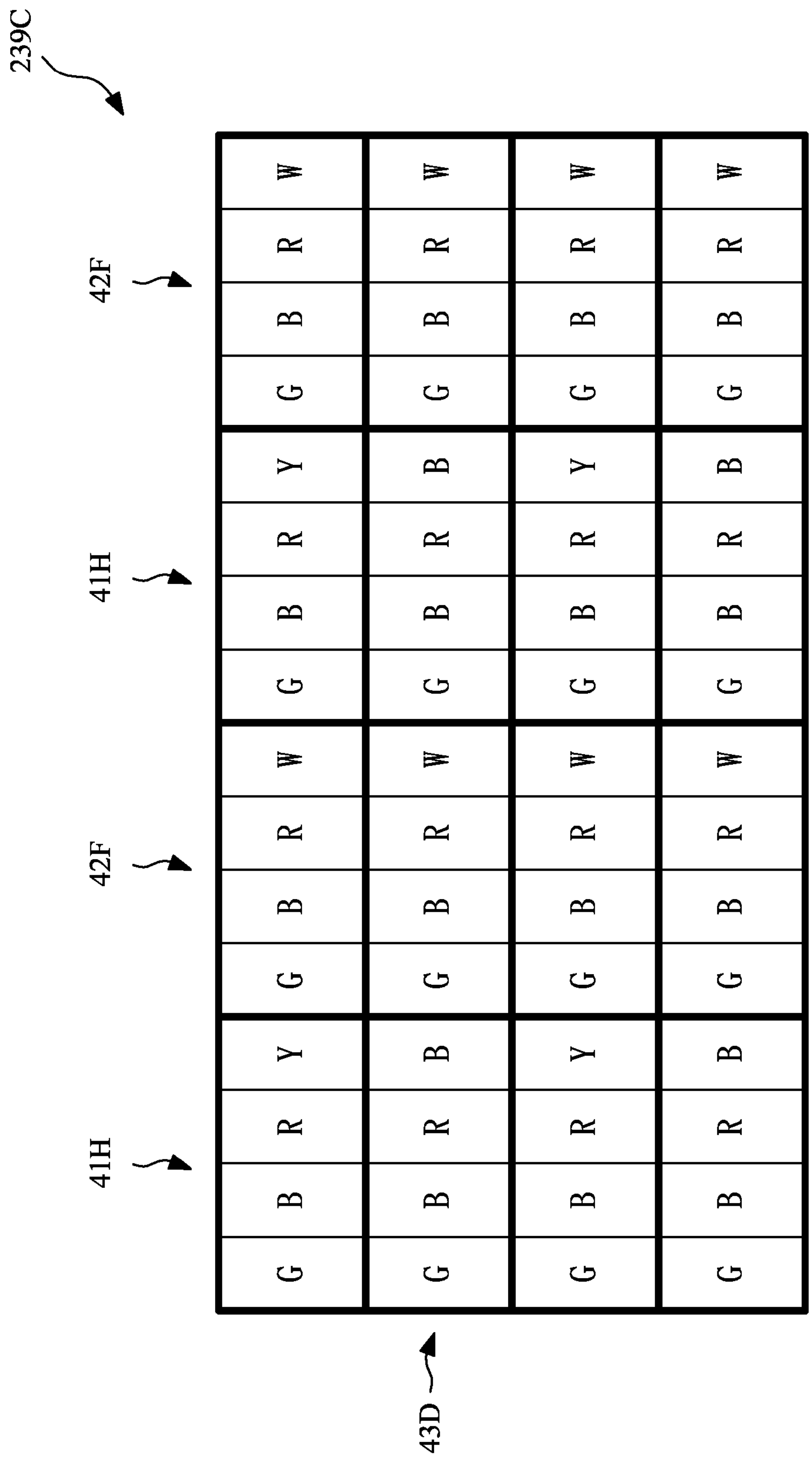
Figure 39D:
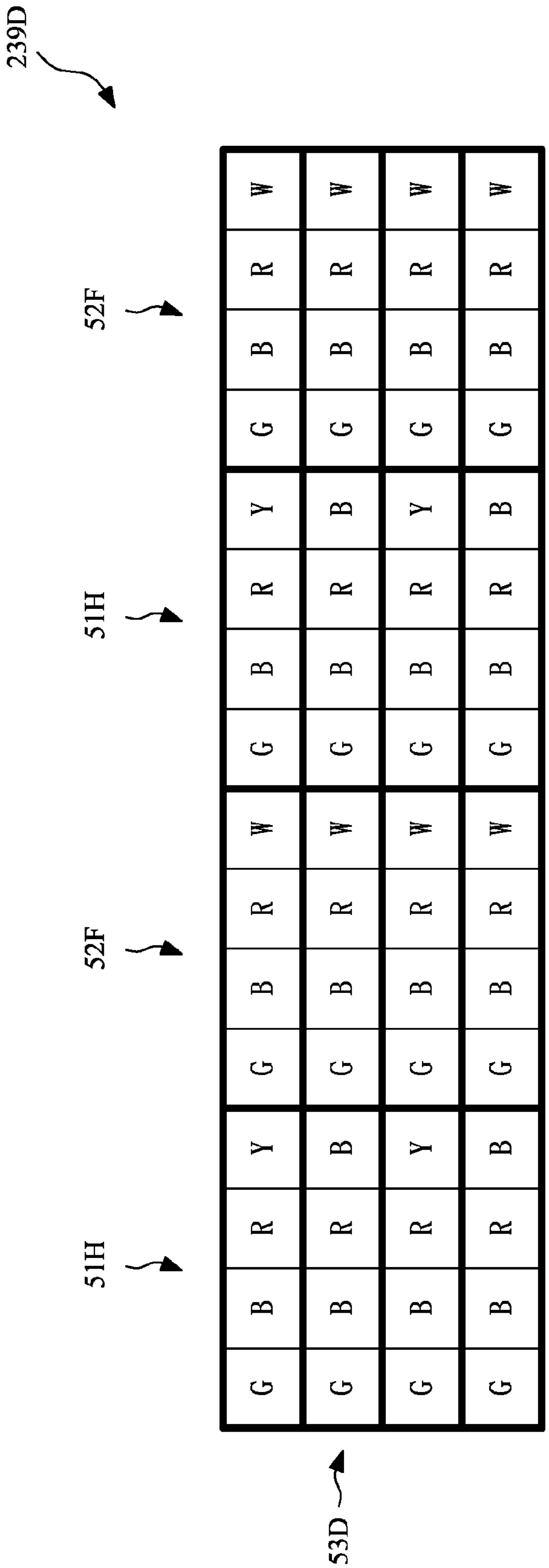
Figure 40A:
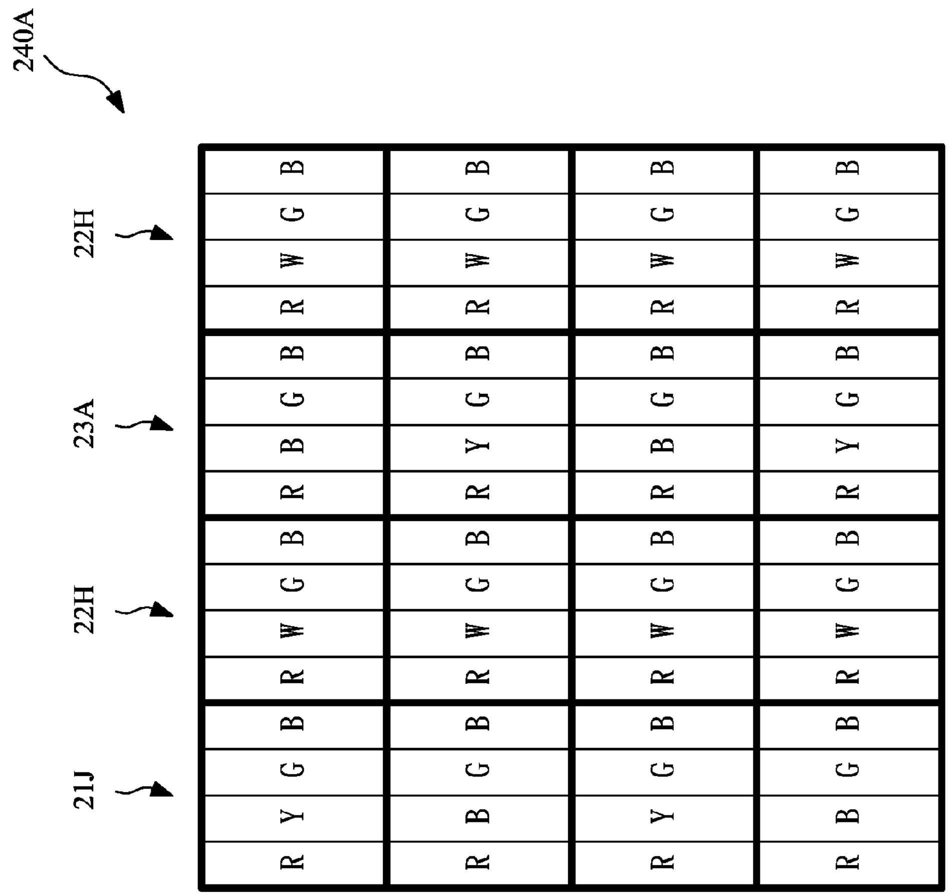
Figure 40B:
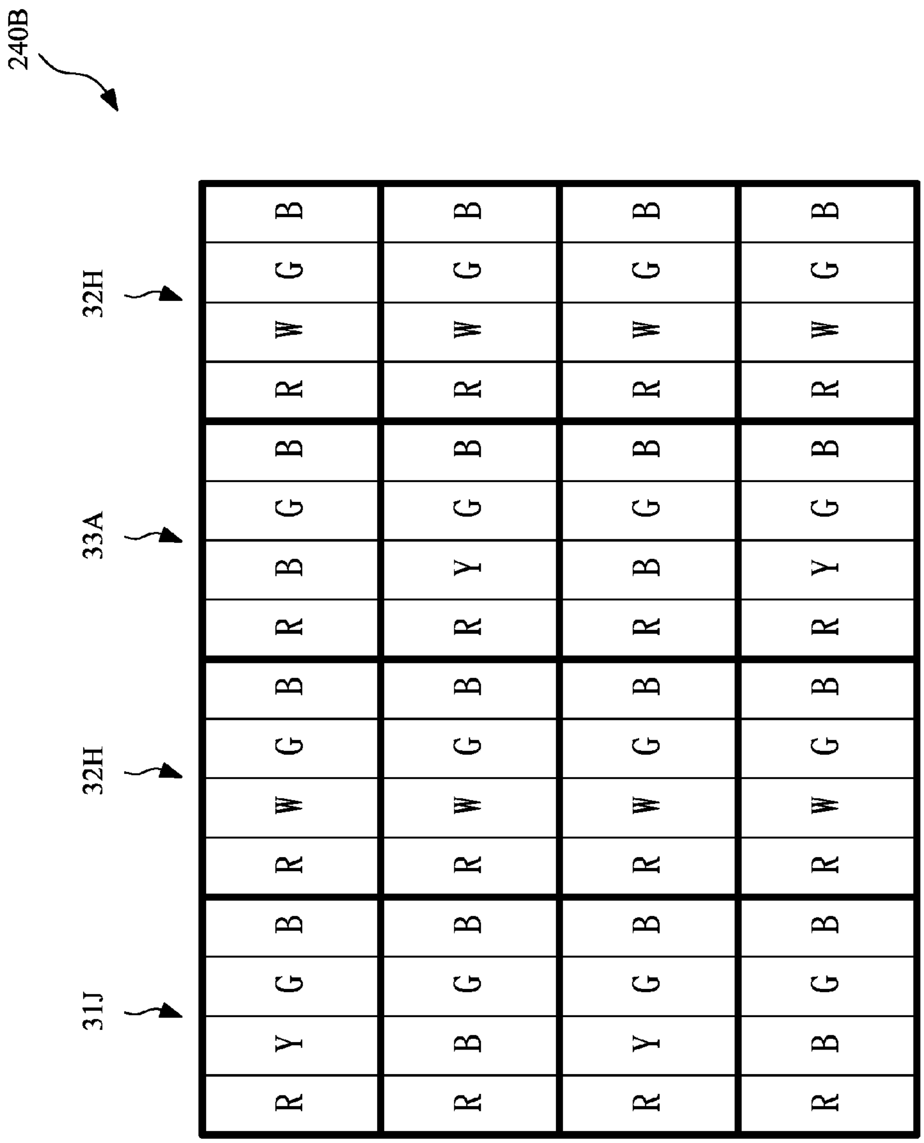
Figure 40C:
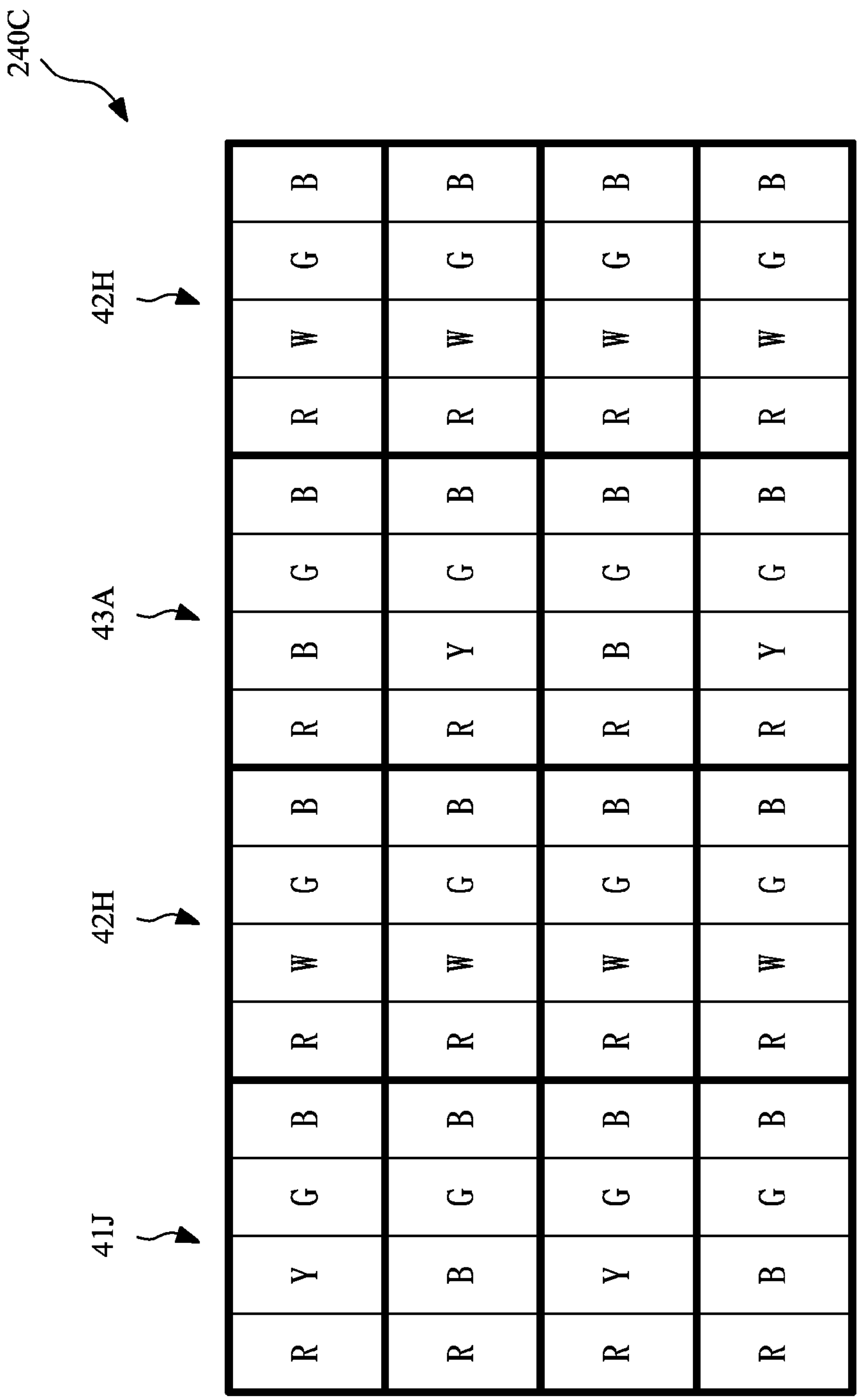
Figure 40D:
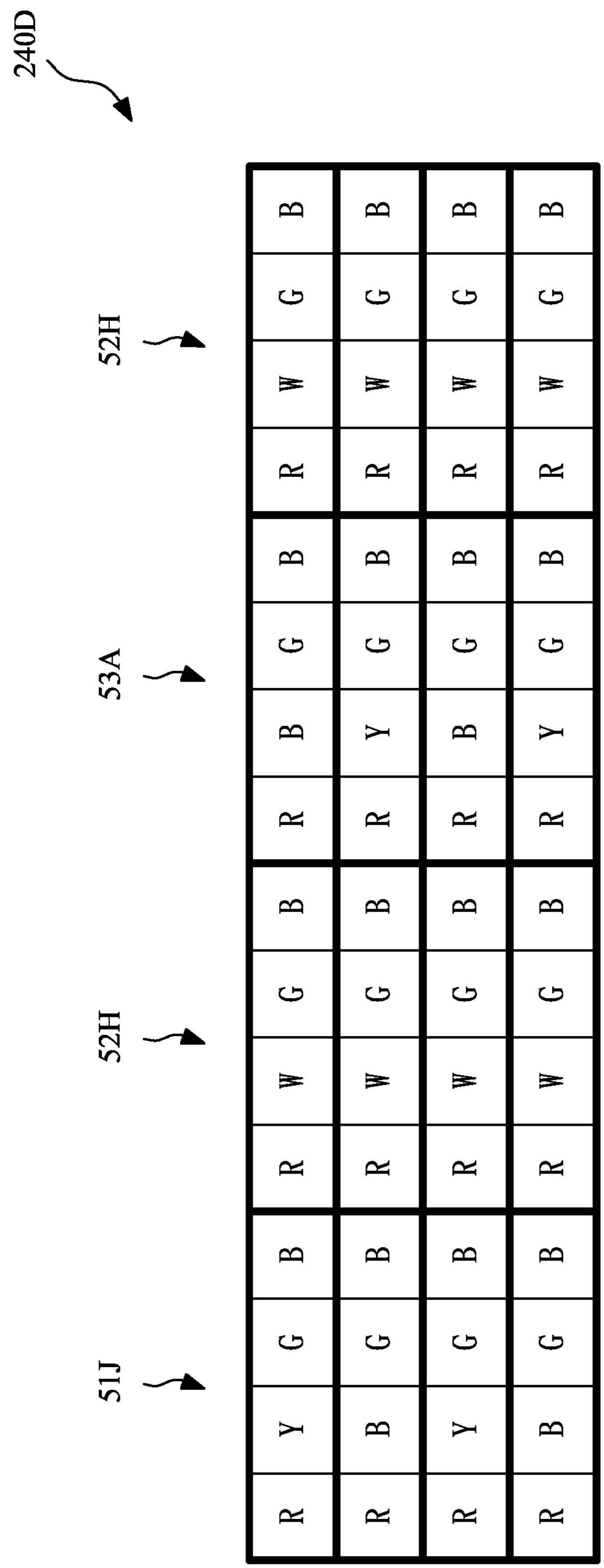
Figure 41A:
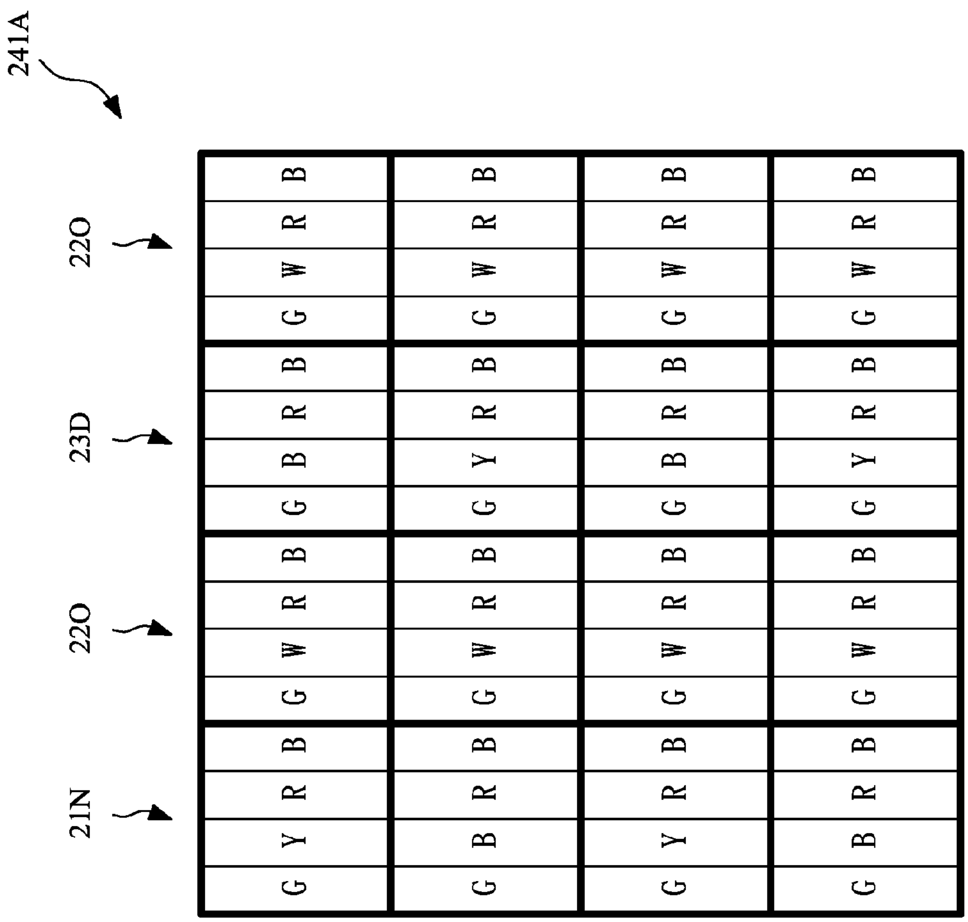
Figure 41B:
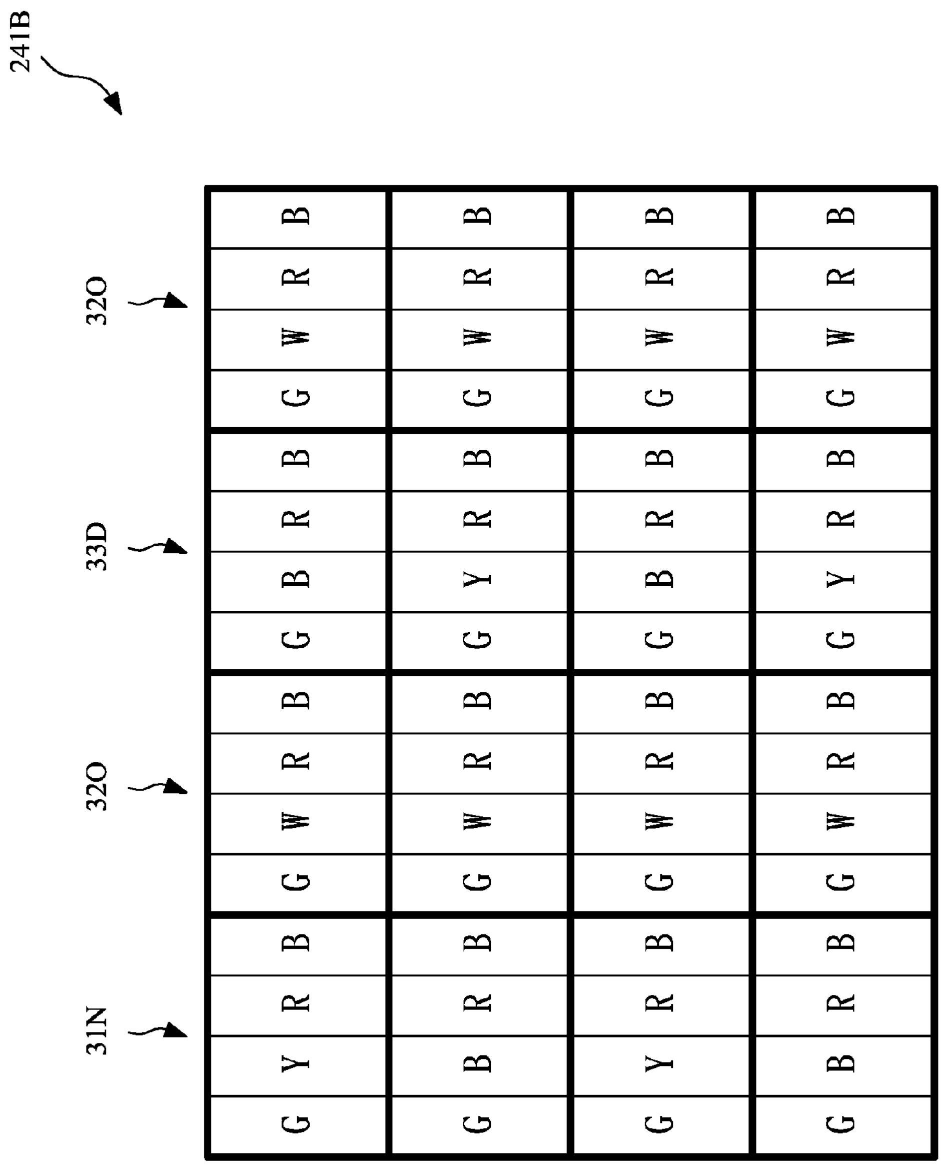
Figure 41C:
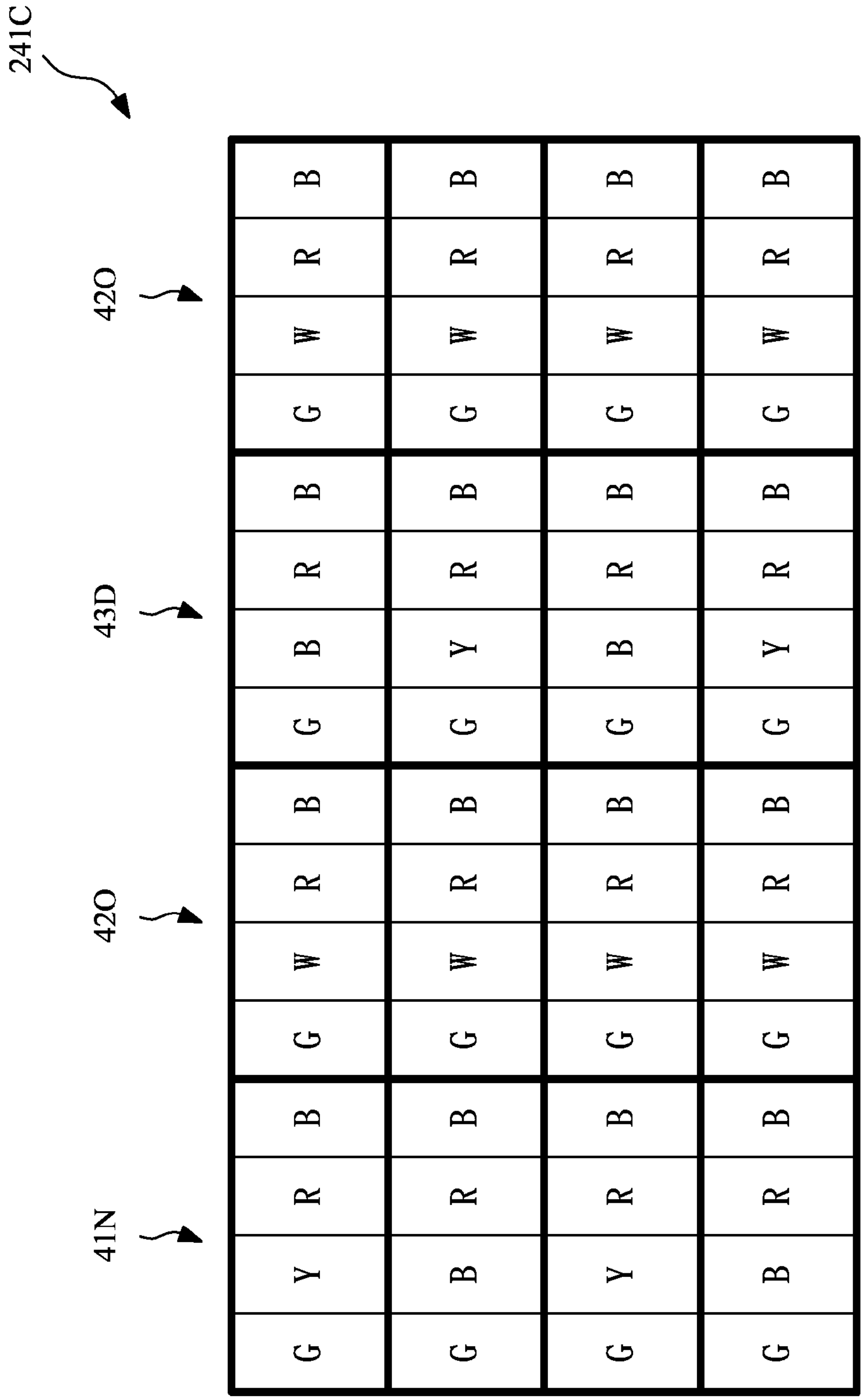
Figure 41D:
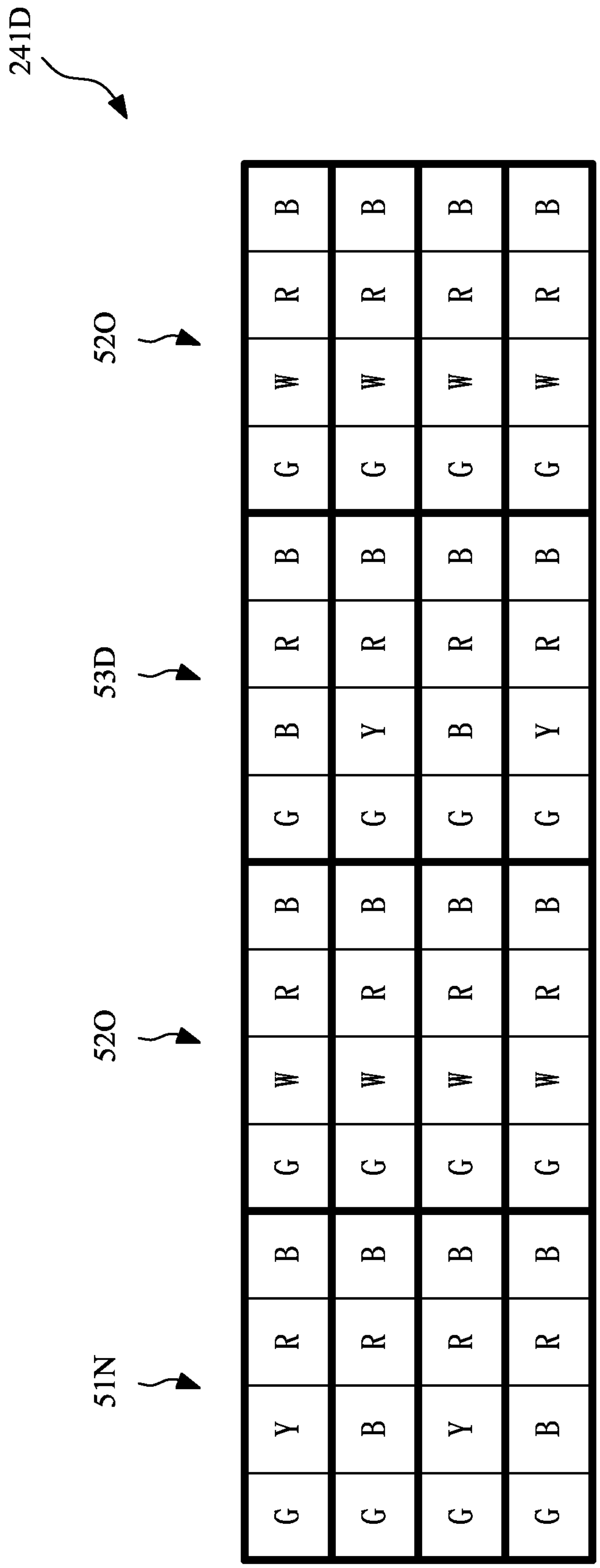
Figure 42A:
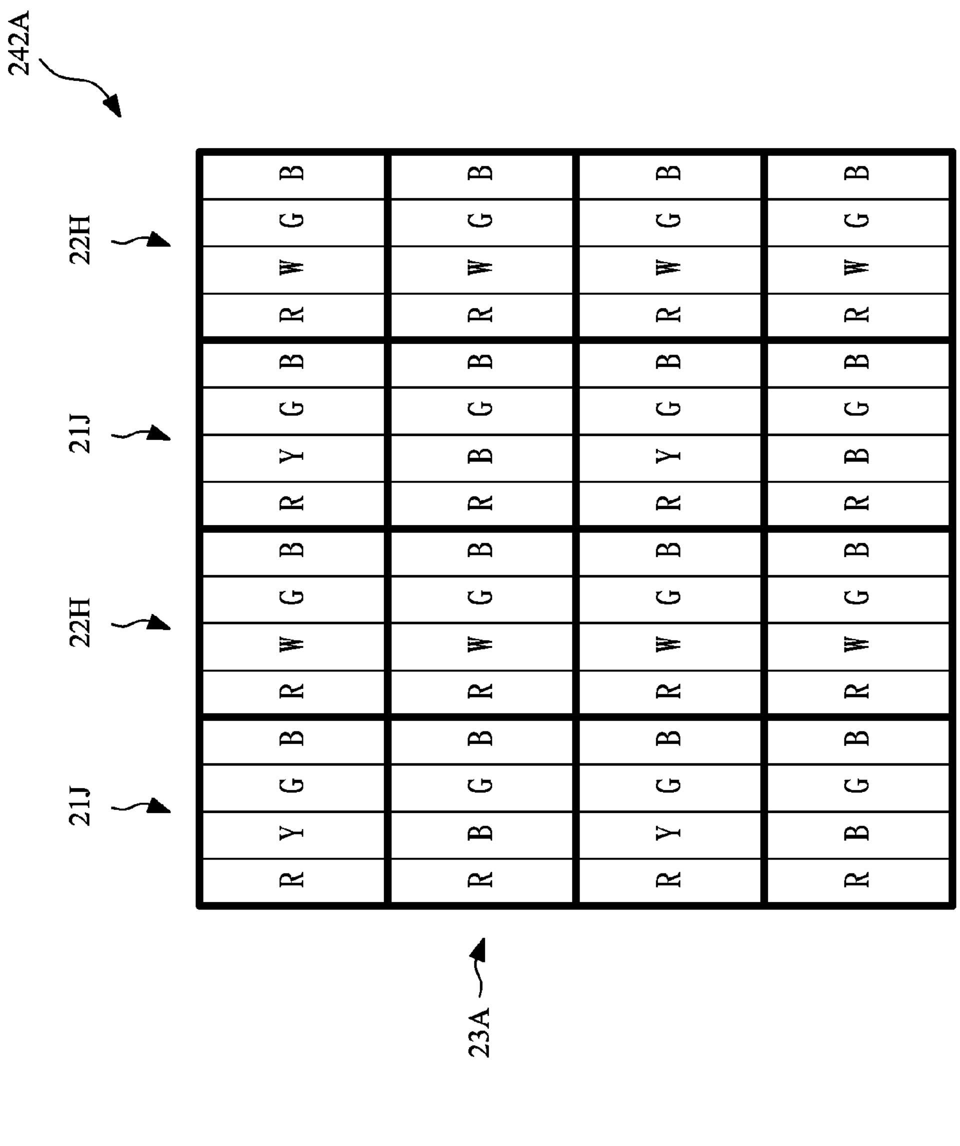
Figure 42B:
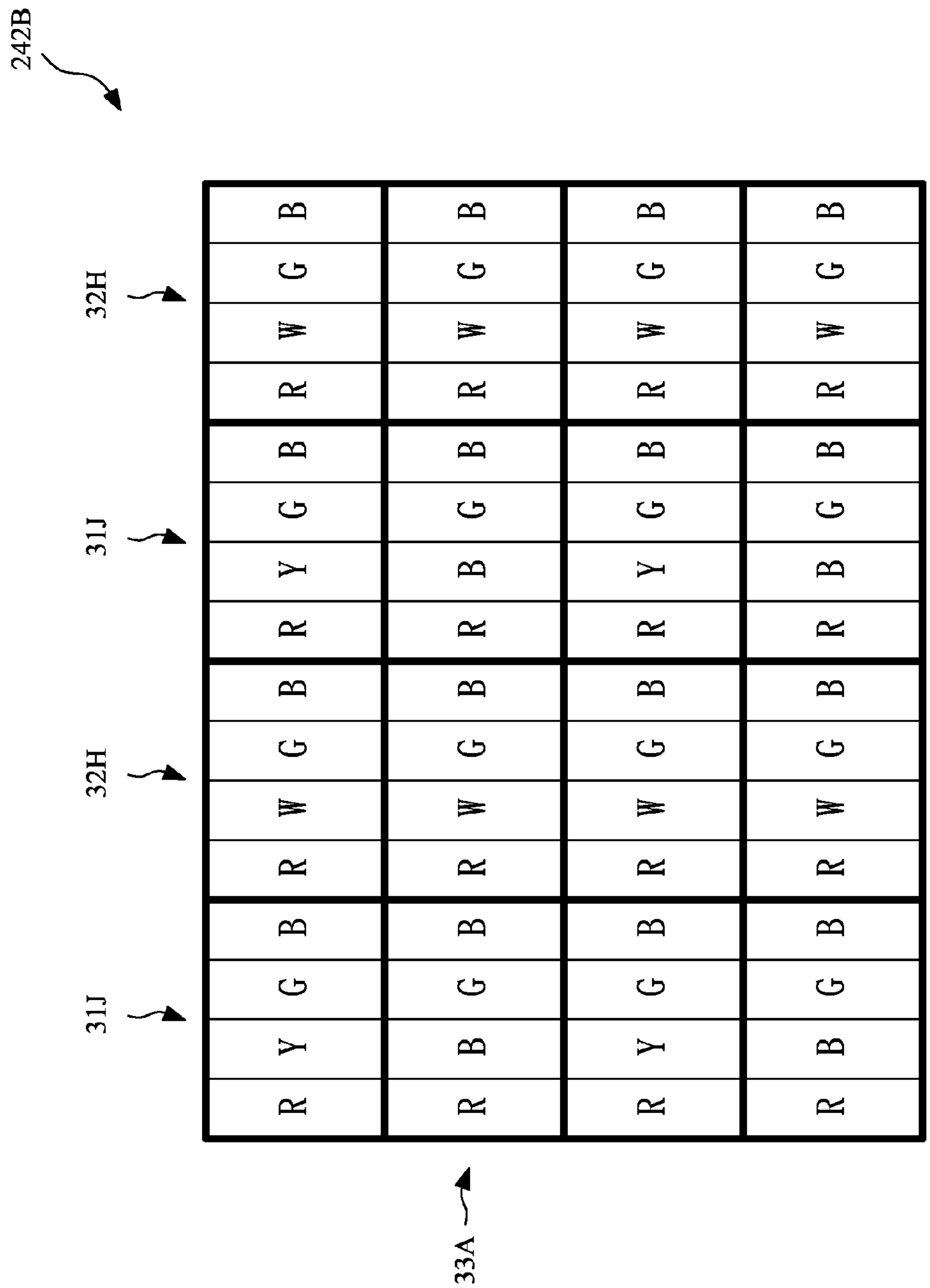
Figure 42C:
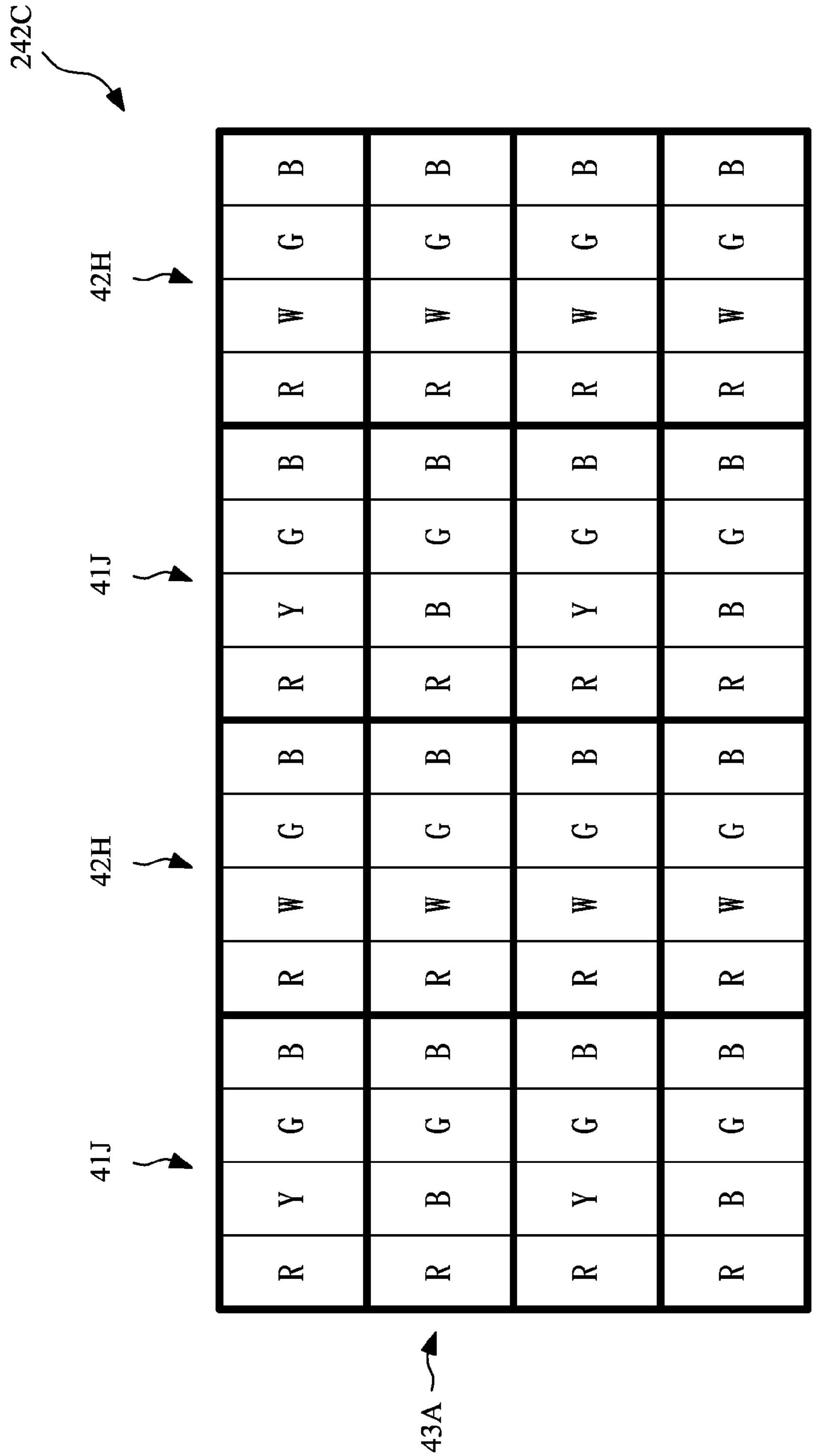
Figure 42D:
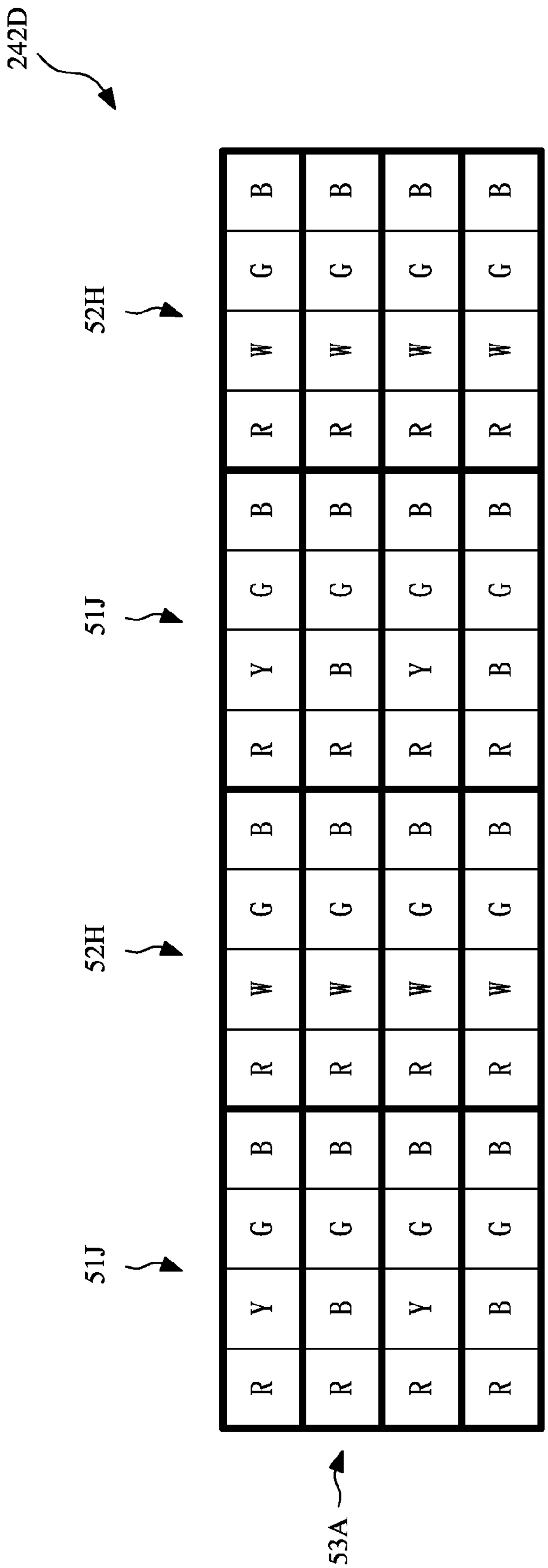
Figure 43A:
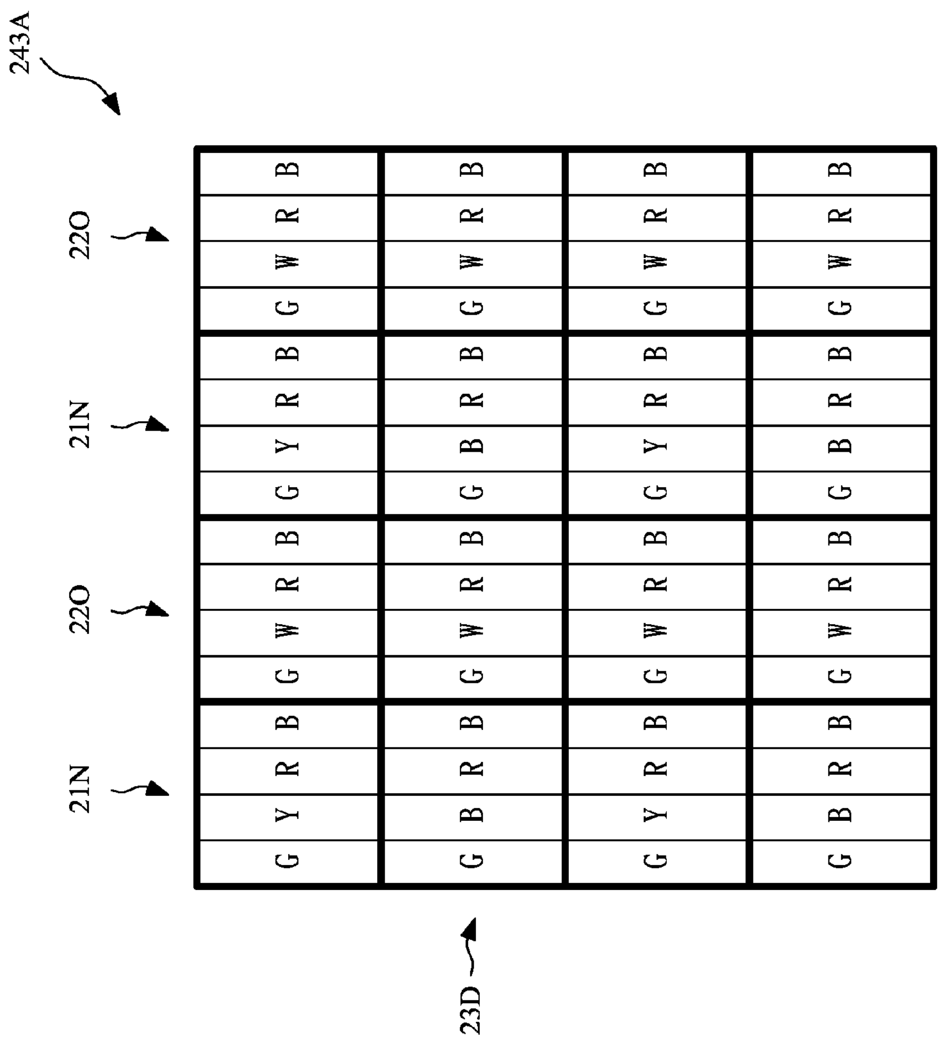
Figure 43B:
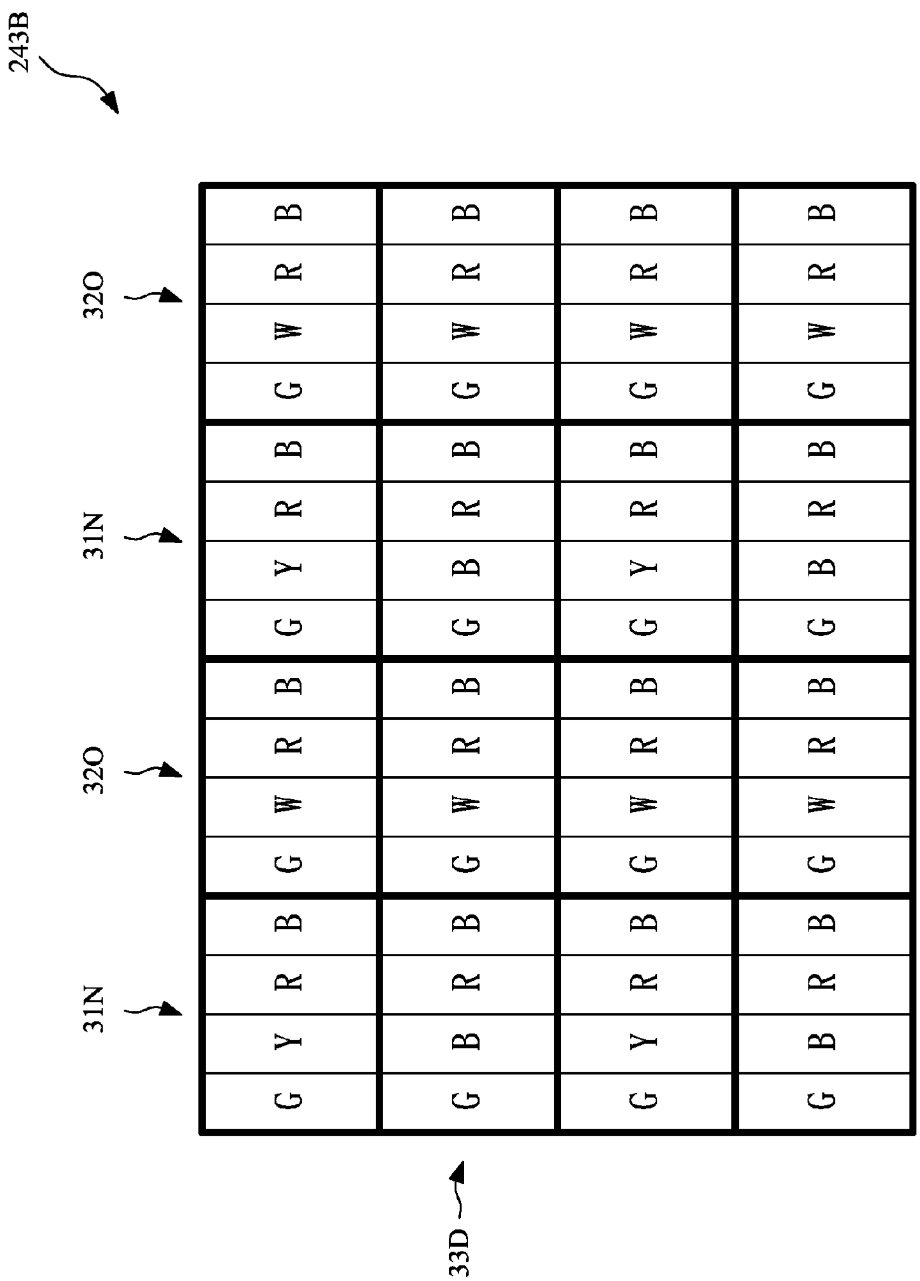
Figure 43C:
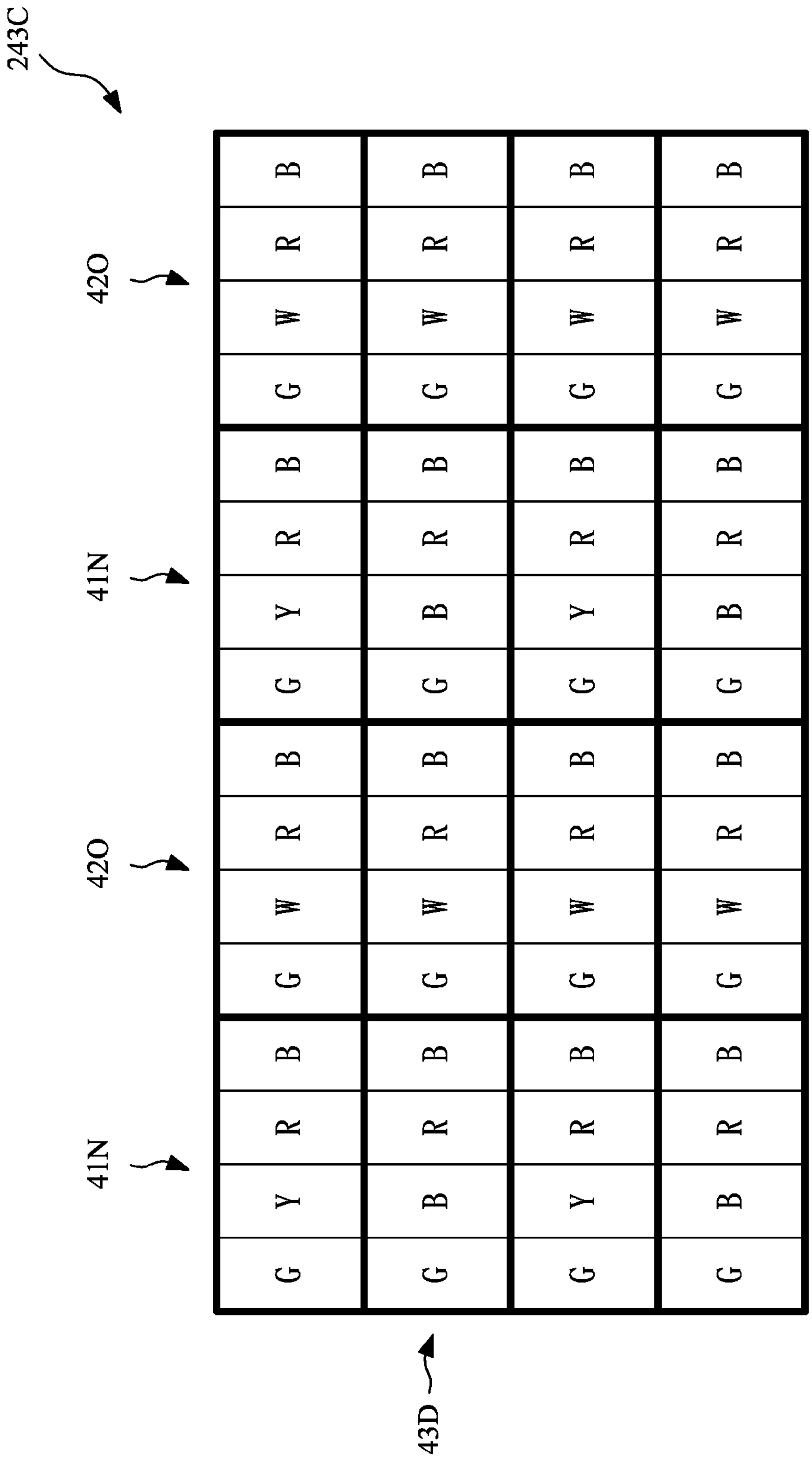
Figure 43D:
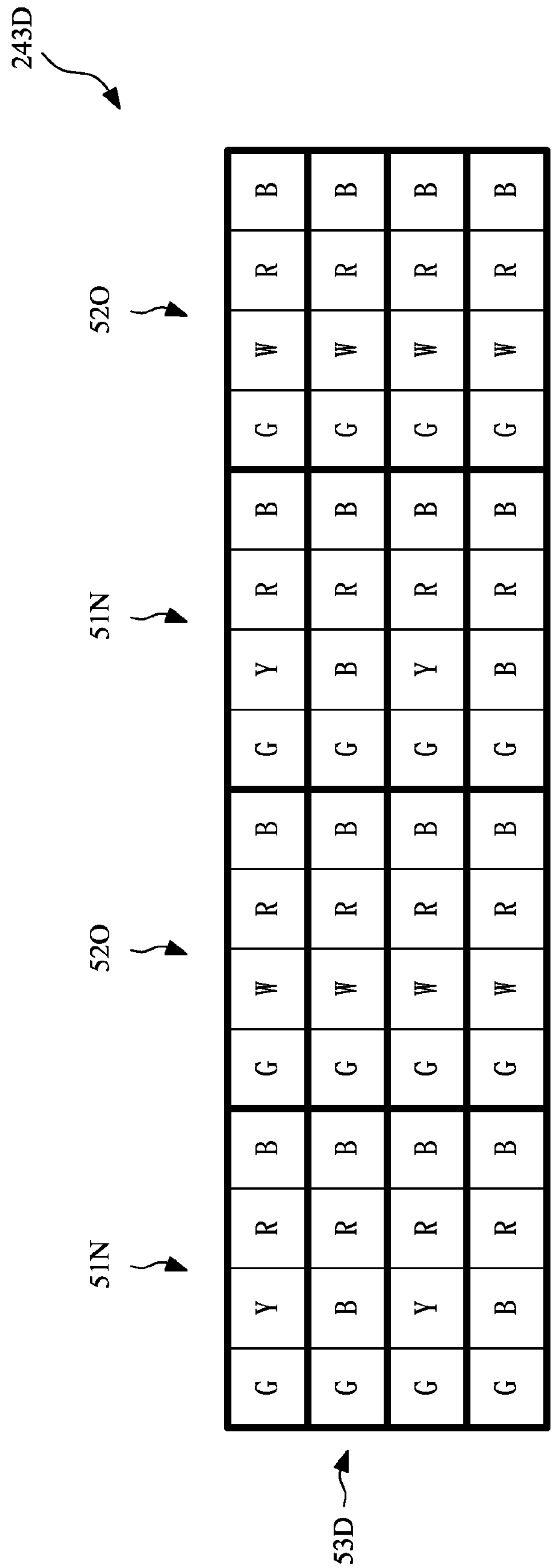
Figure 44A:
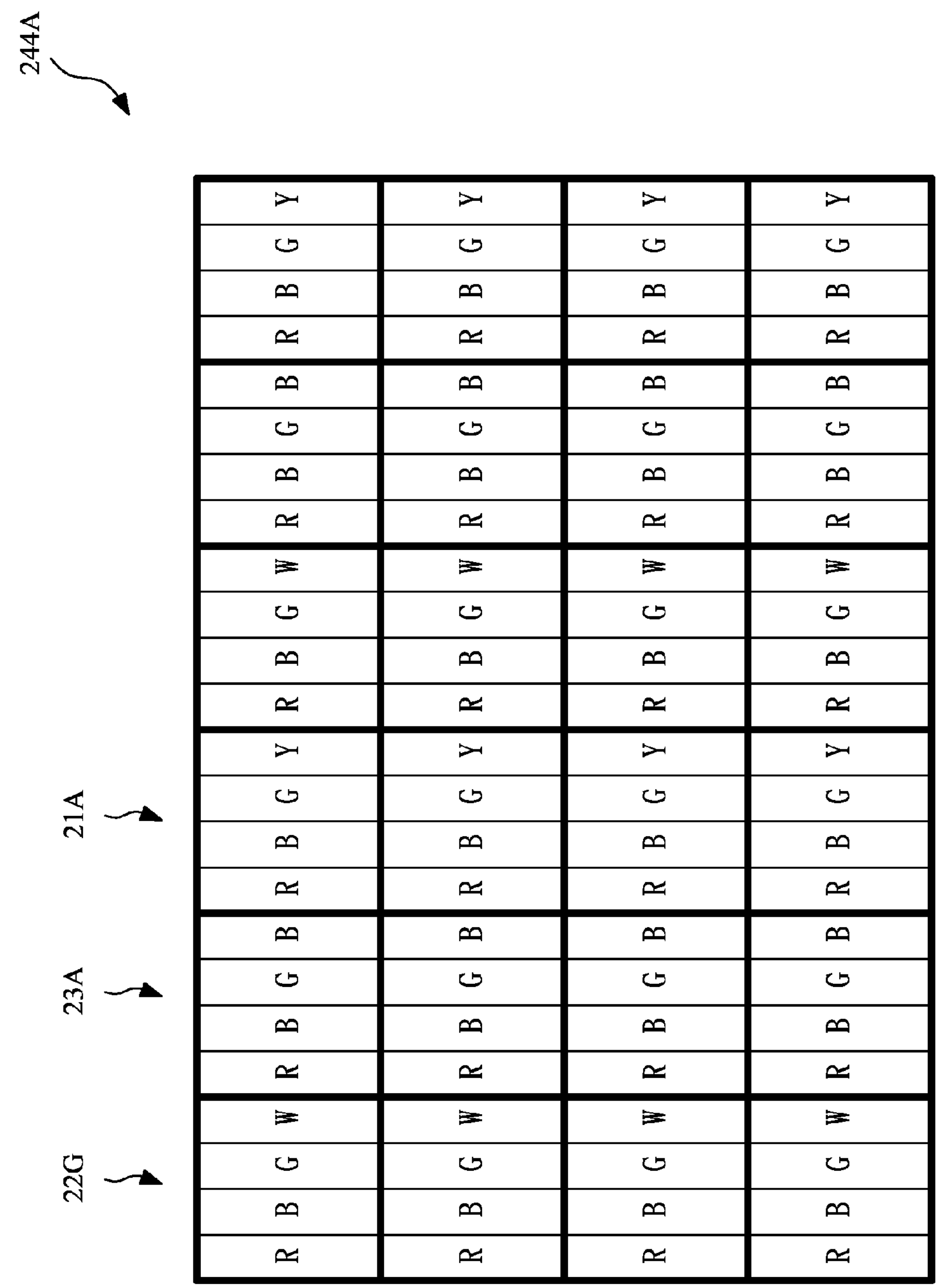
Figure 44B:
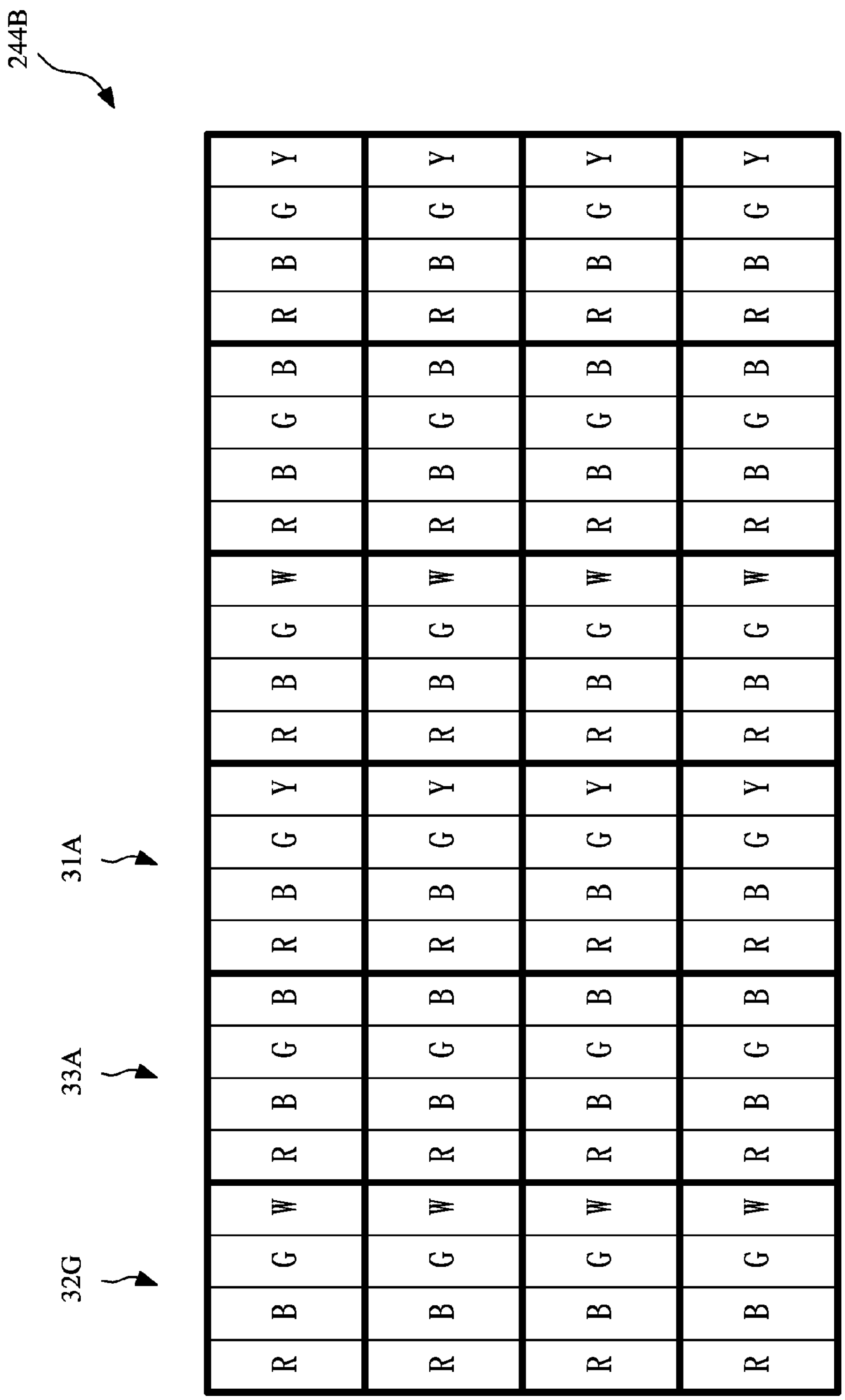
Figure 44C:
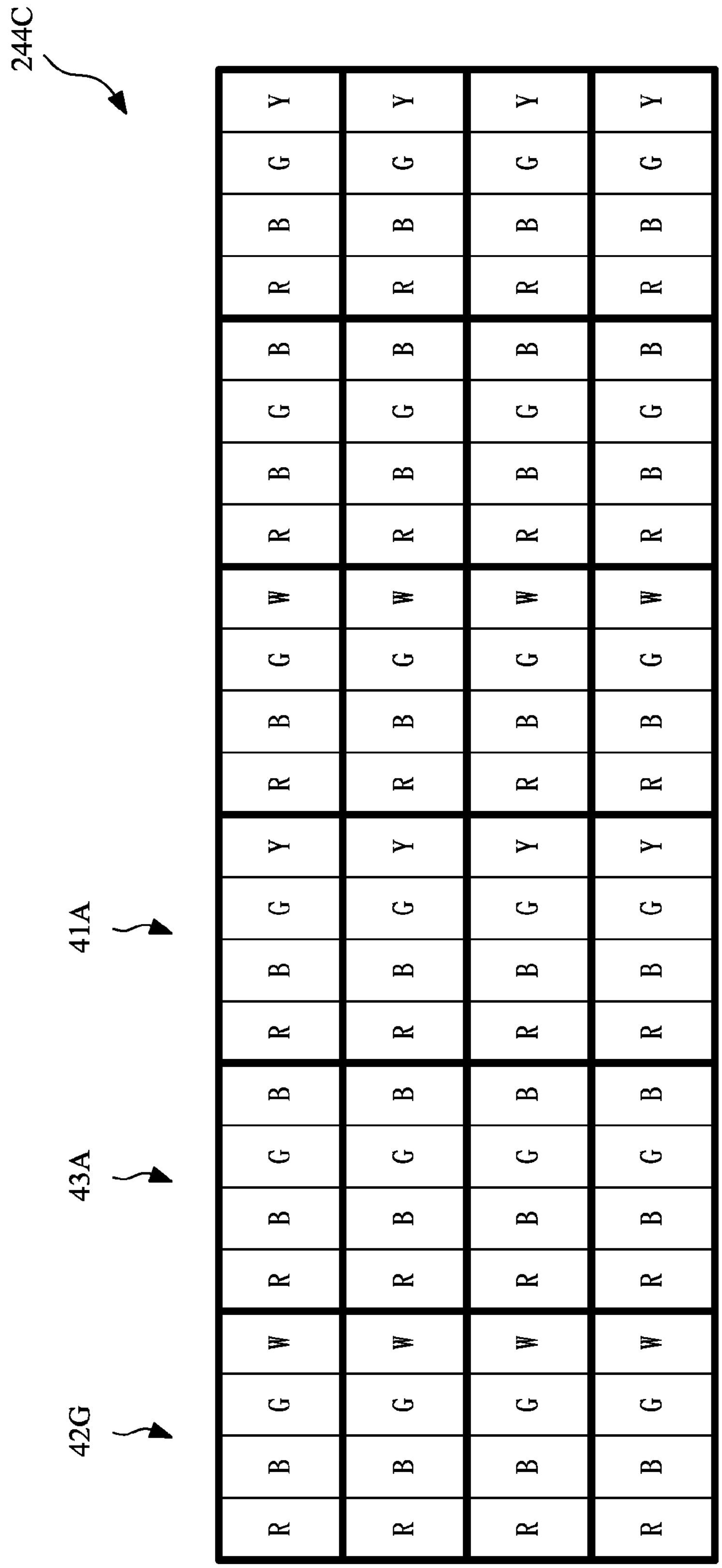
Figure 44D:
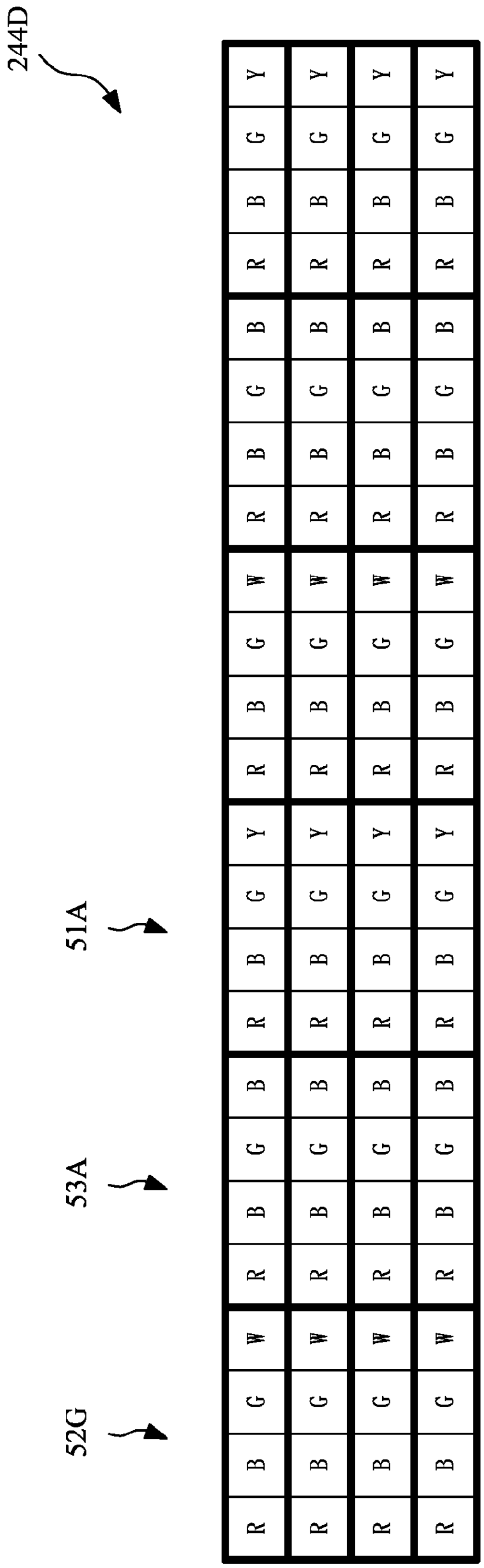
Figure 45A:
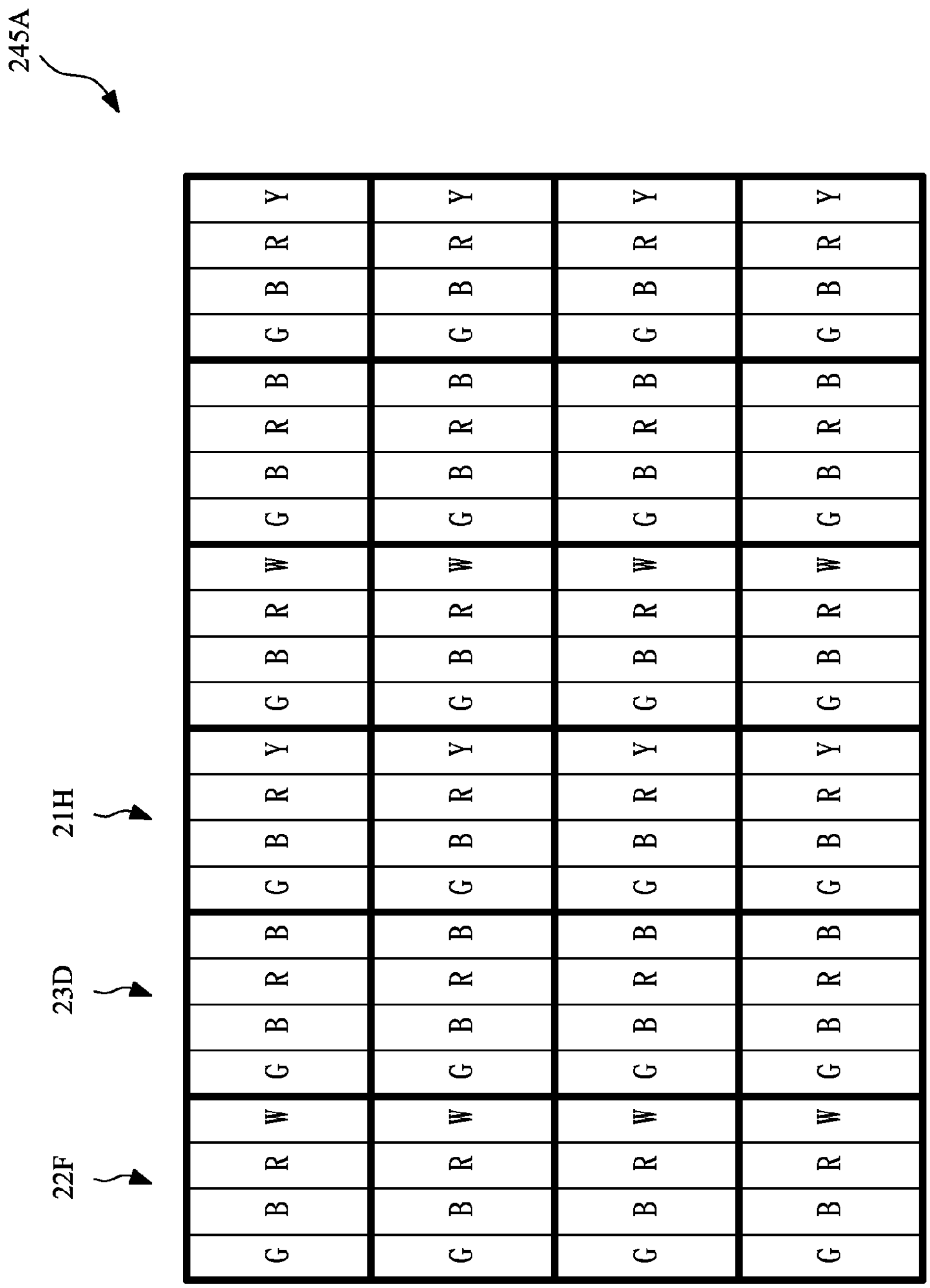
Figure 45B:
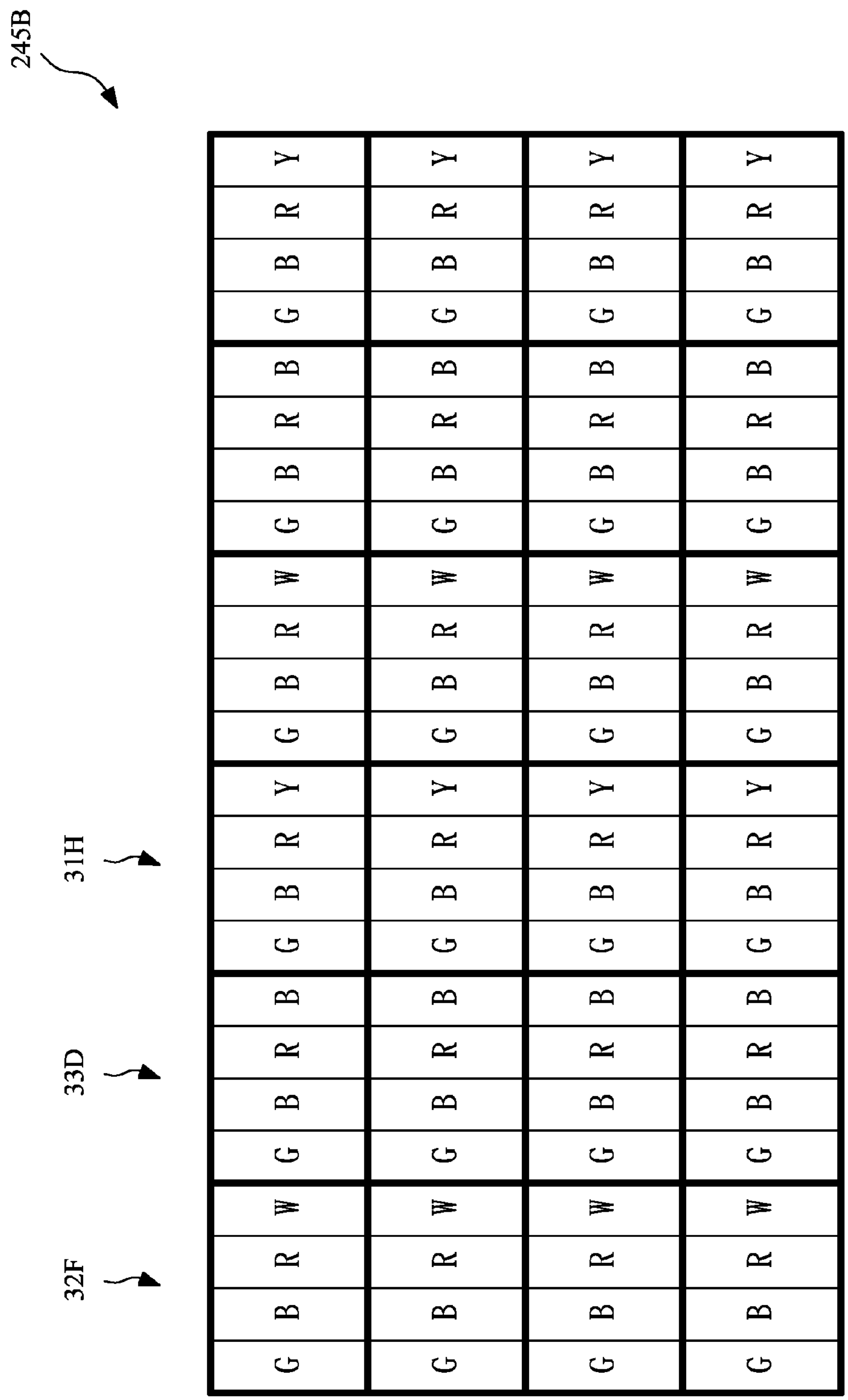
Figure 45C:
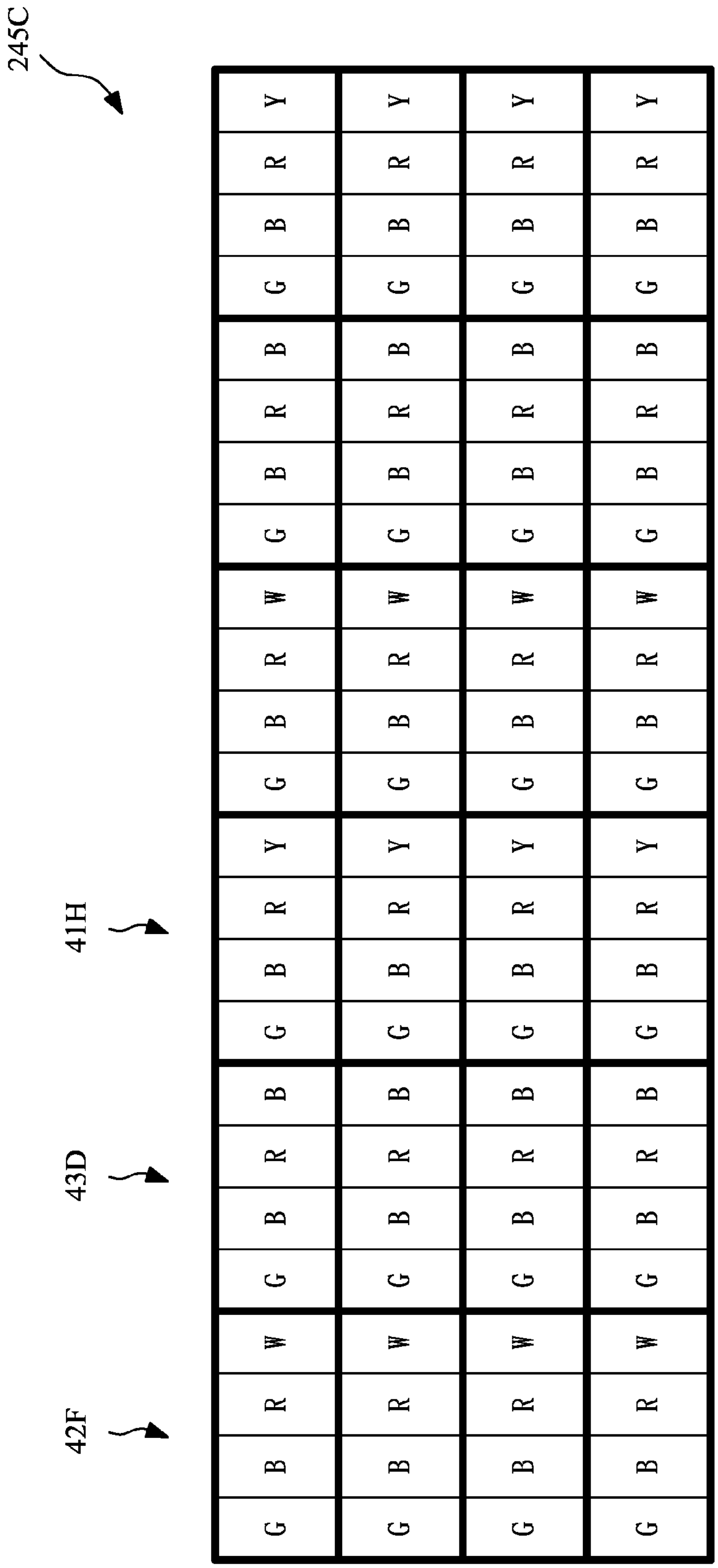
Figure 45D:
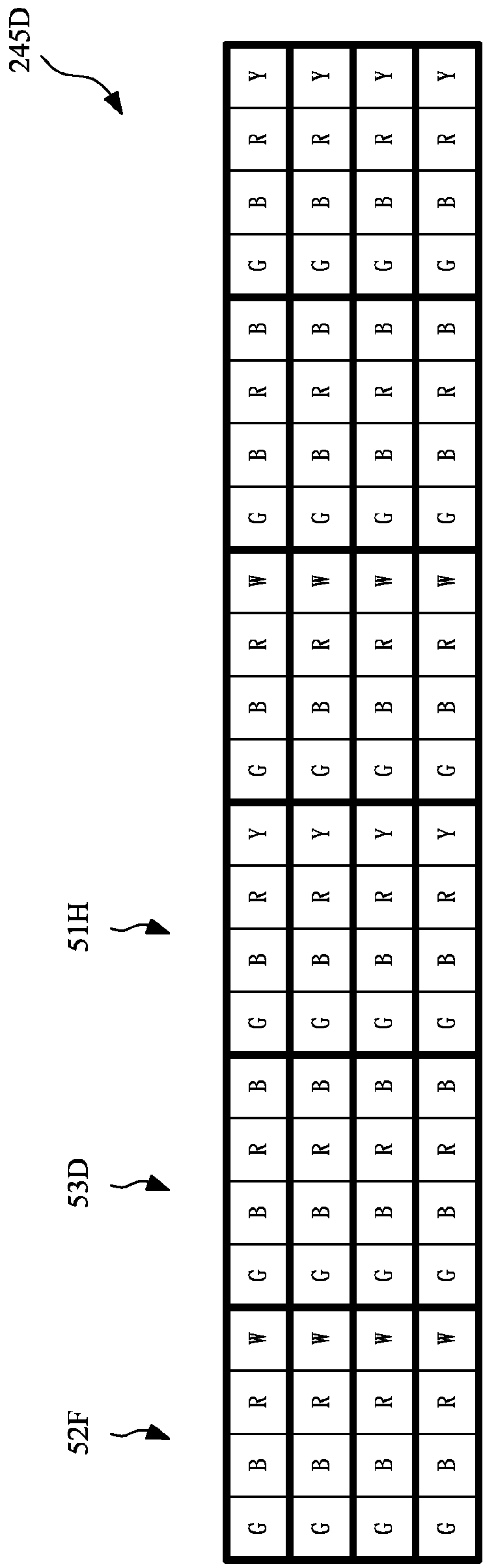
Figure 46A:
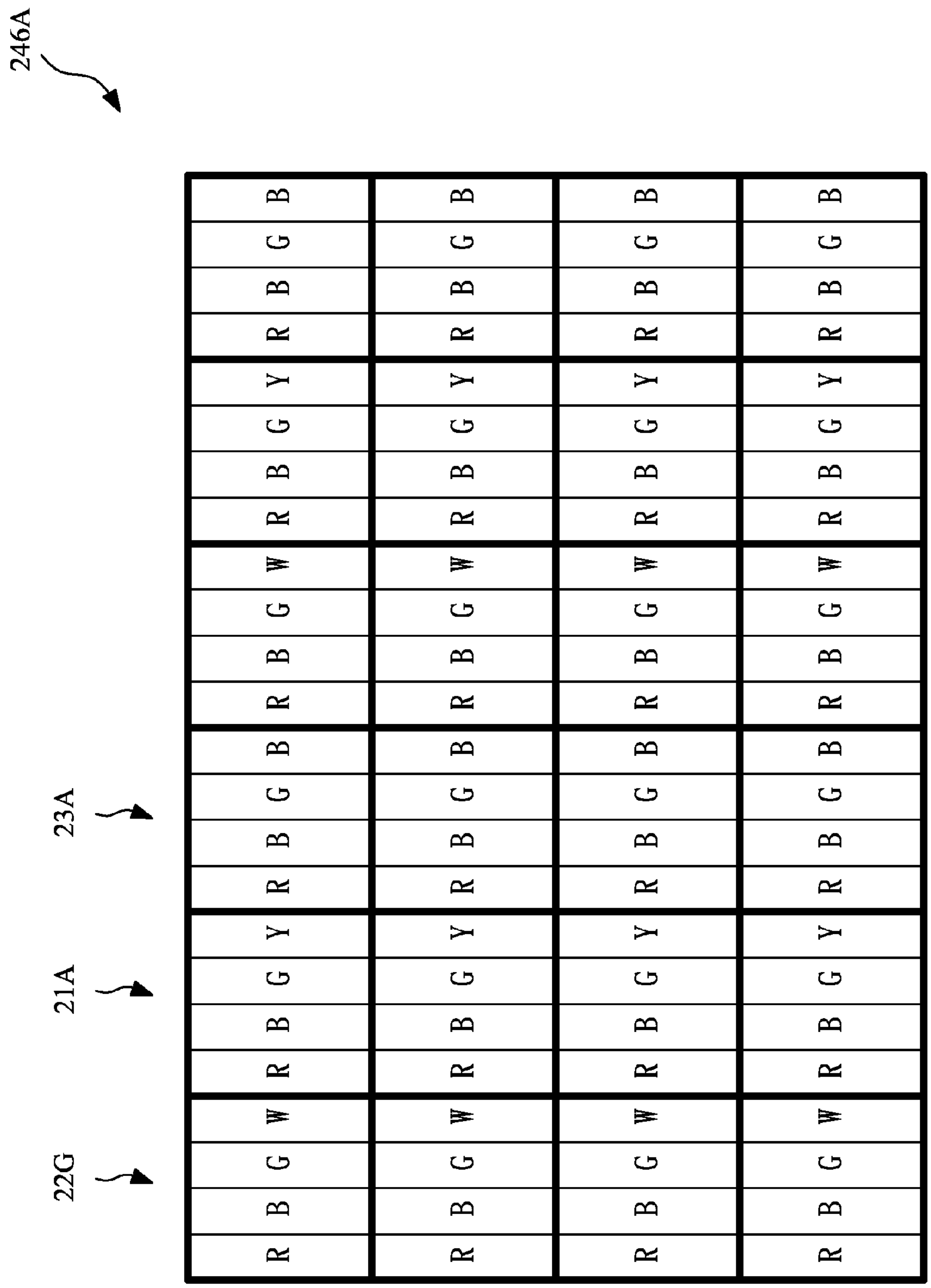
Figure 46B:
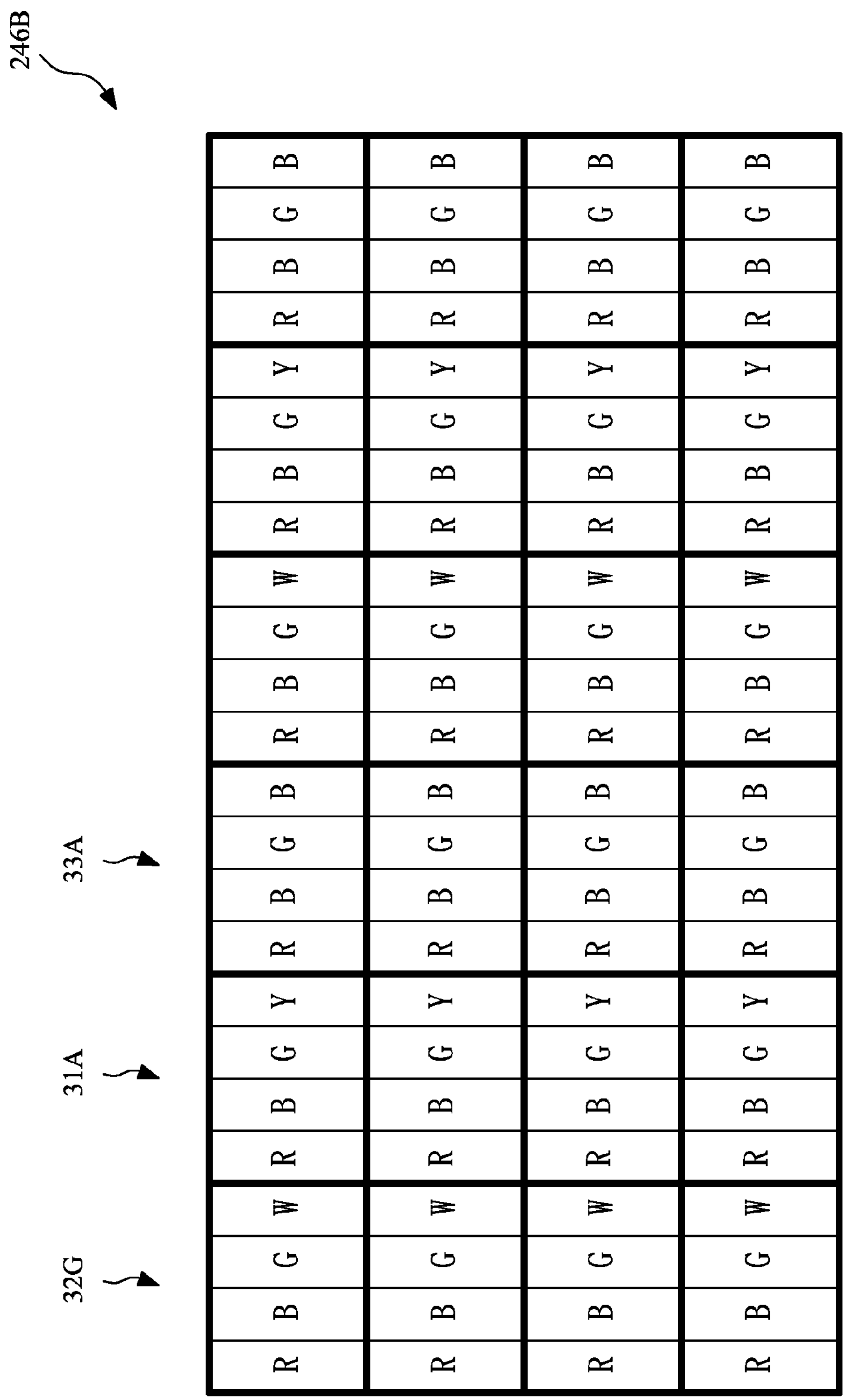
Figure 46C:
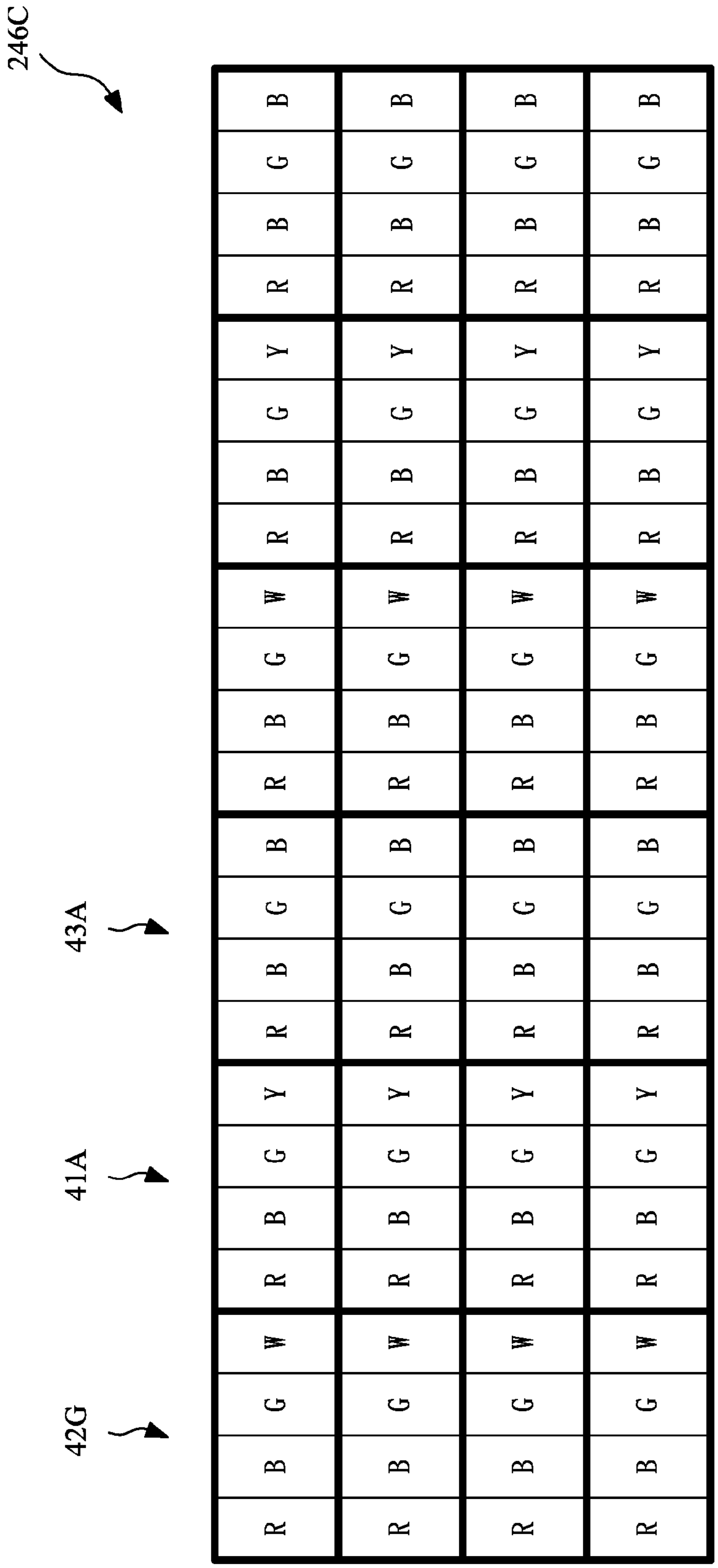
Figure 46D:
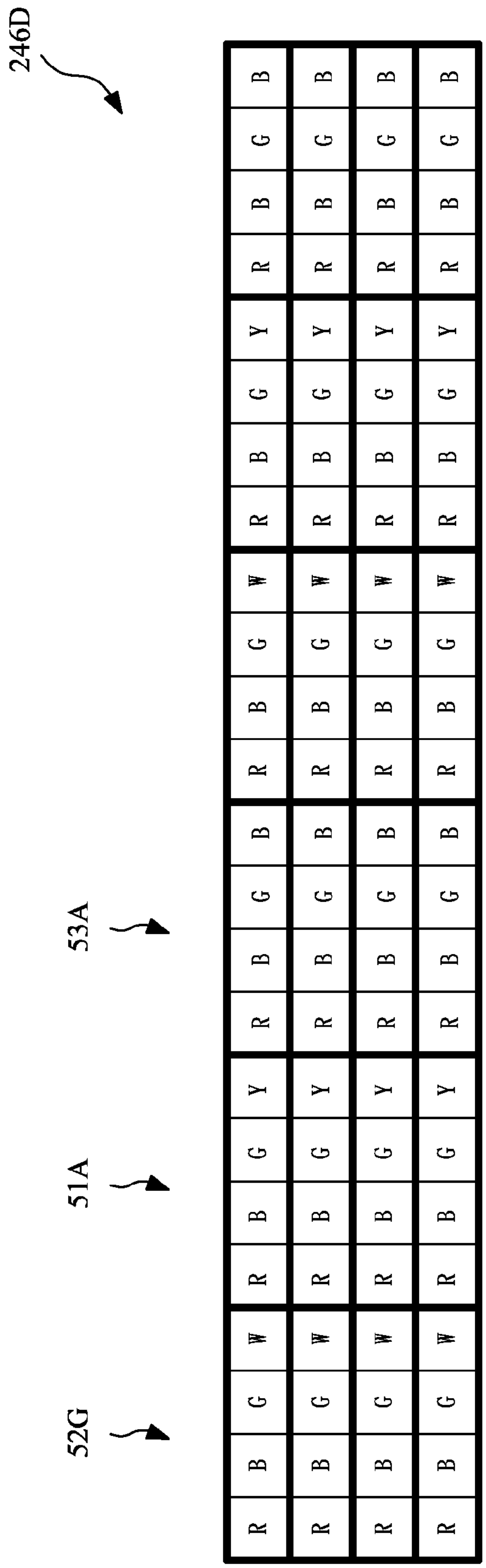
Figure 47A:
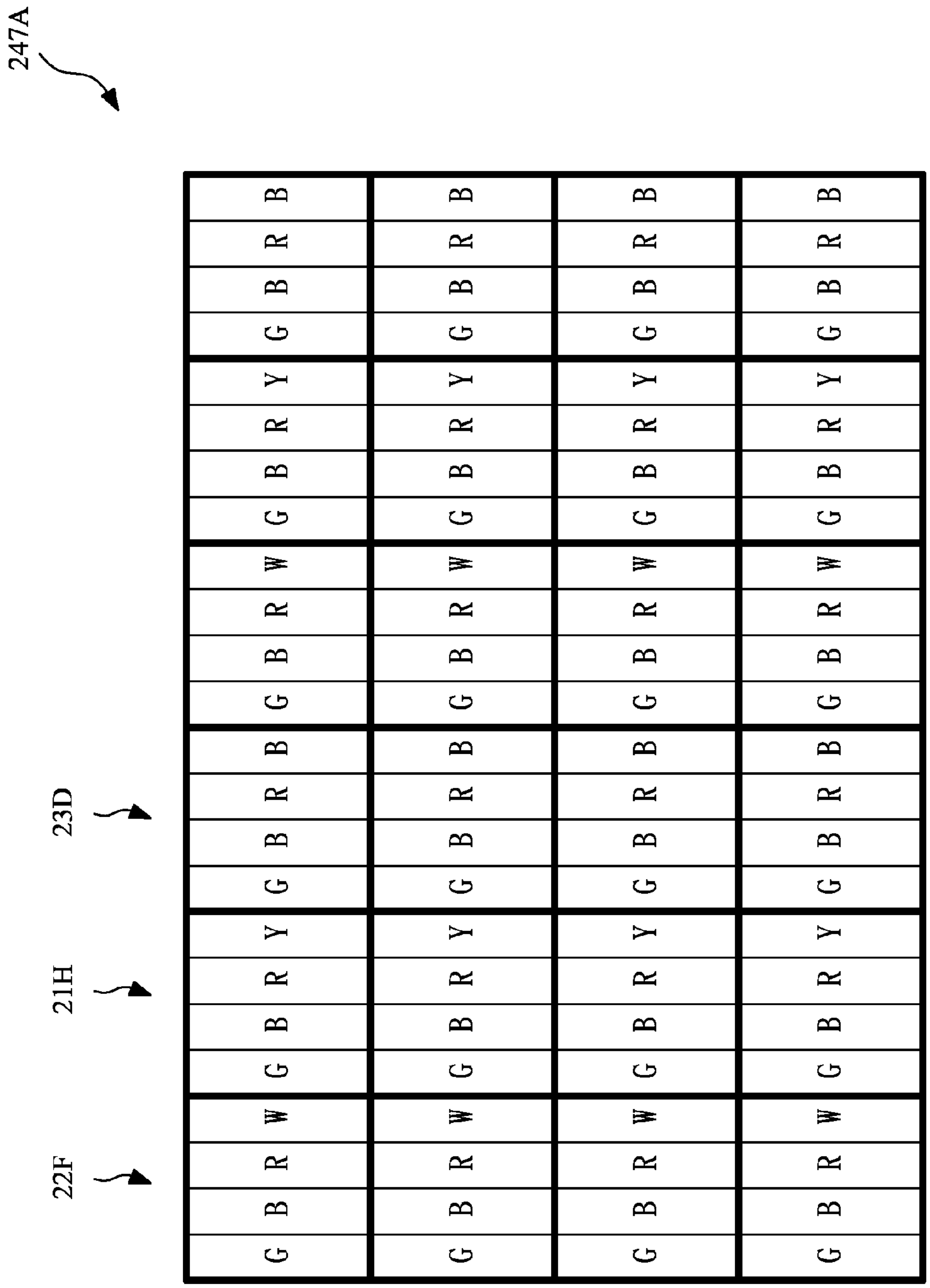
Figure 47B:
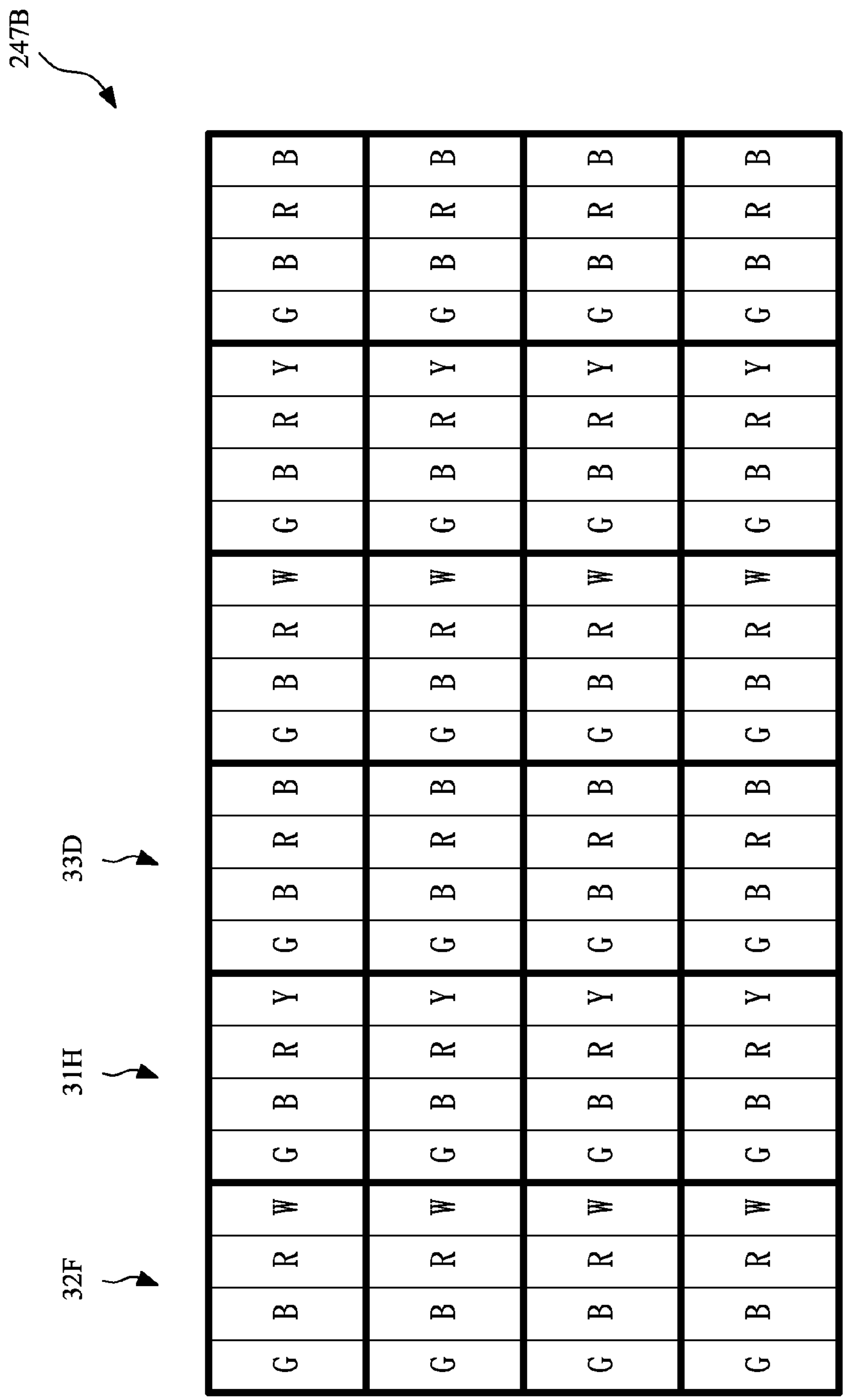
Figure 47C:
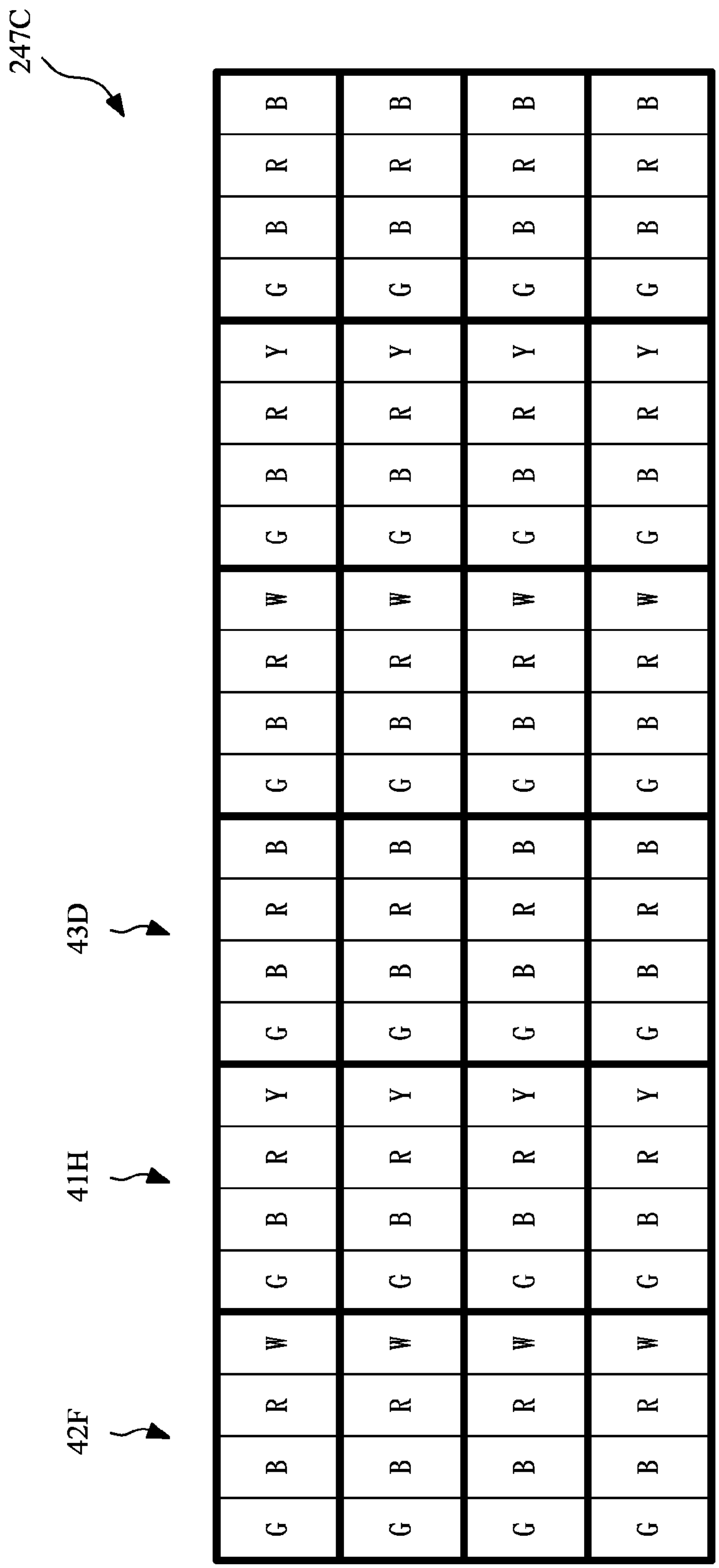
Figure 47D:
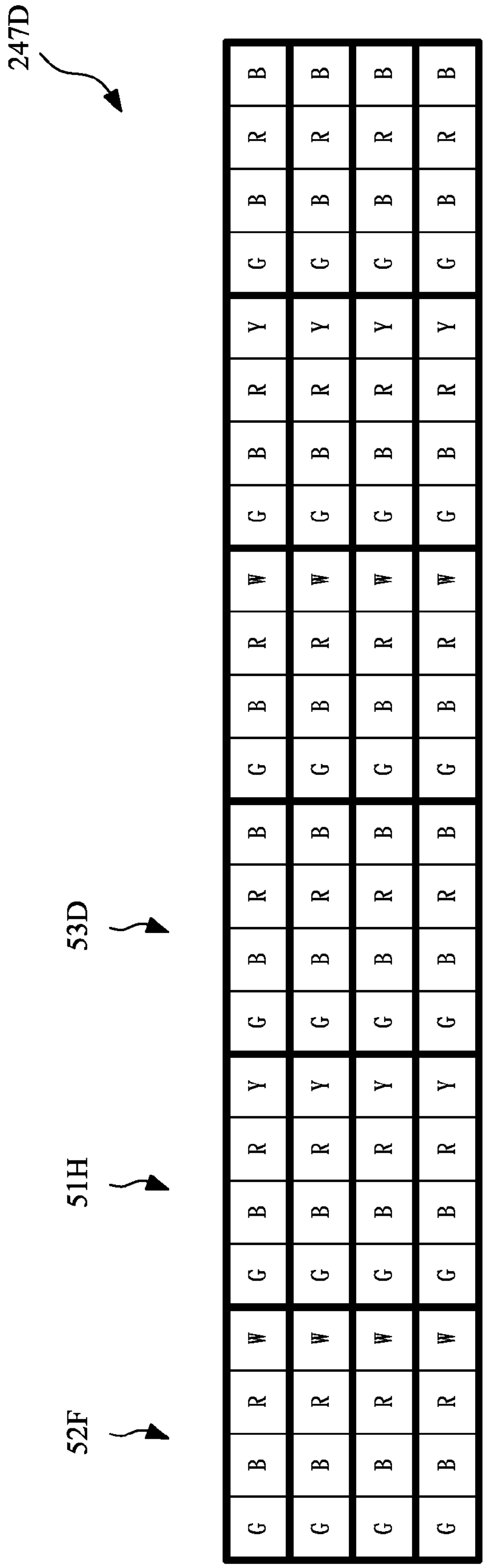
Figure 48A:
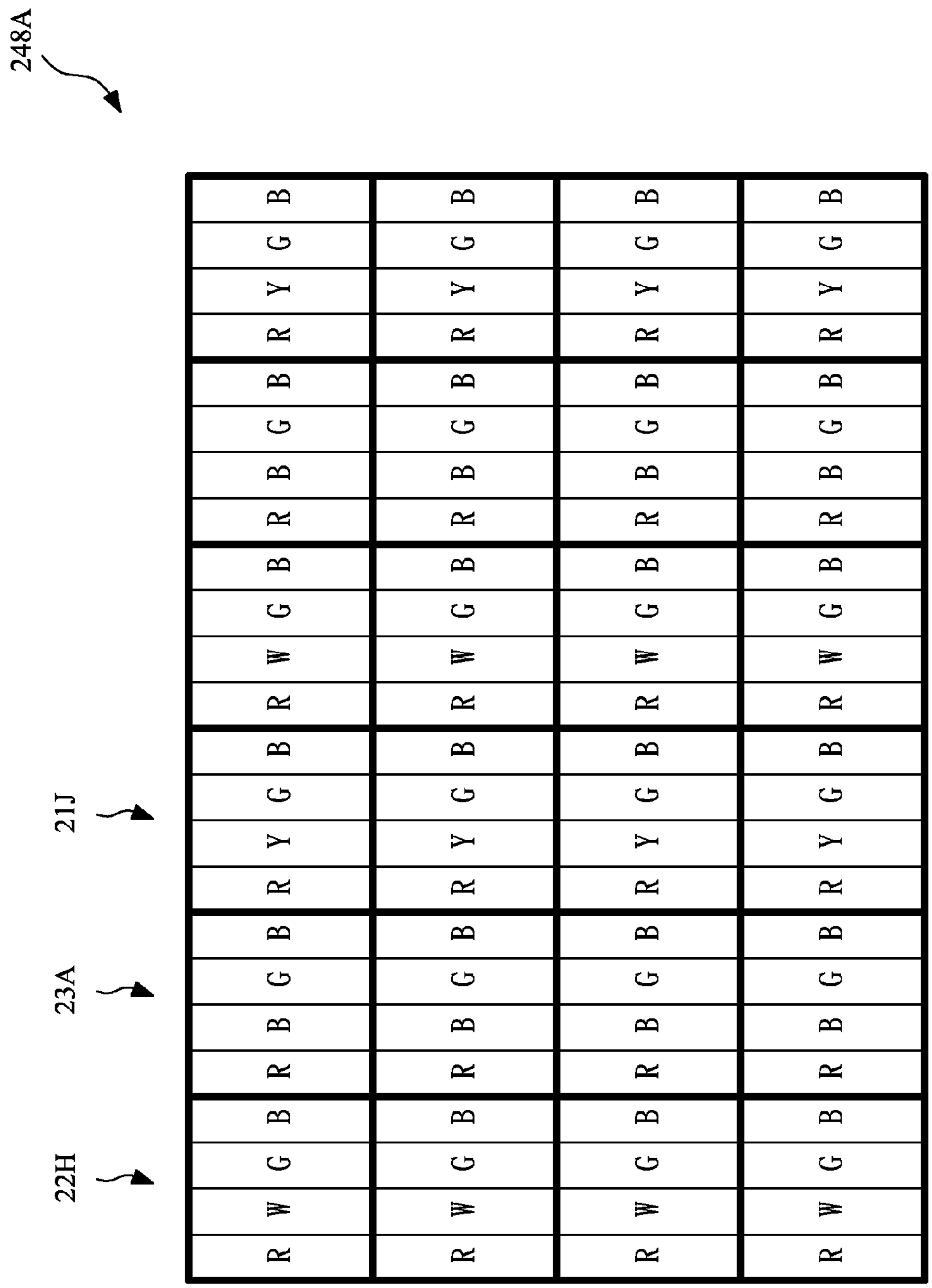
Figure 48B:
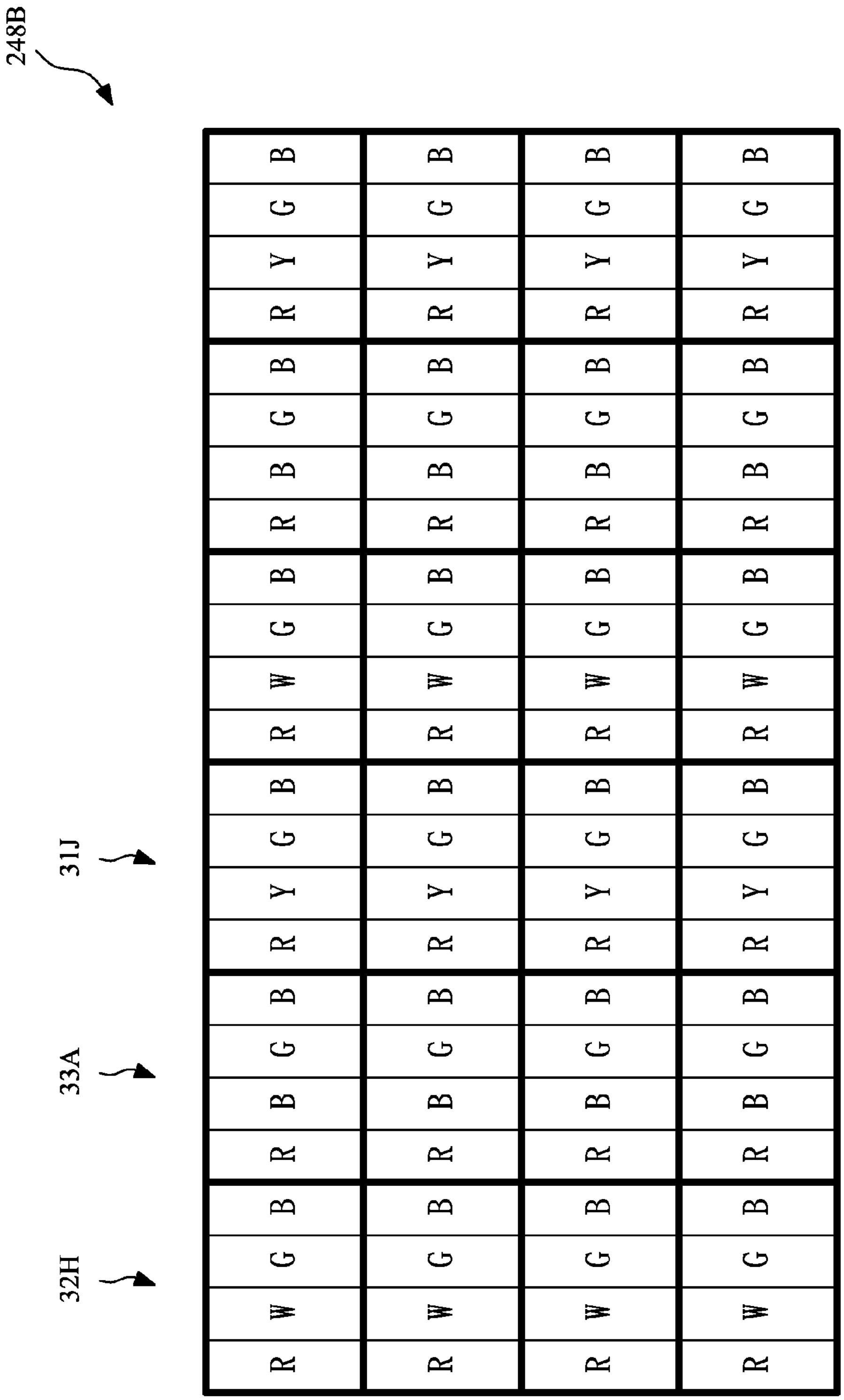
Figure 48C:
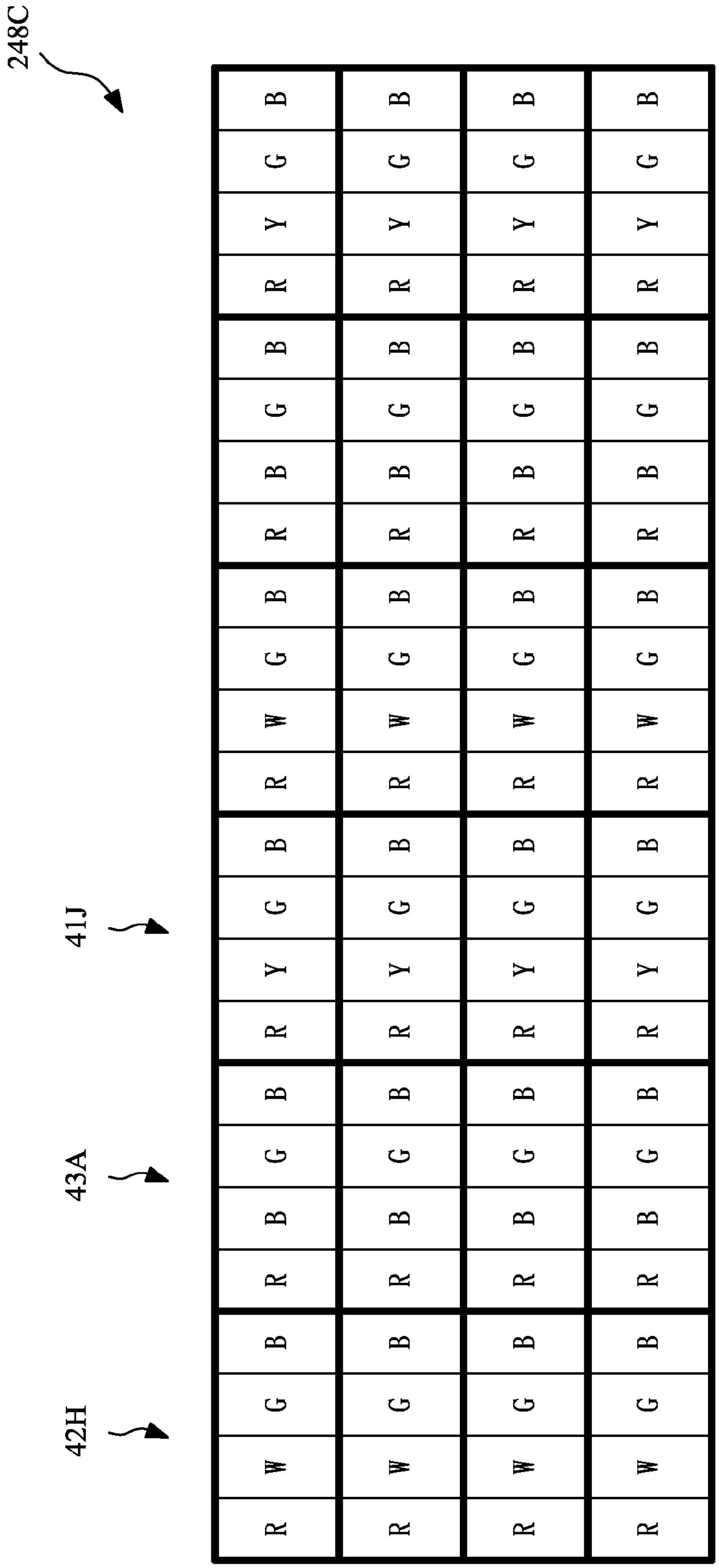
Figure 48D:
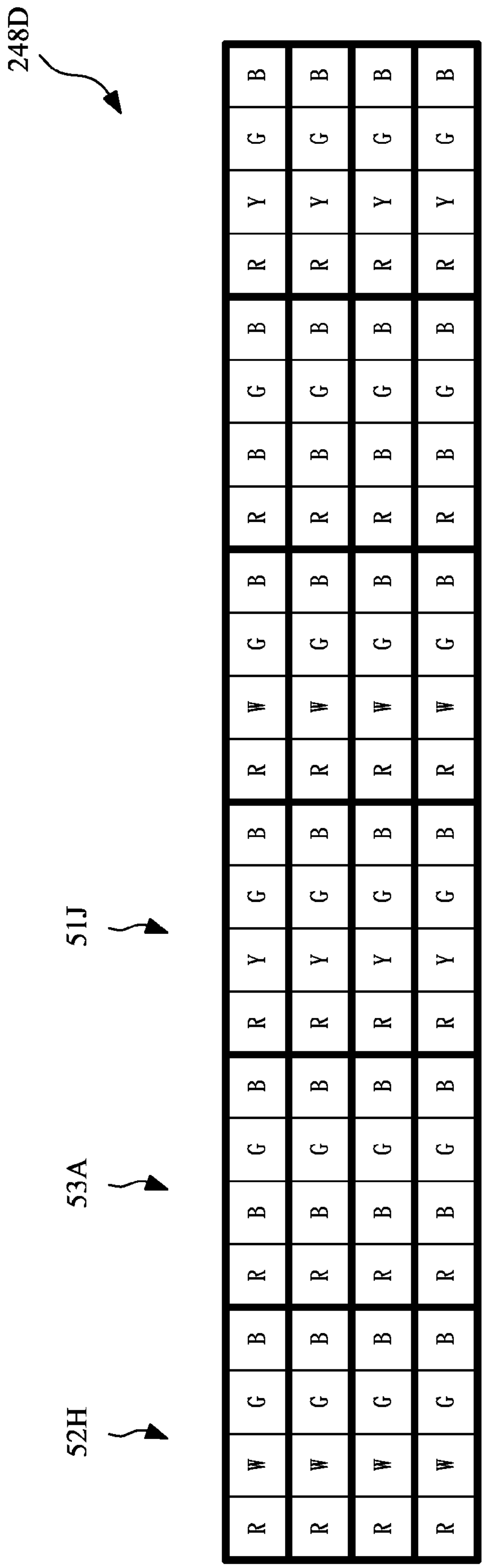
Figure 49A:
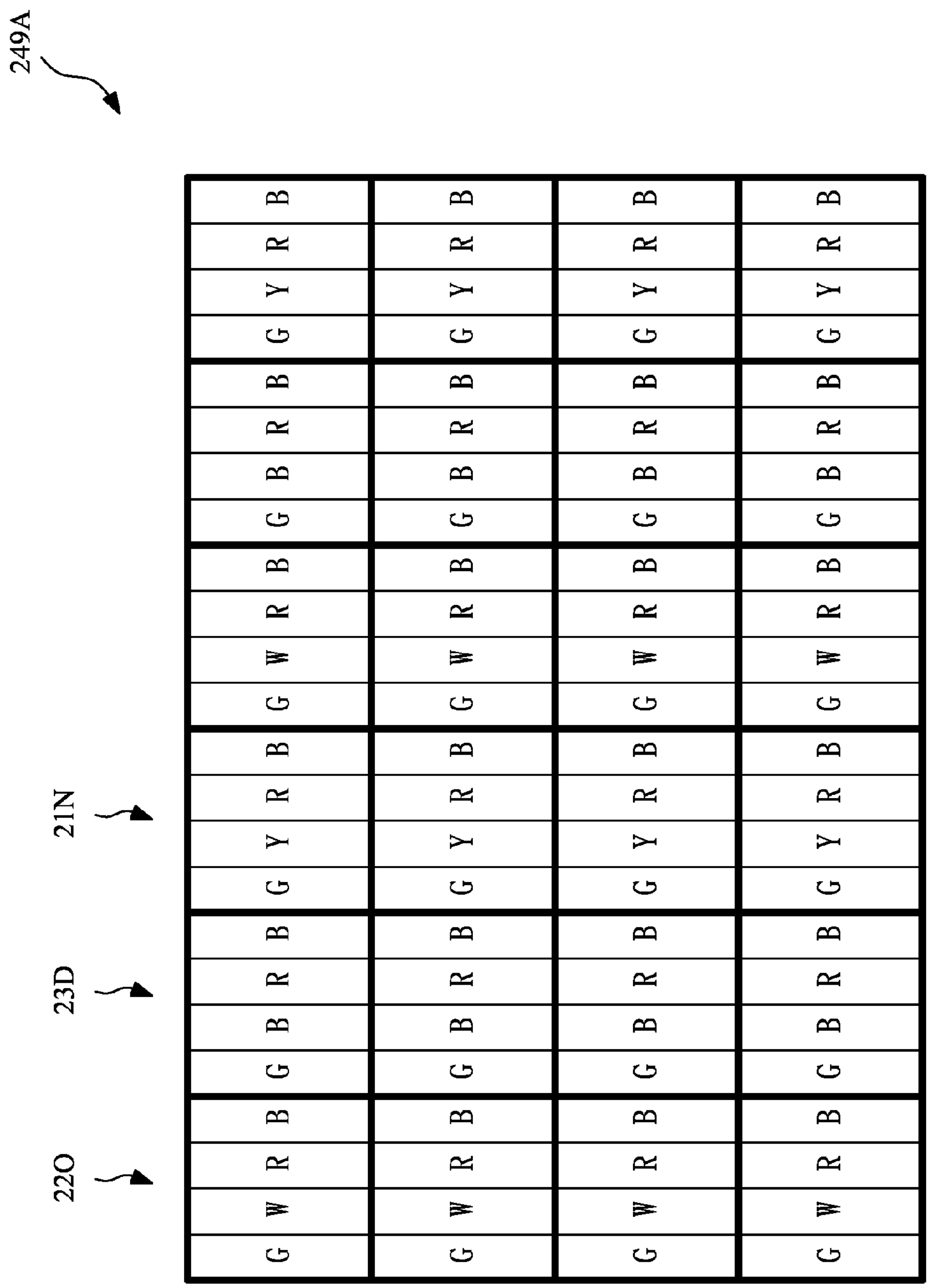
Figure 49B:
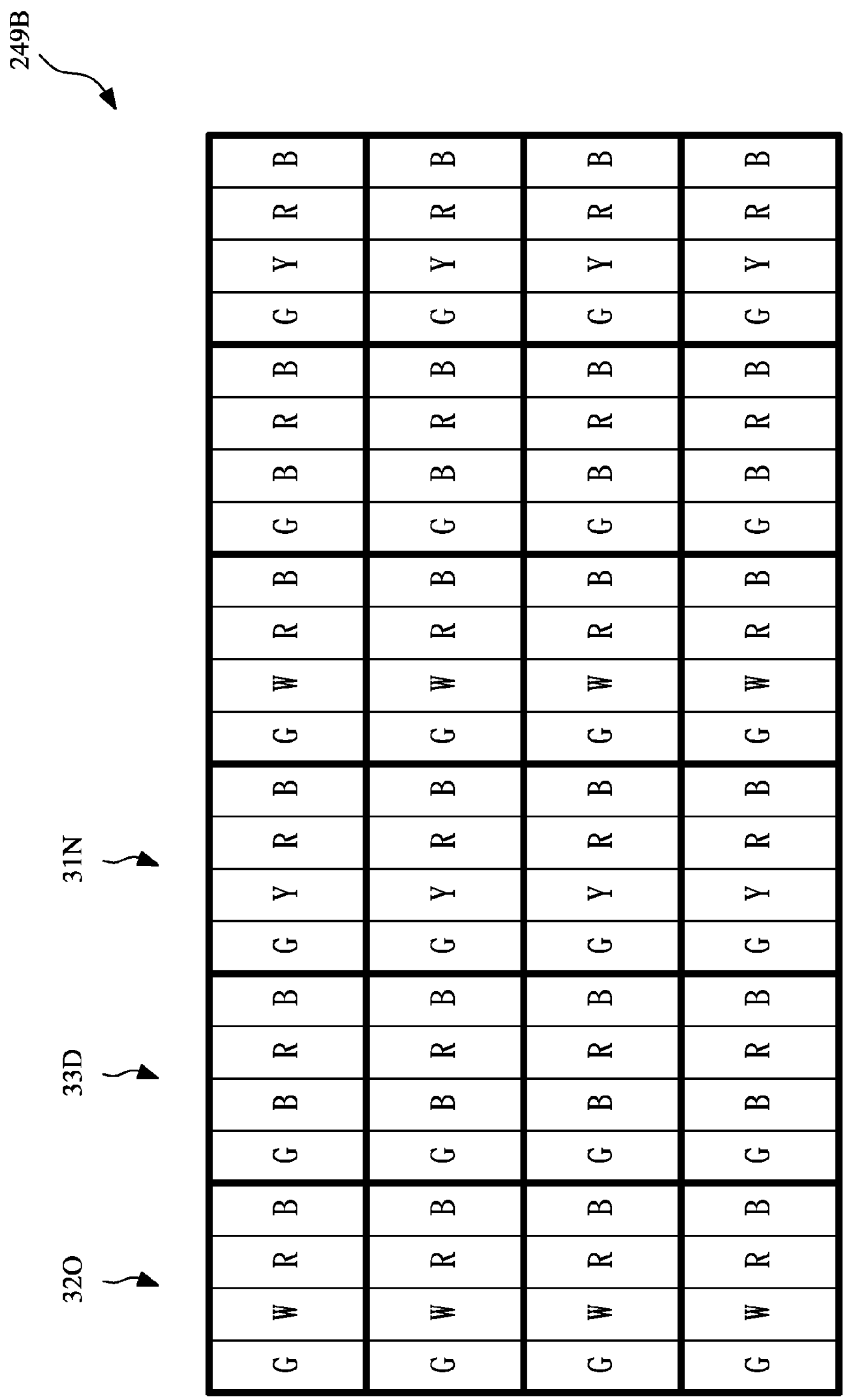
Figure 49C:
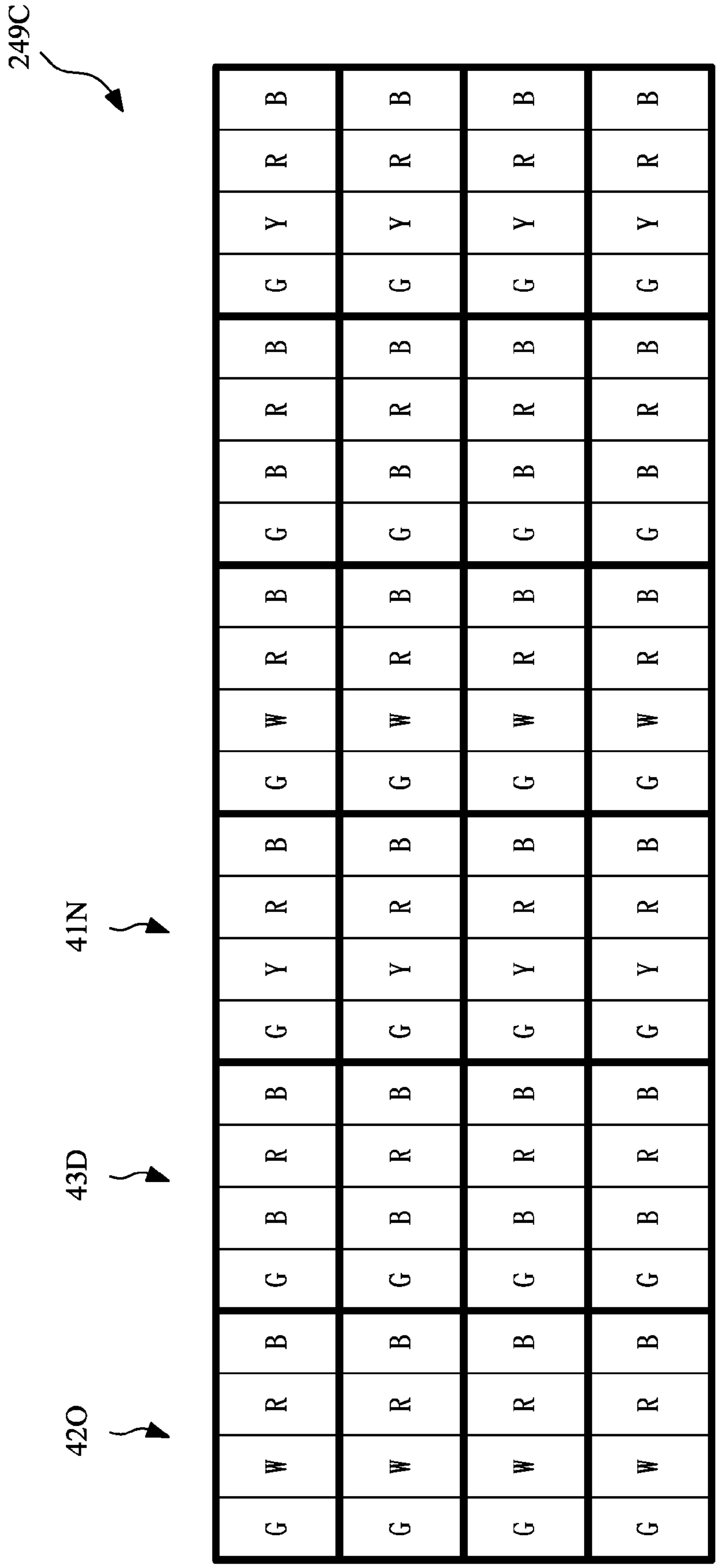
Figure 49D:
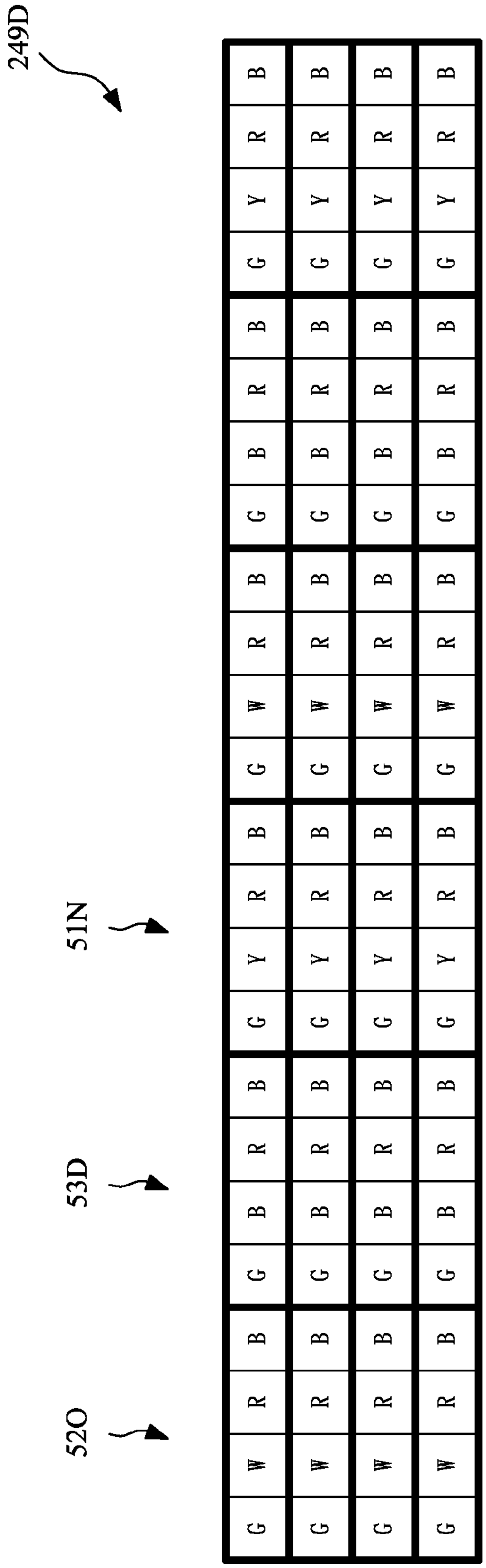
Figure 50A:
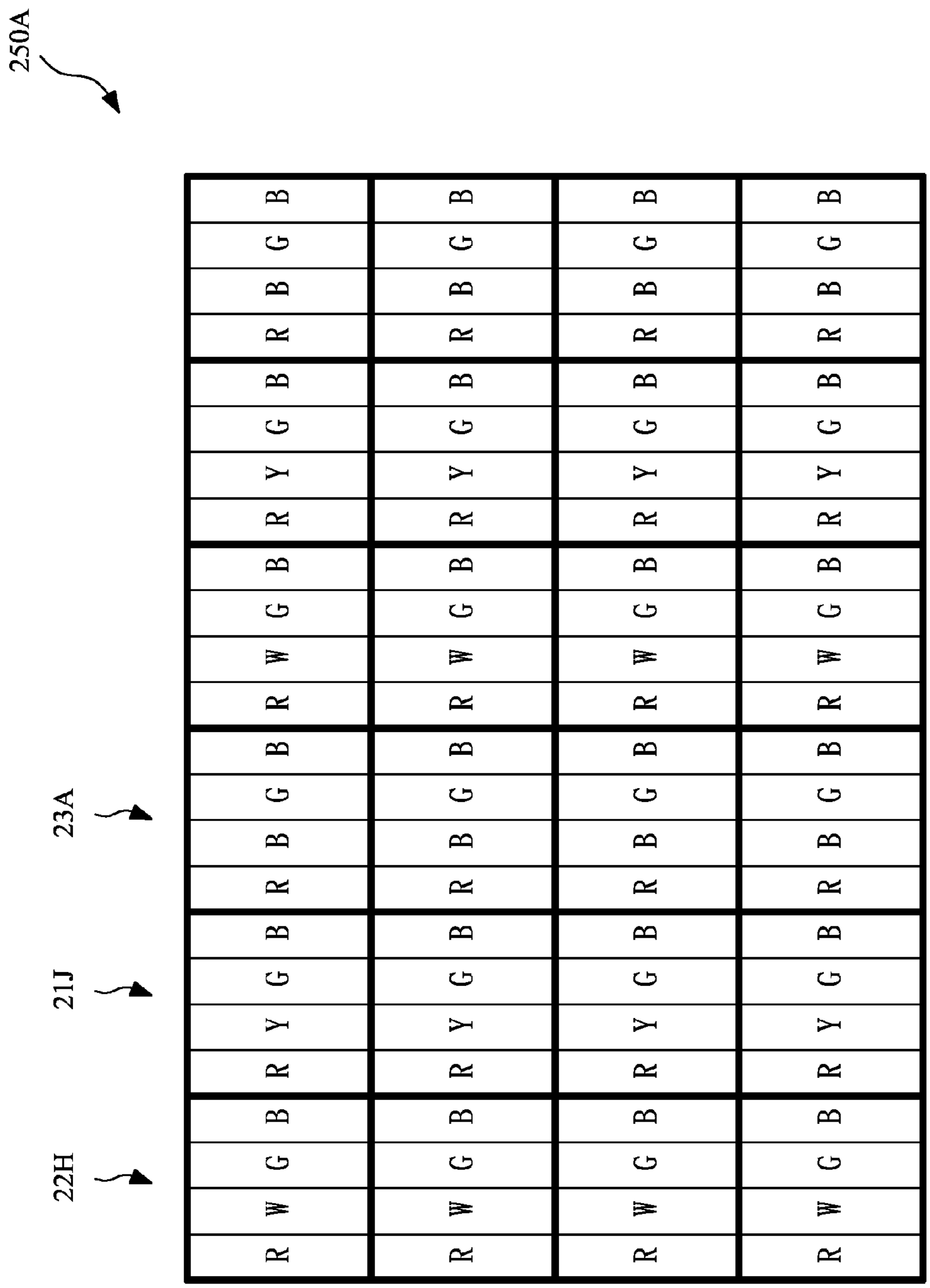
Figure 50B:
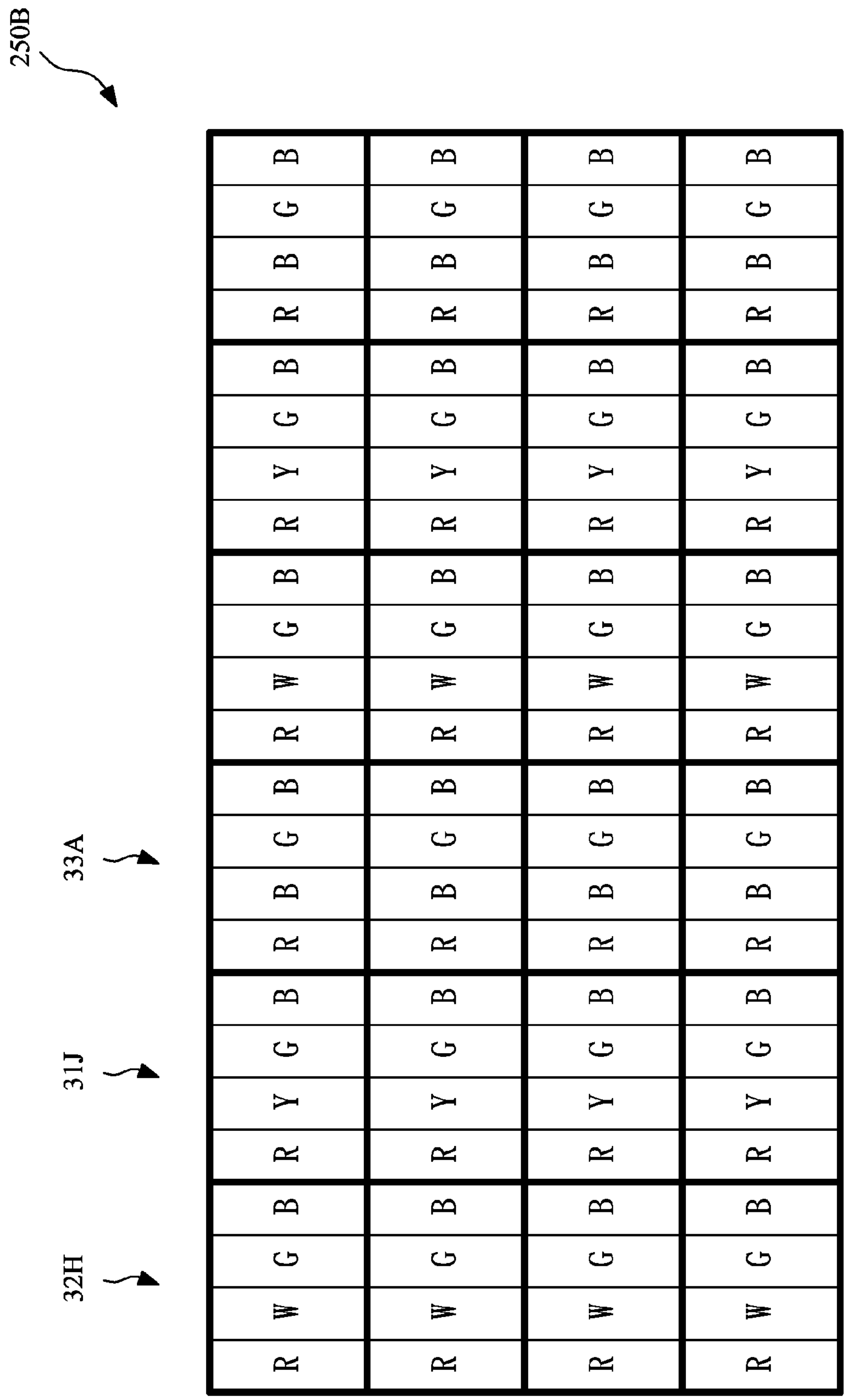
Figure 50C:
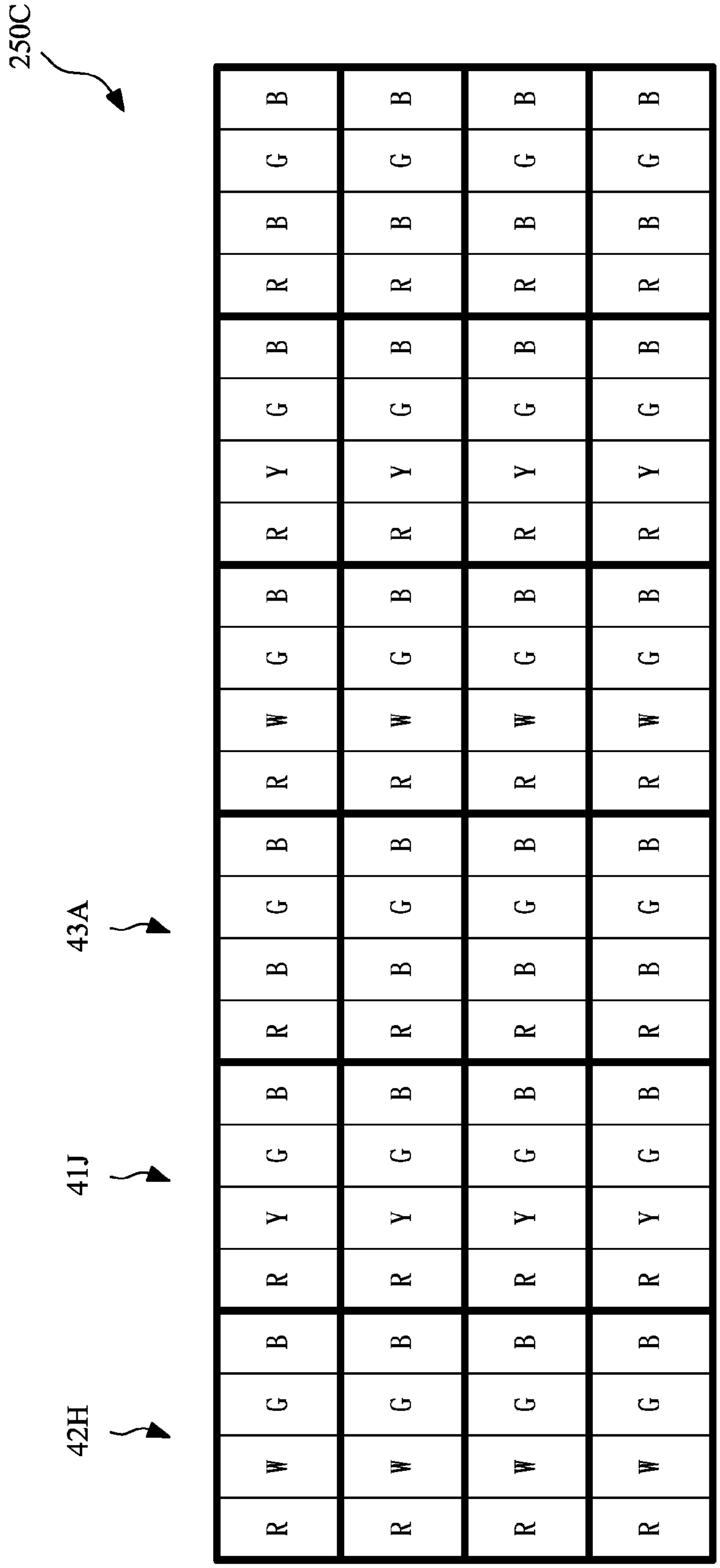
Figure 50D:
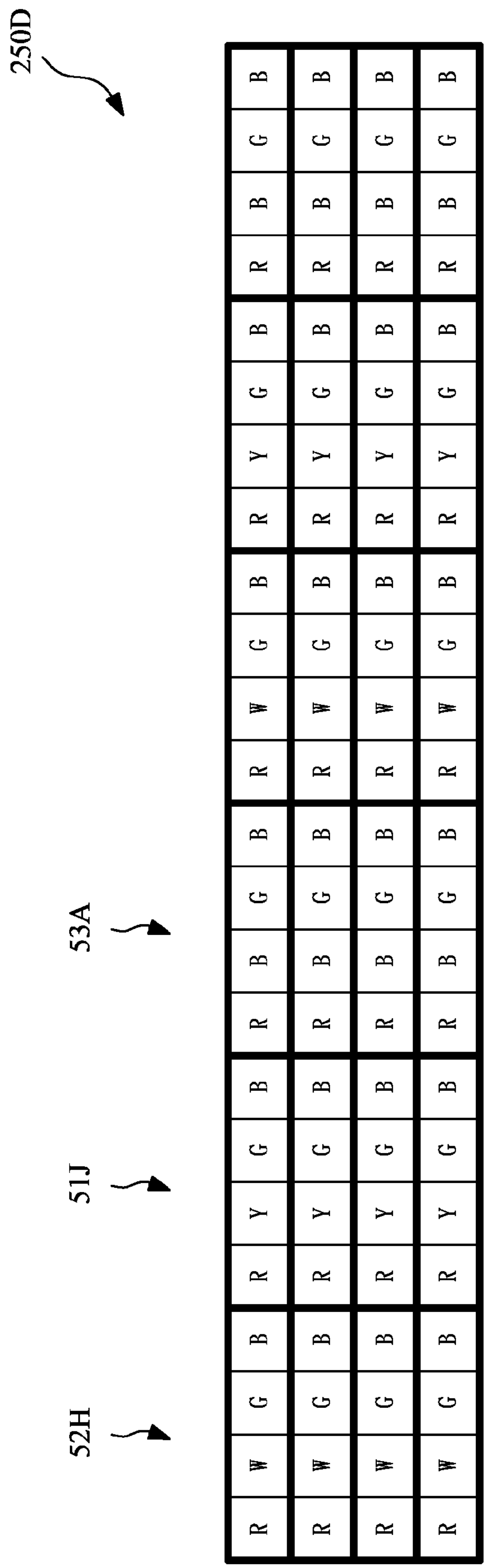
Figure 51A:
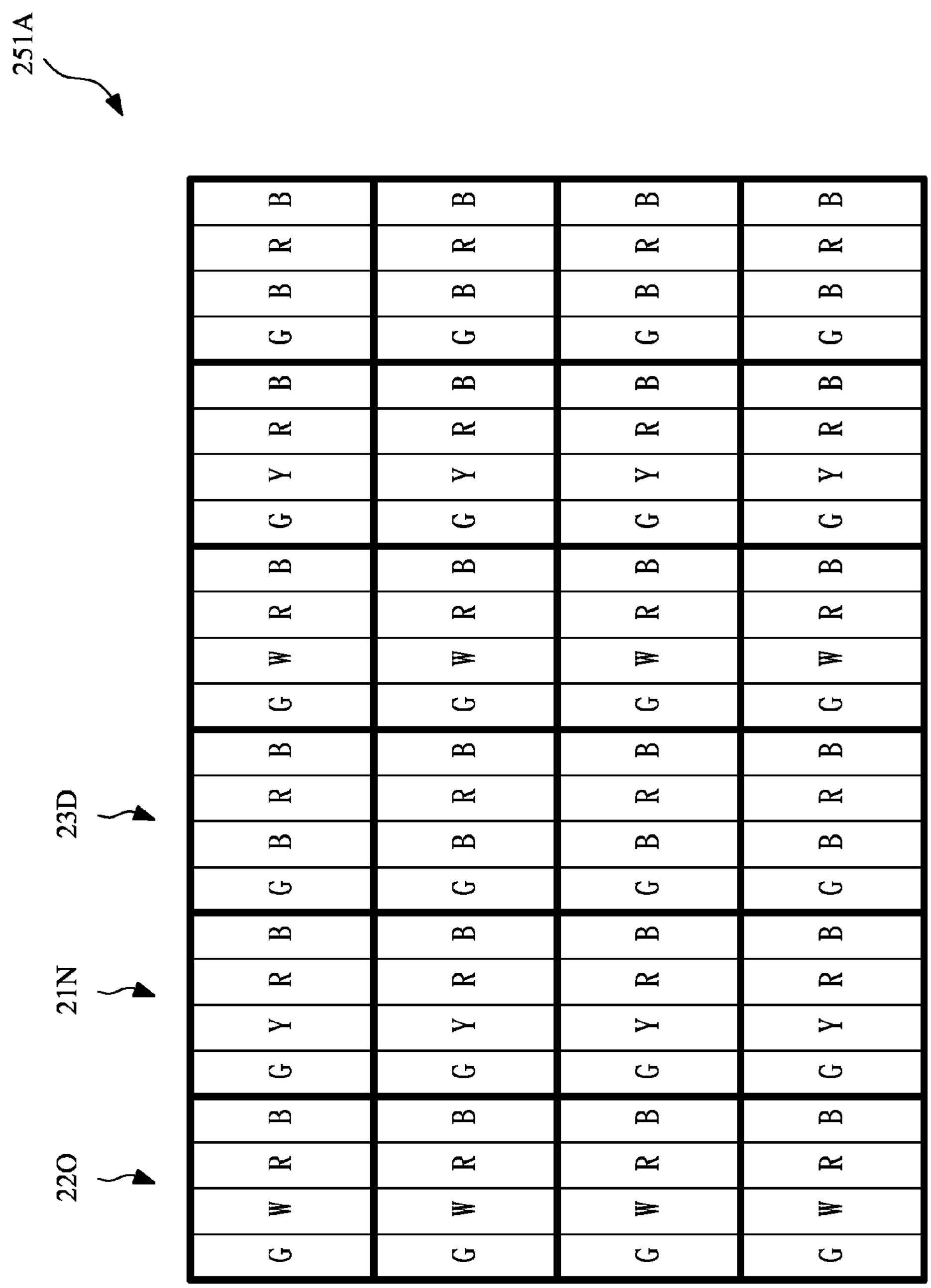
Figure 51B:
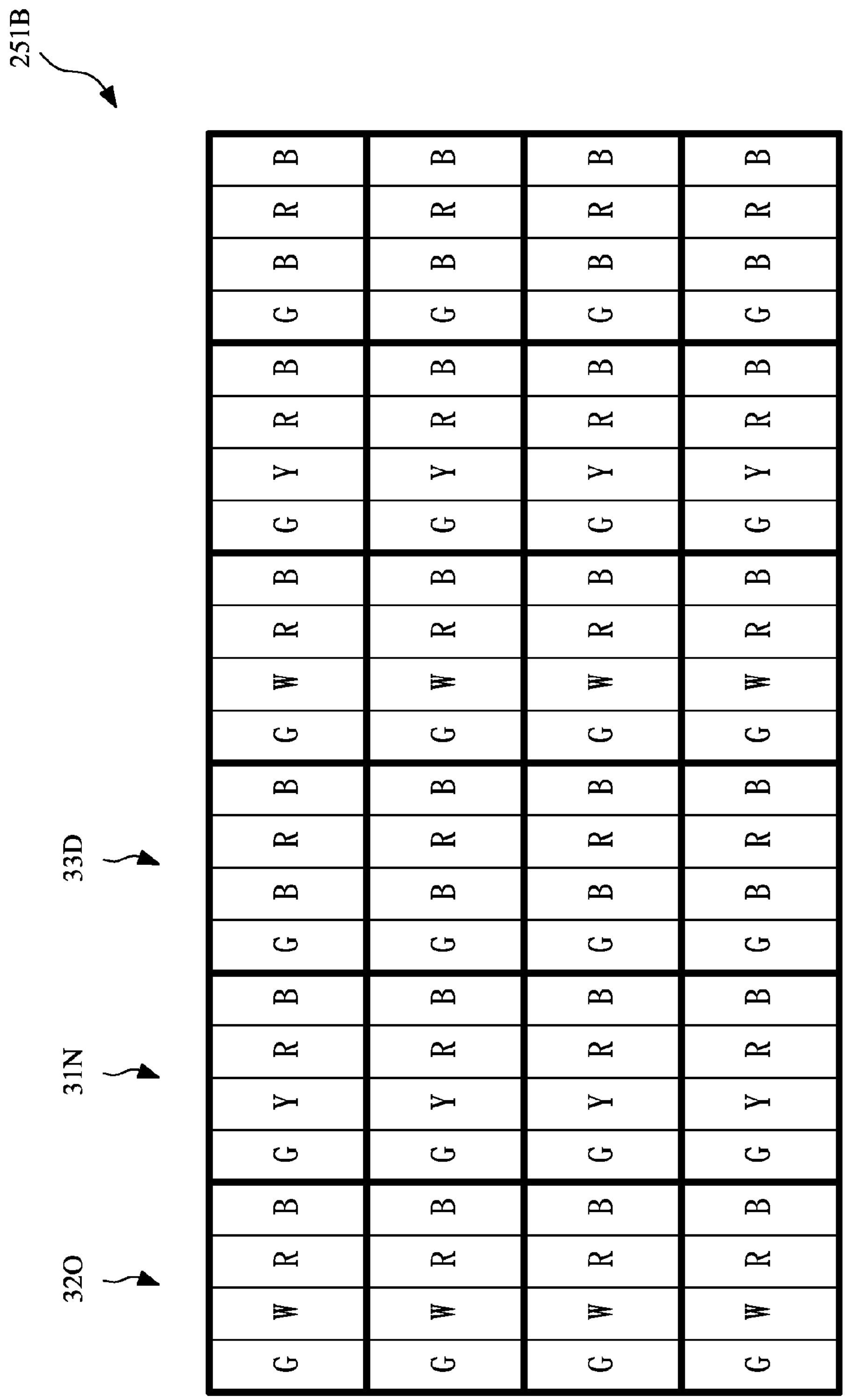
Figure 51C:
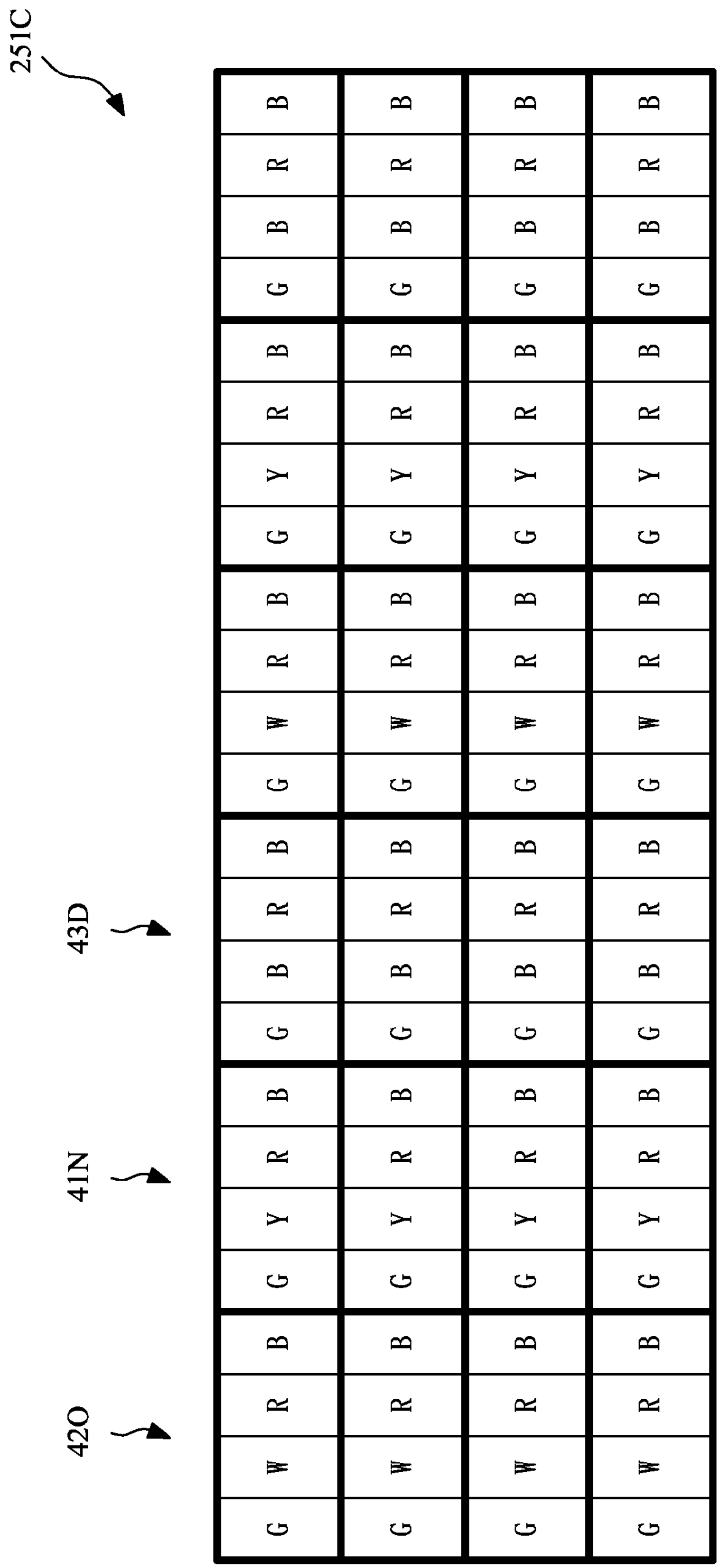
Figure 51D:
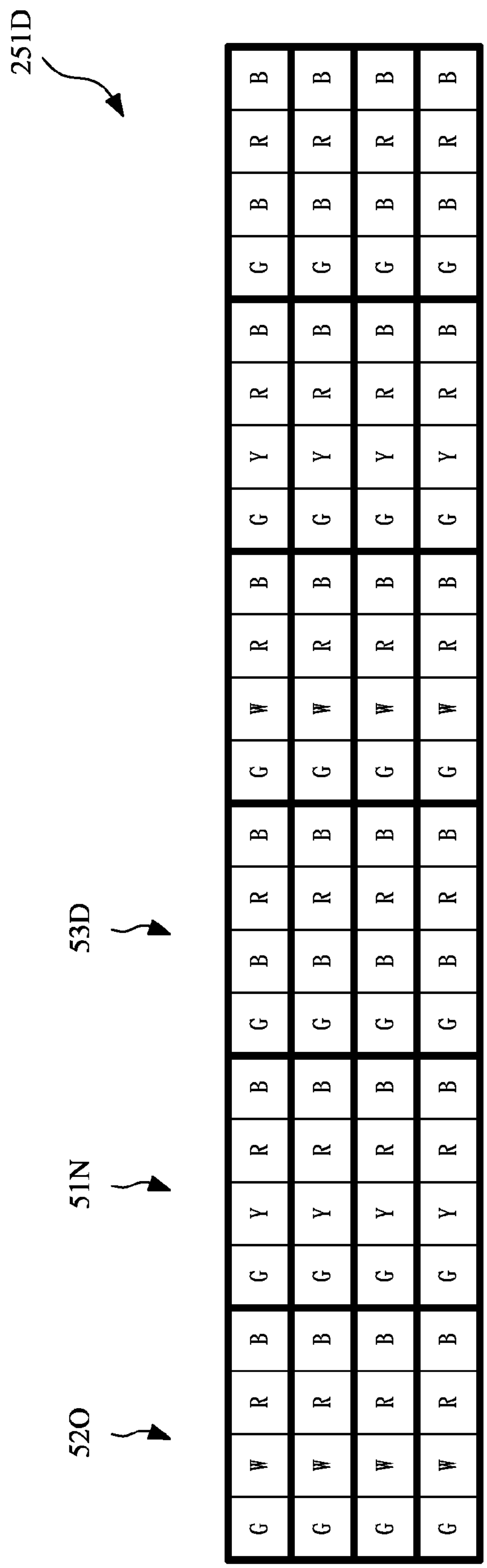
Figure 52:
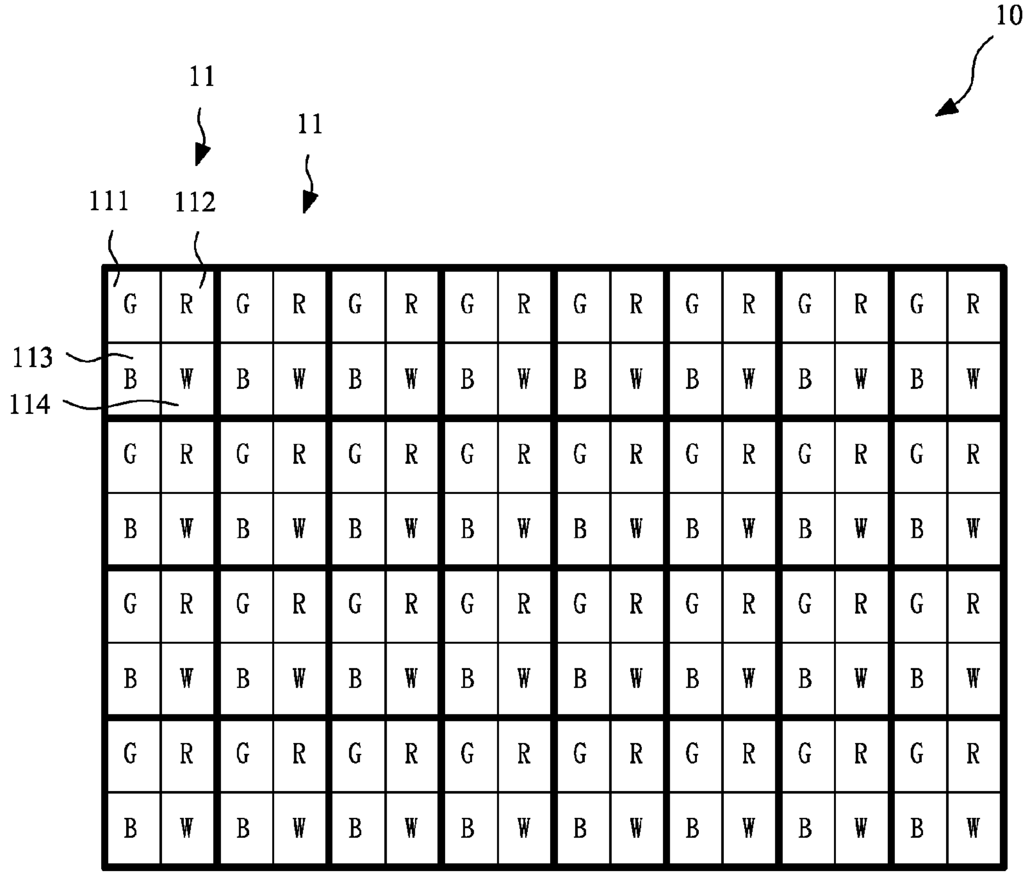

FIG. 33C shows an image device according to an embodiment of the invention;

FIG. 33D shows an image device according to an embodiment of the invention;

FIG. 34A shows an image device according to an embodiment of the invention;

FIG. 34B shows an image device according to an embodiment of the invention;

FIG. 34C shows an image device according to an embodiment of the invention;

FIG. 34D shows an image device according to an embodiment of the invention;

FIG. 35A shows an image device according to an embodiment of the invention;

FIG. 35B shows an image device according to an embodiment of the invention;

FIG. 35C shows an image device according to an embodiment of the invention;

FIG. 35D shows an image device according to an embodiment of the invention;

FIG. 36A shows an image device according to an embodiment of the invention;

FIG. 36B shows an image device according to an embodiment of the invention;

FIG. 36C shows an image device according to an embodiment of the invention;

FIG. 36D shows an image device according to an embodiment of the invention;

FIG. 37A shows an image device according to an embodiment of the invention;

FIG. 37B shows an image device according to an embodiment of the invention;

FIG. 37C shows an image device according to an embodiment of the invention;

FIG. 37D shows an image device according to an embodiment of the invention;

FIG. 38A shows an image device according to an embodiment of the invention;

FIG. 38B shows an image device according to an embodiment of the invention;

FIG. 38C shows an image device according to an embodiment of the invention;

FIG. 38D shows an image device according to an embodiment of the invention;

FIG. 39A shows an image device according to an embodiment of the invention;

FIG. 39B shows an image device according to an embodiment of the invention;

FIG. 39C shows an image device according to an embodiment of the invention;

FIG. 39D shows an image device according to an embodiment of the invention;

FIG. 40A shows an image device according to an embodiment of the invention;

FIG. 40B shows an image device according to an embodiment of the invention;

FIG. 40C shows an image device according to an embodiment of the invention;

FIG. 40D shows an image device according to an embodiment of the invention;

FIG. 41A shows an image device according to an embodiment of the invention;

FIG. 41B shows an image device according to an embodiment of the invention;

FIG. 41C shows an image device according to an embodiment of the invention;

FIG. 41D shows an image device according to an embodiment of the invention;

FIG. 42A shows an image device according to an embodiment of the invention;

FIG. 42B shows an image device according to an embodiment of the invention;

FIG. 42C shows an image device according to an embodiment of the invention;

FIG. 42D shows an image device according to an embodiment of the invention;

FIG. 43A shows an image device according to an embodiment of the invention;

FIG. 43B shows an image device according to an embodiment of the invention;

FIG. 43C shows an image device according to an embodiment of the invention;

FIG. 43D shows an image device according to an embodiment of the invention;

FIG. 44A shows an image device according to an embodiment of the invention;

FIG. 44B shows an image device according to an embodiment of the invention;

FIG. 44C shows an image device according to an embodiment of the invention;

FIG. 44D shows an image device according to an embodiment of the invention;

FIG. 45A shows an image device according to an embodiment of the invention;

FIG. 45B shows an image device according to an embodiment of the invention;

FIG. 45C shows an image device according to an embodiment of the invention;

FIG. 45D shows an image device according to an embodiment of the invention;

FIG. 46A shows an image device according to an embodiment of the invention;

FIG. 46B shows an image device according to an embodiment of the invention;

FIG. 46C shows an image device according to an embodiment of the invention;

FIG. 46D shows an image device according to an embodiment of the invention;

FIG. 47A shows an image device according to an embodiment of the invention;

FIG. 47B shows an image device according to an embodiment of the invention;

FIG. 47C shows an image device according to an embodiment of the invention;

FIG. 47D shows an image device according to an embodiment of the invention;

FIG. 48A shows an image device according to an embodiment of the invention;

FIG. 48B shows an image device according to an embodiment of the invention;

FIG. 48C shows an image device according to an embodiment of the invention;

FIG. 48D shows an image device according to an embodiment of the invention;

FIG. 49A shows an image device according to an embodiment of the invention;

FIG. 49B shows an image device according to an embodiment of the invention;

FIG. 49C shows an image device according to an embodiment of the invention;

FIG. 49D shows an image device according to an embodiment of the invention;

FIG. 50A shows an image device according to an embodiment of the invention;

FIG. 50B shows an image device according to an embodiment of the invention;

FIG. 50C shows an image device according to an embodiment of the invention;

FIG. 50D shows an image device according to an embodiment of the invention;

FIG. 51A shows an image device according to an embodiment of the invention;

FIG. 51B shows an image device according to an embodiment of the invention;

FIG. 51C shows an image device according to an embodiment of the invention;

FIG. 51D shows an image device according to an embodiment of the invention;

FIG. 52 shows a conventional RGBW display.

DETAILED DESCRIPTION OF THE INVENTION

Figure 1A:
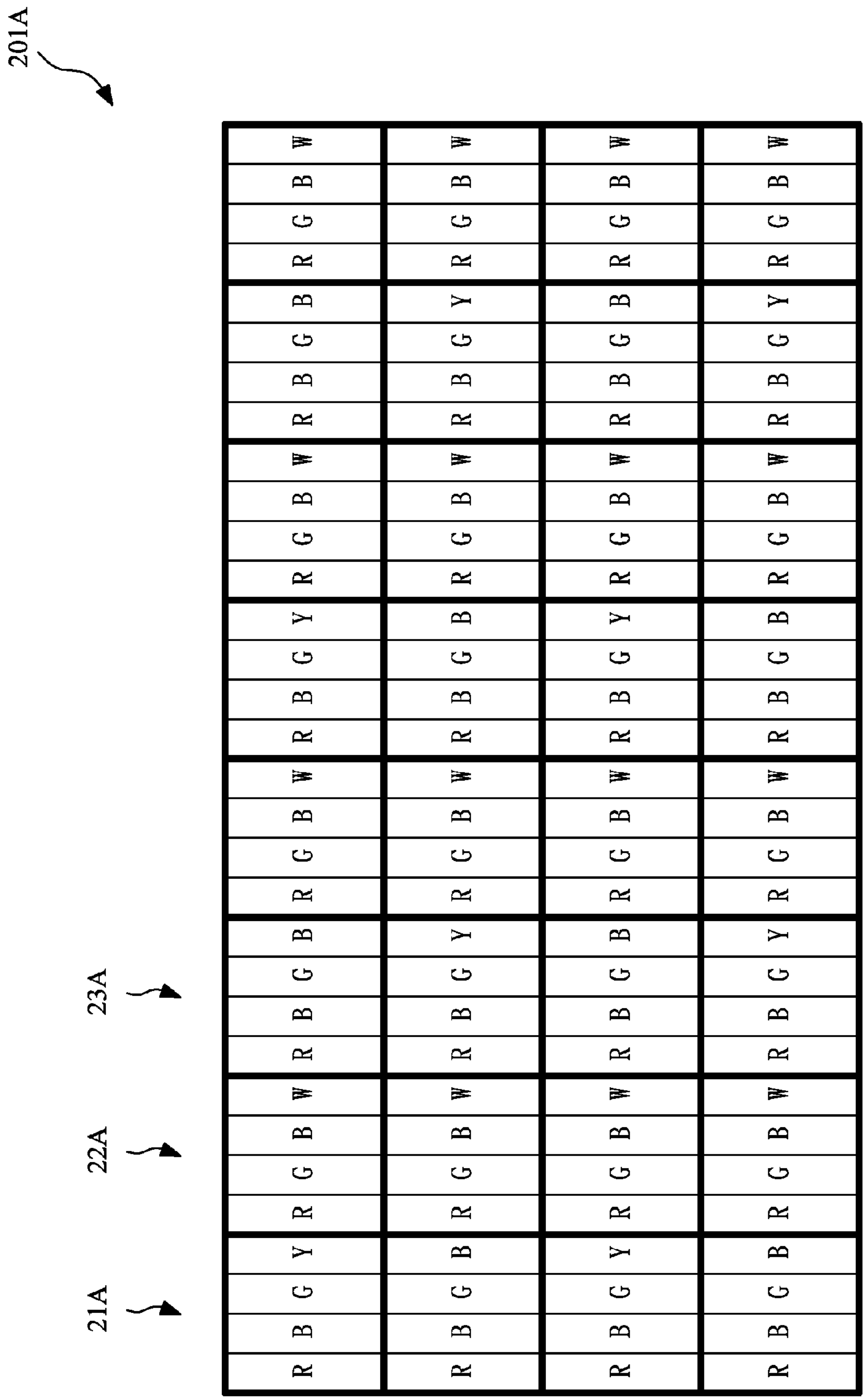
FIG. 1A shows an image device according to an embodiment of the invention.

Referring to FIG. 1A, it shows an image device according to an embodiment of the invention. The image device 201A includes a plurality of RGBY pixels 21A, a plurality of RGBW pixels 22A and a plurality of RBGB pixels 23A. Each RGBY pixel includes a red sub-pixel, a green sub-pixel, a blue sub-pixel and a yellow sub-pixel. The RGBY pixel 21A includes a red sub-pixel, a green sub-pixel, a blue sub-pixel and a yellow sub-pixel. In an embodiment, the red sub-pixel, the green sub-pixel, the blue sub-pixel and the yellow sub-pixel are arranged in a 1×4 matrix. Each sub-pixel is formed as about a rectangular shape, and any four adjacent sub-pixels along a longer border are formed as about a square shape.

In the RGBY pixel 21A, the sequence of the sub-pixels in the 1×4 matrix from left to right is the red sub-pixel, the blue sub-pixel, the green sub-pixel and the yellow sub-pixel.

Each RGBW pixel includes a red sub-pixel, a green sub-pixel, a blue sub-pixel and a white sub-pixel. The RGBW pixel 22A includes a red sub-pixel, a green sub-pixel, a blue sub-pixel and a white sub-pixel. In an embodiment, the red sub-pixel, the green sub-pixel, the blue sub-pixel and the white sub-pixel are arranged in a 1×4 matrix. Each sub-pixel is formed as about a rectangular shape, and any two adjacent sub-pixels along a longer border are formed as about a square shape. In the RGBW pixel 22A, the sequence of the sub-pixels in the 1×4 matrix from left to right is the red sub-pixel, the green sub-pixel, the blue sub-pixel and the white sub-pixel.

Each RBGB pixel includes a red sub-pixel, a green sub-pixel, and two blue sub-pixels. The RBGB pixel 23A includes a red sub-pixel, a green sub-pixel, and two blue sub-pixels. In an embodiment, the red sub-pixel, the green sub-pixel, and the two blue sub-pixels are arranged in a 1×4 matrix. Each sub-pixel is formed as about a rectangular shape, and any two adjacent sub-pixels along a longer border are formed as about a square shape. In the RBGB pixel 23A, the sequence of the sub-pixels in the 1×4 matrix from left to right is the red sub-pixel, the blue sub-pixel, the green sub-pixel and the blue sub-pixel.

At least one row or at least one column comprises sub-pixels of the same first color, at least a second row or at least a second column comprises sub-pixels of the same second color, at least a third row or at least a third column comprises sub-pixels of the same third color, at least a fourth row or at least a fourth column comprises sub-pixels of the same fourth color. In an embodiment, the RGBW pixels 22A are disposed on at least one column of the image device 201A. For the column including only the RGBW pixel 22A, at least a first column comprises sub-pixels of the same first color, for example red color; at least a second column comprises sub-pixels of the same second color, for example green color; at least a third column comprises sub-pixels of the same third color, for example blue color; at least a fourth column comprises sub-pixels of the same fourth color, for example white color.

In an embodiment, each row or each column comprises at least one RBGB pixel and at least one RGBY pixel and at least one RGBW pixel. In the image device 201A, each row comprises at least one RBGB pixel 23A and at least one RGBY pixel 21A and at least one RGBW pixel 22A. In an embodiment, at least one row or at least one column comprises at least one RGBY pixel and at least one RBGB pixel. In the image device 201A, at least one column comprises at least one RGBY pixel and at least one RBGB pixel.

Figure 1B:
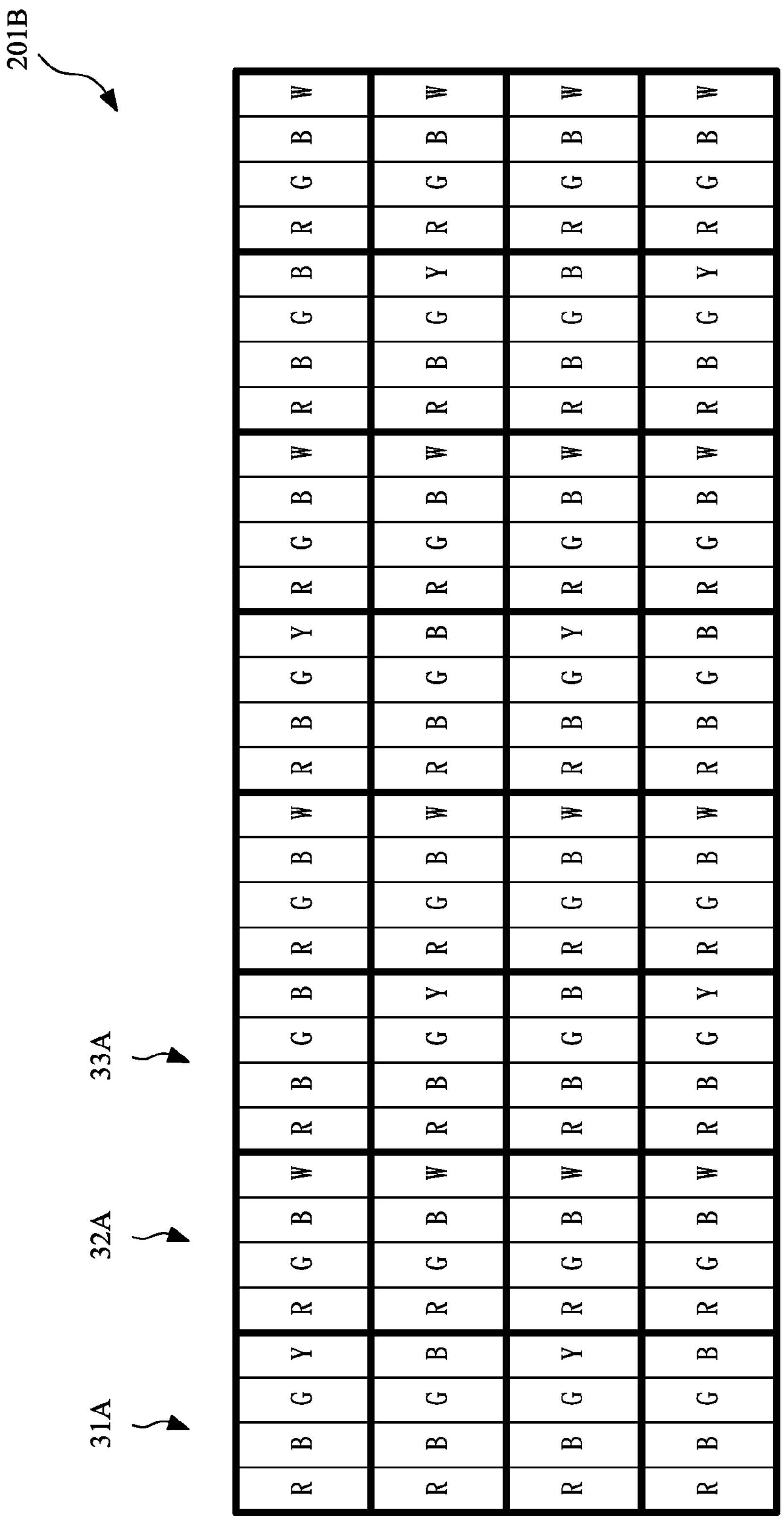
FIG. 1B shows an image device according to an embodiment of the invention.

Referring to FIG. 1B, it shows an image device according to an embodiment of the invention. The image device 201B includes a plurality of RGBY pixels 31A, a plurality of RGBW pixels 32A and a plurality of RBGB pixels 33A. Each RGBY pixel includes a red sub-pixel, a green sub-pixel, a blue sub-pixel and a yellow sub-pixel. The RGBY pixel 31A includes a red sub-pixel, a green sub-pixel, a blue sub-pixel and a yellow sub-pixel. In an embodiment, the red sub-pixel, the green sub-pixel, the blue sub-pixel and the yellow sub-pixel are arranged in a 1×4 matrix. Each sub-pixel is formed as about a rectangular shape, and any three adjacent sub-pixels along a longer border are formed as about a square shape.

In the RGBY pixel 31A, the sequence of the sub-pixels in the 1×4 matrix from left to right is the red sub-pixel, the blue sub-pixel, the green sub-pixel and the yellow sub-pixel.

Each RGBW pixel includes a red sub-pixel, a green sub-pixel, a blue sub-pixel and a white sub-pixel. The RGBW pixel 32A includes a red sub-pixel, a green sub-pixel, a blue sub-pixel and a white sub-pixel. In an embodiment, the red sub-pixel, the green sub-pixel, the blue sub-pixel and the white sub-pixel are arranged in a 1×4 matrix. Each sub-pixel is formed as about a rectangular shape, and any two adjacent sub-pixels along a longer border are formed as about a square shape. In the RGBW pixel 32A, the sequence of the sub-pixels in the 1×4 matrix from left to right is the red sub-pixel, the green sub-pixel, the blue sub-pixel and the white sub-pixel.

Each RBGB pixel includes a red sub-pixel, a green sub-pixel, and two blue sub-pixels. The RBGB pixel 33A includes a red sub-pixel, a green sub-pixel, and two blue sub-pixels. In an embodiment, the red sub-pixel, the green sub-pixel, and the two blue sub-pixels are arranged in a 1×4 matrix. Each sub-pixel is formed as about a rectangular shape, and any two adjacent sub-pixels along a longer border are formed as about a square shape. In the RBGB pixel 33A, the sequence of the sub-pixels in the 1×4 matrix from left to right is the red sub-pixel, the blue sub-pixel, the green sub-pixel and the blue sub-pixel.

At least one row or at least one column comprises sub-pixels of the same first color, at least a second row or at least a second column comprises sub-pixels of the same second color, at least a third row or at least a third column comprises sub-pixels of the same third color, at least a fourth row or at least a fourth column comprises sub-pixels of the same fourth color. In an embodiment, the RGBW pixels 32A are disposed on at least one column of the image device 201B. For the column including only the RGBW pixel 32A, at least a first column comprises sub-pixels of the same first color, for example red color; at least a second column comprises sub-pixels of the same second color, for example green color; at least a third column comprises sub-pixels of the same third color, for example blue color; at least a fourth column comprises sub-pixels of the same fourth color, for example white color.

In an embodiment, each row or each column comprises at least one RBGB pixel and at least one RGBY pixel and at least one RGBW pixel. In the image device 201B, each row comprises at least one RBGB pixel 33A and at least one RGBY pixel 31A and at least one RGBW pixel 32A. In an embodiment, at least one row or at least one column comprises at least one RGBY pixel and at least one RBGB pixel. In the image device 201B, at least one column comprises at least one RGBY pixel and at least one RBGB pixel.

Figure 1C:
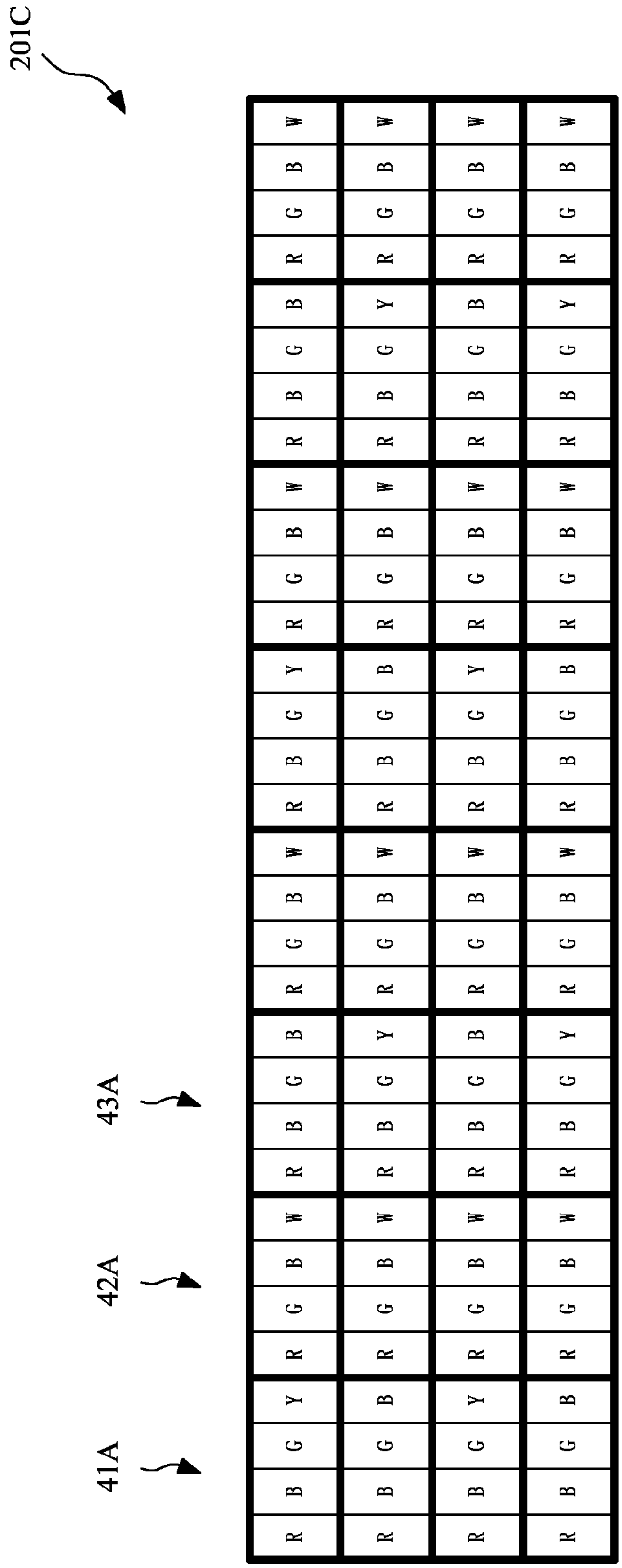
FIG. 1C shows an image device according to an embodiment of the invention.

Referring to FIG. 1C, it shows an image device according to an embodiment of the invention. The image device 201C includes a plurality of RGBY pixels 41A, a plurality of RGBW pixels 42A and a plurality of RBGB pixels 43A. Each RGBY pixel includes a red sub-pixel, a green sub-pixel, a blue sub-pixel and a yellow sub-pixel. The RGBY pixel 41A includes a red sub-pixel, a green sub-pixel, a blue sub-pixel and a yellow sub-pixel. In an embodiment, the red sub-pixel, the green sub-pixel, the blue sub-pixel and the yellow sub-pixel are arranged in a 1×4 matrix. Each sub-pixel is formed as about a rectangular shape, and any two adjacent sub-pixels along a longer border are formed as about a square shape.

In the RGBY pixel 41A, the sequence of the sub-pixels in the 1×4 matrix from left to right is the red sub-pixel, the blue sub-pixel, the green sub-pixel and the yellow sub-pixel.

Each RGBW pixel includes a red sub-pixel, a green sub-pixel, a blue sub-pixel and a white sub-pixel. The RGBW pixel 42A includes a red sub-pixel, a green sub-pixel, a blue sub-pixel and a white sub-pixel. In an embodiment, the red sub-pixel, the green sub-pixel, the blue sub-pixel and the white sub-pixel are arranged in a 1×4 matrix. Each sub-pixel is formed as about a rectangular shape, and any two adjacent sub-pixels along a longer border are formed as about a square shape. In the RGBW pixel 42A, the sequence of the sub-pixels in the 1×4 matrix from left to right is the red sub-pixel, the green sub-pixel, the blue sub-pixel and the white sub-pixel.

Each RBGB pixel includes a red sub-pixel, a green sub-pixel, and two blue sub-pixels. The RBGB pixel 43A includes a red sub-pixel, a green sub-pixel, and two blue sub-pixels. In an embodiment, the red sub-pixel, the green sub-pixel, and the two blue sub-pixels are arranged in a 1×4 matrix. Each sub-pixel is formed as about a rectangular shape, and any two adjacent sub-pixels along a longer border are formed as about a square shape. In the RBGB pixel 43A, the sequence of the sub-pixels in the 1×4 matrix from left to right is the red sub-pixel, the blue sub-pixel, the green sub-pixel and the blue sub-pixel.

At least one row or at least one column comprises sub-pixels of the same first color, at least a second row or at least a second column comprises sub-pixels of the same second color, at least a third row or at least a third column comprises sub-pixels of the same third color, at least a fourth row or at least a fourth column comprises sub-pixels of the same fourth color. In an embodiment, the RGBW pixels 42A are disposed on at least one column of the image device 201C. For the column including only the RGBW pixel 42A, at least a first column comprises sub-pixels of the same first color, for example red color; at least a second column comprises sub-pixels of the same second color, for example green color; at least a third column comprises sub-pixels of the same third color, for example blue color; at least a fourth column comprises sub-pixels of the same fourth color, for example white color.

In an embodiment, each row or each column comprises at least one RBGB pixel and at least one RGBY pixel and at least one RGBW pixel. In the image device 201C, each row comprises at least one RBGB pixel 43A and at least one RGBY pixel 41A and at least one RGBW pixel 42A. In an embodiment, at least one row or at least one column comprises at least one RGBY pixel and at least one RBGB pixel. In the image device 201C, at least one column comprises at least one RGBY pixel and at least one RBGB pixel.

Figure 1D:
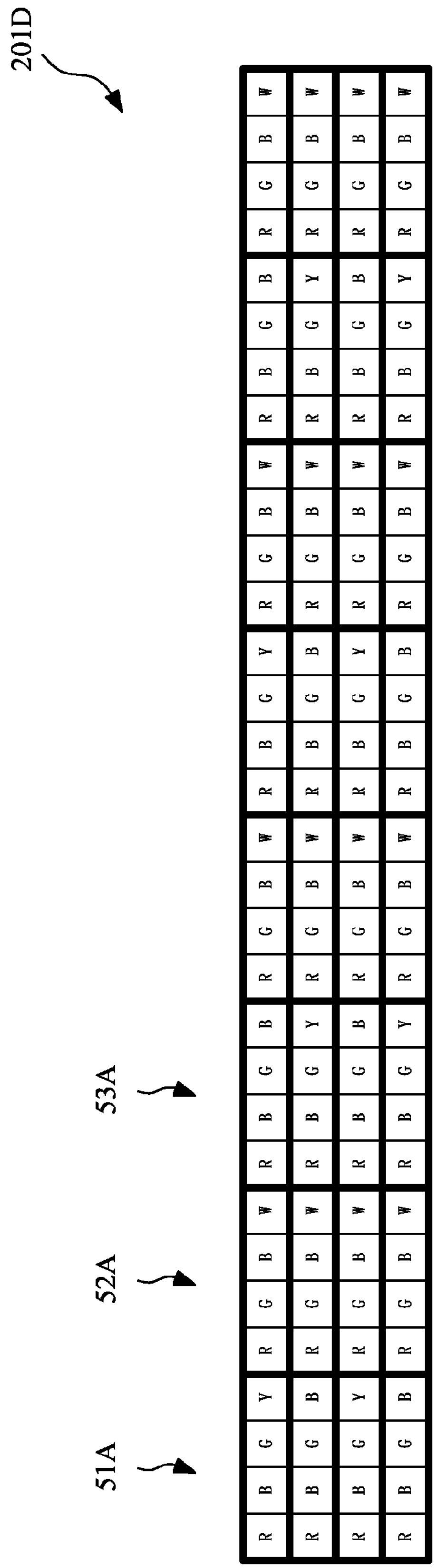
FIG. 1D shows an image device according to an embodiment of the invention.

Referring to FIG. 1D, it shows an image device according to an embodiment of the invention. The image device 201D includes a plurality of RGBY pixels 51A, a plurality of RGBW pixels 52A and a plurality of RBGB pixels 53A. Each RGBY pixel includes a red sub-pixel, a green sub-pixel, a blue sub-pixel and a yellow sub-pixel. The RGBY pixel 51A includes a red sub-pixel, a green sub-pixel, a blue sub-pixel and a yellow sub-pixel. In an embodiment, the red sub-pixel, the green sub-pixel, the blue sub-pixel and the yellow sub-pixel are arranged in a 1×4 matrix. Each sub-pixel is formed as about a square shape.

In the RGBY pixel 51A, the sequence of the sub-pixels in the 1×4 matrix from left to right is the red sub-pixel, the blue sub-pixel, the green sub-pixel and the yellow sub-pixel.

Each RGBW pixel includes a red sub-pixel, a green sub-pixel, a blue sub-pixel and a white sub-pixel. The RGBW pixel 52A includes a red sub-pixel, a green sub-pixel, a blue sub-pixel and a white sub-pixel. In an embodiment, the red sub-pixel, the green sub-pixel, the blue sub-pixel and the white sub-pixel are arranged in a 1×4 matrix. Each sub-pixel is formed as about a rectangular shape, and any two adjacent sub-pixels along a longer border are formed as about a square shape. In the RGBW pixel 52A, the sequence of the sub-pixels in the 1×4 matrix from left to right is the red sub-pixel, the green sub-pixel, the blue sub-pixel and the white sub-pixel.

Each RBGB pixel includes a red sub-pixel, a green sub-pixel, and two blue sub-pixels. The RBGB pixel 53A includes a red sub-pixel, a green sub-pixel, and two blue sub-pixels. In an embodiment, the red sub-pixel, the green sub-pixel, and the two blue sub-pixels are arranged in a 1×4 matrix. Each sub-pixel is formed as about a rectangular shape, and any two adjacent sub-pixels along a longer border are formed as about a square shape. In the RBGB pixel 53A, the sequence of the sub-pixels in the 1×4 matrix from left to right is the red sub-pixel, the blue sub-pixel, the green sub-pixel and the blue sub-pixel.

At least one row or at least one column comprises sub-pixels of the same first color, at least a second row or at least a second column comprises sub-pixels of the same second color, at least a third row or at least a third column comprises sub-pixels of the same third color, at least a fourth row or at least a fourth column comprises sub-pixels of the same fourth color. In an embodiment, the RGBW pixels 52A are disposed on at least one column of the image device 201D. For the column including only the RGBW pixel 52A, at least a first column comprises sub-pixels of the same first color, for example red color; at least a second column comprises sub-pixels of the same second color, for example green color; at least a third column comprises sub-pixels of the same third color, for example blue color; at least a fourth column comprises sub-pixels of the same fourth color, for example white color.

In an embodiment, each row or each column comprises at least one RBGB pixel and at least one RGBY pixel and at least one RGBW pixel. In the image device 201D, each row comprises at least one RBGB pixel 53A and at least one RGBY pixel 51A and at least one RGBW pixel 52A. In an embodiment, at least one row or at least one column comprises at least one RGBY pixel and at least one RBGB pixel. In the image device 201D, at least one column comprises at least one RGBY pixel and at least one RBGB pixel.

Figure 2A:
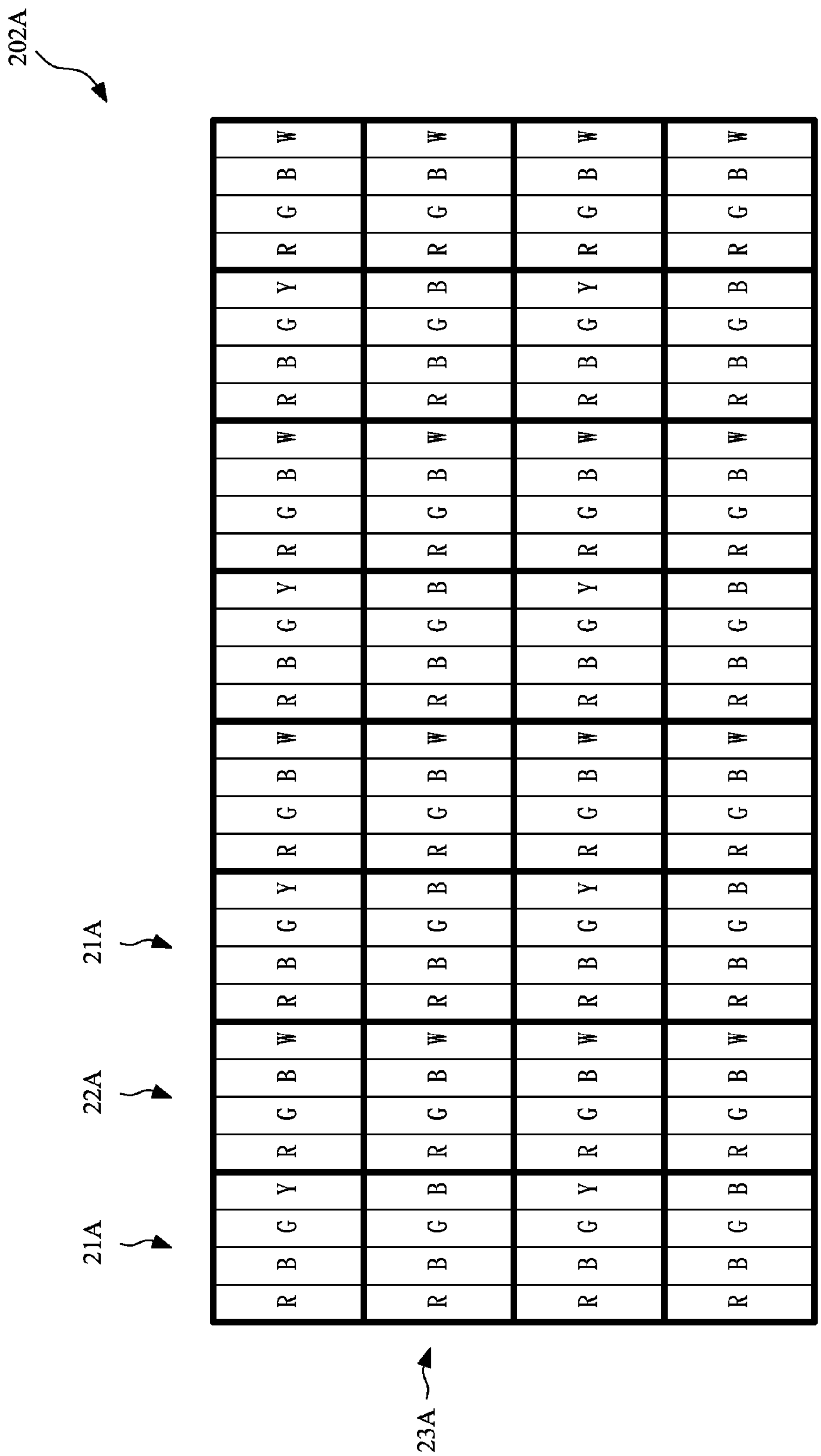
FIG. 2A shows an image device according to an embodiment of the invention.

Referring to FIG. 2A, it shows an image device according to an embodiment of the invention. The image device 202A includes a plurality of RGBY pixels 21A, a plurality of RGBW pixels 22A and a plurality of RBGB pixels 23A. In an embodiment, at least one row or at least one column comprises at least one RGBW pixel and at least one RGBY pixel. In the image device 202A, at least one row comprises at least one RGBW pixel and at least one RGBY pixel.

Figure 2B:
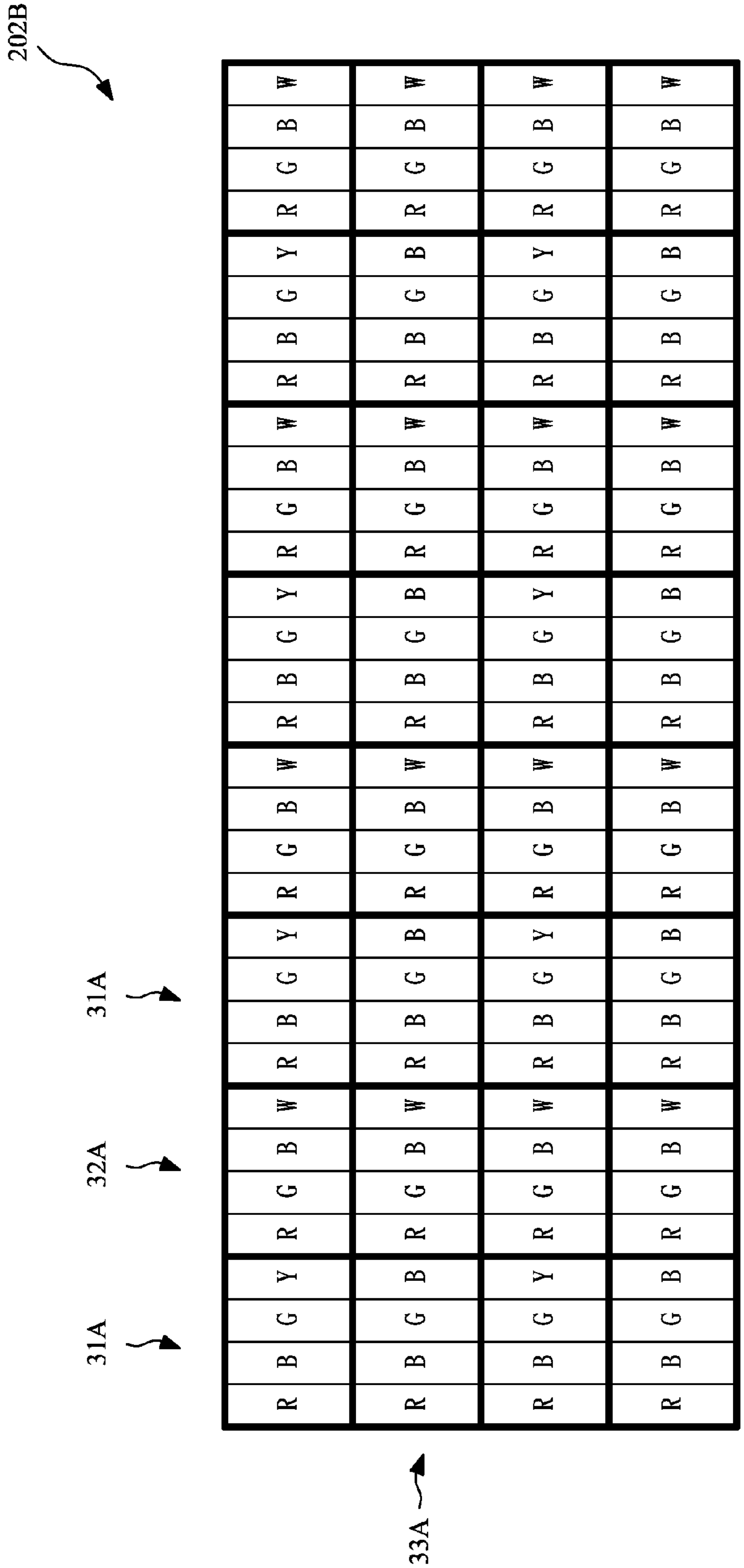
FIG. 2B shows an image device according to an embodiment of the invention.

Referring to FIG. 2B, it shows an image device according to an embodiment of the invention. The image device 202B includes a plurality of RGBY pixels 31A, a plurality of RGBW pixels 32A and a plurality of RBGB pixels 33A. In an embodiment, at least one row or at least one column comprises at least one RGBW pixel and at least one RGBY pixel. In the image device 202B, at least one row comprises at least one RGBW pixel and at least one RGBY pixel.

Figure 2C:
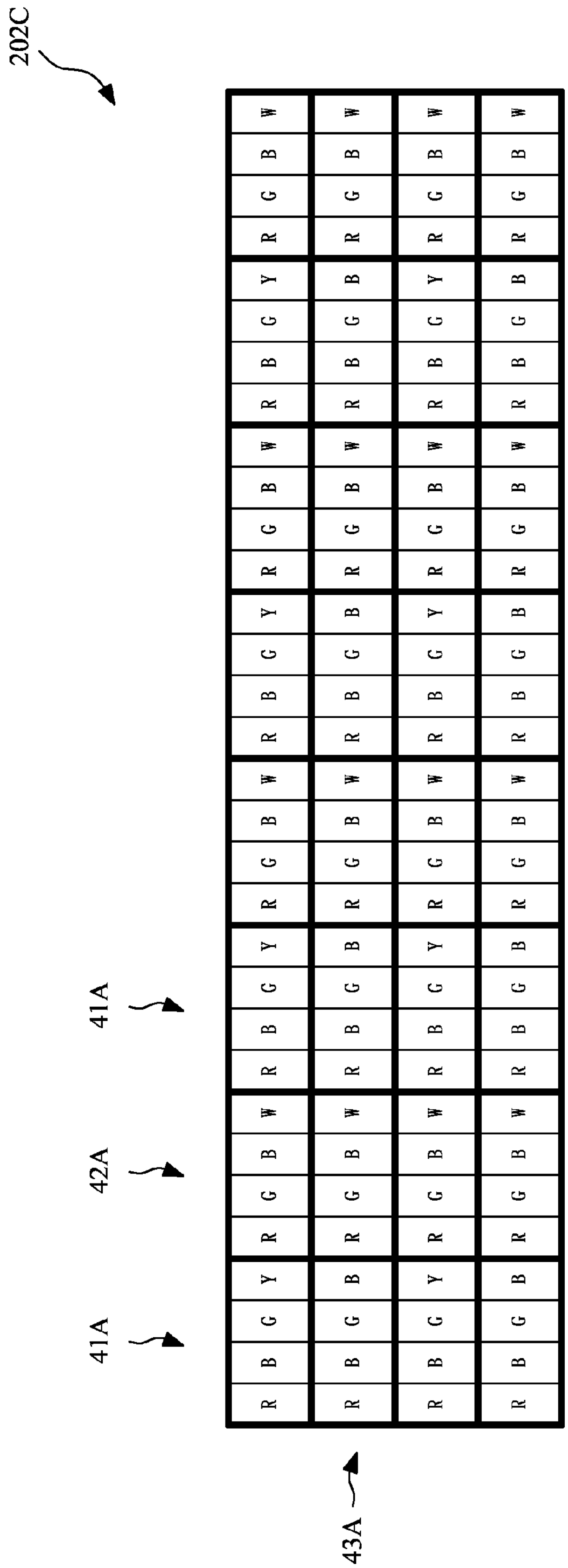
FIG. 2C shows an image device according to an embodiment of the invention.

Referring to FIG. 2C it shows an image device according to an embodiment of the invention. The image device 202C includes a plurality of RGBY pixels 41A, a plurality of RGBW pixels 42A and a plurality of RBGB pixels 43A. In an embodiment, at least one row or at least one column comprises at least one RGBW pixel and at least one RGBY pixel. In the image device 202C, at least one row comprises at least one RGBW pixel and at least one RGBY pixel.

Figure 2D:
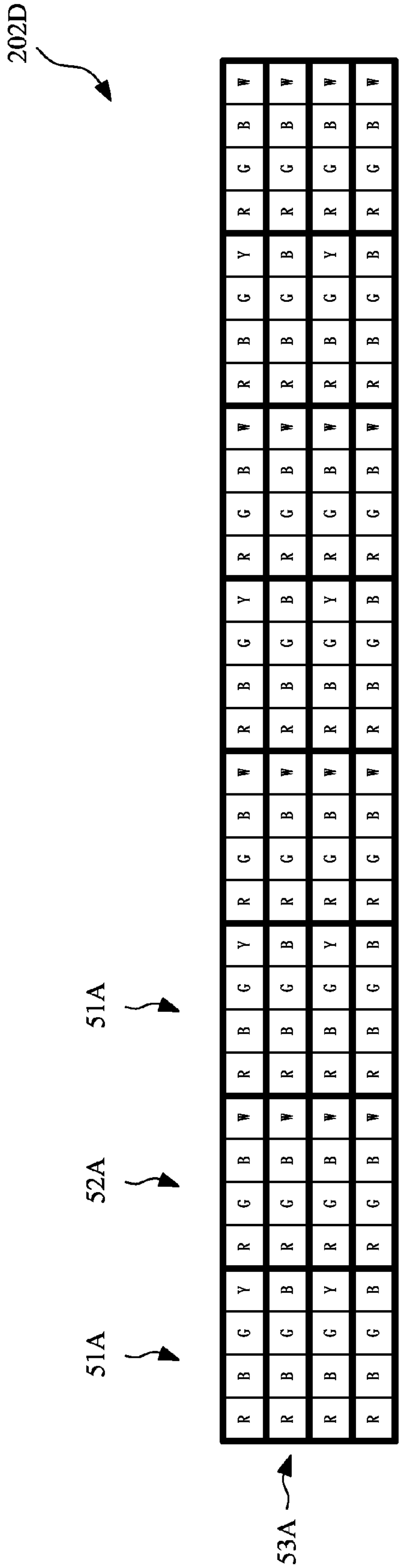
FIG. 2D shows an image device according to an embodiment of the invention.

Referring to FIG. 2D, it shows an image device according to an embodiment of the invention. The image device 202D includes a plurality of RGBY pixels 51A, a plurality of RGBW pixels 52A and a plurality of RBGB pixels 53A. In an embodiment, at least one row or at least one column comprises at least one RGBW pixel and at least one RGBY pixel. In the image device 202D, at least one row comprises at least one RGBW pixel and at least one RGBY pixel.

Figure 3A:
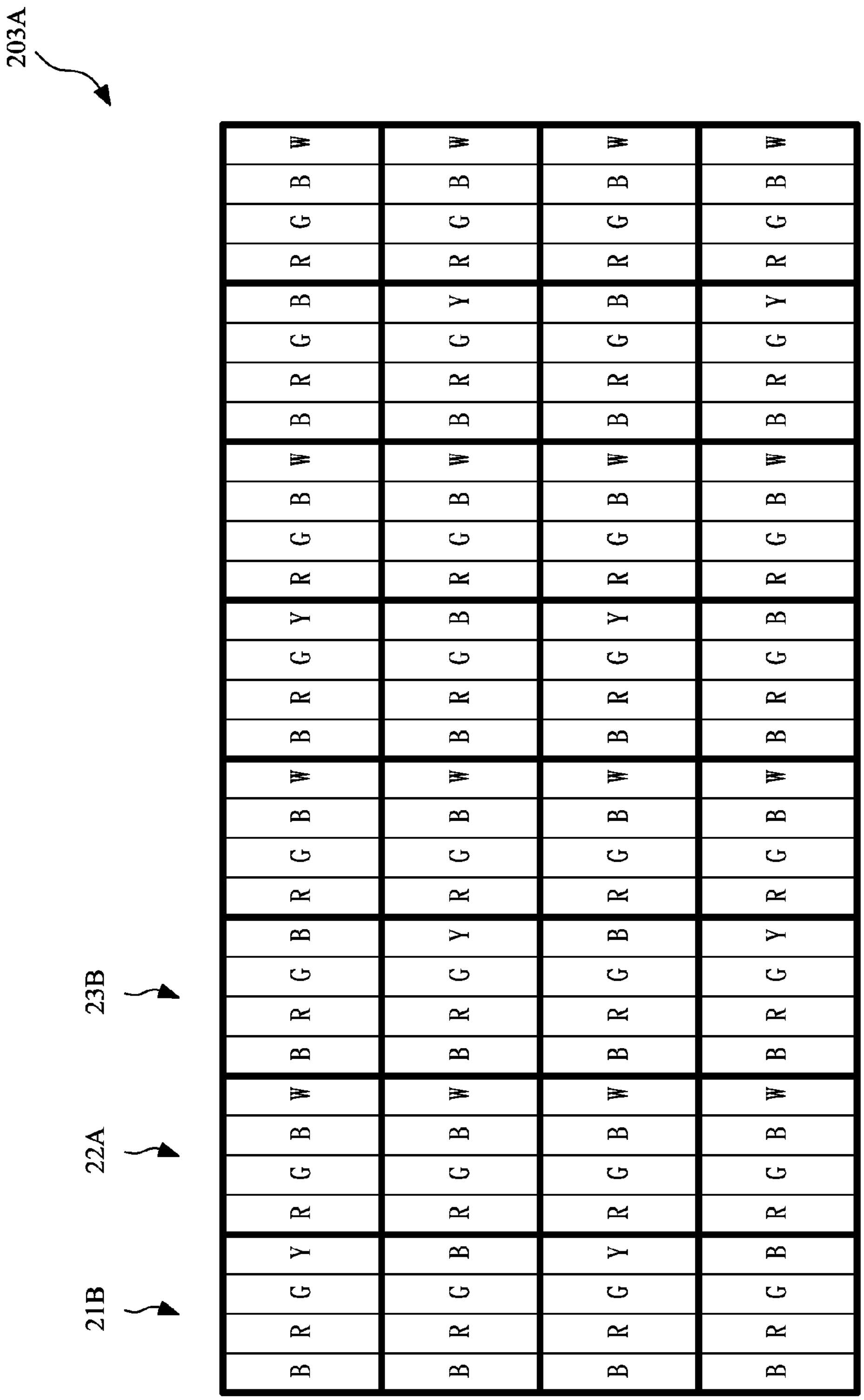
FIG. 3A shows an image device according to an embodiment of the invention.

Referring to FIG. 3A, it shows an image device according to an embodiment of the invention. The image device 203A includes a plurality of RGBY pixels 21B, a plurality of RGBW pixels 22A and a plurality of RBGB pixels 23B. In the RGBY pixel 21B, the sequence of the sub-pixels in the 1×4 matrix from left to right is the blue sub-pixel, the red sub-pixel, the green sub-pixel and the yellow sub-pixel. In the RBGB pixel 23B, the sequence of the sub-pixels in the 1×4 matrix from left to right is the blue sub-pixel, the red sub-pixel, the green sub-pixel and the blue sub-pixel.

In an embodiment, the RGBY pixels 21B and the RBGB pixel 23B are disposed on at least one column of the image device 203A. For the column including the RGBY pixels 21B and the RBGB pixel 23B, at least a first column comprises sub-pixels of the same first color, for example blue color; at least a second column comprises sub-pixels of the same second color, for example red color; at least a third column comprises sub-pixels of the same third color, for example green color.

Figure 3B:
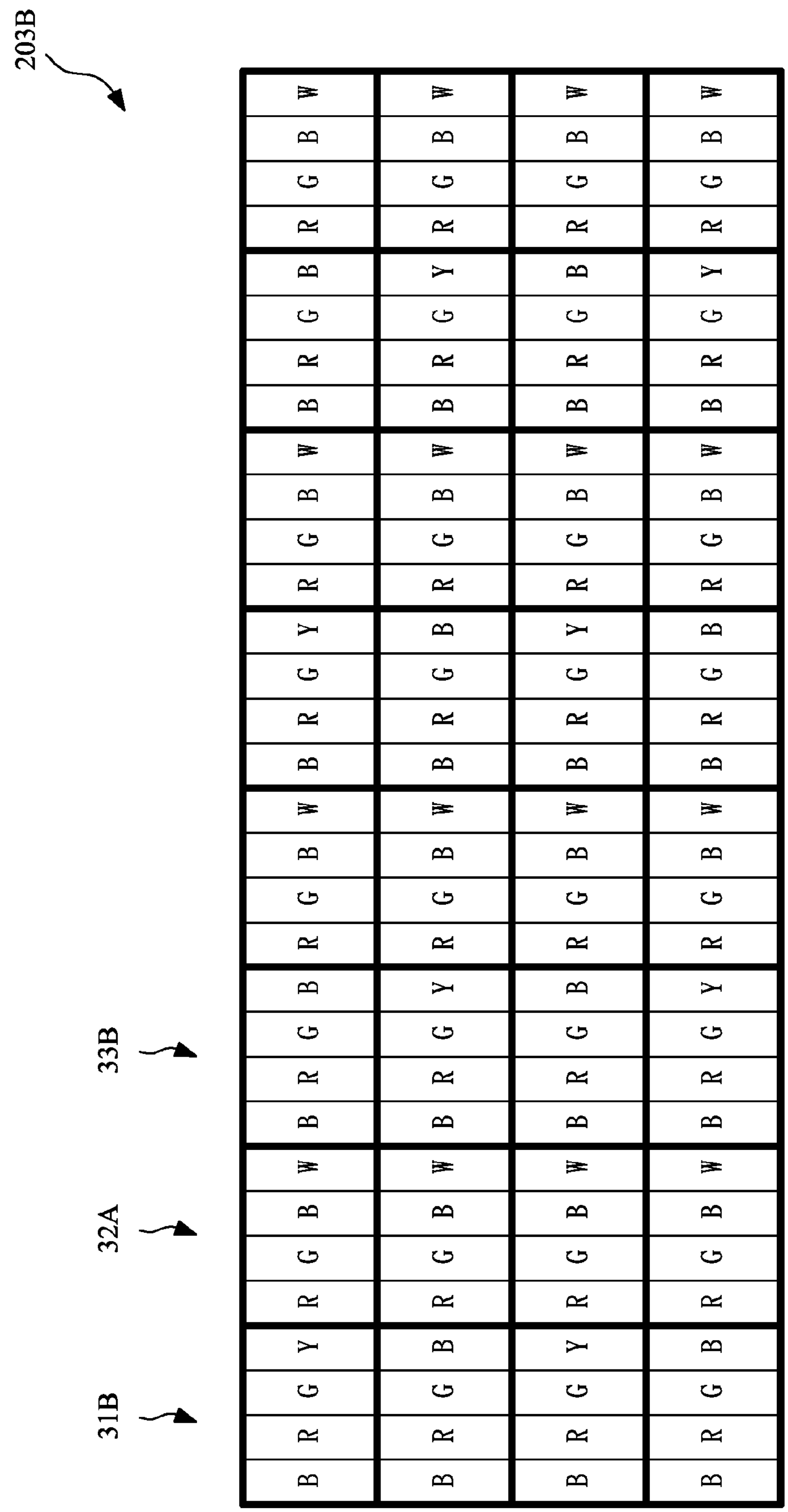
FIG. 3B shows an image device according to an embodiment of the invention.

Referring to FIG. 3B, it shows an image device according to an embodiment of the invention. The image device 203B includes a plurality of RGBY pixels 31B, a plurality of RGBW pixels 32A and a plurality of RBGB pixels 33B. In the RGBY pixel 31B, the sequence of the sub-pixels in the 1×4 matrix from left to right is the blue sub-pixel, the red sub-pixel, the green sub-pixel and the yellow sub-pixel. In the RBGB pixel 33B, the sequence of the sub-pixels in the 1×4 matrix from left to right is the blue sub-pixel, the red sub-pixel, the green sub-pixel and the blue sub-pixel.

Figure 3C:
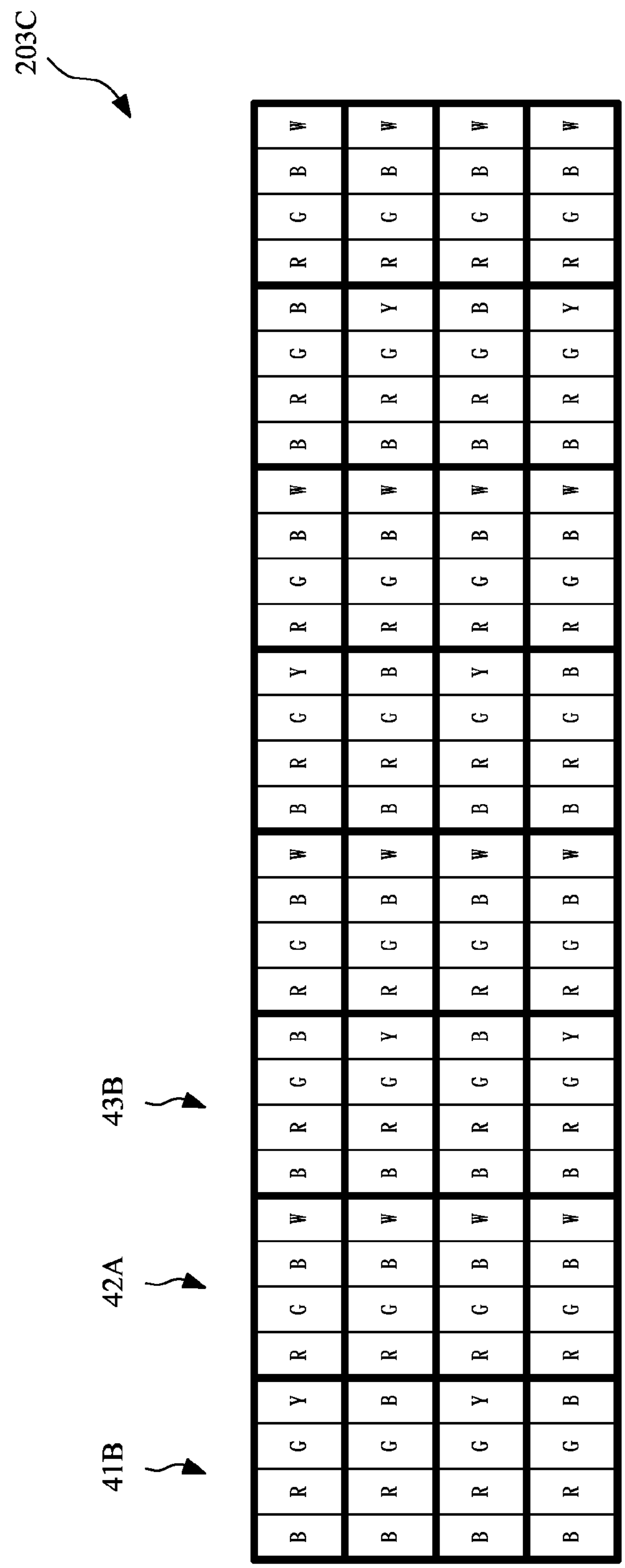
FIG. 3C shows an image device according to an embodiment of the invention.

Referring to FIG. 3C, it shows an image device according to an embodiment of the invention. The image device 203C includes a plurality of RGBY pixels 41B, a plurality of RGBW pixels 42A and a plurality of RBGB pixels 43B. In the RGBY pixel 41B, the sequence of the sub-pixels in the 1×4 matrix from left to right is the blue sub-pixel, the red sub-pixel, the green sub-pixel and the yellow sub-pixel. In the RBGB pixel 43B, the sequence of the sub-pixels in the 1×4 matrix from left to right is the blue sub-pixel, the red sub-pixel, the green sub-pixel and the blue sub-pixel.

Figure 3D:
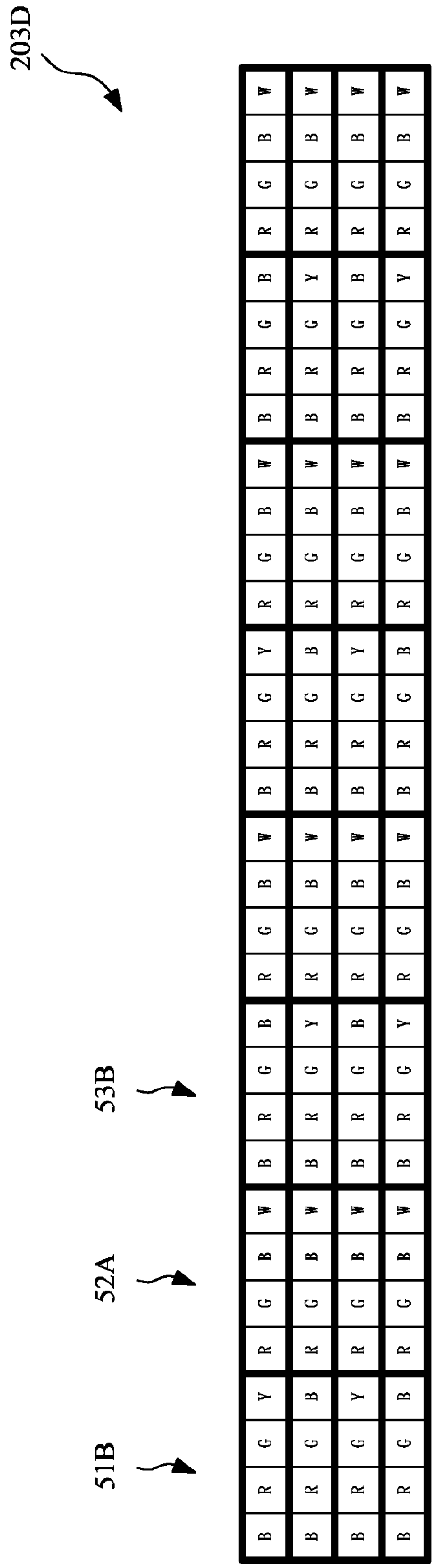
FIG. 3D shows an image device according to an embodiment of the invention.

Referring to FIG. 3D, it shows an image device according to an embodiment of the invention. The image device 203D includes a plurality of RGBY pixels 51B, a plurality of RGBW pixels 52A and a plurality of RBGB pixels 53B. In the RGBY pixel 51B, the sequence of the sub-pixels in the 1×4 matrix from left to right is the blue sub-pixel, the red sub-pixel, the green sub-pixel and the yellow sub-pixel. In the RBGB pixel 53B, the sequence of the sub-pixels in the 1×4 matrix from left to right is the blue sub-pixel, the red sub-pixel, the green sub-pixel and the blue sub-pixel.

Figure 4A:
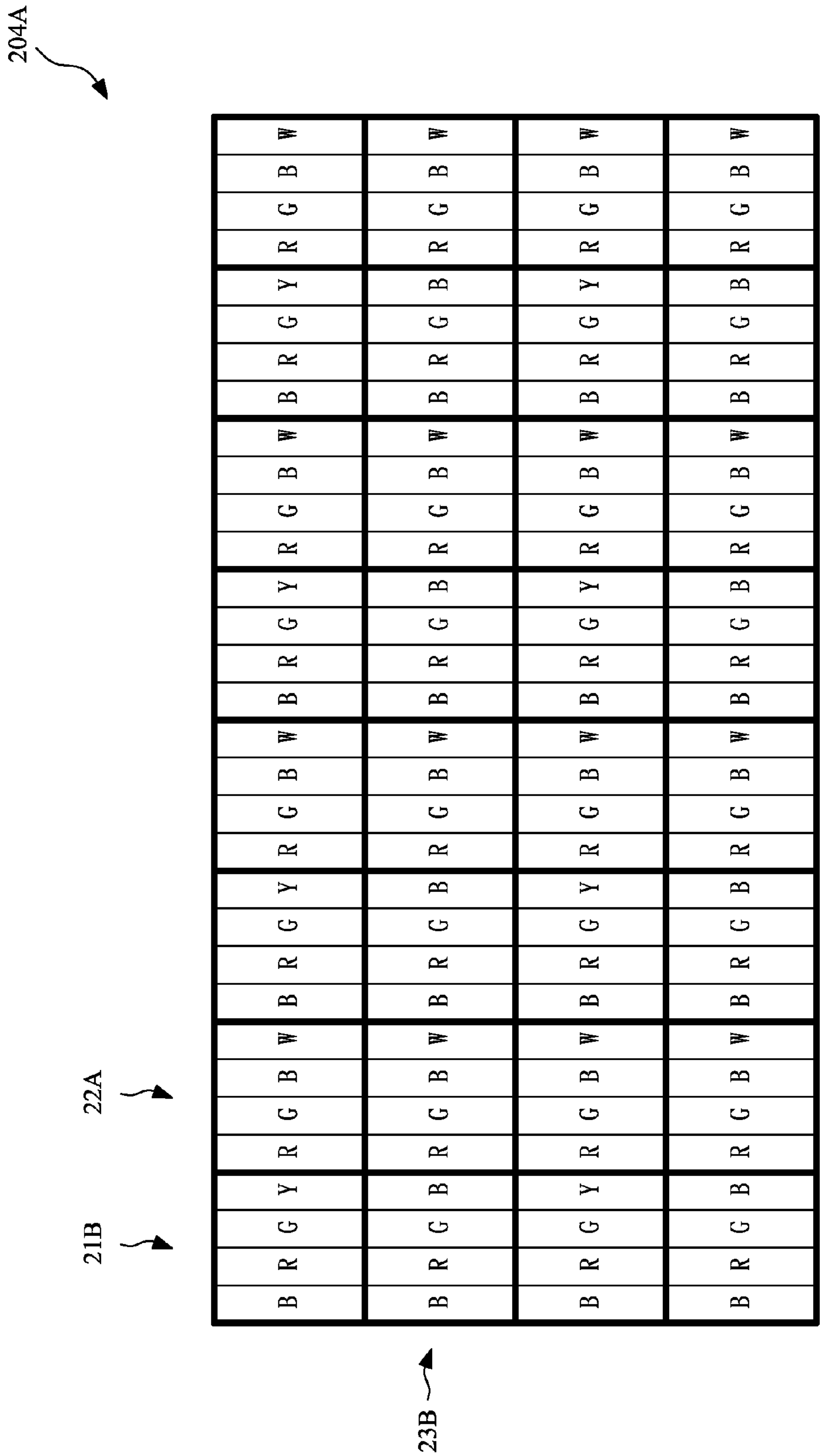
FIG. 4A shows an image device according to an embodiment of the invention.

Referring to FIG. 4A, it shows an image device according to an embodiment of the invention. The image device 204A includes a plurality of RGBY pixels 21B, a plurality of RGBW pixels 22A and a plurality of RBGB pixels 23B.

Figure 4B:
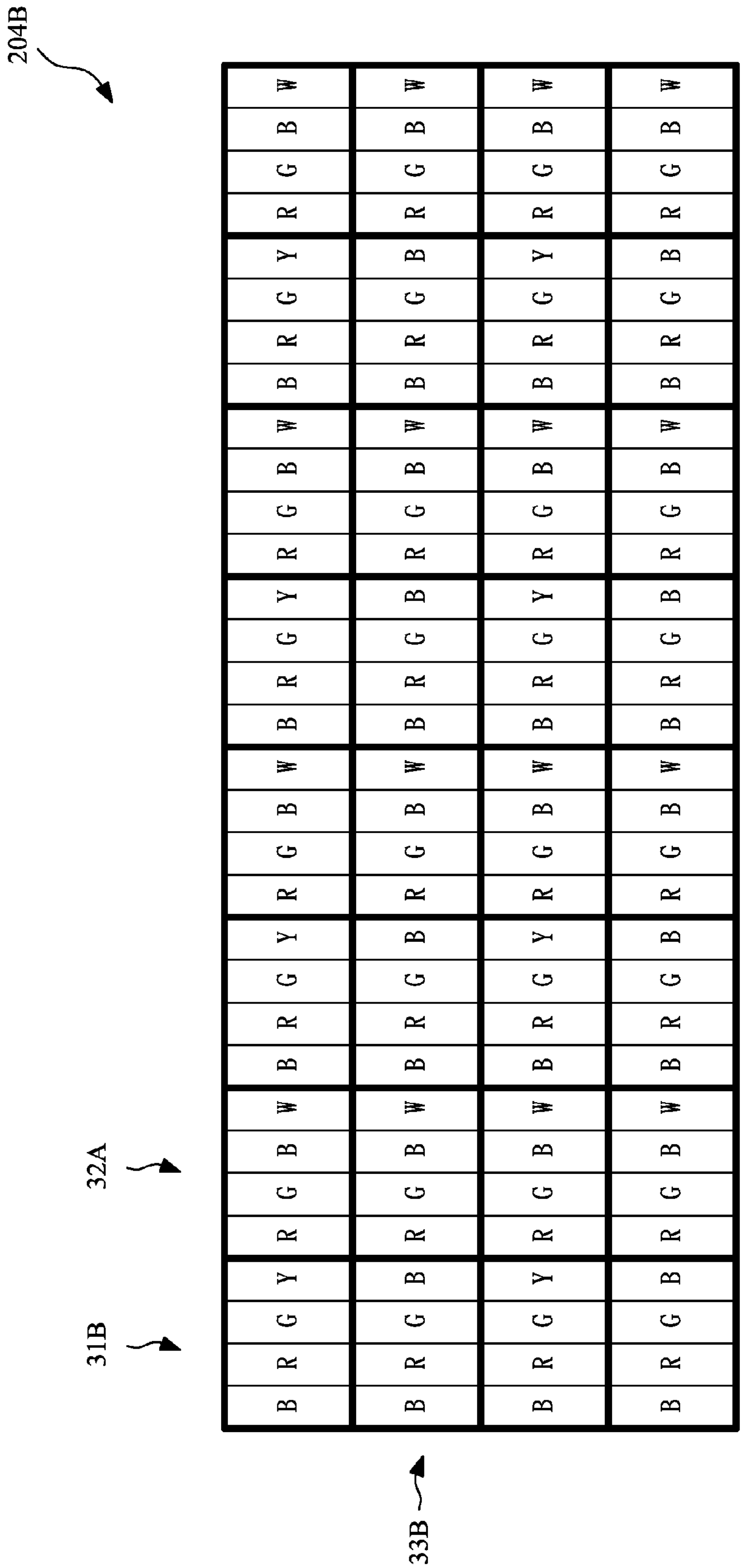
FIG. 4B shows an image device according to an embodiment of the invention.

Referring to FIG. 4B, it shows an image device according to an embodiment of the invention. The image device 204B includes a plurality of RGBY pixels 31B, a plurality of RGBW pixels 32A and a plurality of RBGB pixels 33B.

Figure 4C:
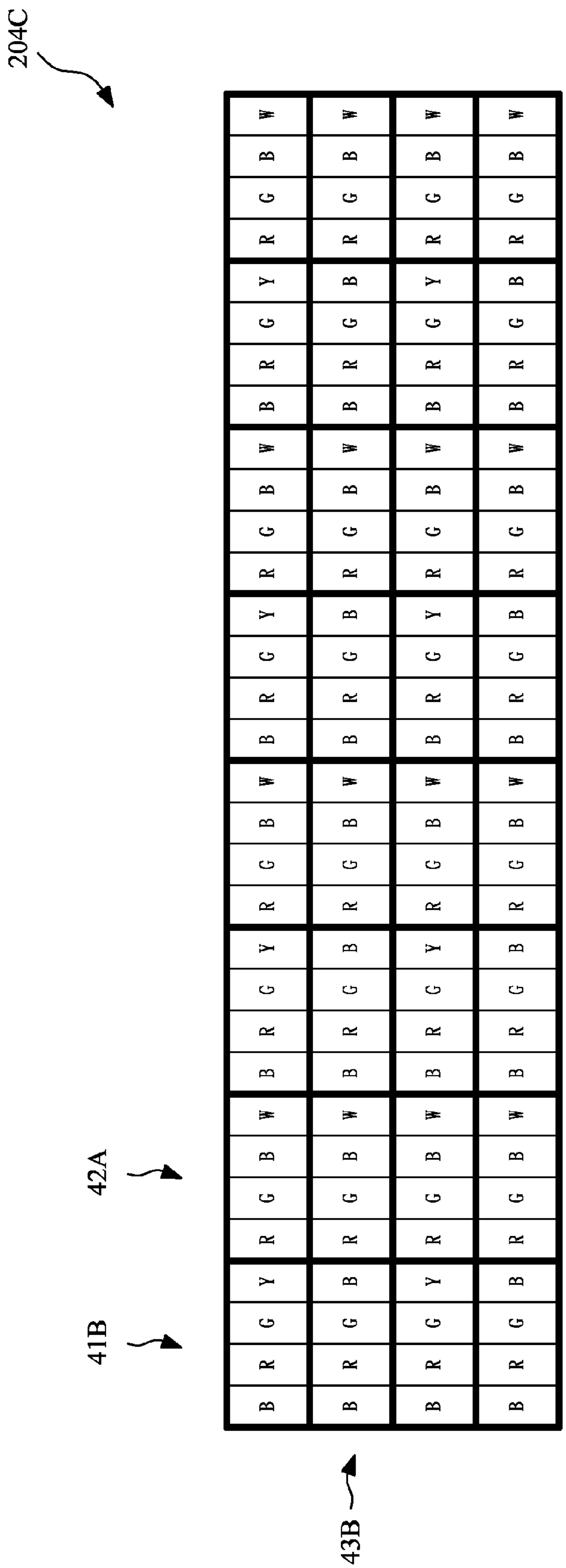
FIG. 4C shows an image device according to an embodiment of the invention.

Referring to FIG. 4C, it shows an image device according to an embodiment of the invention. The image device 204C includes a plurality of RGBY pixels 41B, a plurality of RGBW pixels 42A and a plurality of RBGB pixels 43B.

Figure 4D:
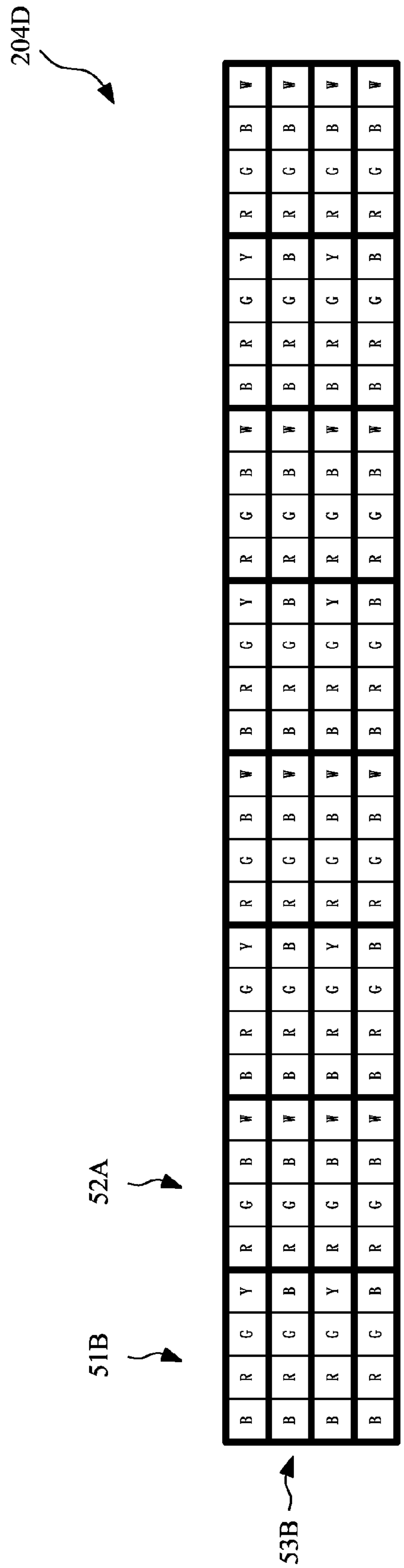
FIG. 4D shows an image device according to an embodiment of the invention.

Referring to FIG. 4D, it shows an image device according to an embodiment of the invention. The image device 204D includes a plurality of RGBY pixels 51B, a plurality of RGBW pixels 52A and a plurality of RBGB pixels 53B.

Figure 5A:
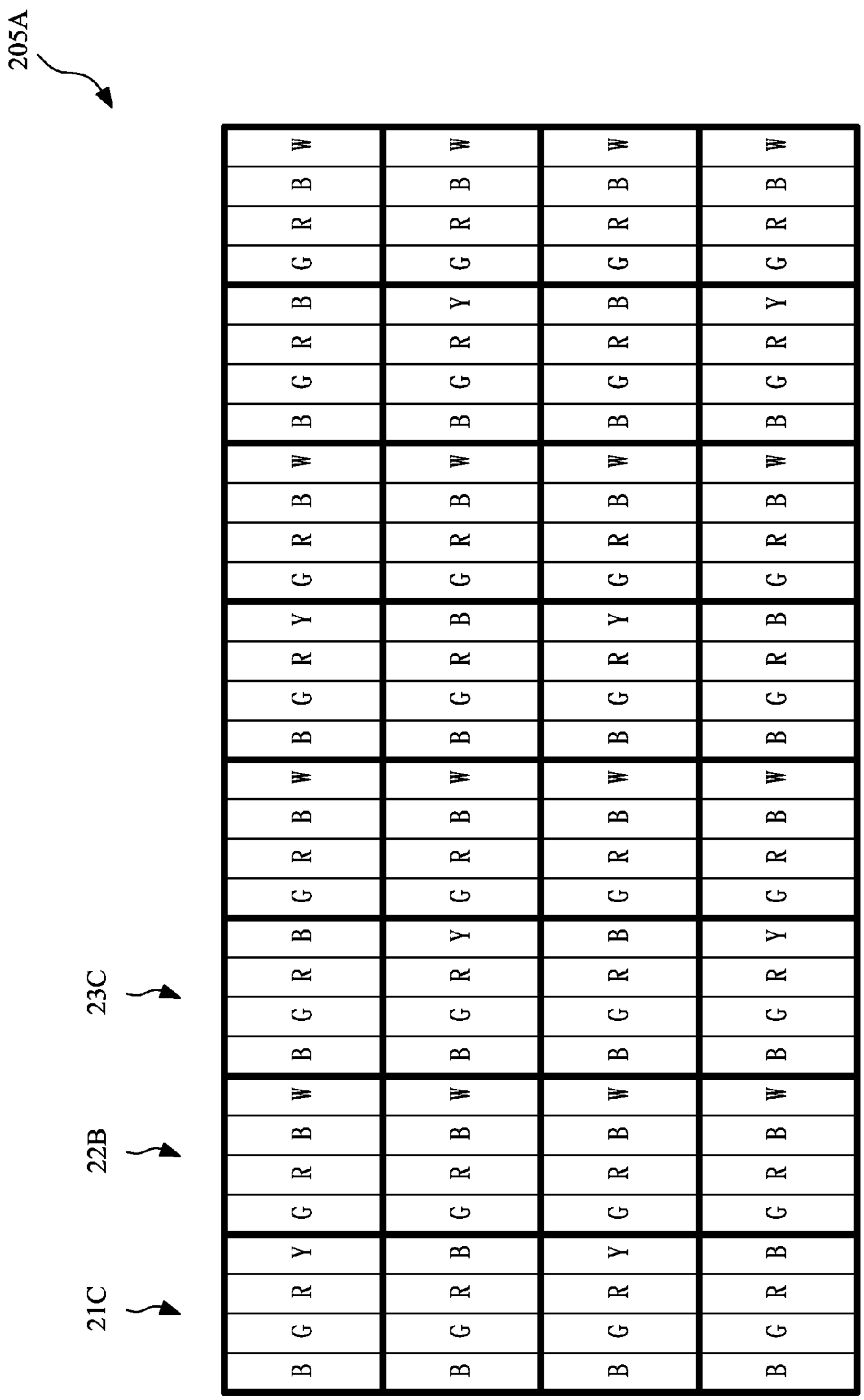
FIG. 5A shows an image device according to an embodiment of the invention.

Referring to FIG. 5A, it shows an image device according to an embodiment of the invention. The image device 205A includes a plurality of RGBY pixels 21C, a plurality of RGBW pixels 22B and a plurality of RBGB pixels 23C. In the RGBY pixel 21C, the sequence of the sub-pixels in the 1×4 matrix from left to right is the blue sub-pixel, the green sub-pixel, the red sub-pixel and the yellow sub-pixel. In the RGBW pixel 22B, the sequence of the sub-pixels in the 1×4 matrix from left to right is the green sub-pixel, the red sub-pixel, the blue sub-pixel and the white sub-pixel. In the RBGB pixel 23C, the sequence of the sub-pixels in the 1×4 matrix from left to right is the blue sub-pixel, the green sub-pixel, the red sub-pixel and the blue sub-pixel.

Figure 5B:
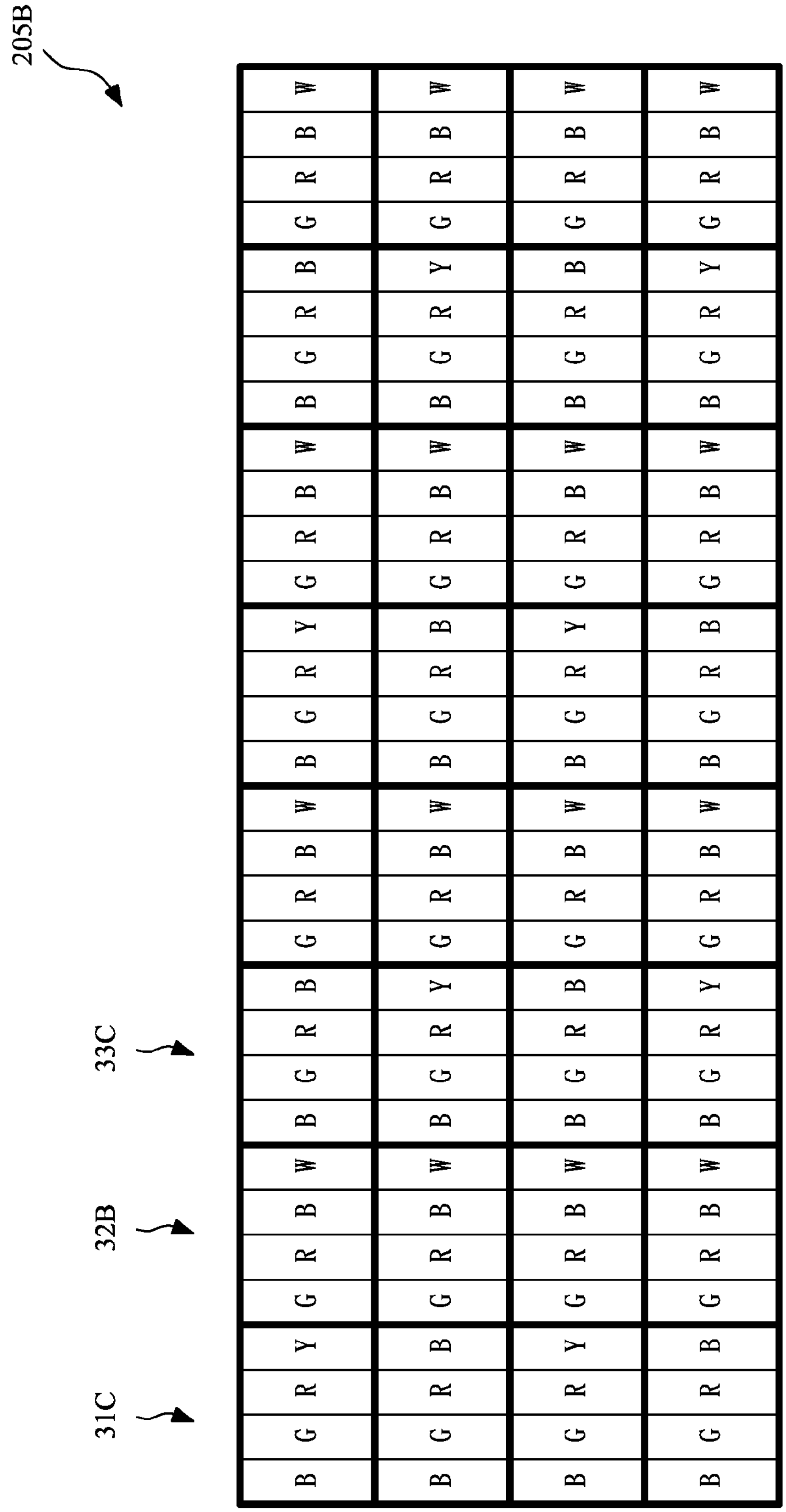
FIG. 5B shows an image device according to an embodiment of the invention.

Referring to FIG. 5B, it shows an image device according to an embodiment of the invention. The image device 205B includes a plurality of RGBY pixels 31C, a plurality of RGBW pixels 32B and a plurality of RBGB pixels 33C. In the RGBY pixel 31C, the sequence of the sub-pixels in the 1×4 matrix from left to right is the blue sub-pixel, the green sub-pixel, the red sub-pixel and the yellow sub-pixel. In the RGBW pixel 32B, the sequence of the sub-pixels in the 1×4 matrix from left to right is the green sub-pixel, the red sub-pixel, the blue sub-pixel and the white sub-pixel. In the RBGB pixel 33C, the sequence of the sub-pixels in the 1×4 matrix from left to right is the blue sub-pixel, the green sub-pixel, the red sub-pixel and the blue sub-pixel.

Figure 5C:
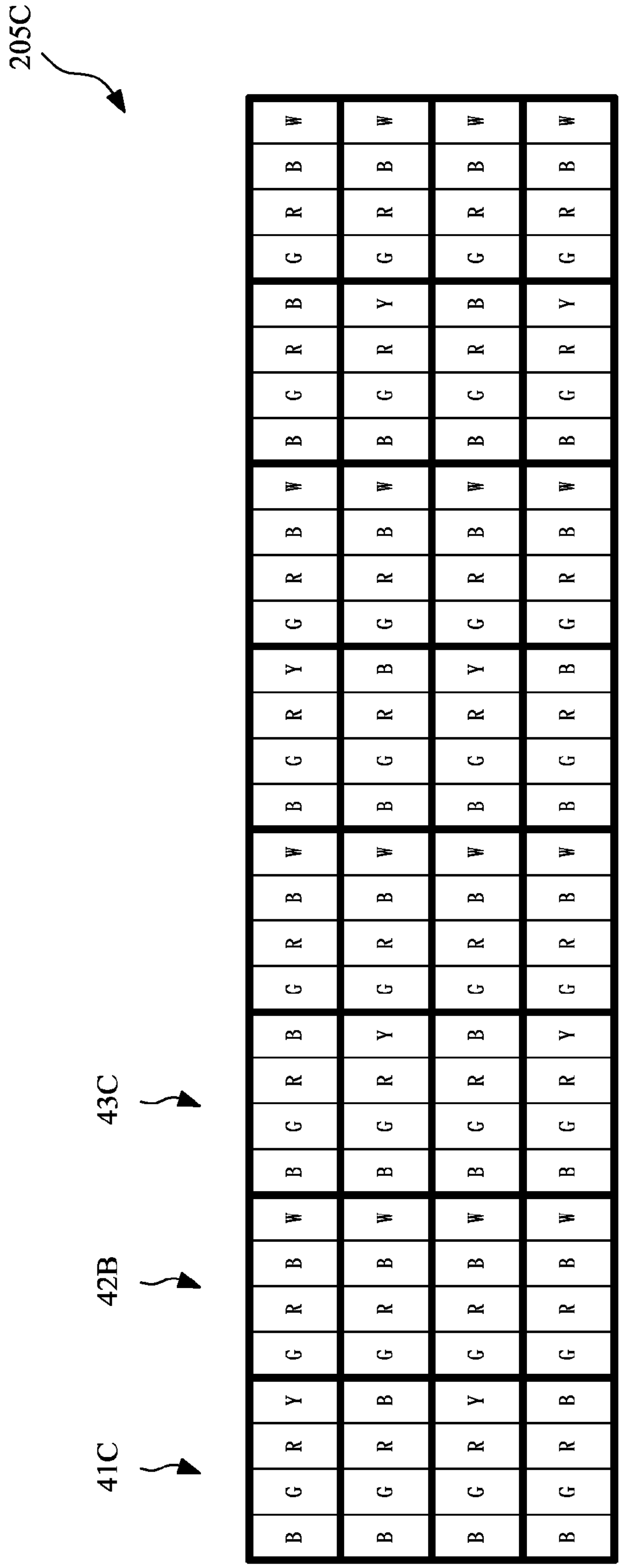
FIG. 5C shows an image device according to an embodiment of the invention.

Referring to FIG. 5C, it shows an image device according to an embodiment of the invention. The image device 205C includes a plurality of RGBY pixels 41C, a plurality of RGBW pixels 42B and a plurality of RBGB pixels 43C. In the RGBY pixel 41C, the sequence of the sub-pixels in the 1×4 matrix from left to right is the blue sub-pixel, the green sub-pixel, the red sub-pixel and the yellow sub-pixel. In the RGBW pixel 42B, the sequence of the sub-pixels in the 1×4 matrix from left to right is the green sub-pixel, the red sub-pixel, the blue sub-pixel and the white sub-pixel. In the RBGB pixel 43C, the sequence of the sub-pixels in the 1×4 matrix from left to right is the blue sub-pixel, the green sub-pixel, the red sub-pixel and the blue sub-pixel.

Figure 5D:
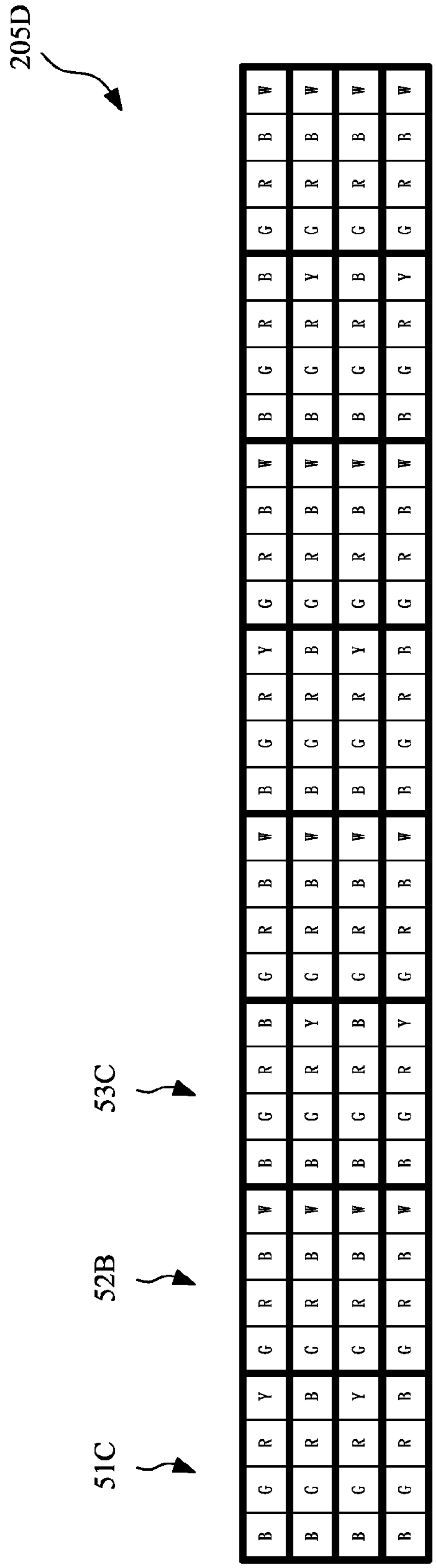
FIG. 5D shows an image device according to an embodiment of the invention.

Referring to FIG. 5D, it shows an image device according to an embodiment of the invention. The image device 205D includes a plurality of RGBY pixels 51C, a plurality of RGBW pixels 52B and a plurality of RBGB pixels 53C. In the RGBY pixel 51C, the sequence of the sub-pixels in the 1×4 matrix from left to right is the blue sub-pixel, the green sub-pixel, the red sub-pixel and the yellow sub-pixel. In the RGBW pixel 52B, the sequence of the sub-pixels in the 1×4 matrix from left to right is the green sub-pixel, the red sub-pixel, the blue sub-pixel and the white sub-pixel. In the RBGB pixel 53C, the sequence of the sub-pixels in the 1×4 matrix from left to right is the blue sub-pixel, the green sub-pixel, the red sub-pixel and the blue sub-pixel.

Figure 6A:
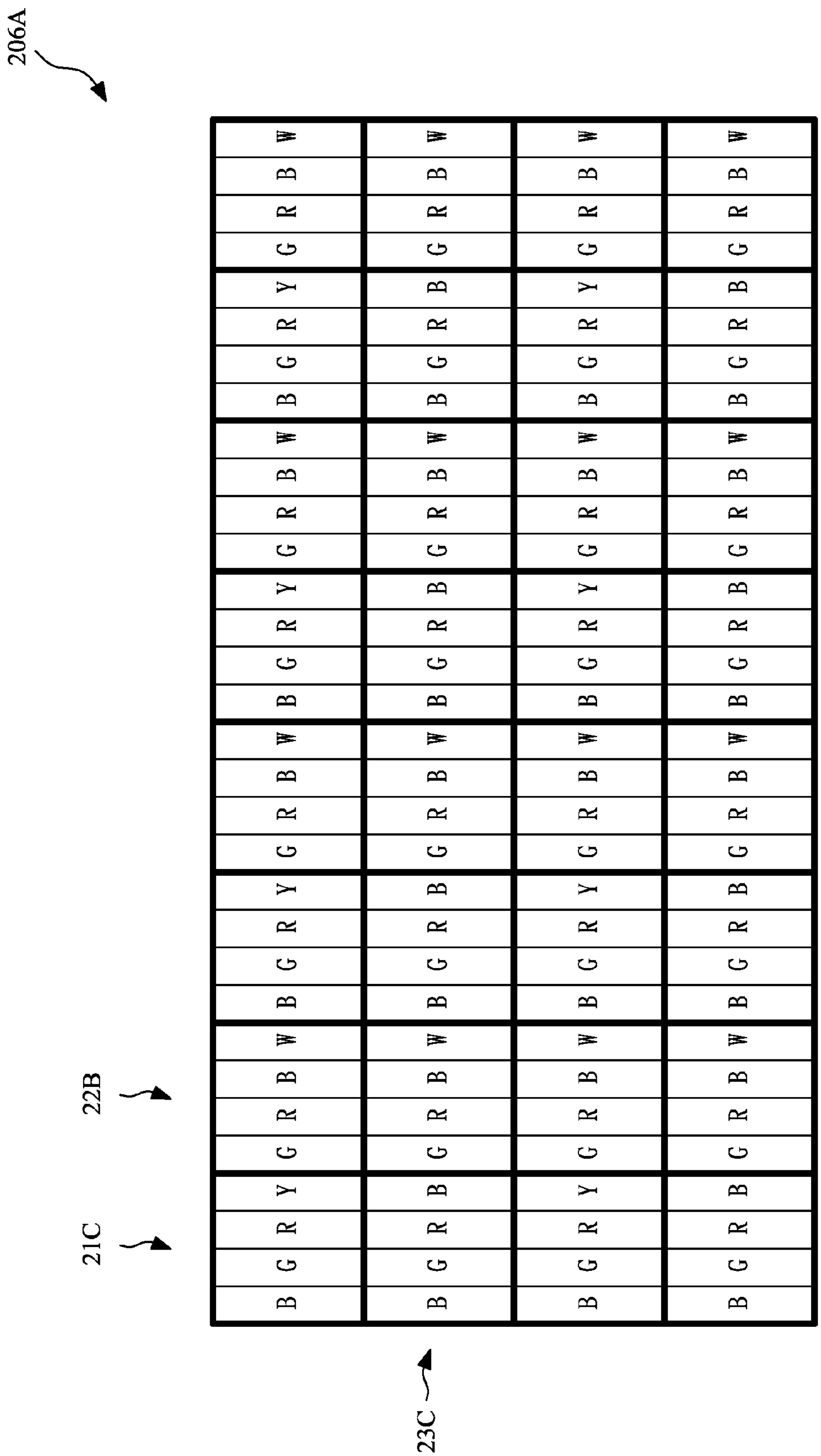
FIG. 6A shows an image device according to an embodiment of the invention.

Referring to FIG. 6A, it shows an image device according to an embodiment of the invention. The image device 206A includes a plurality of RGBY pixels 21C, a plurality of RGBW pixels 22B and a plurality of RBGB pixels 23C.

Figure 6B:
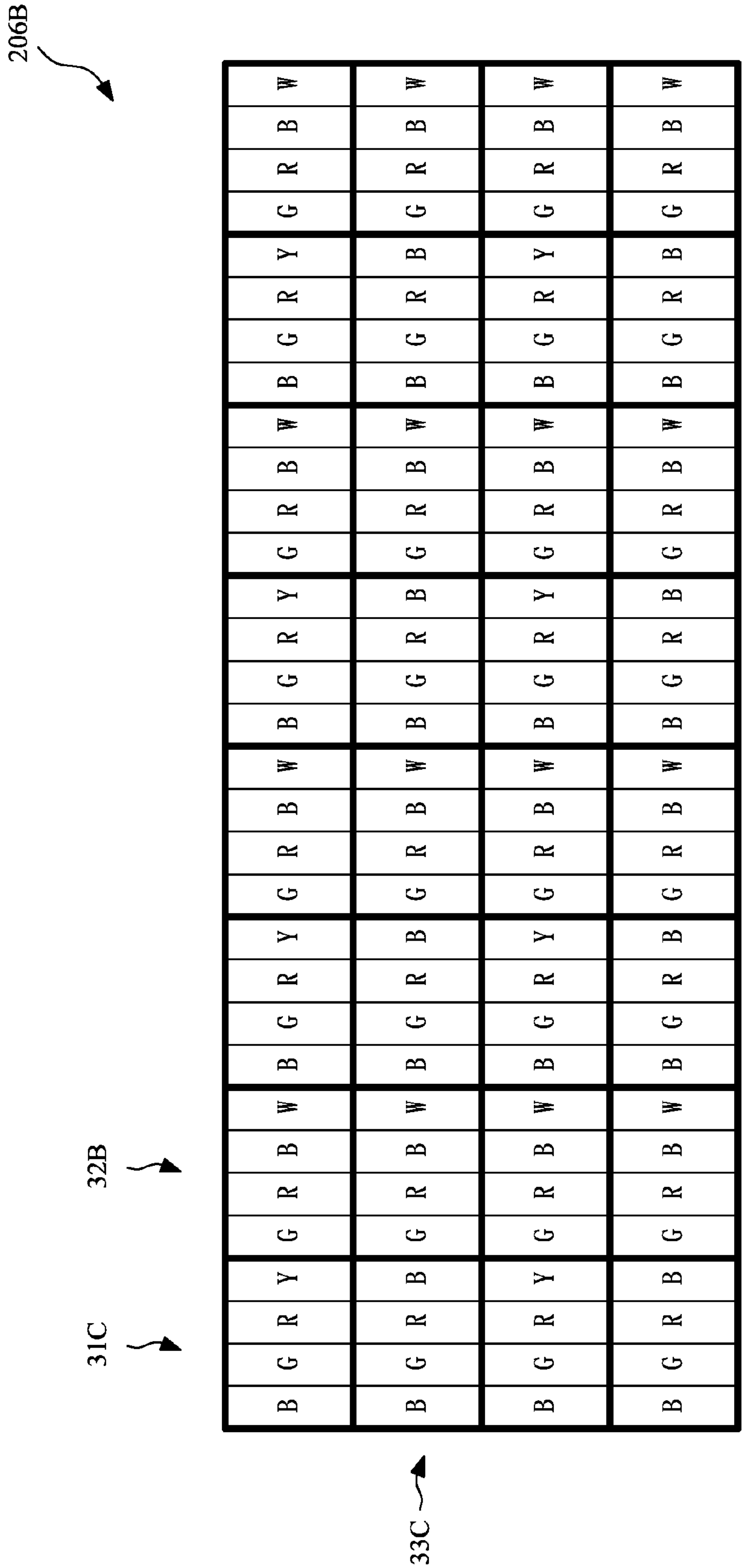
FIG. 6B shows an image device according to an embodiment of the invention.

Referring to FIG. 6B, it shows an image device according to an embodiment of the invention. The image device 206B includes a plurality of RGBY pixels 31C, a plurality of RGBW pixels 32B and a plurality of RBGB pixels 33C.

Figure 6C:
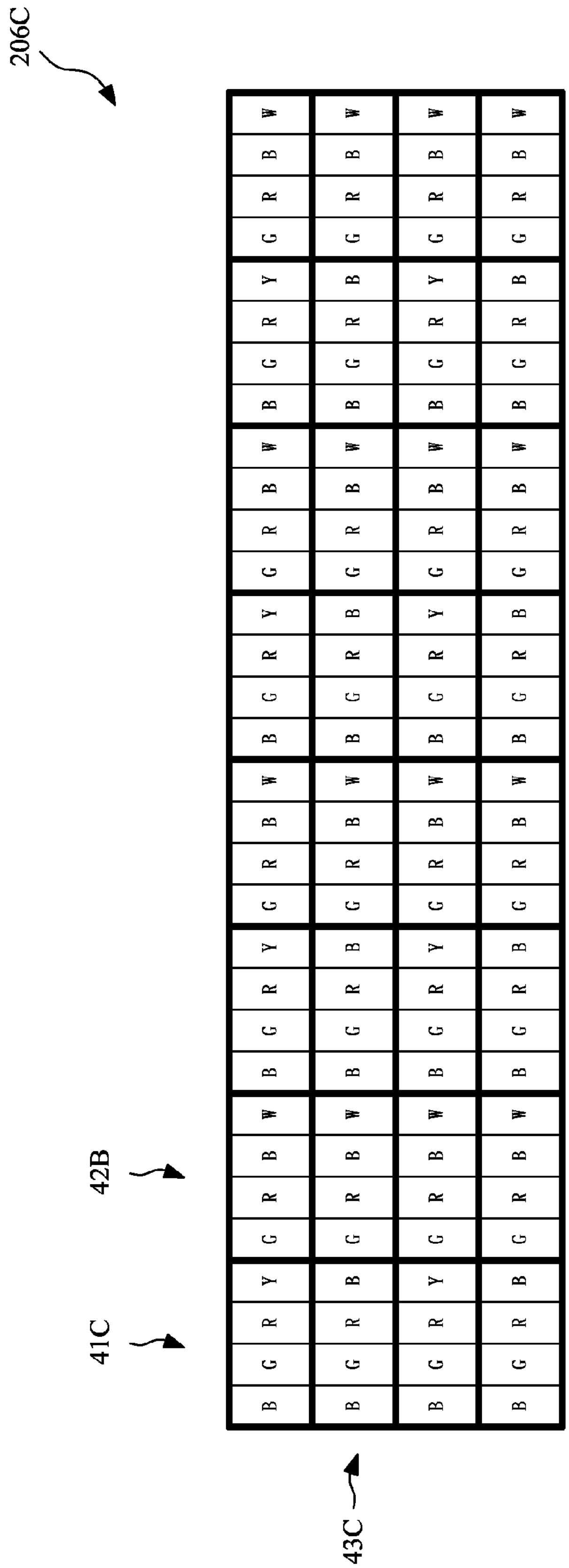
FIG. 6C shows an image device according to an embodiment of the invention.

Referring to FIG. 6C, it shows an image device according to an embodiment of the invention. The image device 206C includes a plurality of RGBY pixels 41C, a plurality of RGBW pixels 42B and a plurality of RBGB pixels 43C.

Figure 6D:
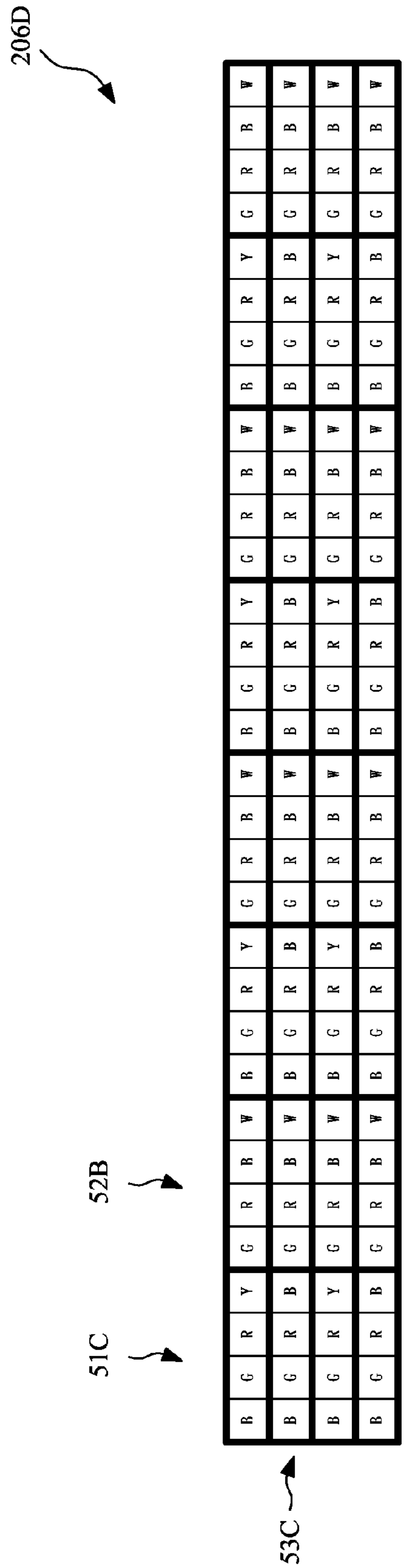
FIG. 6D shows an image device according to an embodiment of the invention.

Referring to FIG. 6D, it shows an image device according to an embodiment of the invention. The image device 206D includes a plurality of RGBY pixels 51C, a plurality of RGBW pixels 52B and a plurality of RBGB pixels 53C.

Figure 7A:
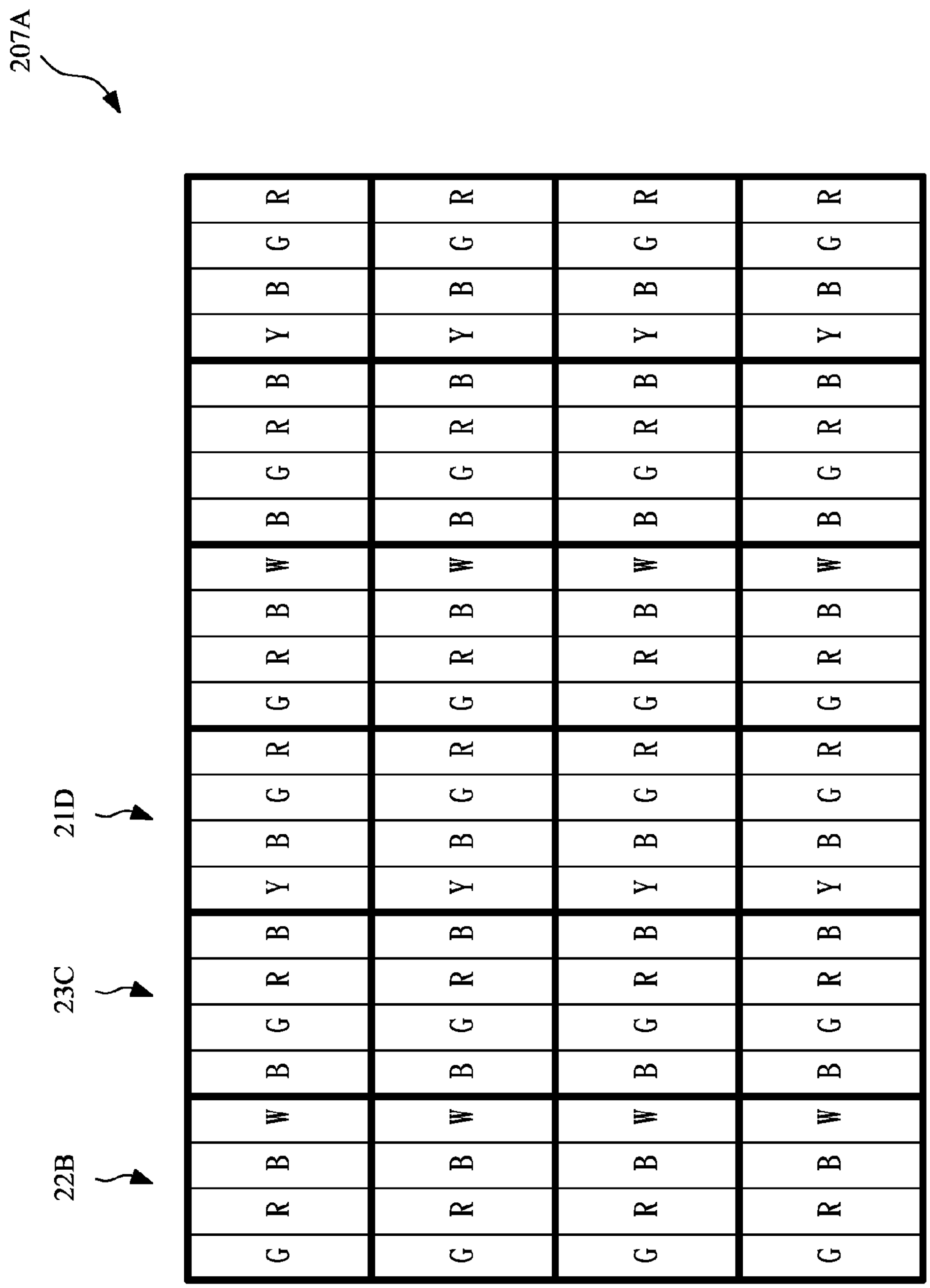
FIG. 7A shows an image device according to an embodiment of the invention.

Referring to FIG. 7A, it shows an image device according to an embodiment of the invention. The image device 207A includes a plurality of RGBY pixels 21D, a plurality of RGBW pixels 22B and a plurality of RBGB pixels 23C. In the RGBY pixel 21D, the sequence of the sub-pixels in the 1×4 matrix from left to right is the yellow sub-pixel, the blue sub-pixel, the green sub-pixel and the red sub-pixel.

In an embodiment, the RGBY pixels 21D are disposed on at least one column of the image device 207A. For the column including only the RGBY pixel 21D, at least a first column comprises sub-pixels of the same first color, for example yellow color; at least a second column comprises sub-pixels of the same second color, for example blue color; at least a third column comprises sub-pixels of the same third color, for example green color; at least a fourth column comprises sub-pixels of the same fourth color, for example red color.

In an embodiment, the RBGB pixels 23C are disposed on at least one column of the image device 207A. For the column including only the RBGB pixel 23C, at least a first column comprises sub-pixels of the same first color, for example blue color; at least a second column comprises sub-pixels of the same second color, for example green color; at least a third column comprises sub-pixels of the same third color, for example red color; at least a fourth column comprises sub-pixels of the same fourth color, for example blue color.

Figure 7B:
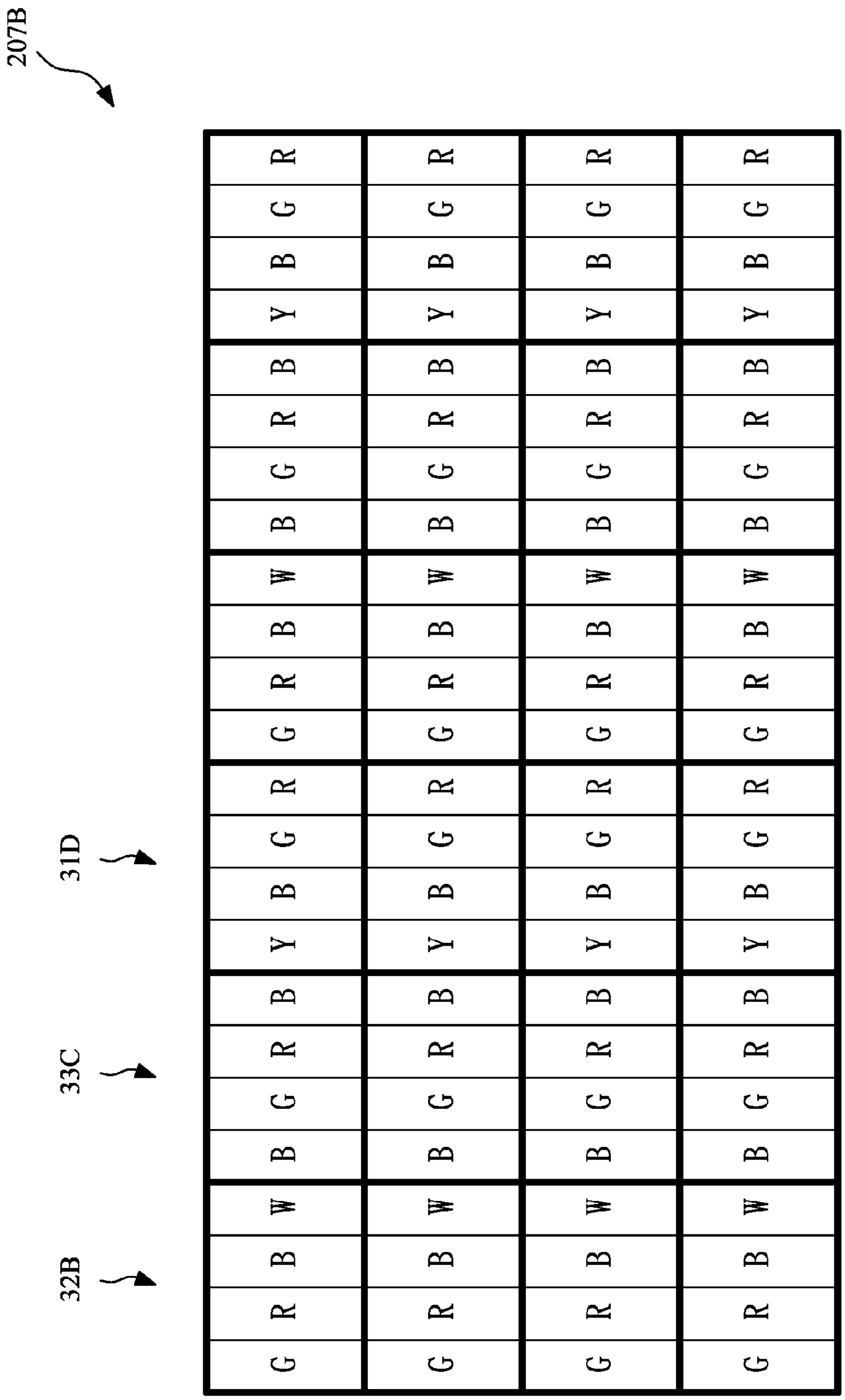
FIG. 7B shows an image device according to an embodiment of the invention.

Referring to FIG. 7B, it shows an image device according to an embodiment of the invention. The image device 207B includes a plurality of RGBY pixels 31D, a plurality of RGBW pixels 32B and a plurality of RBGB pixels 33C. In the RGBY pixel 31D, the sequence of the sub-pixels in the 1×4 matrix from left to right is the yellow sub-pixel, the blue sub-pixel, the green sub-pixel and the red sub-pixel.

Figure 7C:
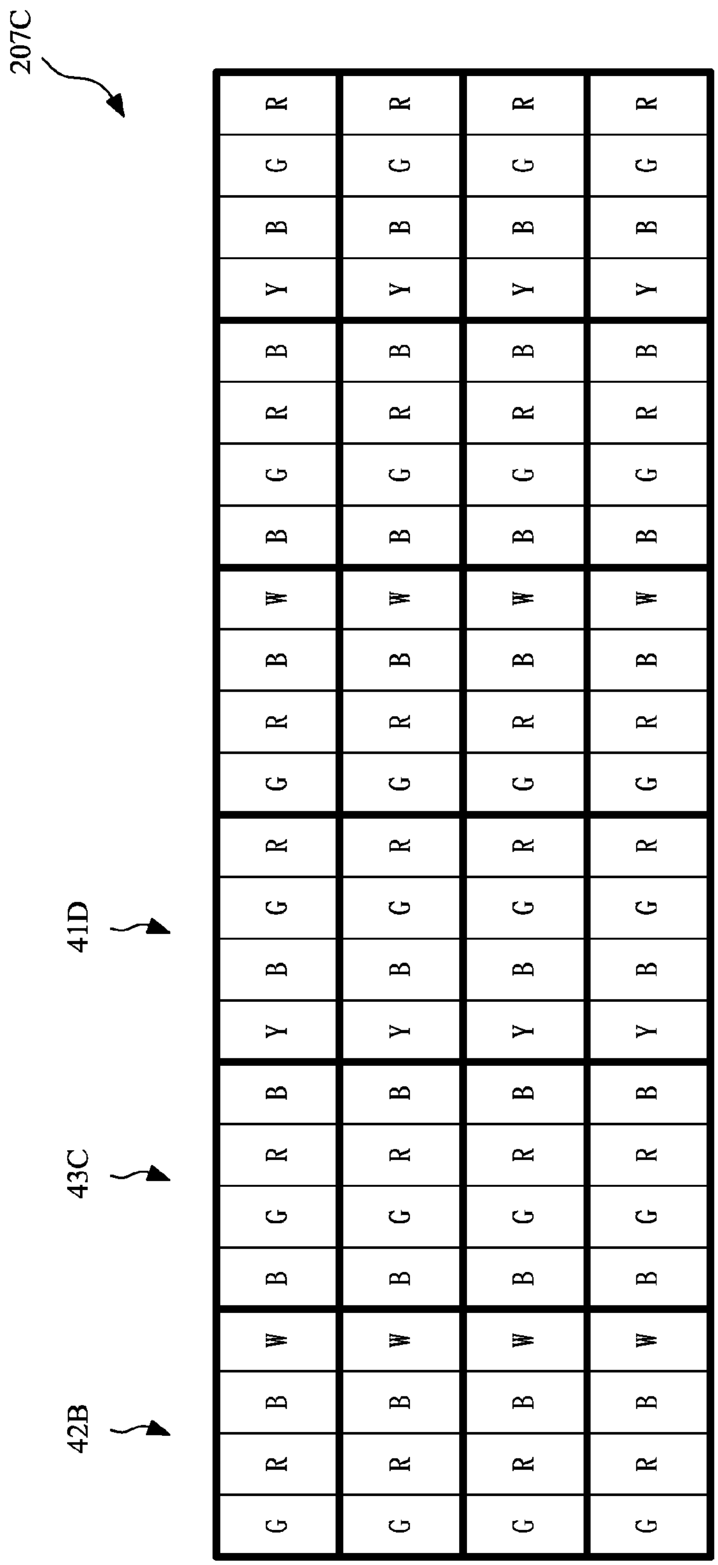
FIG. 7C shows an image device according to an embodiment of the invention.

Referring to FIG. 7C, it shows an image device according to an embodiment of the invention. The image device 207C includes a plurality of RGBY pixels 41D, a plurality of RGBW pixels 42B and a plurality of RBGB pixels 43C. In the RGBY pixel 41D, the sequence of the sub-pixels in the 1×4 matrix from left to right is the yellow sub-pixel, the blue sub-pixel, the green sub-pixel and the red sub-pixel.

Figure 7D:
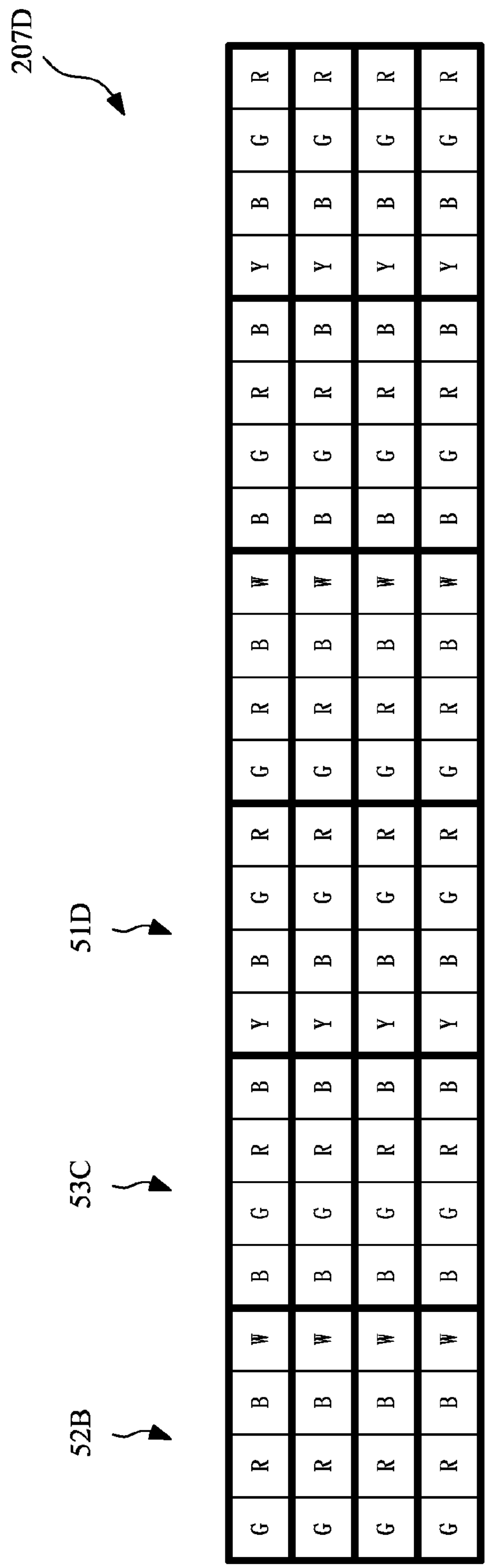
FIG. 7D shows an image device according to an embodiment of the invention.

Referring to FIG. 7D, it shows an image device according to an embodiment of the invention. The image device 207D includes a plurality of RGBY pixels 51D, a plurality of RGBW pixels 52B and a plurality of RBGB pixels 53C. In the RGBY pixel 51D, the sequence of the sub-pixels in the 1×4 matrix from left to right is the yellow sub-pixel, the blue sub-pixel, the green sub-pixel and the red sub-pixel.

Figure 8A:
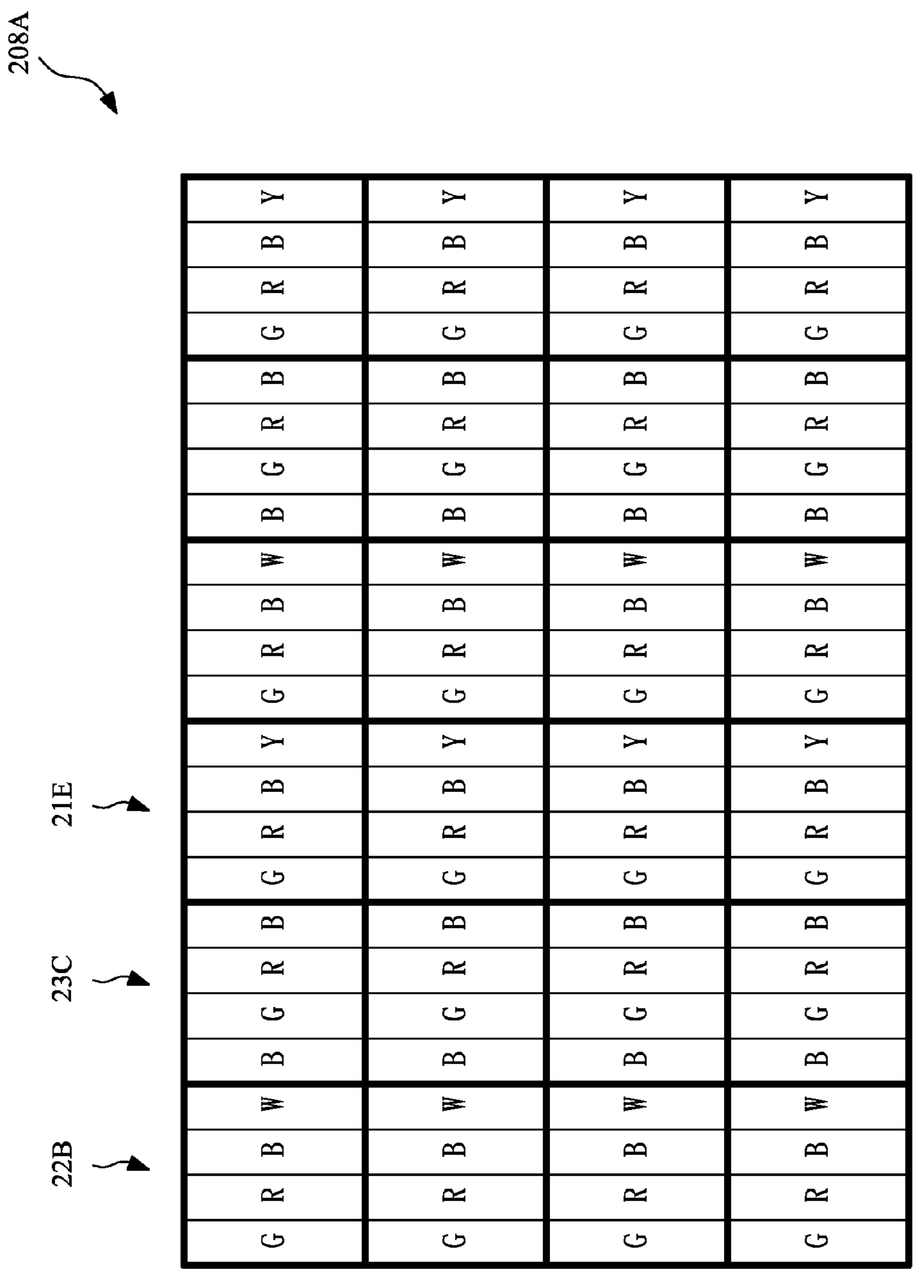
FIG. 8A shows an image device according to an embodiment of the invention.

Referring to FIG. 8A, it shows an image device according to an embodiment of the invention. The image device 208A includes a plurality of RGBY pixels 21E, a plurality of RGBW pixels 22B and a plurality of RBGB pixels 23C. In the RGBY pixel 21E, the sequence of the sub-pixels in the 1×4 matrix from left to right is the green sub-pixel, the red sub-pixel, the blue sub-pixel and the yellow sub-pixel.

Figure 8B:
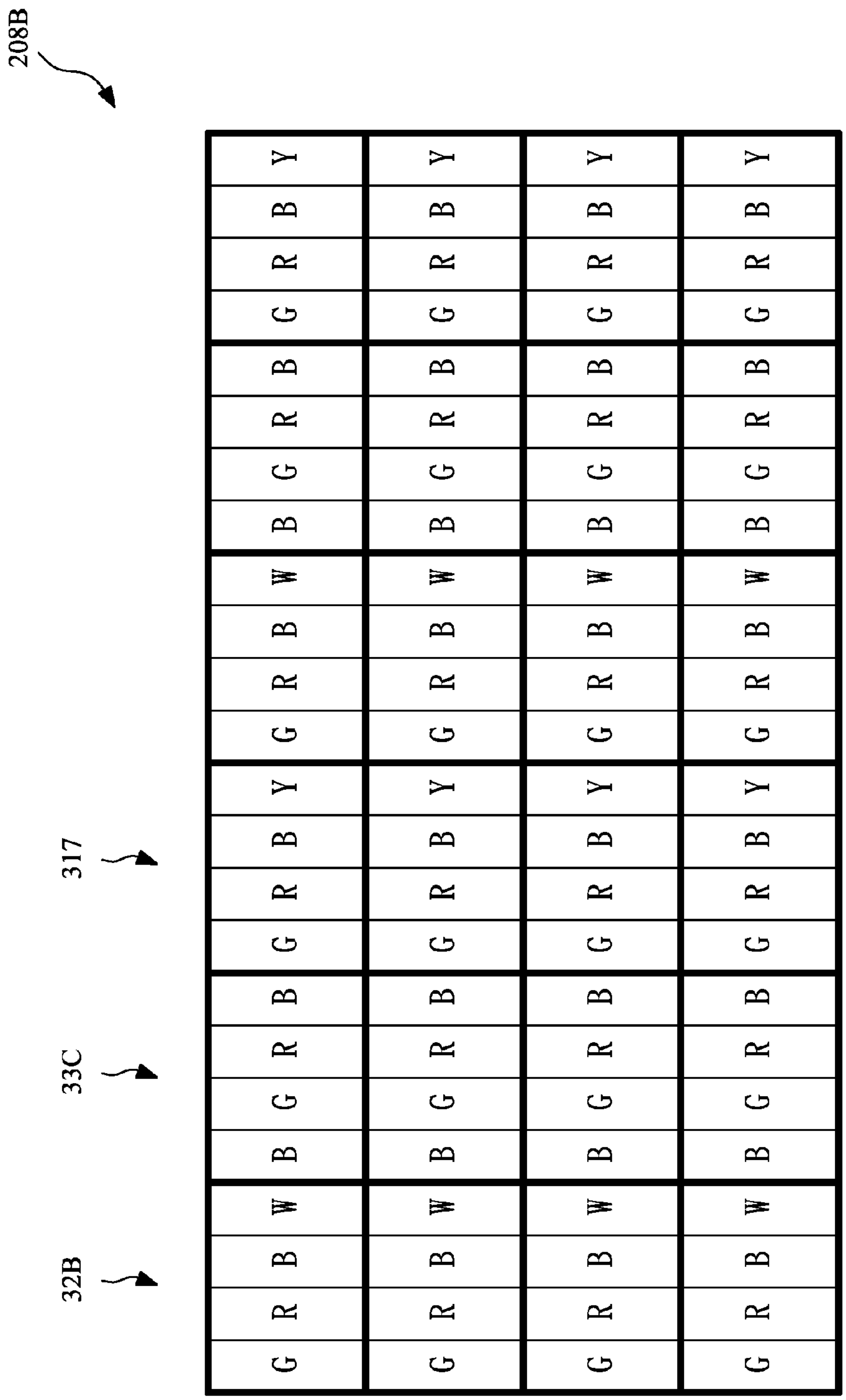
FIG. 8B shows an image device according to an embodiment of the invention.

Referring to FIG. 8B, it shows an image device according to an embodiment of the invention. The image device 208B includes a plurality of RGBY pixels 31E, a plurality of RGBW pixels 32B and a plurality of RBGB pixels 33C. In the RGBY pixel 31E, the sequence of the sub-pixels in the 1×4 matrix from left to right is the green sub-pixel, the red sub-pixel, the blue sub-pixel and the yellow sub-pixel.

Figure 8C:
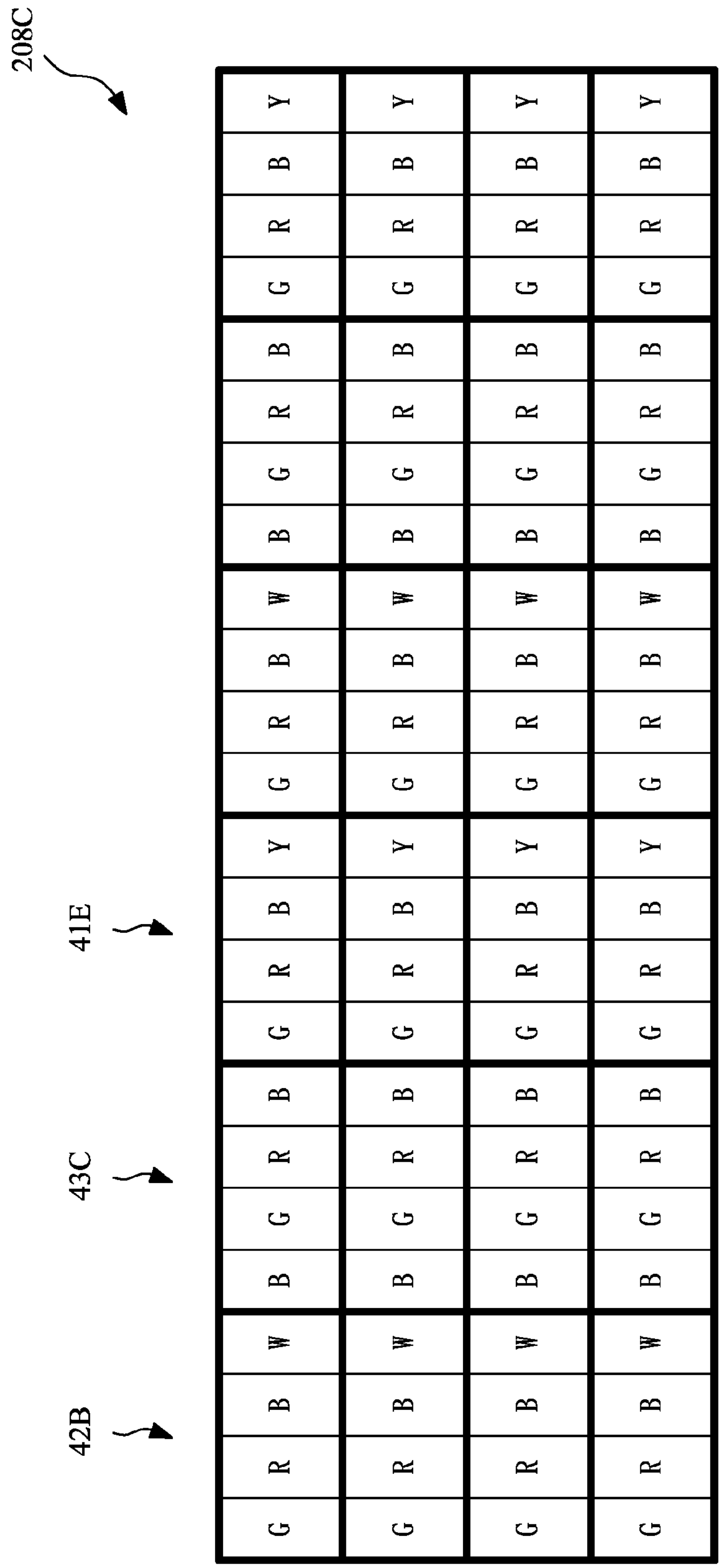
FIG. 8C shows an image device according to an embodiment of the invention.

Referring to FIG. 8C, it shows an image device according to an embodiment of the invention. The image device 208C includes a plurality of RGBY pixels 41E, a plurality of RGBW pixels 42B and a plurality of RBGB pixels 43C. In the RGBY pixel 41E, the sequence of the sub-pixels in the 1×4 matrix from left to right is the green sub-pixel, the red sub-pixel, the blue sub-pixel and the yellow sub-pixel.

Figure 8D:
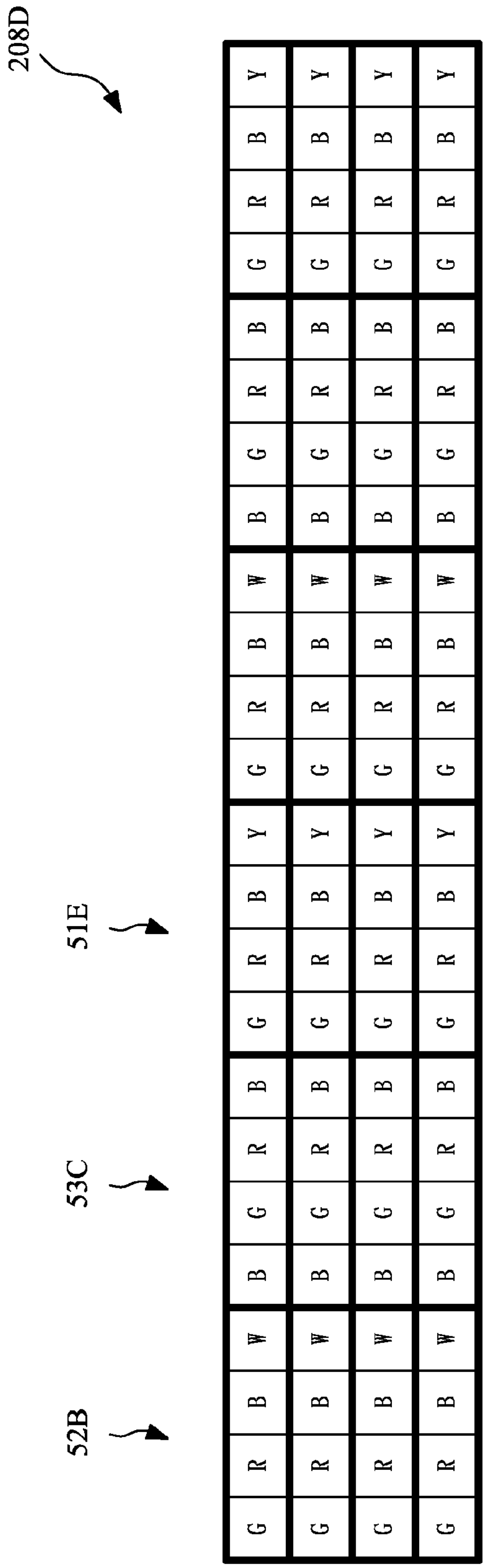
FIG. 8D shows an image device according to an embodiment of the invention.

Referring to FIG. 8D, it shows an image device according to an embodiment of the invention. The image device 208D includes a plurality of RGBY pixels 51E, a plurality of RGBW pixels 52B and a plurality of RBGB pixels 53C. In the RGBY pixel 51E, the sequence of the sub-pixels in the 1×4 matrix from left to right is the green sub-pixel, the red sub-pixel, the blue sub-pixel and the yellow sub-pixel.

Figure 9A:
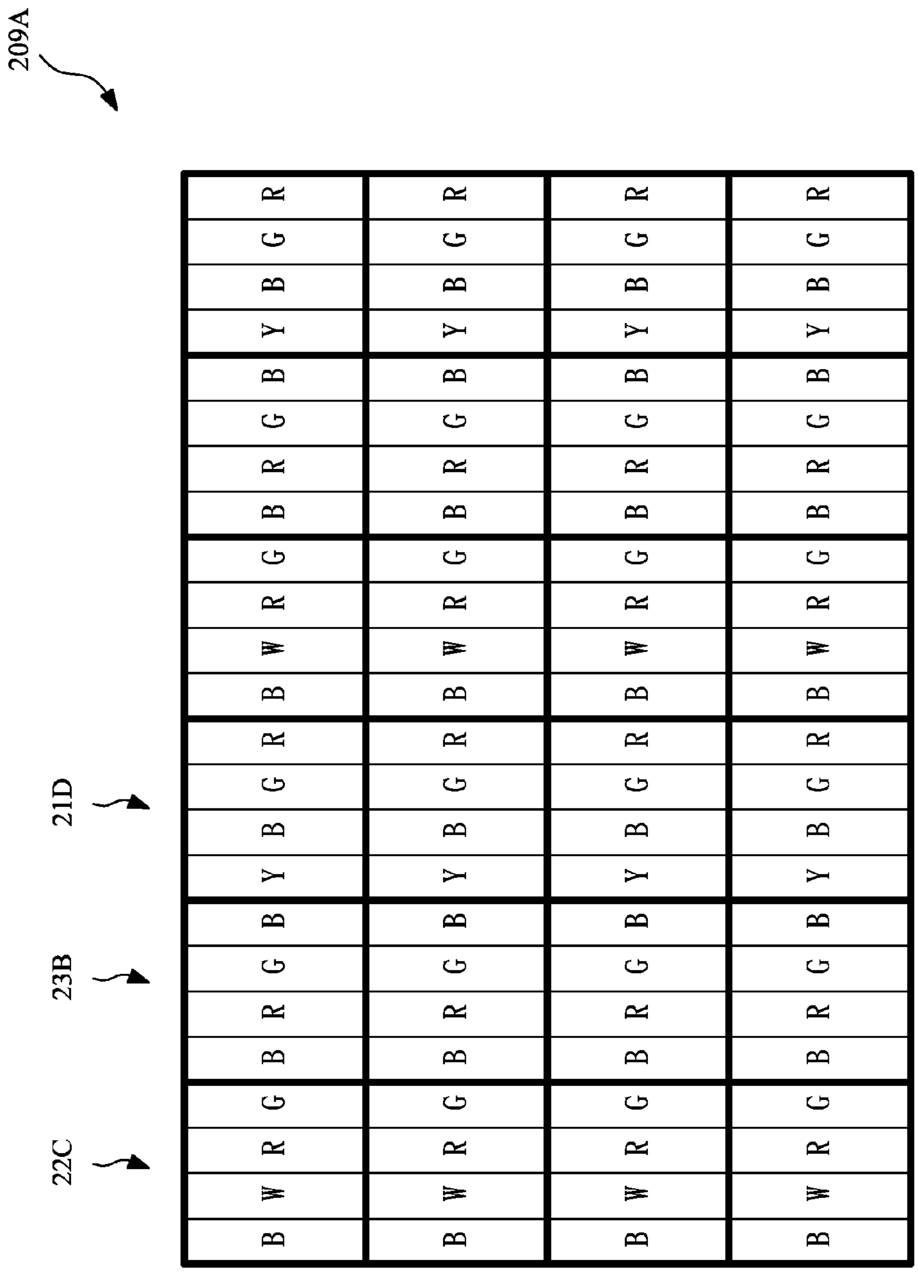
FIG. 9A shows an image device according to an embodiment of the invention.

Referring to FIG. 9A, it shows an image device according to an embodiment of the invention. The image device 209A includes a plurality of RGBY pixels 21D, a plurality of RGBW pixels 22C and a plurality of RBGB pixels 23B. In the RGBW pixel 22C, the sequence of the sub-pixels in the 1×4 matrix from left to right is the blue sub-pixel, the white sub-pixel, the red sub-pixel and the green sub-pixel.

Figure 9B:
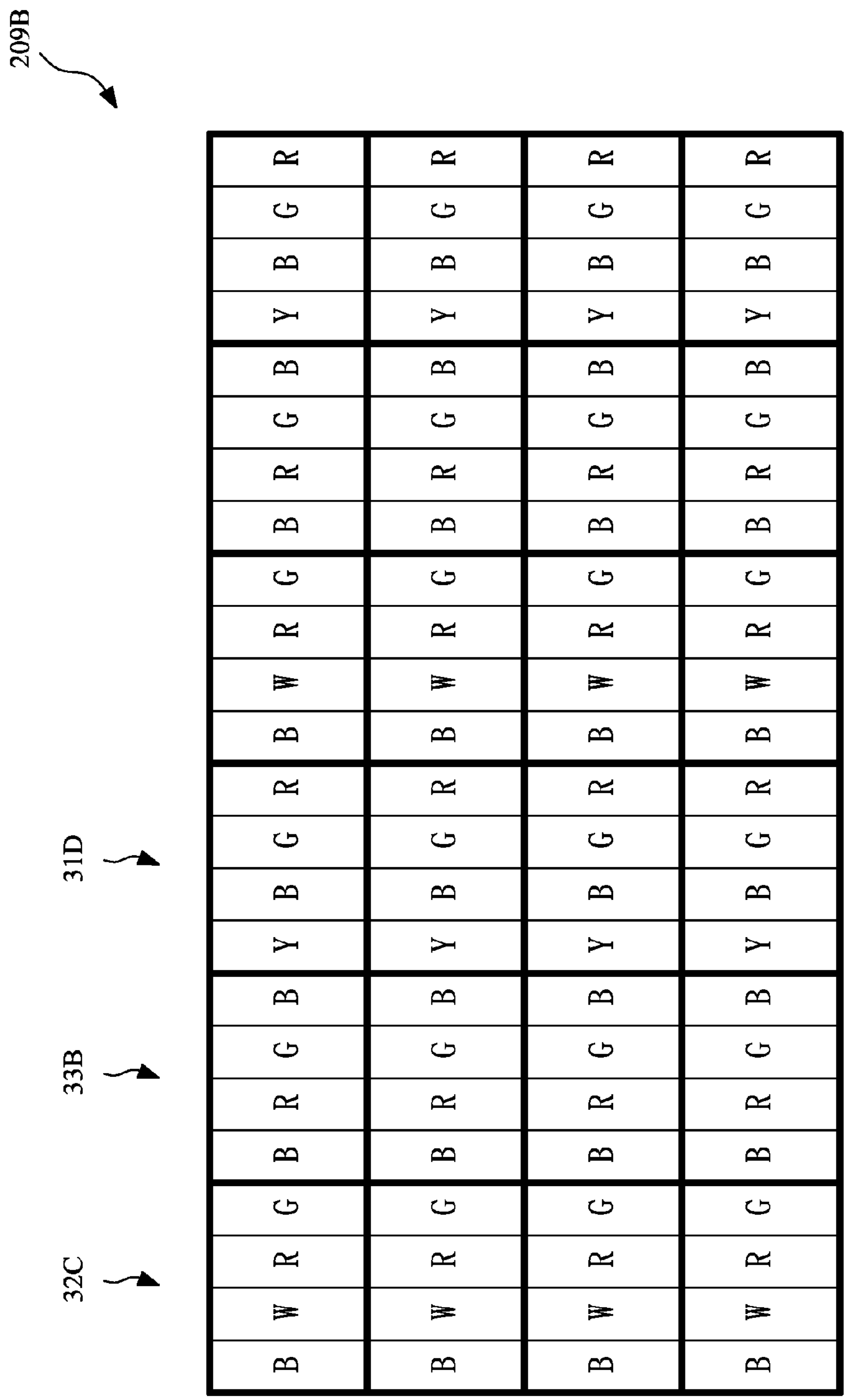
FIG. 9B shows an image device according to an embodiment of the invention.

Referring to FIG. 9B, it shows an image device according to an embodiment of the invention. The image device 209B includes a plurality of RGBY pixels 31D, a plurality of RGBW pixels 32C and a plurality of RBGB pixels 33B. In the RGBW pixel 32C, the sequence of the sub-pixels in the 1×4 matrix from left to right is the blue sub-pixel, the white sub-pixel, the red sub-pixel and the green sub-pixel.

Figure 9C:
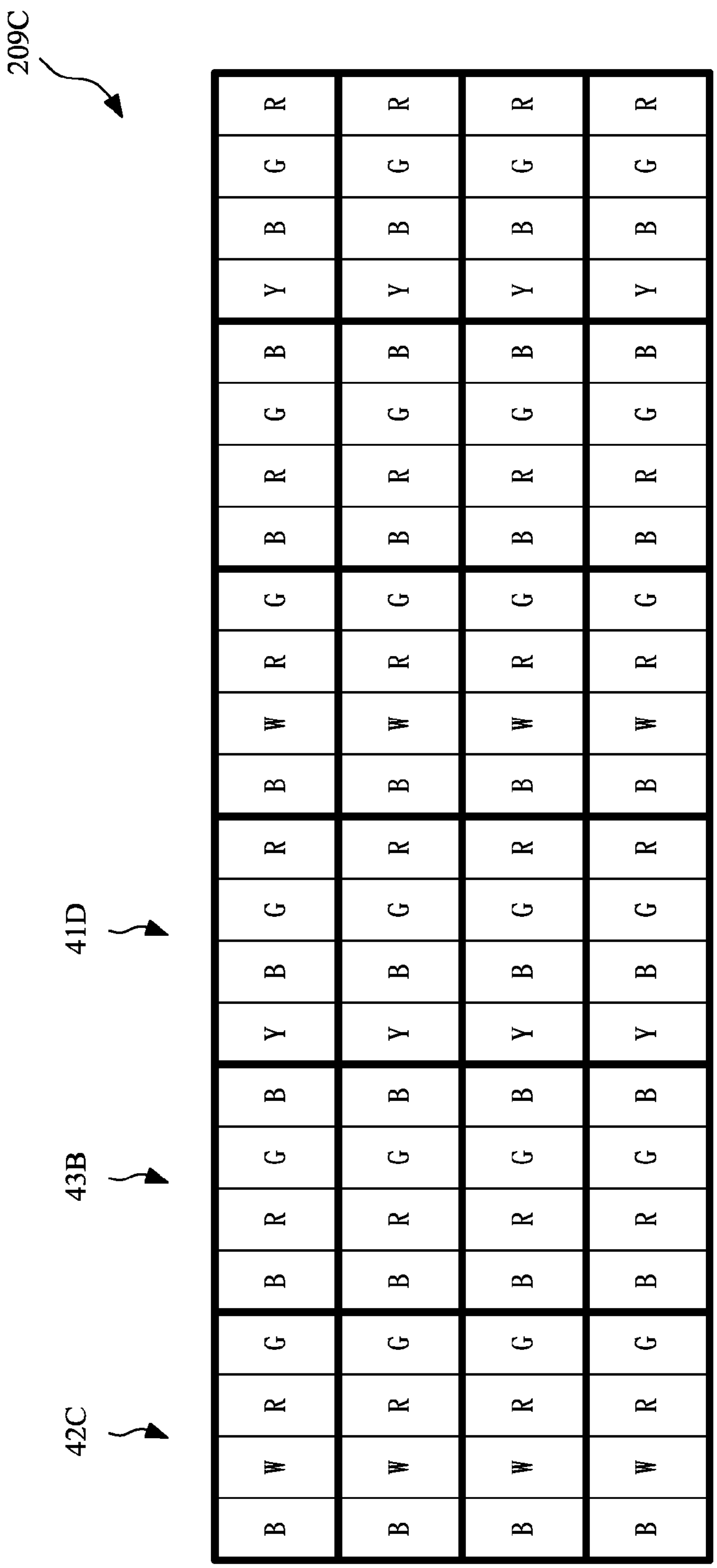
FIG. 9C shows an image device according to an embodiment of the invention.

Referring to FIG. 9C, it shows an image device according to an embodiment of the invention. The image device 209C includes a plurality of RGBY pixels 41D, a plurality of RGBW pixels 42C and a plurality of RBGB pixels 43B. In the RGBW pixel 42C, the sequence of the sub-pixels in the 1×4 matrix from left to right is the blue sub-pixel, the white sub-pixel, the red sub-pixel and the green sub-pixel.

Figure 9D:
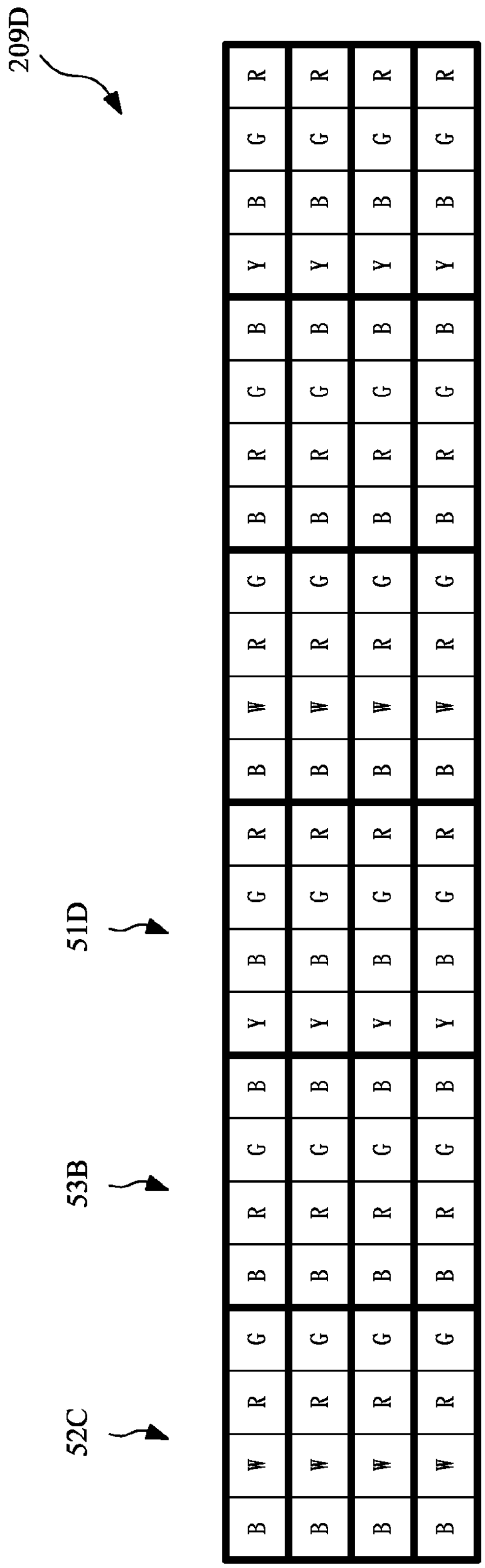
FIG. 9D shows an image device according to an embodiment of the invention.

Referring to FIG. 9D, it shows an image device according to an embodiment of the invention. The image device 209D includes a plurality of RGBY pixels 51D, a plurality of RGBW pixels 52C and a plurality of RBGB pixels 53B. In the RGBW pixel 52C, the sequence of the sub-pixels in the 1×4 matrix from left to right is the blue sub-pixel, the white sub-pixel, the red sub-pixel and the green sub-pixel.

Figure 10A:
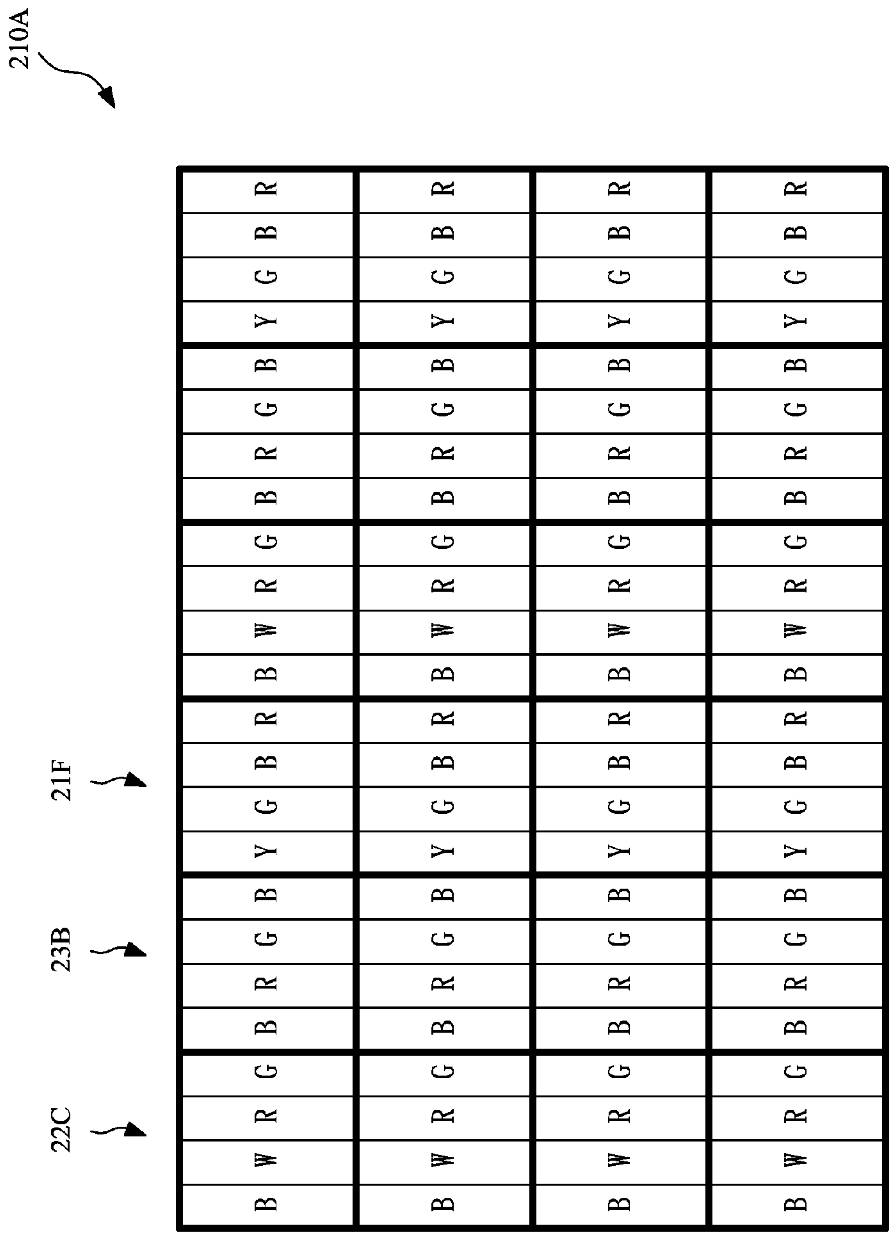
FIG. 10A shows an image device according to an embodiment of the invention.

Referring to FIG. 10A, it shows an image device according to an embodiment of the invention. The image device 210A includes a plurality of RGBY pixels 21F, a plurality of RGBW pixels 22C and a plurality of RBGB pixels 23B. In the RGBY pixel 21F, the sequence of the sub-pixels in the 1×4 matrix from left to right is the yellow sub-pixel, the green sub-pixel, the blue sub-pixel and the red sub-pixel.

Figure 10B:
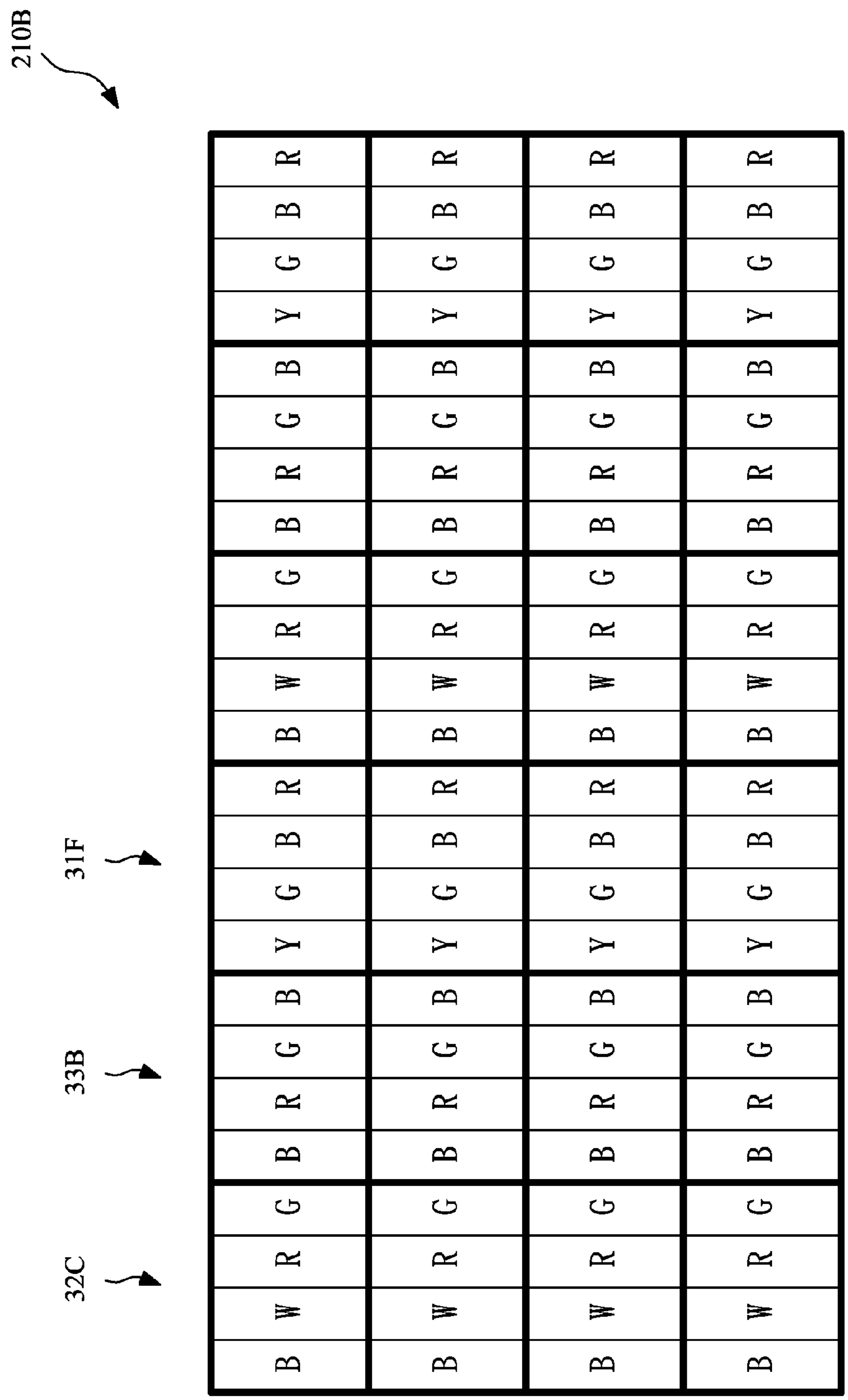
FIG. 10B shows an image device according to an embodiment of the invention.

Referring to FIG. 10B, it shows an image device according to an embodiment of the invention. The image device 210B includes a plurality of RGBY pixels 31F, a plurality of RGBW pixels 32C and a plurality of RBGB pixels 33B. In the RGBY pixel 31F, the sequence of the sub-pixels in the 1×4 matrix from left to right is the yellow sub-pixel, the green sub-pixel, the blue sub-pixel and the red sub-pixel.

Figure 10C:
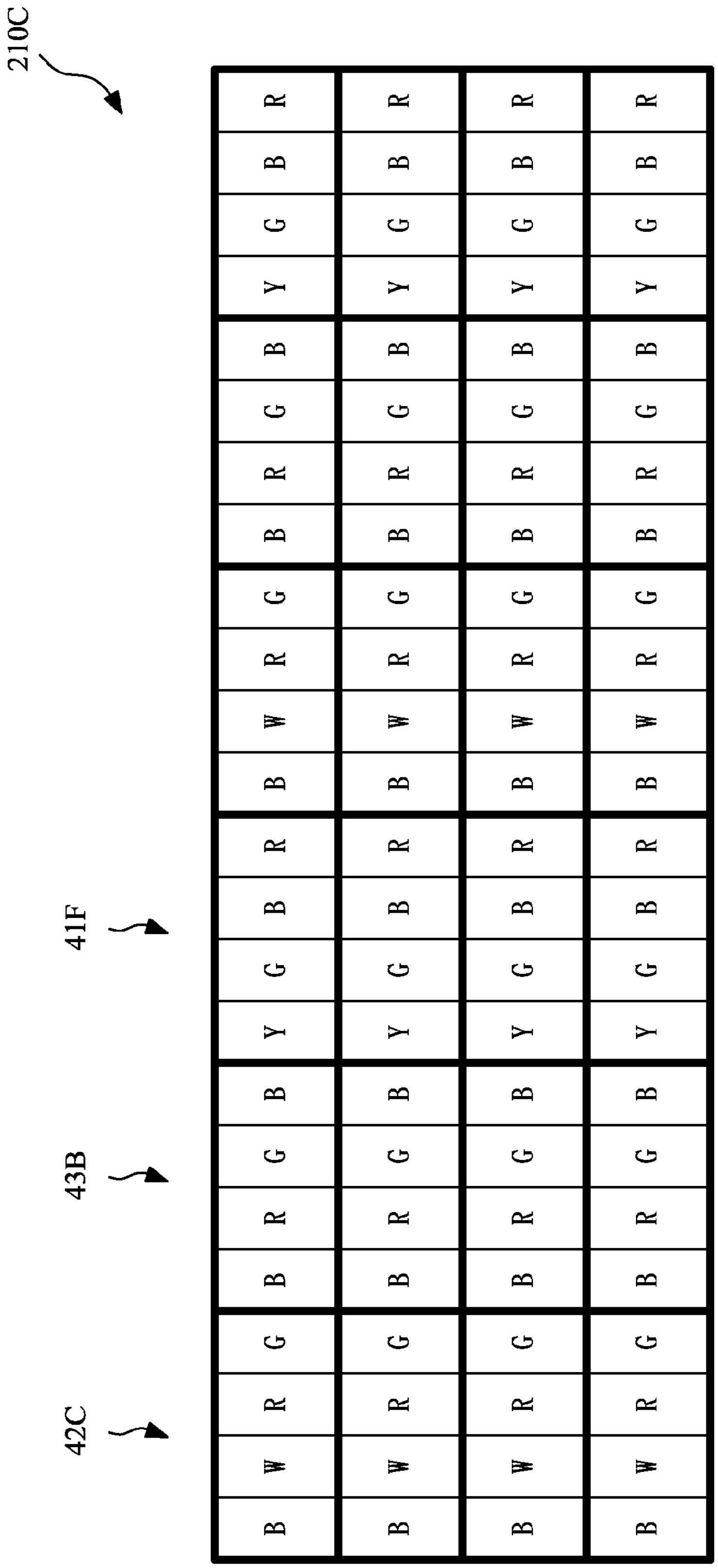
FIG. 10C shows an image device according to an embodiment of the invention.

Referring to FIG. 10C, it shows an image device according to an embodiment of the invention. The image device 210C includes a plurality of RGBY pixels 41F, a plurality of RGBW pixels 42C and a plurality of RBGB pixels 43B. In the RGBY pixel 41F, the sequence of the sub-pixels in the 1×4 matrix from left to right is the yellow sub-pixel, the green sub-pixel, the blue sub-pixel and the red sub-pixel.

Figure 10D:
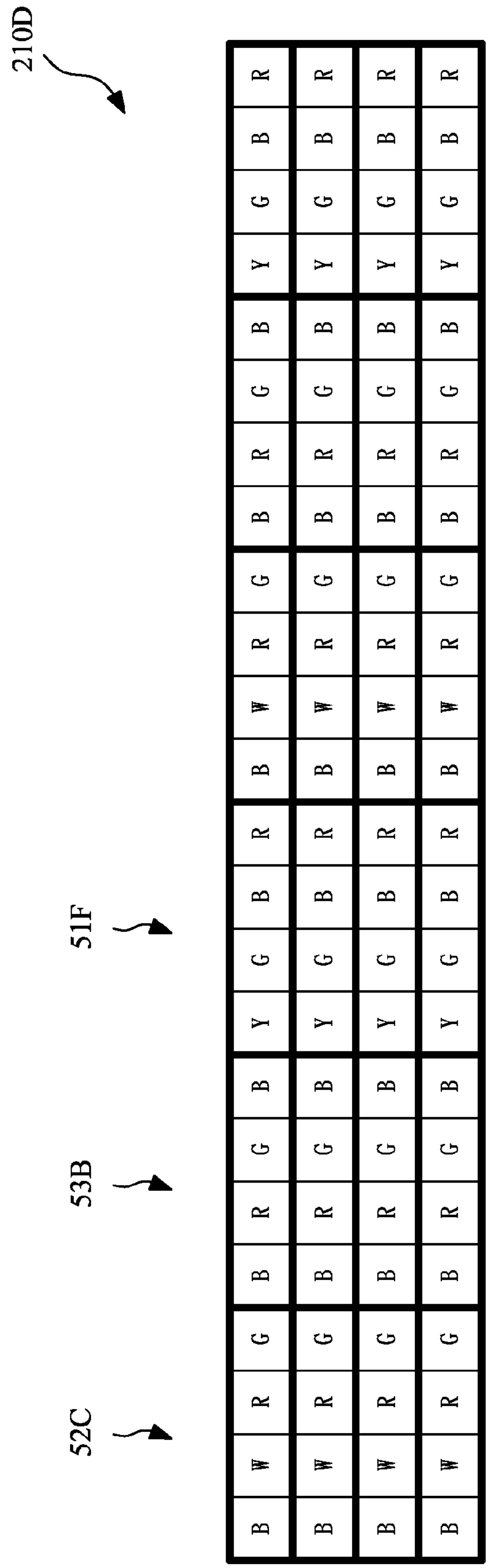
FIG. 10D shows an image device according to an embodiment of the invention.

Referring to FIG. 10D, it shows an image device according to an embodiment of the invention. The image device 210D includes a plurality of RGBY pixels 51F, a plurality of RGBW pixels 52C and a plurality of RBGB pixels 53B. In the RGBY pixel 51F, the sequence of the sub-pixels in the 1×4 matrix from left to right is the yellow sub-pixel, the green sub-pixel, the blue sub-pixel and the red sub-pixel.

Figure 11A:
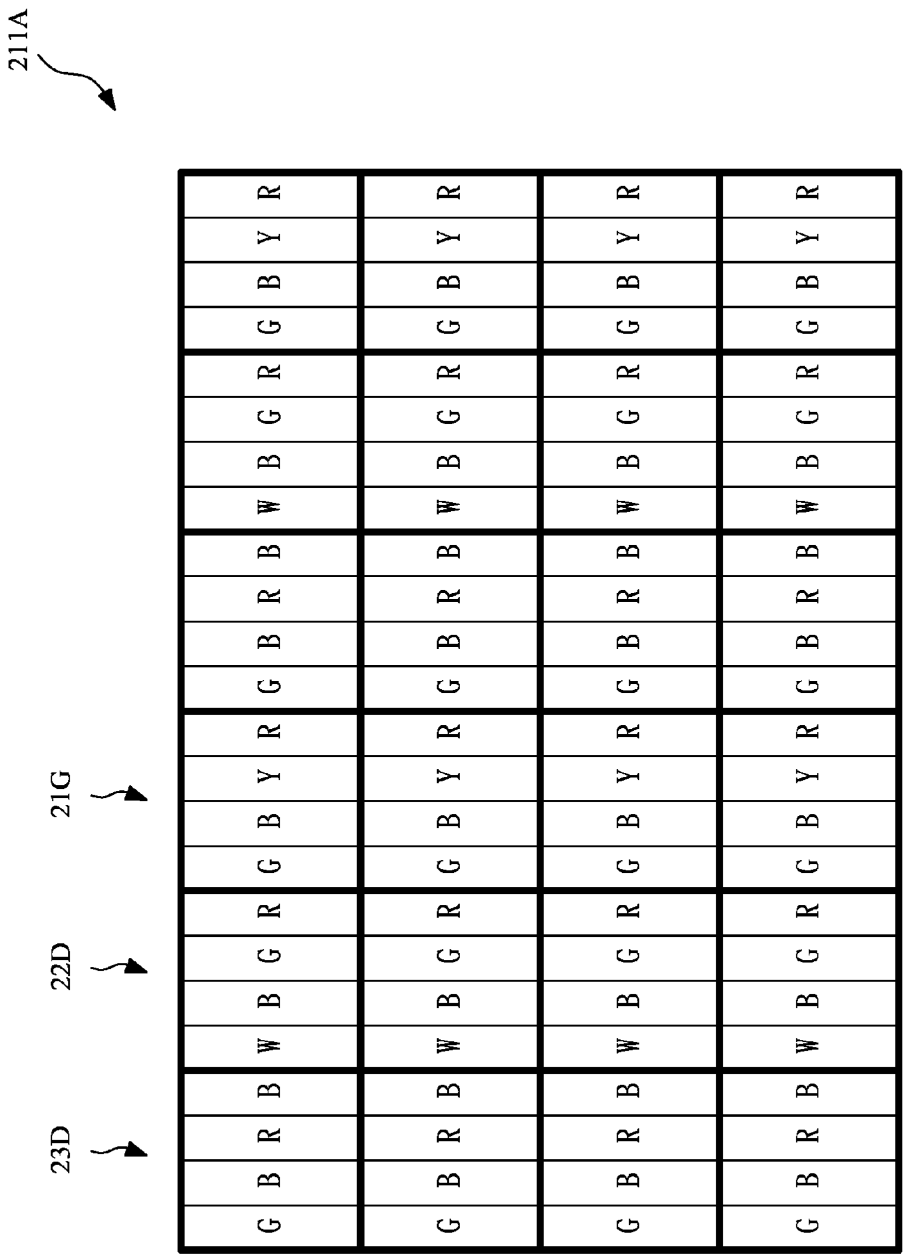
FIG. 11A shows an image device according to an embodiment of the invention.

Referring to FIG. 11A, it shows an image device according to an embodiment of the invention. The image device 211A includes a plurality of RGBY pixels 21G, a plurality of RGBW pixels 22D and a plurality of RBGB pixels 23D. In the RGBY pixel 21G, the sequence of the sub-pixels in the 1×4 matrix from left to right is the green sub-pixel, the blue sub-pixel, the yellow sub-pixel and the red sub-pixel. In the RGBW pixel 22D, the sequence of the sub-pixels in the 1×4 matrix from left to right is the white sub-pixel, the blue sub-pixel, the green sub-pixel and the red sub-pixel. In the RBGB pixel 23D, the sequence of the sub-pixels in the 1×4 matrix from left to right is the green sub-pixel, the blue sub-pixel, the red sub-pixel and the blue sub-pixel.

Figure 11B:
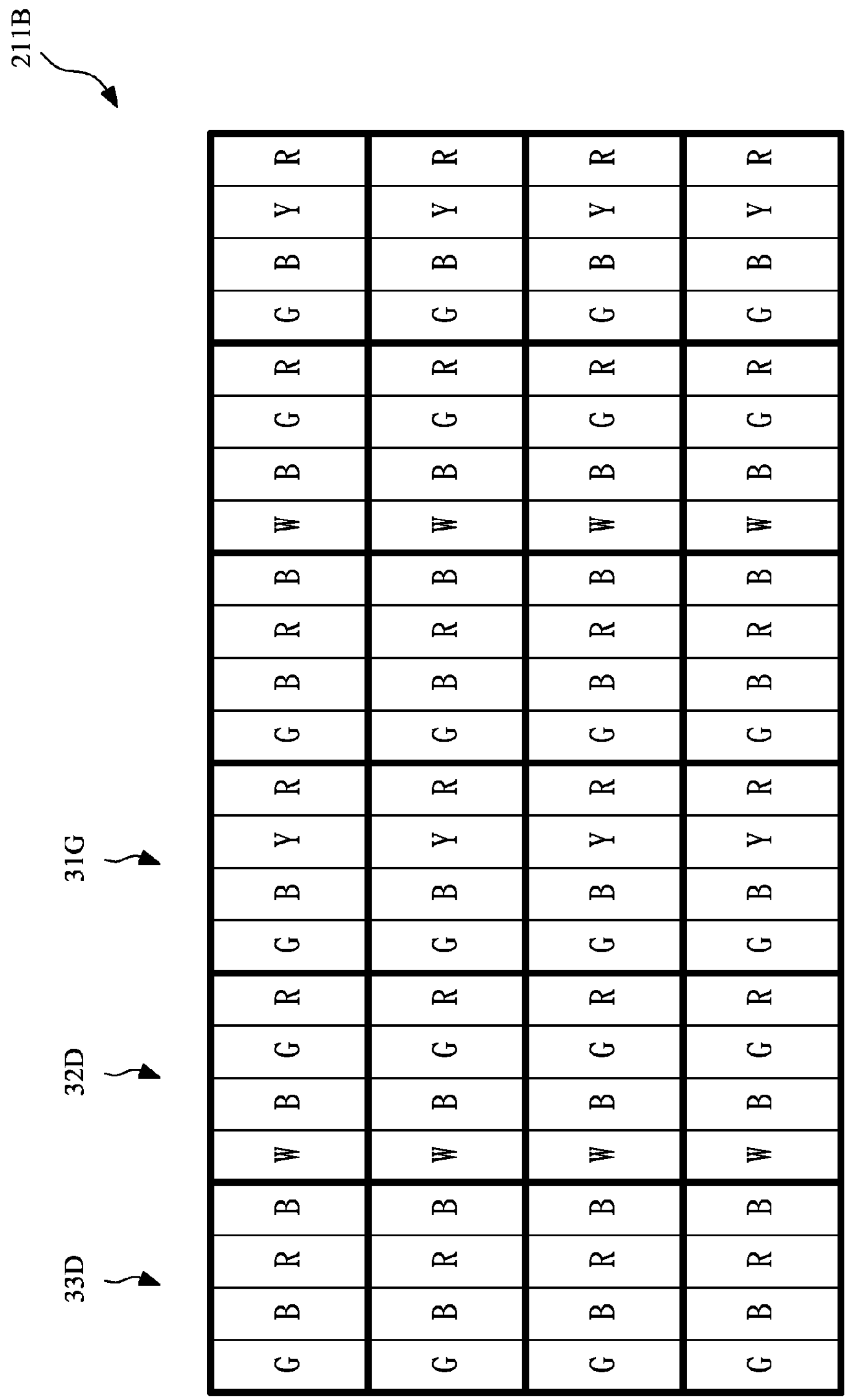
FIG. 11B shows an image device according to an embodiment of the invention.

Referring to FIG. 11B, it shows an image device according to an embodiment of the invention. The image device 211B includes a plurality of RGBY pixels 31G, a plurality of RGBW pixels 32D and a plurality of RBGB pixels 33D. In the RGBY pixel 31G, the sequence of the sub-pixels in the 1×4 matrix from left to right is the green sub-pixel, the blue sub-pixel, the yellow sub-pixel and the red sub-pixel. In the RGBW pixel 32D, the sequence of the sub-pixels in the 1×4 matrix from left to right is the white sub-pixel, the blue sub-pixel, the green sub-pixel and the red sub-pixel. In the RBGB pixel 33D, the sequence of the sub-pixels in the 1×4 matrix from left to right is the green sub-pixel, the blue sub-pixel, the red sub-pixel and the blue sub-pixel.

Figure 11C:
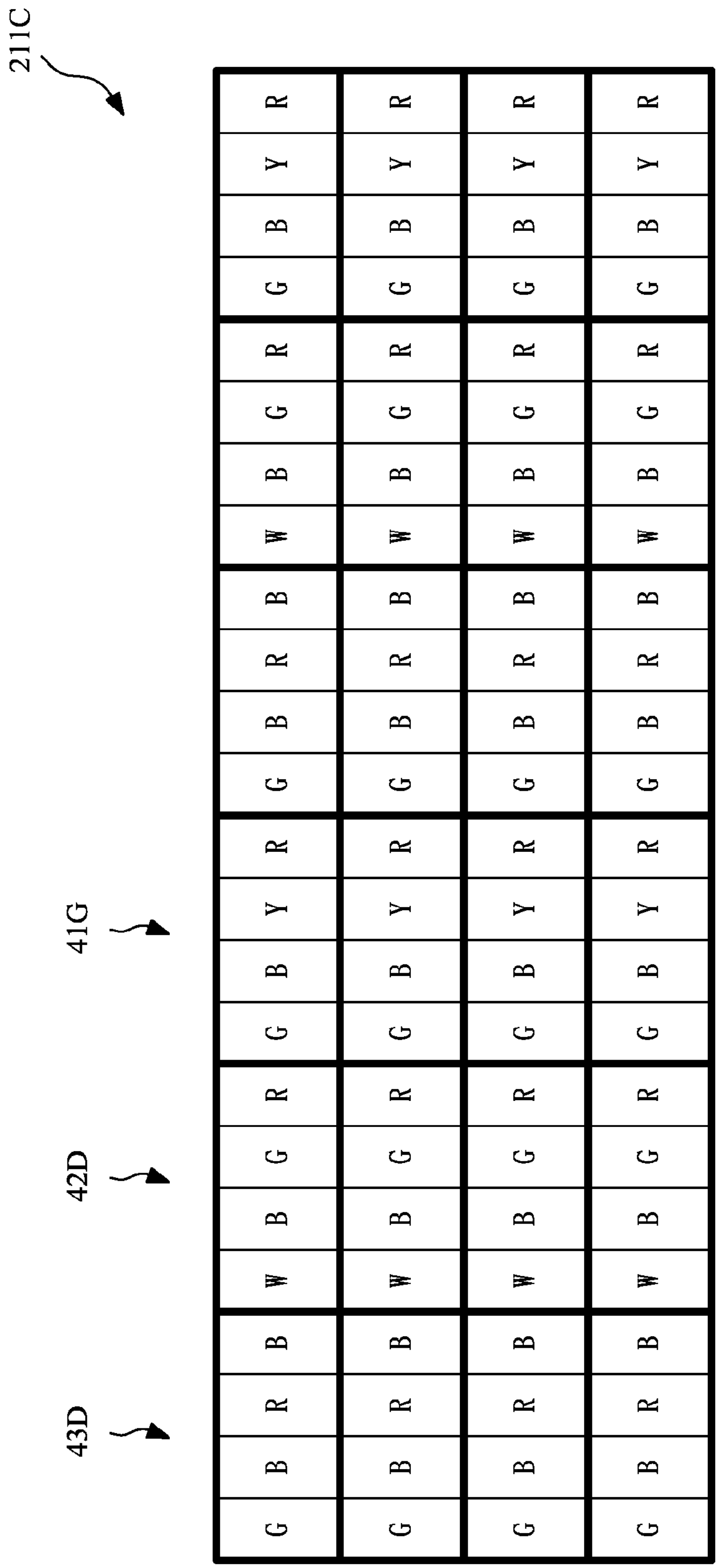
FIG. 11C shows an image device according to an embodiment of the invention.

Referring to FIG. 11C, it shows an image device according to an embodiment of the invention. The image device 211C includes a plurality of RGBY pixels 41G, a plurality of RGBW pixels 42D and a plurality of RBGB pixels 43D. In the RGBY pixel 41G, the sequence of the sub-pixels in the 1×4 matrix from left to right is the green sub-pixel, the blue sub-pixel, the yellow sub-pixel and the red sub-pixel. In the RGBW pixel 42D, the sequence of the sub-pixels in the 1×4 matrix from left to right is the white sub-pixel, the blue sub-pixel, the green sub-pixel and the red sub-pixel. In the RBGB pixel 43D, the sequence of the sub-pixels in the 1×4 matrix from left to right is the green sub-pixel, the blue sub-pixel, the red sub-pixel and the blue sub-pixel.

Figure 11D:
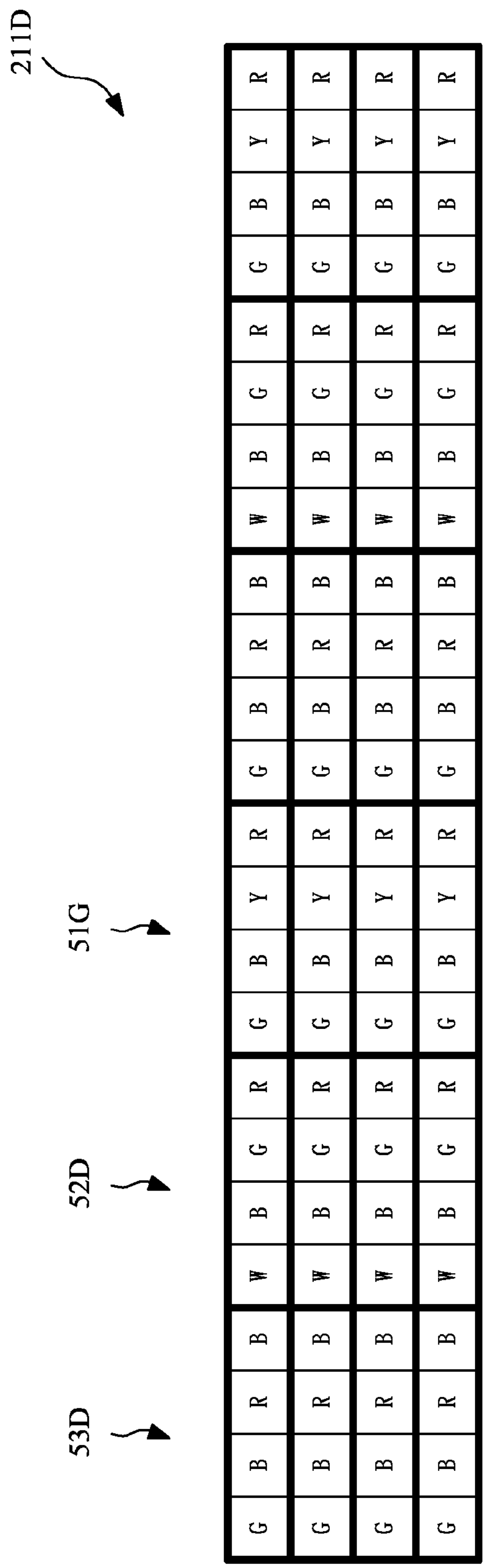
FIG. 11D shows an image device according to an embodiment of the invention.

Referring to FIG. 11D, it shows an image device according to an embodiment of the invention. The image device 211D includes a plurality of RGBY pixels 51G, a plurality of RGBW pixels 52D and a plurality of RBGB pixels 53D. In the RGBY pixel 51G, the sequence of the sub-pixels in the 1×4 matrix from left to right is the green sub-pixel, the blue sub-pixel, the yellow sub-pixel and the red sub-pixel. In the RGBW pixel 52D, the sequence of the sub-pixels in the 1×4 matrix from left to right is the white sub-pixel, the blue sub-pixel, the green sub-pixel and the red sub-pixel. In the RBGB pixel 53D, the sequence of the sub-pixels in the 1×4 matrix from left to right is the green sub-pixel, the blue sub-pixel, the red sub-pixel and the blue sub-pixel.

Figure 12A:
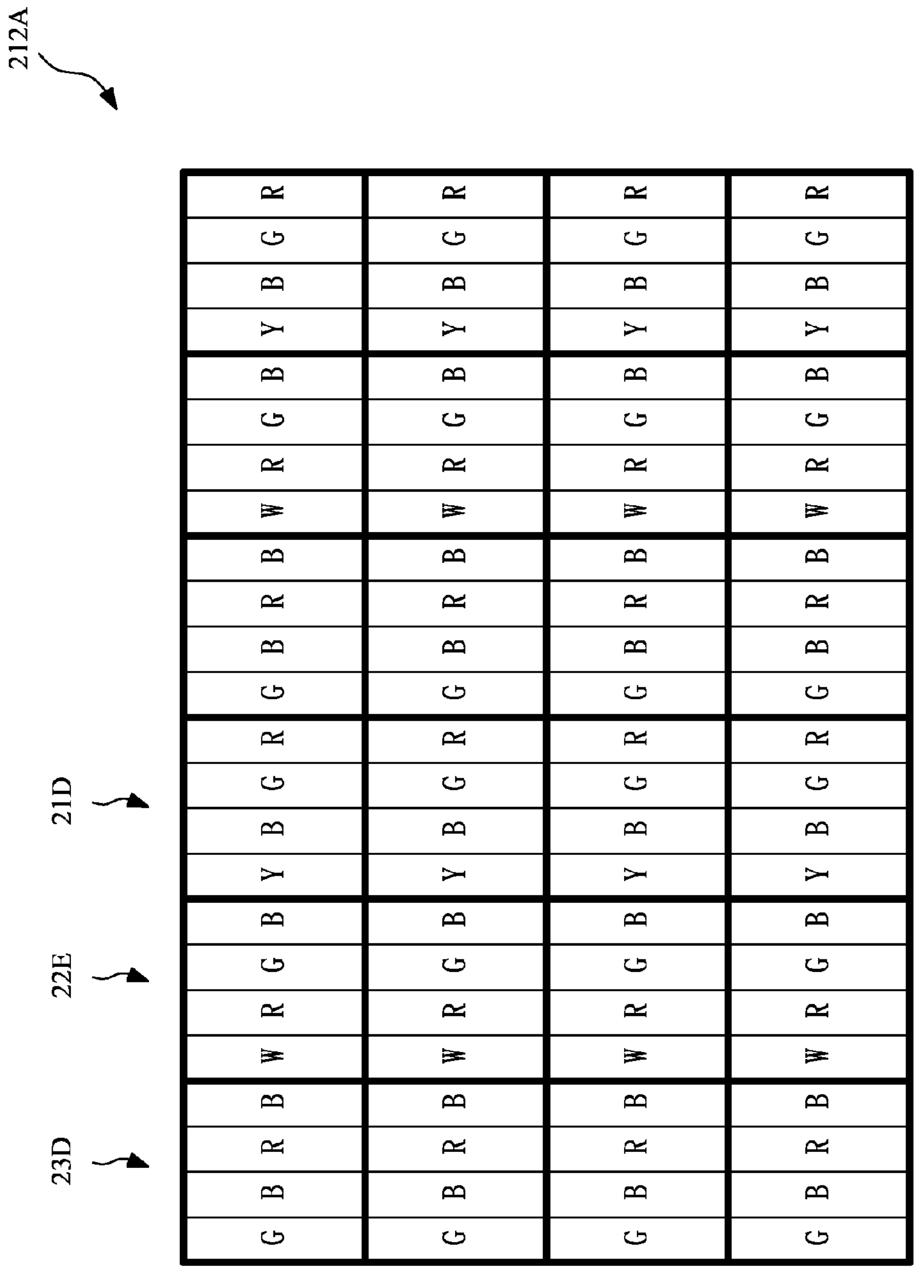
FIG. 12A shows an image device according to an embodiment of the invention.

Referring to FIG. 12A, it shows an image device according to an embodiment of the invention. The image device 212A includes a plurality of RGBY pixels 21D, a plurality of RGBW pixels 22E and a plurality of RBGB pixels 23D. In the RGBW pixel 22E, the sequence of the sub-pixels in the 1×4 matrix from left to right is the white sub-pixel, the red sub-pixel, the green sub-pixel and the blue sub-pixel.

Figure 12B:
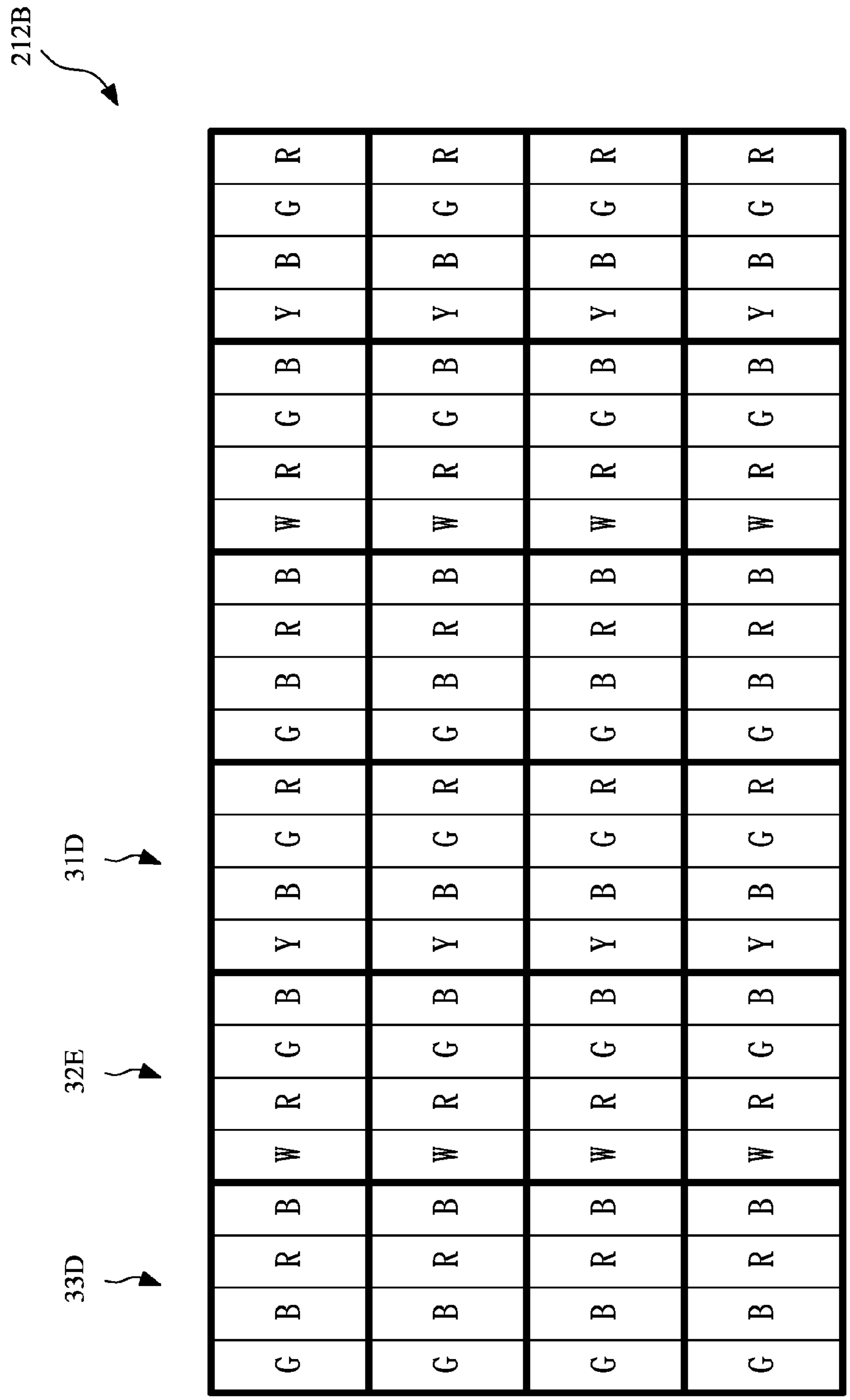
FIG. 12B shows an image device according to an embodiment of the invention.

Referring to FIG. 12B, it shows an image device according to an embodiment of the invention. The image device 212B includes a plurality of RGBY pixels 31D, a plurality of RGBW pixels 32E and a plurality of RBGB pixels 33D. In the RGBW pixel 32E, the sequence of the sub-pixels in the 1×4 matrix from left to right is the white sub-pixel, the red sub-pixel, the green sub-pixel and the blue sub-pixel.

Figure 12C:
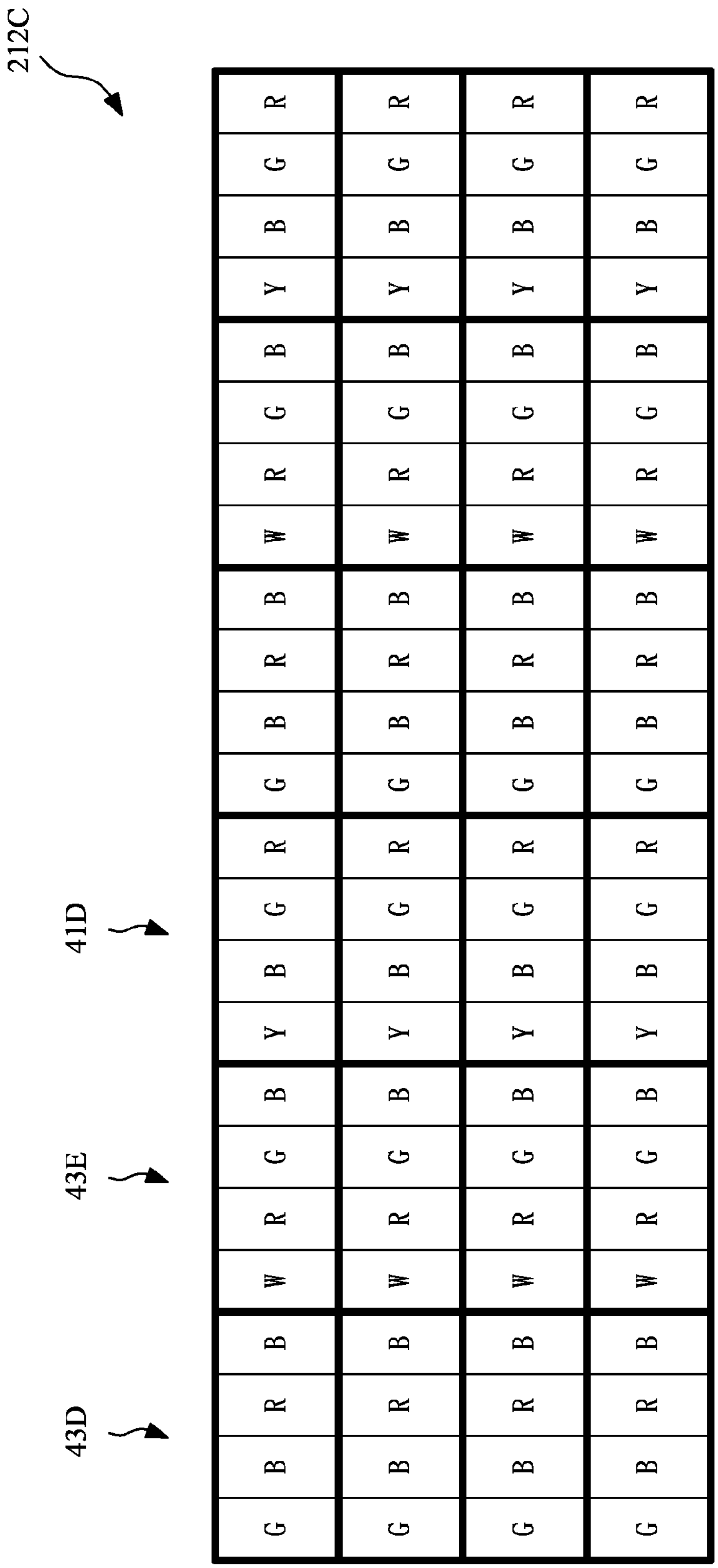
FIG. 12C shows an image device according to an embodiment of the invention.

Referring to FIG. 12C, it shows an image device according to an embodiment of the invention. The image device 212C includes a plurality of RGBY pixels 41D, a plurality of RGBW pixels 42E and a plurality of RBGB pixels 43D. In the RGBW pixel 42E, the sequence of the sub-pixels in the 1×4 matrix from left to right is the white sub-pixel, the red sub-pixel, the green sub-pixel and the blue sub-pixel.

Figure 12D:
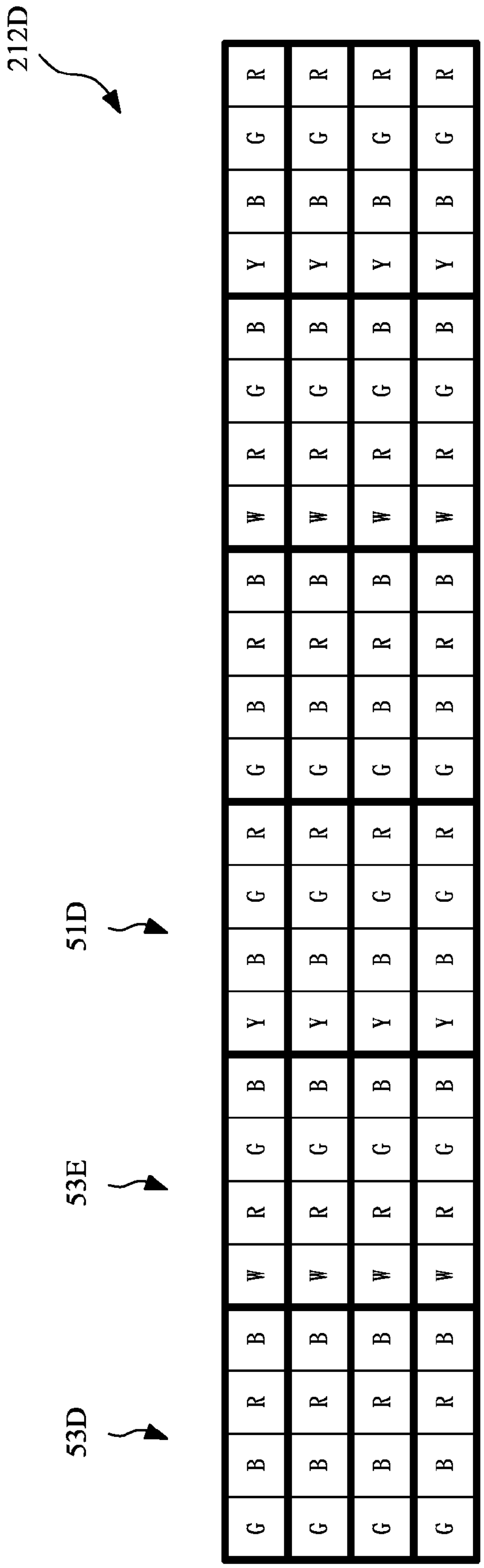
FIG. 12D shows an image device according to an embodiment of the invention.

Referring to FIG. 12D, it shows an image device according to an embodiment of the invention. The image device 212D includes a plurality of RGBY pixels 51D, a plurality of RGBW pixels 52E and a plurality of RBGB pixels 53D. In the RGBW pixel 52E, the sequence of the sub-pixels in the 1×4 matrix from left to right is the white sub-pixel, the red sub-pixel, the green sub-pixel and the blue sub-pixel.

Figure 13A:
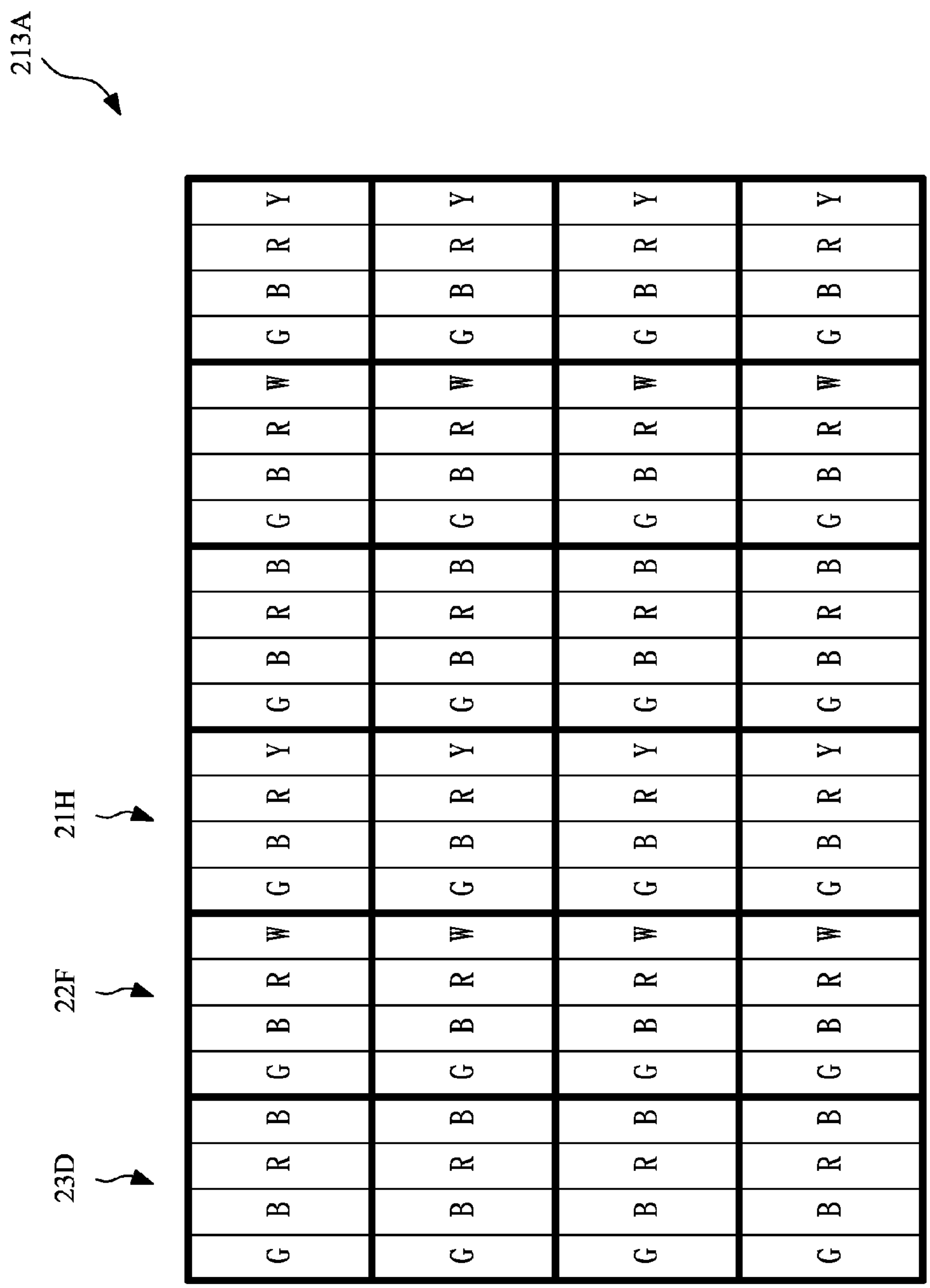
FIG. 13A shows an image device according to an embodiment of the invention.

Referring to FIG. 13A, it shows an image device according to an embodiment of the invention. The image device 213A includes a plurality of RGBY pixels 21H, a plurality of RGBW pixels 22F and a plurality of RBGB pixels 23D. In the RGBY pixel 21H, the sequence of the sub-pixels in the 1×4 matrix from left to right is the green sub-pixel, the blue sub-pixel, the red sub-pixel and the yellow sub-pixel. In the RGBW pixel 22F, the sequence of the sub-pixels in the 1×4 matrix from left to right is the green sub-pixel, the blue sub-pixel, the red sub-pixel and the white sub-pixel.

Figure 13B:
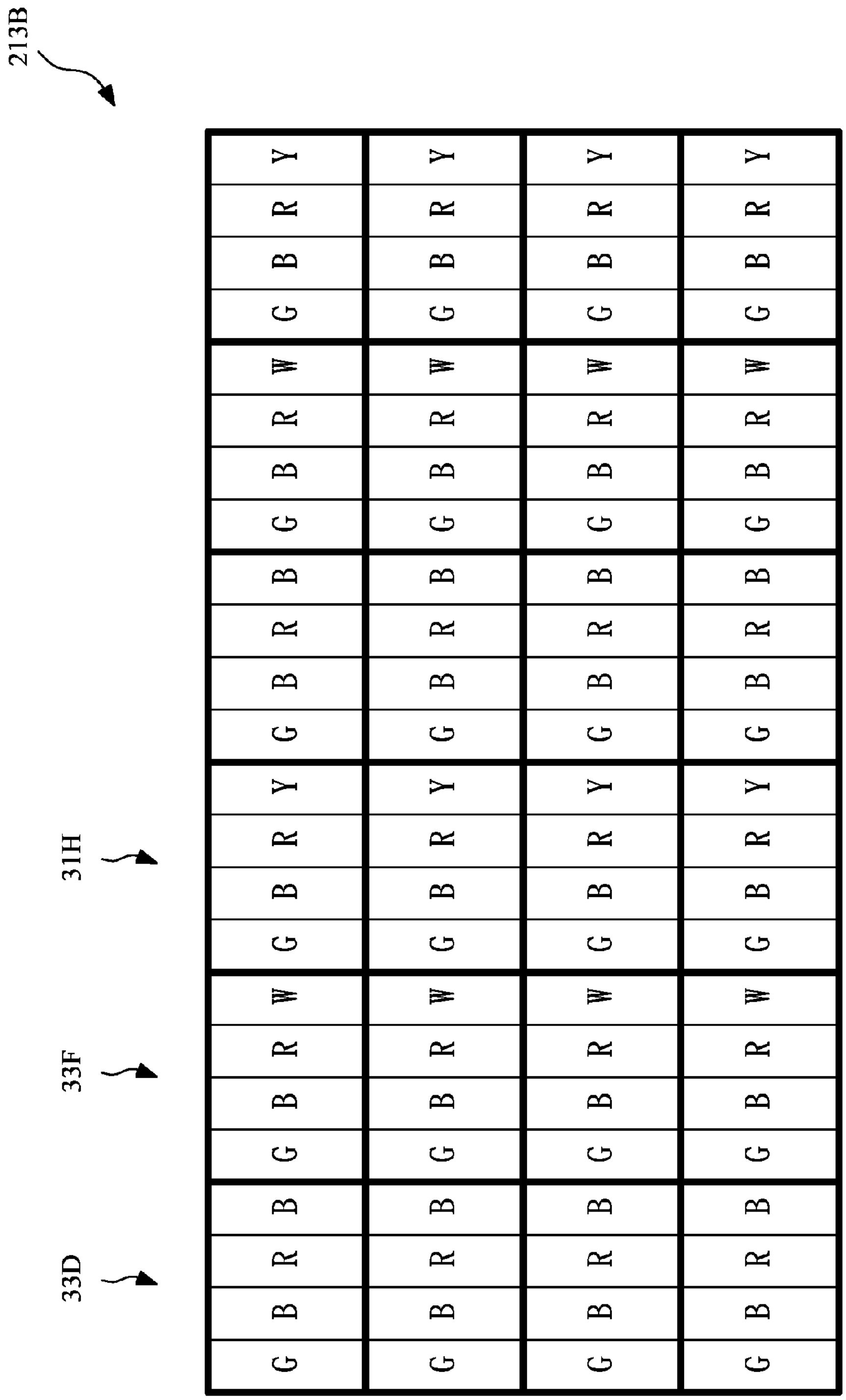
FIG. 13B shows an image device according to an embodiment of the invention.

Referring to FIG. 13B, it shows an image device according to an embodiment of the invention. The image device 213B includes a plurality of RGBY pixels 31H, a plurality of RGBW pixels 32F and a plurality of RBGB pixels 33D. In the RGBY pixel 31H, the sequence of the sub-pixels in the 1×4 matrix from left to right is the green sub-pixel, the blue sub-pixel, the red sub-pixel and the yellow sub-pixel. In the RGBW pixel 32F, the sequence of the sub-pixels in the 1×4 matrix from left to right is the green sub-pixel, the blue sub-pixel, the red sub-pixel and the white sub-pixel.

Figure 13C:
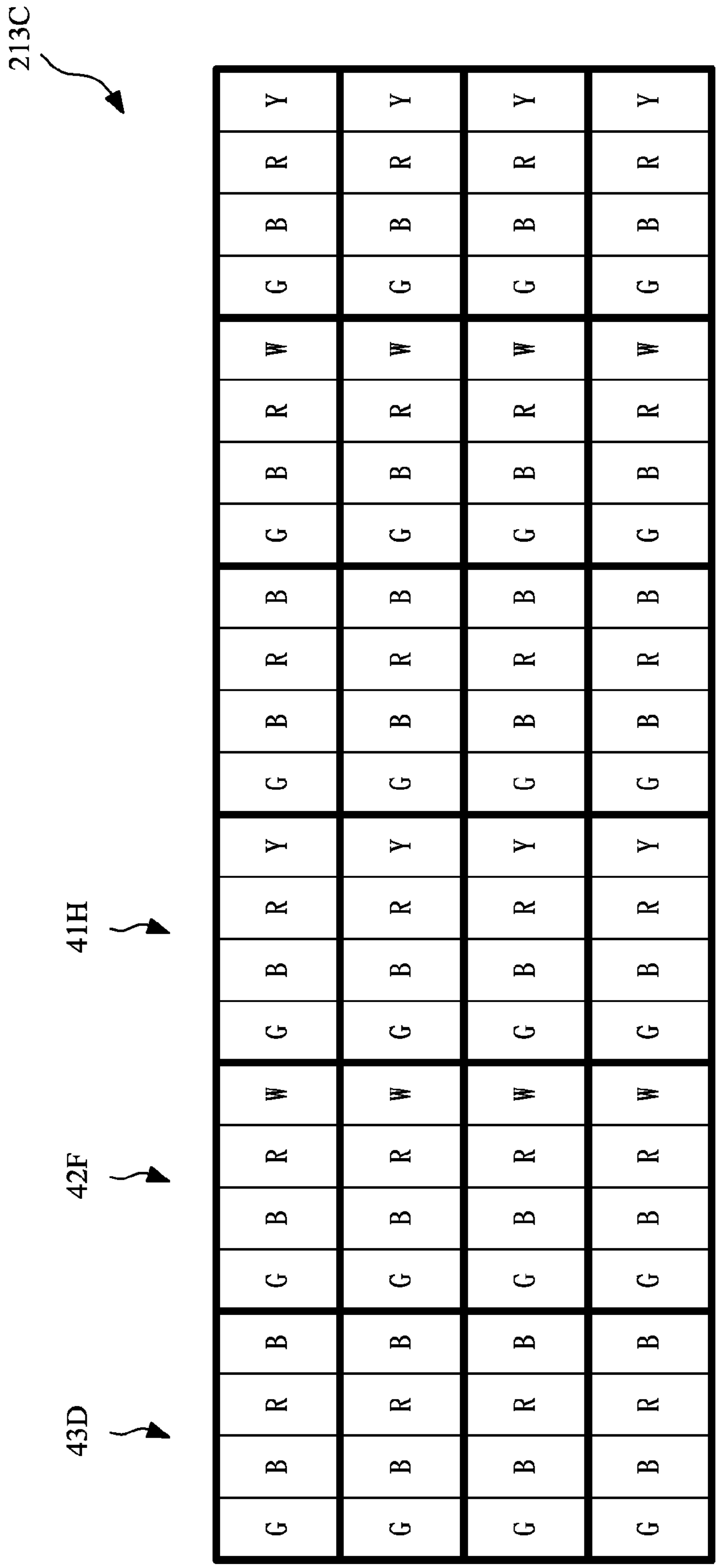
FIG. 13C shows an image device according to an embodiment of the invention.

Referring to FIG. 13C, it shows an image device according to an embodiment of the invention. The image device 213C includes a plurality of RGBY pixels 41H, a plurality of RGBW pixels 42F and a plurality of RBGB pixels 43D. In the RGBY pixel 41H, the sequence of the sub-pixels in the 1×4 matrix from left to right is the green sub-pixel, the blue sub-pixel, the red sub-pixel and the yellow sub-pixel. In the RGBW pixel 42F, the sequence of the sub-pixels in the 1×4 matrix from left to right is the green sub-pixel, the blue sub-pixel, the red sub-pixel and the white sub-pixel.

Figure 13D:
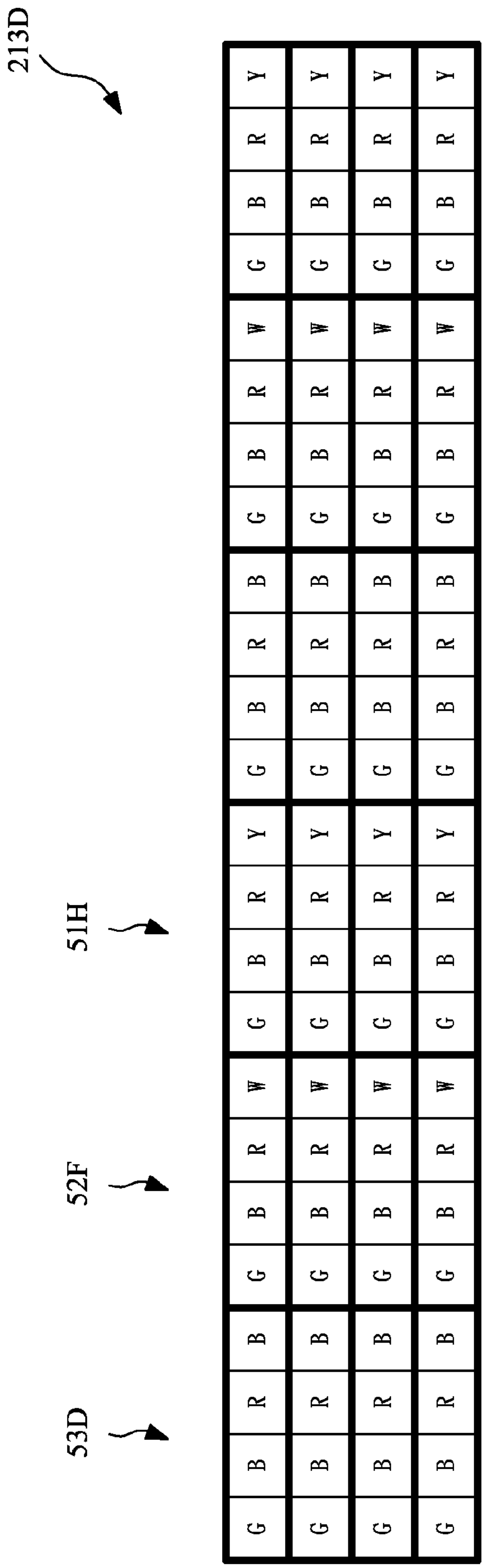
FIG. 13D shows an image device according to an embodiment of the invention.

Referring to FIG. 13D, it shows an image device according to an embodiment of the invention. The image device 213D includes a plurality of RGBY pixels 51H, a plurality of RGBW pixels 52F and a plurality of RBGB pixels 53D. In the RGBY pixel 51H, the sequence of the sub-pixels in the 1×4 matrix from left to right is the green sub-pixel, the blue sub-pixel, the red sub-pixel and the yellow sub-pixel. In the RGBW pixel 52F, the sequence of the sub-pixels in the 1×4 matrix from left to right is the green sub-pixel, the blue sub-pixel, the red sub-pixel and the white sub-pixel.

Figure 14A:
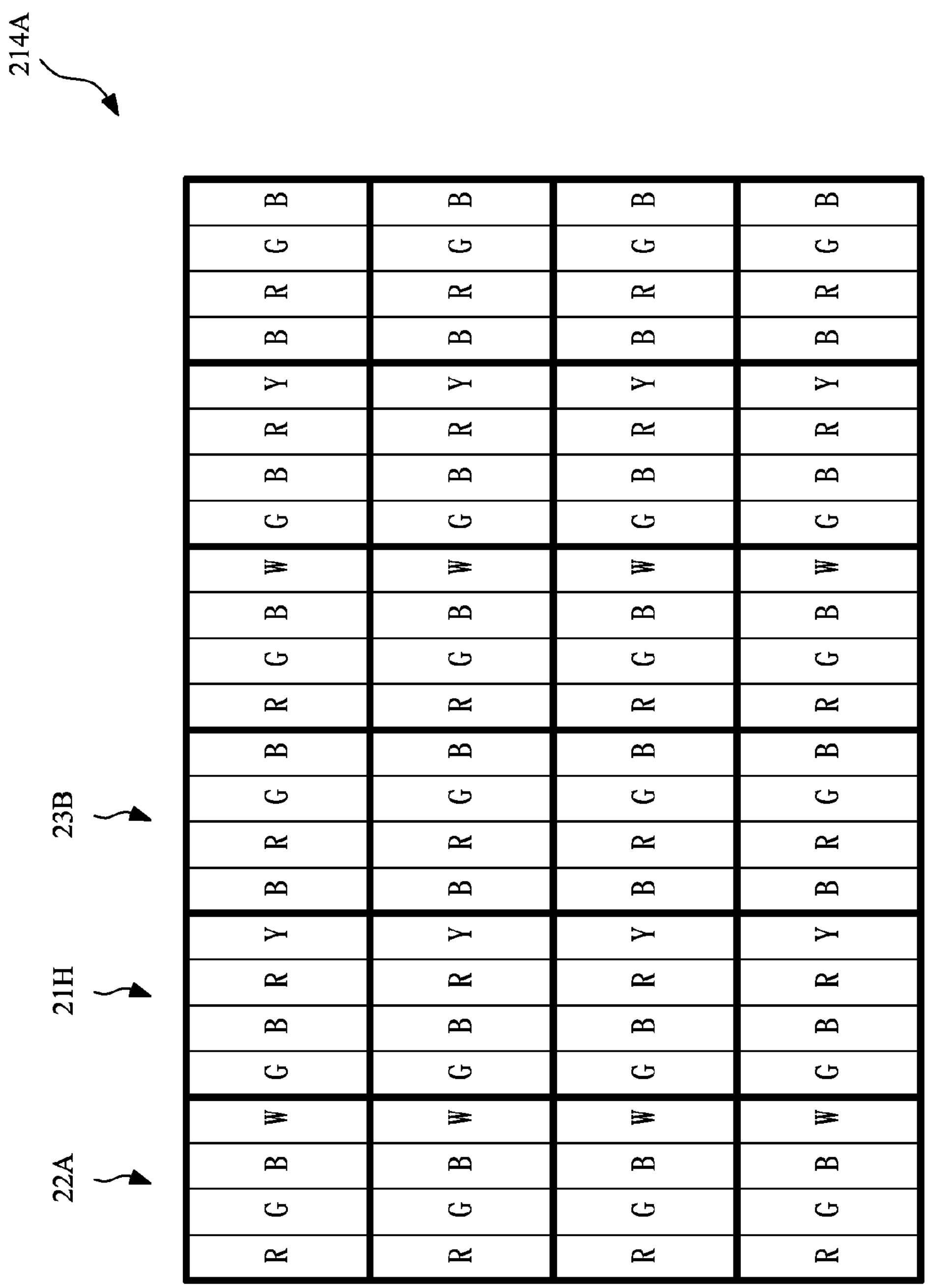
FIG. 14A shows an image device according to an embodiment of the invention.

Referring to FIG. 14A, it shows an image device according to an embodiment of the invention. The image device 214A includes a plurality of RGBY pixels 21H, a plurality of RGBW pixels 22A and a plurality of RBGB pixels 23B. In the image device 214A, the sequence of the pixels from left to right is the RGBW pixel 22A, the RGBY pixel 21H and the RBGB pixel 23B.

In an embodiment, in the image device 214A, the ratio of the number of red sub-pixels to the number of green sub-pixels to the number of blue sub-pixels to the number of white sub-pixels and to the number of yellow sub-pixels is about 3:3:4:1:1.

In an embodiment, in the image device 201, any group of three adjacent sub-pixels of at least two different colors can produce a white color, and any group of four adjacent sub-pixels of at least two different colors can produce a white color.

Figure 14B:
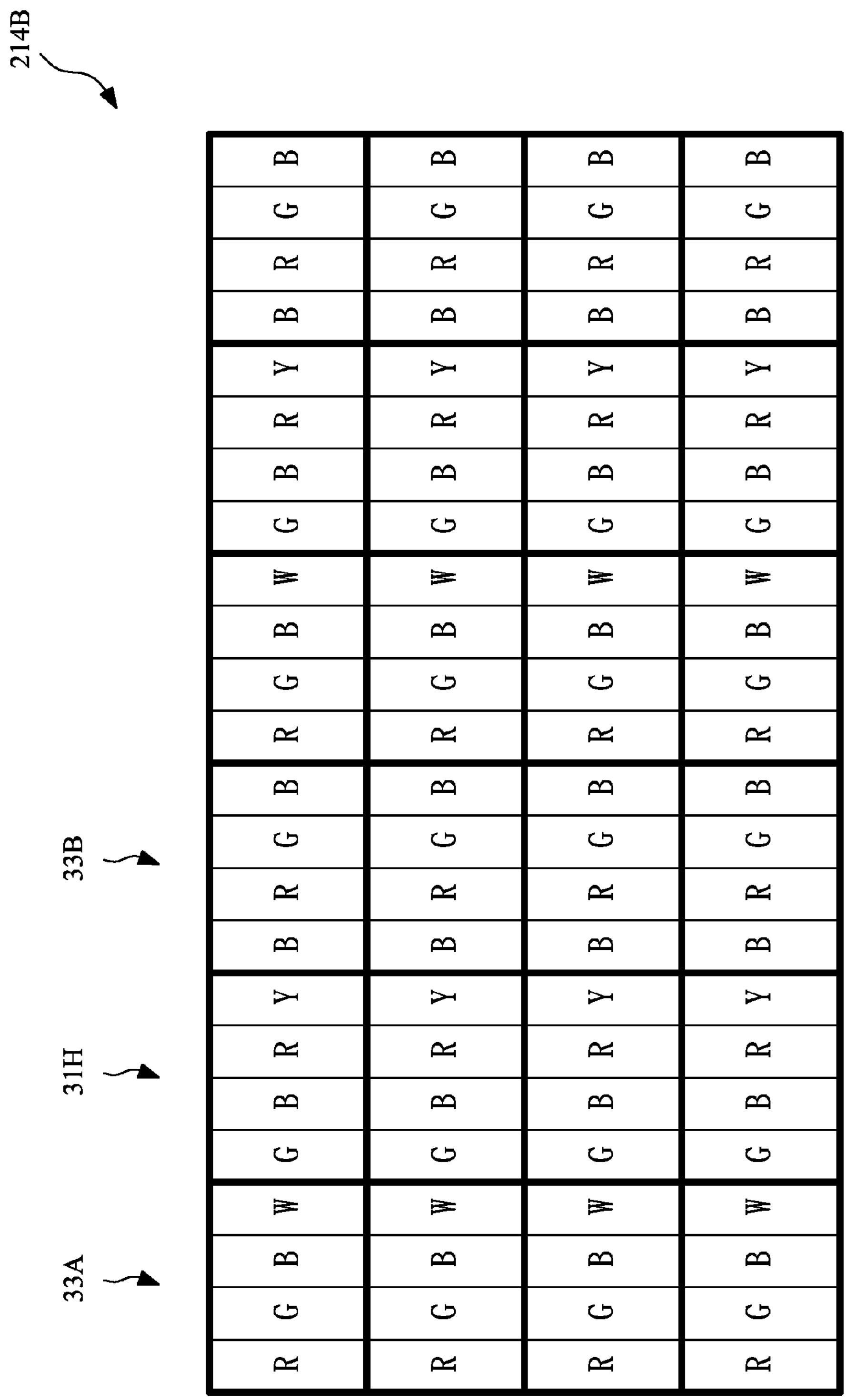
FIG. 14B shows an image device according to an embodiment of the invention.

Referring to FIG. 14B, it shows an image device according to an embodiment of the invention. The image device 214B includes a plurality of RGBY pixels 31H, a plurality of RGBW pixels 32A and a plurality of RBGB pixels 33B. In the image device 214B, the sequence of the pixels from left to right is the RGBW pixel 32A, the RGBY pixel 31H and the RBGB pixel 33B.

Figure 14C:
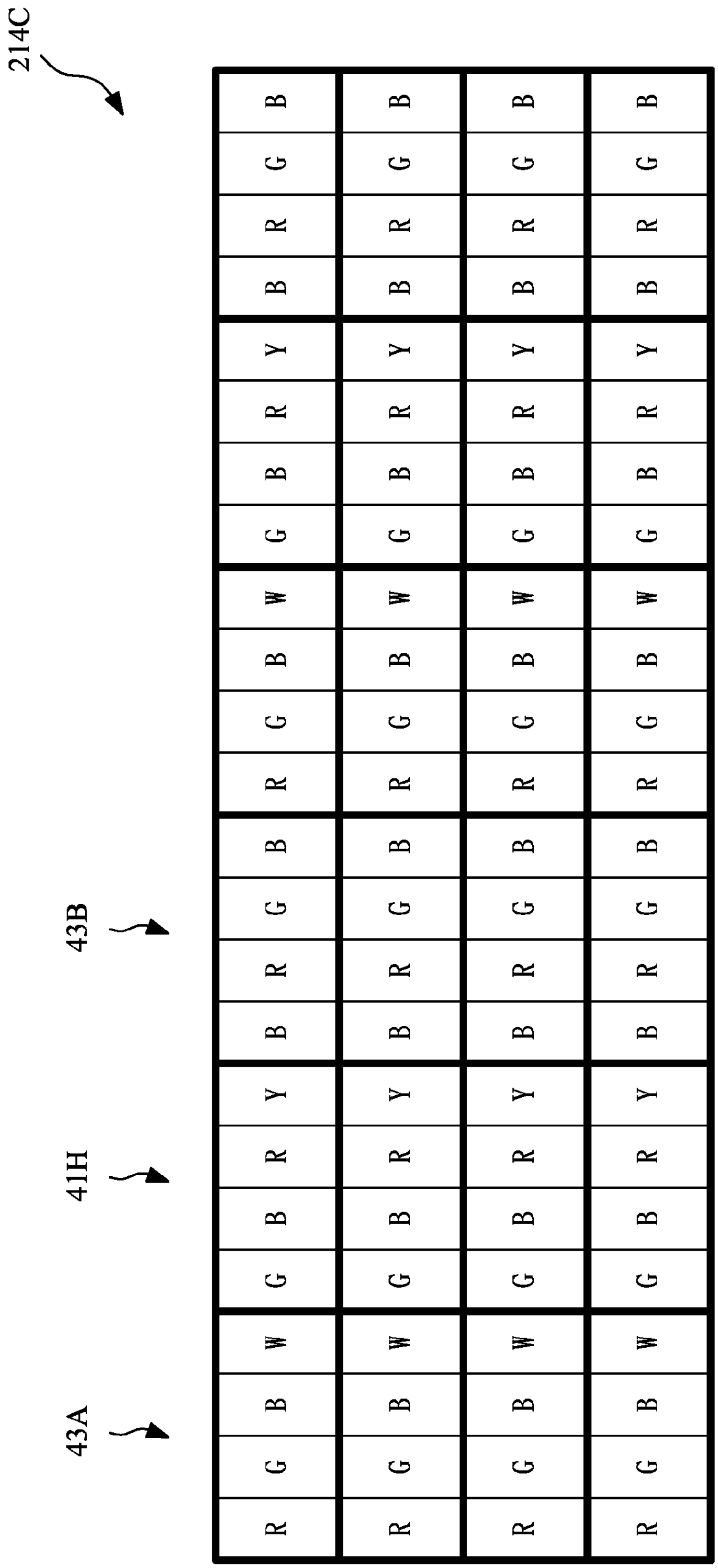
FIG. 14C shows an image device according to an embodiment of the invention.

Referring to FIG. 14C, it shows an image device according to an embodiment of the invention. The image device 214C includes a plurality of RGBY pixels 41H, a plurality of RGBW pixels 42A and a plurality of RBGB pixels 43B. In the image device 214C, the sequence of the pixels from left to right is the RGBW pixel 42A, the RGBY pixel 41H and the RBGB pixel 43B.

Figure 14D:
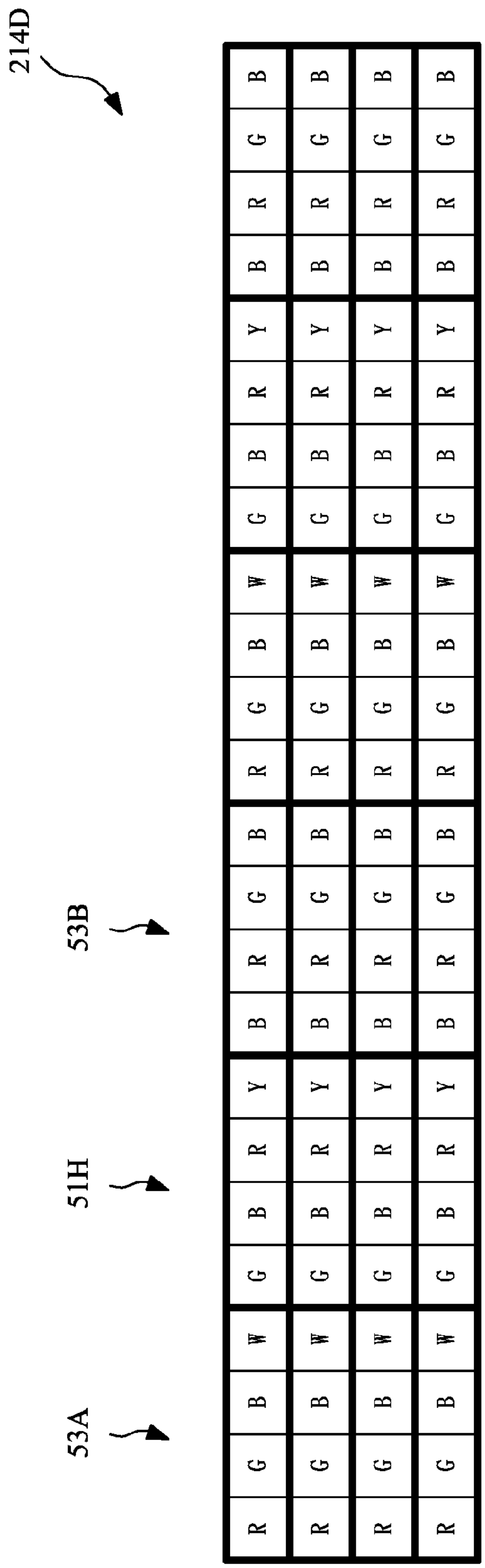
FIG. 14D shows an image device according to an embodiment of the invention.

Referring to FIG. 14D, it shows an image device according to an embodiment of the invention. The image device 214D includes a plurality of RGBY pixels 51H, a plurality of RGBW pixels 52A and a plurality of RBGB pixels 53B.

In the image device 214D, the sequence of the pixels from left to right is the RGBW pixel 52A, the RGBY pixel 51H and the RBGB pixel 53B.

Figure 15A:
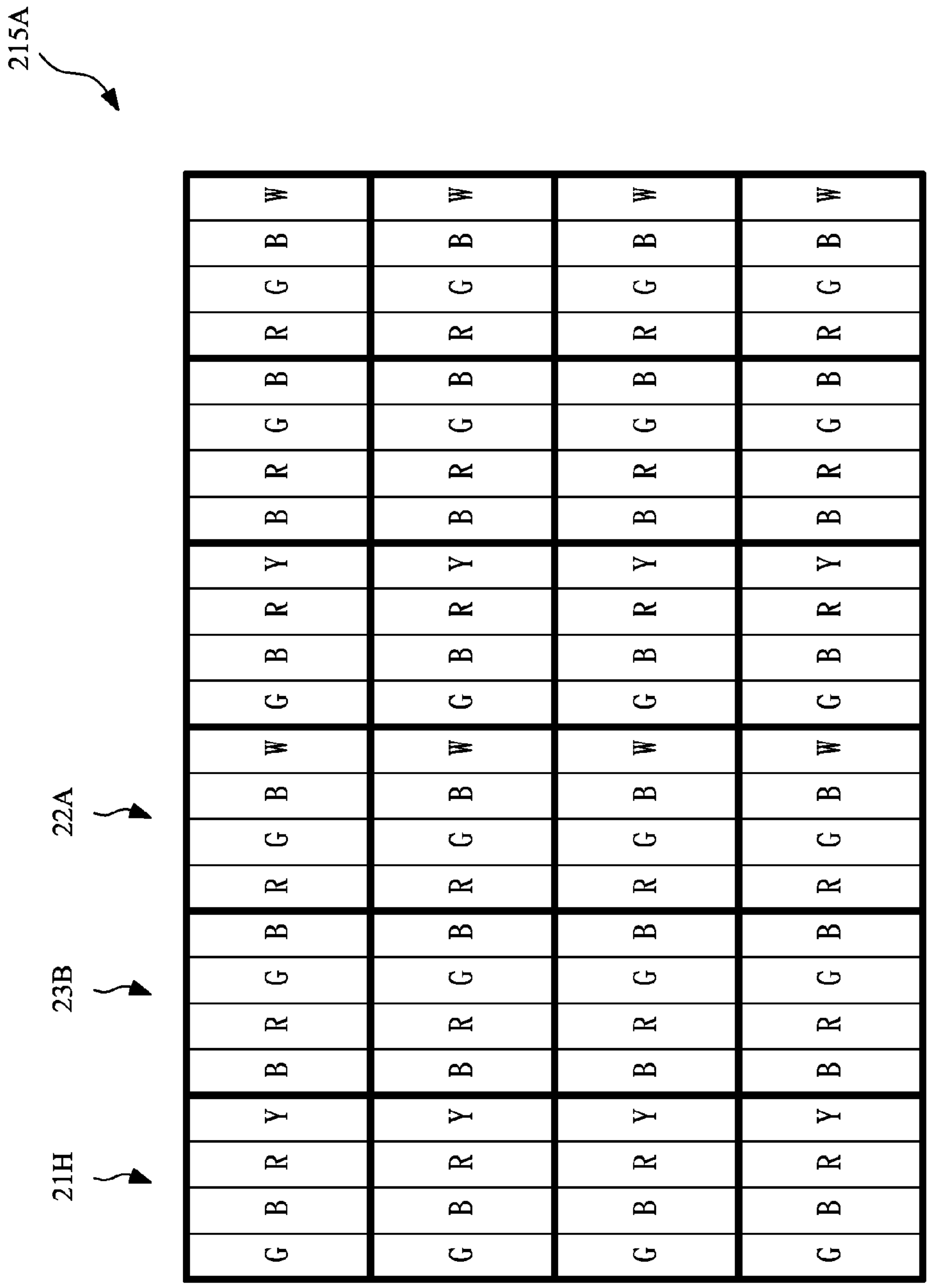
FIG. 15A shows an image device according to an embodiment of the invention.

Referring to FIG. 15A, it shows an image device according to an embodiment of the invention. The image device 215A includes a plurality of RGBY pixels 21H, a plurality of RGBW pixels 22A and a plurality of RBGB pixels 23B. In the image device 215A, the sequence of the pixels from left to right is the RGBY pixel 21H, the RBGB pixel 23B and the RGBW pixel 22A.

Figure 15B:
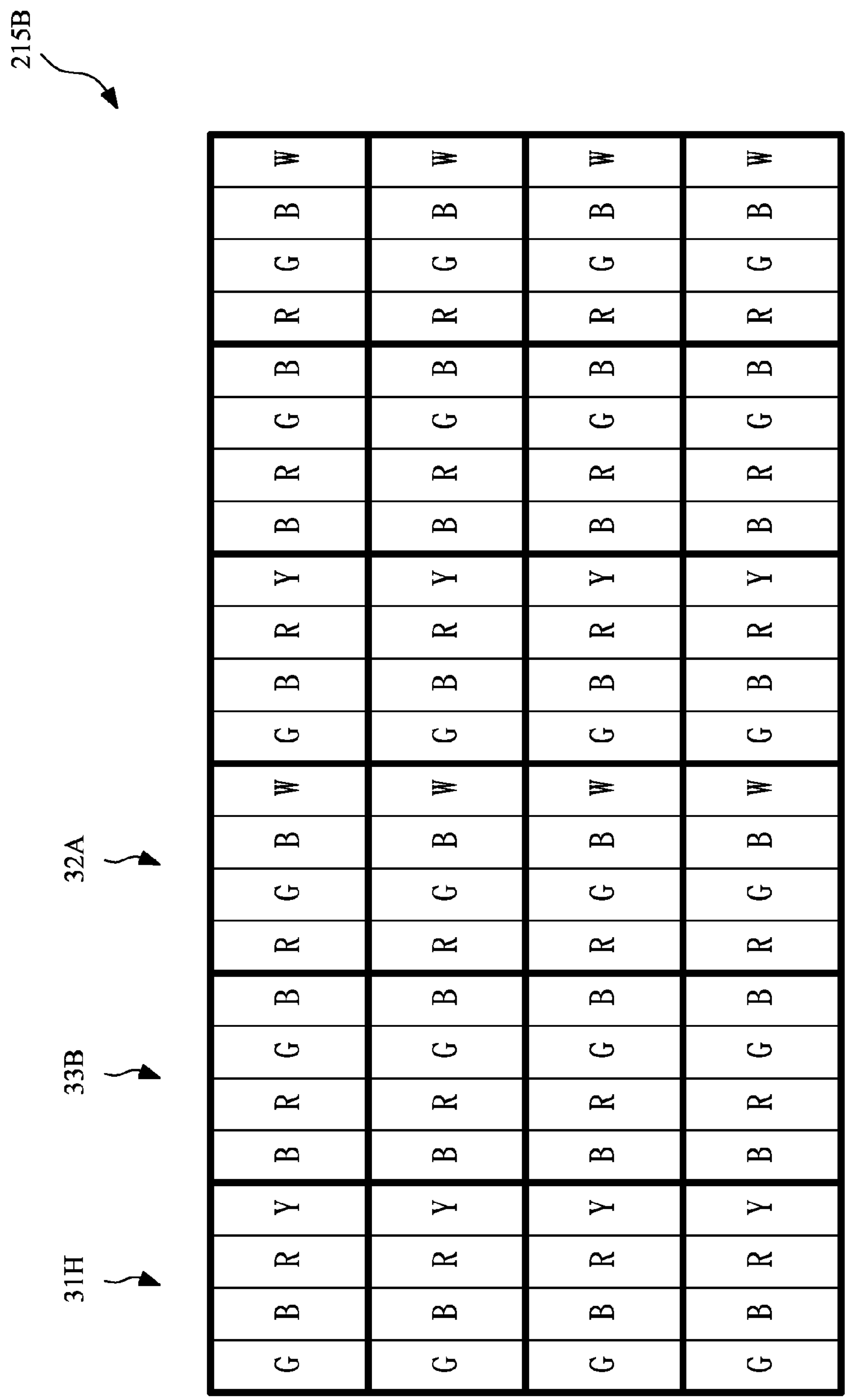
FIG. 15B shows an image device according to an embodiment of the invention.

Referring to FIG. 15B, it shows an image device according to an embodiment of the invention. The image device 215B includes a plurality of RGBY pixels 31H, a plurality of RGBW pixels 32A and a plurality of RBGB pixels 33B. In the image device 215B, the sequence of the pixels from left to right is the RGBY pixel 31H, the RBGB pixel 33B and the RGBW pixel 32A.

Figure 15C:
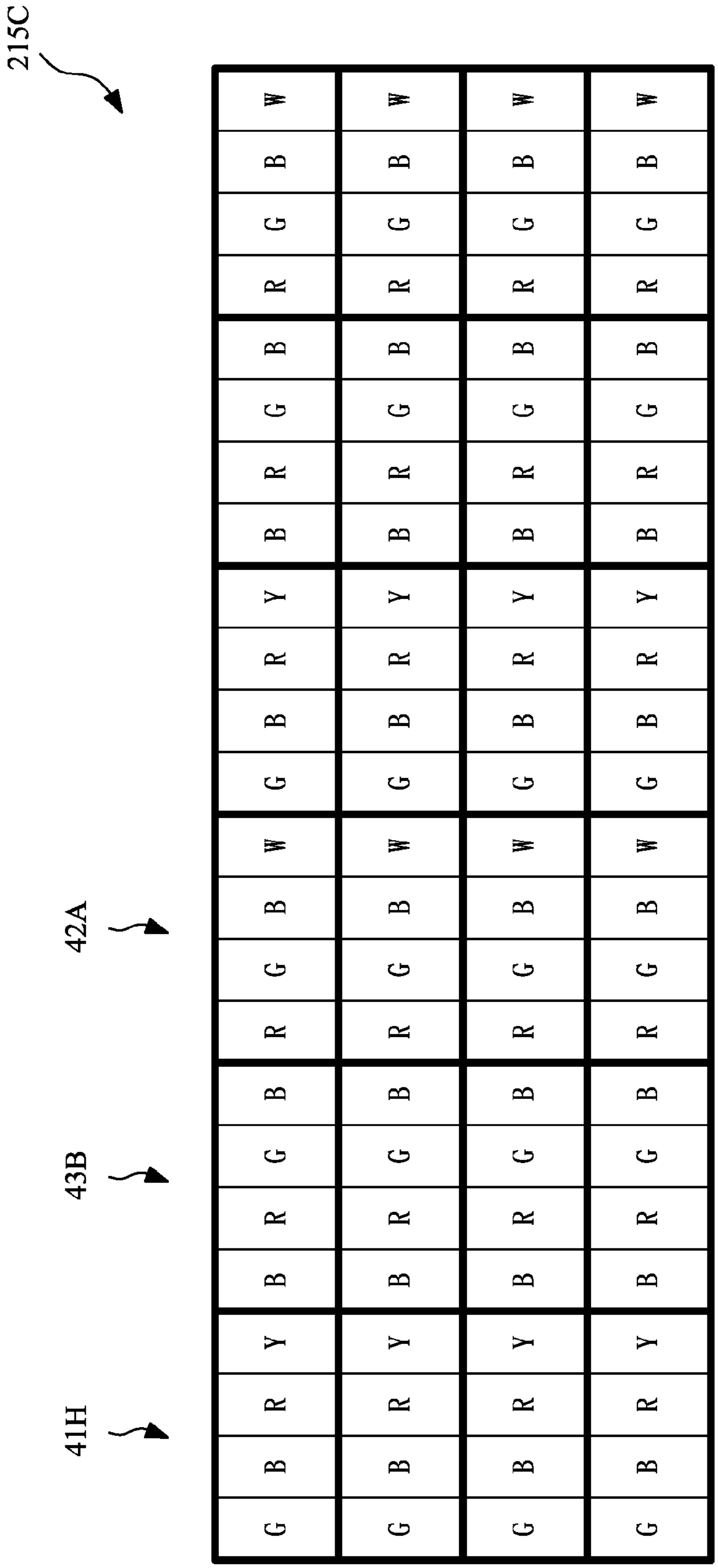
FIG. 15C shows an image device according to an embodiment of the invention.

Referring to FIG. 15C, it shows an image device according to an embodiment of the invention. The image device 215C includes a plurality of RGBY pixels 41H, a plurality of RGBW pixels 42A and a plurality of RBGB pixels 43B. In the image device 215C, the sequence of the pixels from left to right is the RGBY pixel 41H, the RBGB pixel 43B and the RGBW pixel 42A.

Figure 15D:
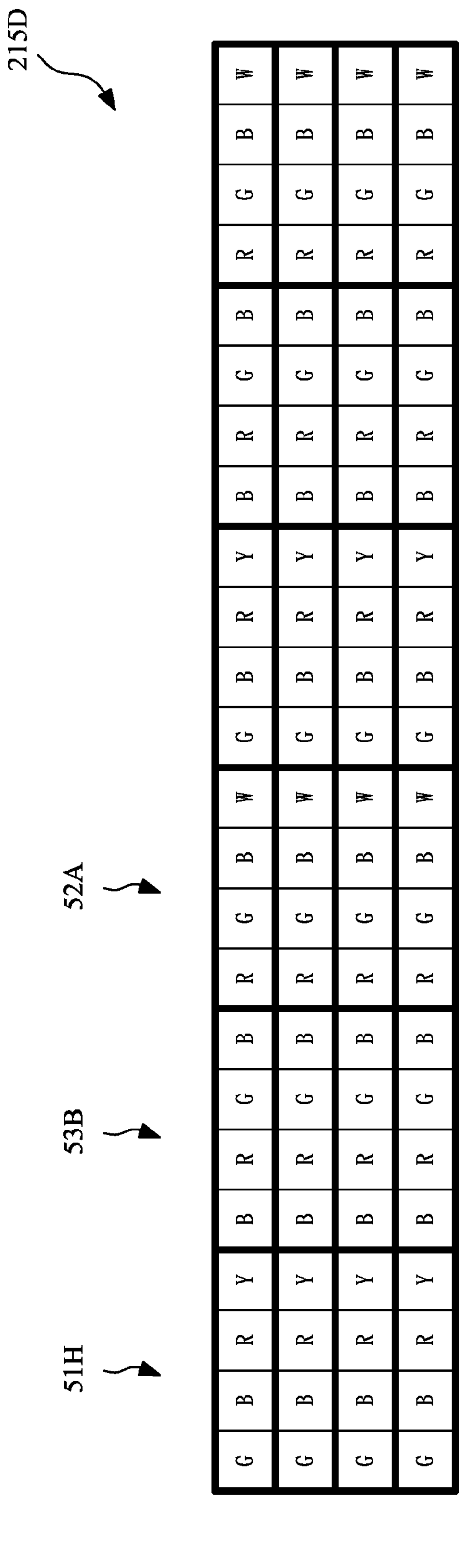
FIG. 15D shows an image device according to an embodiment of the invention.

Referring to FIG. 15D, it shows an image device according to an embodiment of the invention. The image device 215D includes a plurality of RGBY pixels 51H, a plurality of RGBW pixels 52A and a plurality of RBGB pixels 53B. In the image device 215D, the sequence of the pixels from left to right is the RGBY pixel 51H, the RBGB pixel 53B and the RGBW pixel 52A.

Figure 16A:
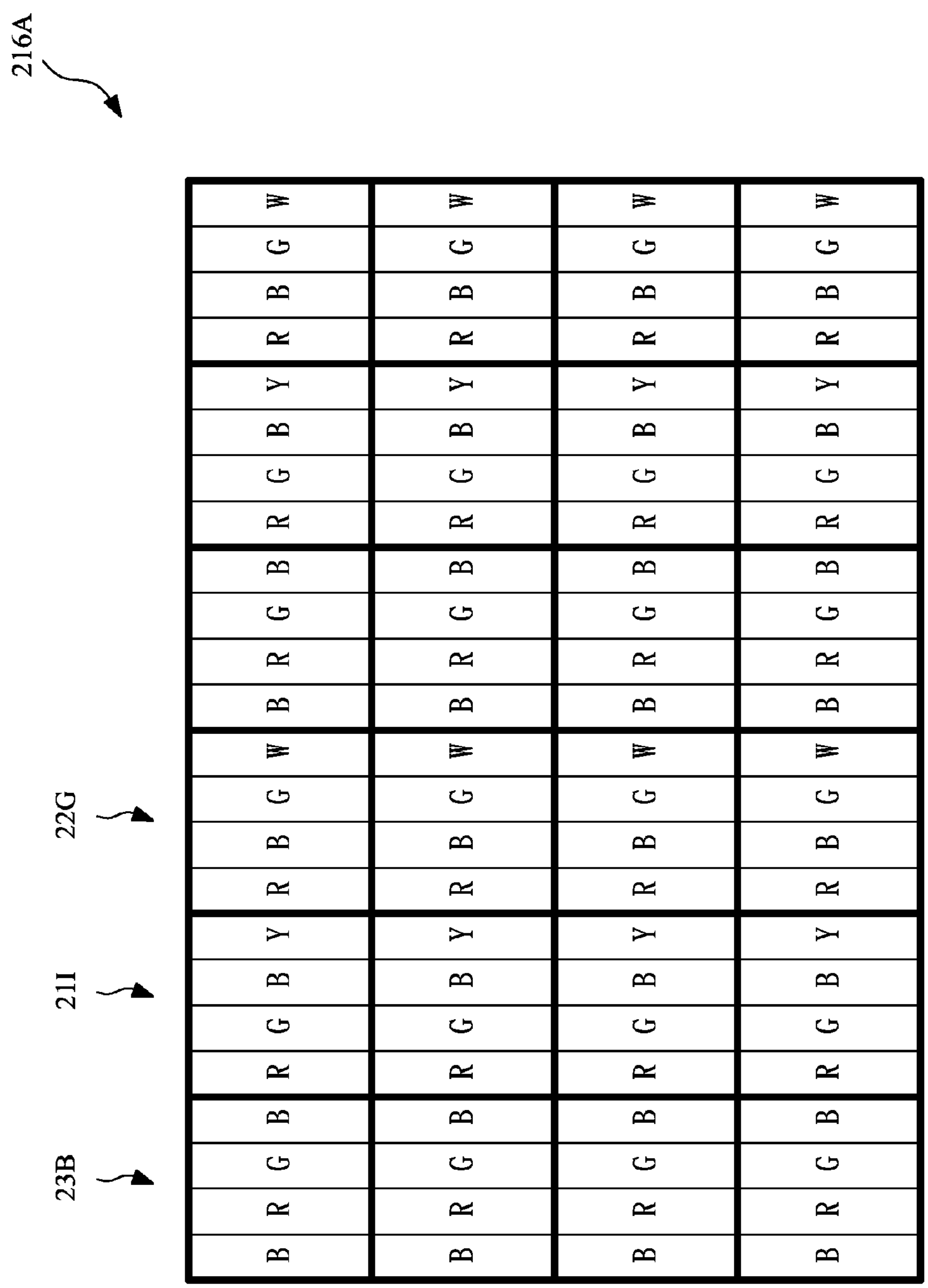
FIG. 16A shows an image device according to an embodiment of the invention.

Referring to FIG. 16A, it shows an image device according to an embodiment of the invention. The image device 216A includes a plurality of RGBY pixels 21I, a plurality of RGBW pixels 22G and a plurality of RBGB pixels 23B. In the RGBY pixel 21I, the sequence of the sub-pixels in the 1×4 matrix from left to right is the red sub-pixel, the green sub-pixel, the blue sub-pixel and the yellow sub-pixel. In the RGBW pixel 22G, the sequence of the sub-pixels in the 1×4 matrix from left to right is the red sub-pixel, the blue sub-pixel, the green sub-pixel and the white sub-pixel.

Figure 16B:
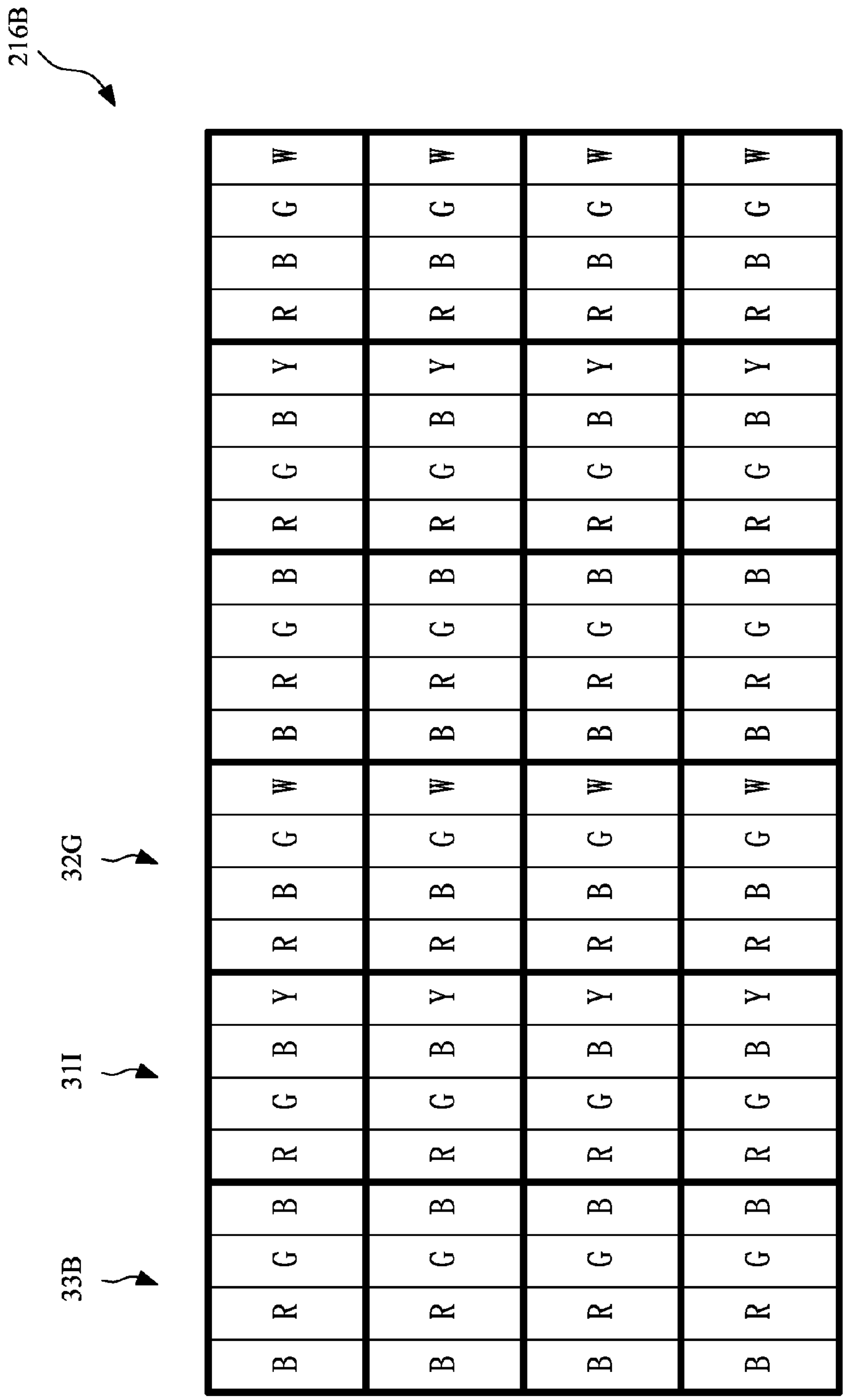
FIG. 16B shows an image device according to an embodiment of the invention.

Referring to FIG. 16B, it shows an image device according to an embodiment of the invention. The image device 216B includes a plurality of RGBY pixels 31I, a plurality of RGBW pixels 32G and a plurality of RBGB pixels 33B. In the RGBY pixel 31I, the sequence of the sub-pixels in the 1×4 matrix from left to right is the red sub-pixel, the green sub-pixel, the blue sub-pixel and the yellow sub-pixel. In the RGBW pixel 32G, the sequence of the sub-pixels in the 1×4 matrix from left to right is the red sub-pixel, the blue sub-pixel, the green sub-pixel and the white sub-pixel.

Figure 16C:
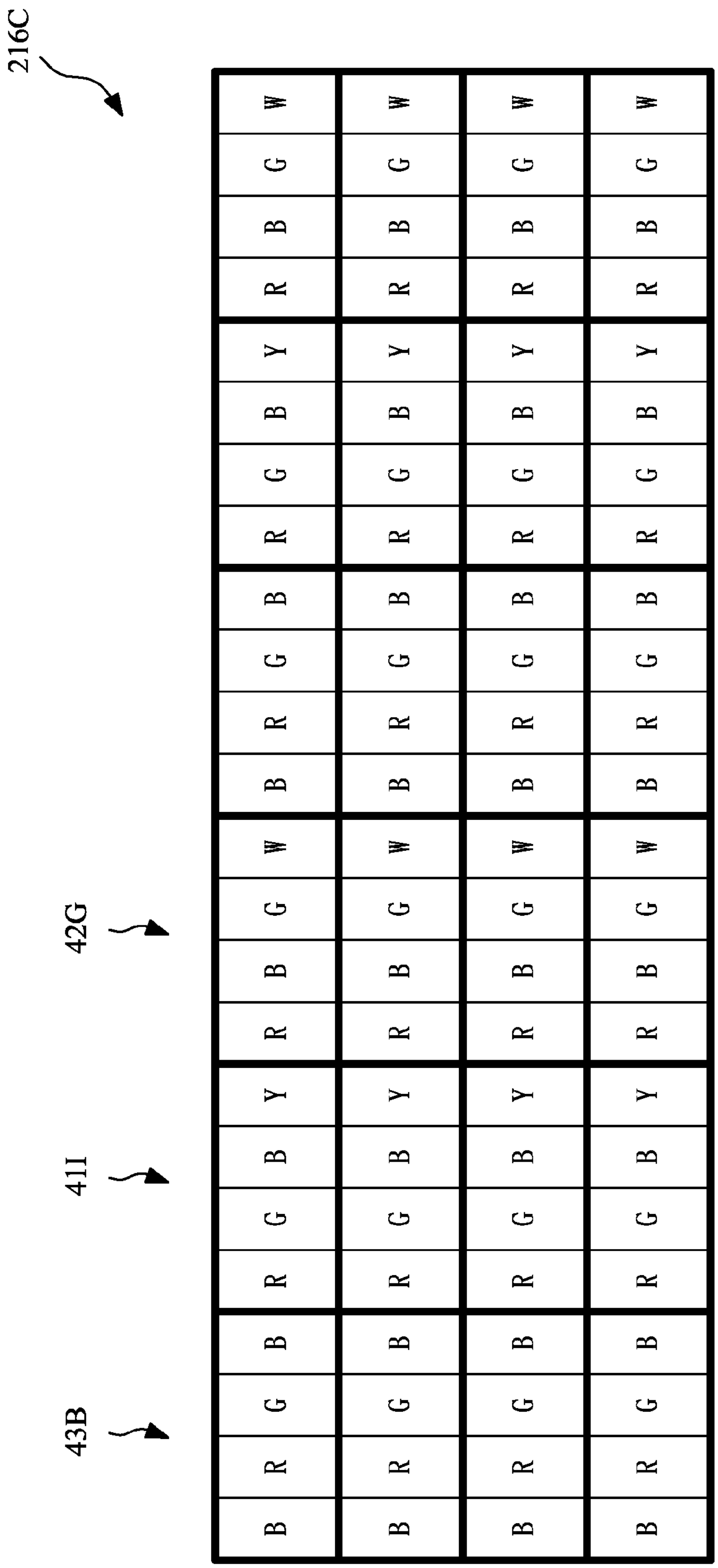
FIG. 16C shows an image device according to an embodiment of the invention.

Referring to FIG. 16C, it shows an image device according to an embodiment of the invention. The image device 216C includes a plurality of RGBY pixels 41I, a plurality of RGBW pixels 42G and a plurality of RBGB pixels 43B. In the RGBY pixel 41I, the sequence of the sub-pixels in the 1×4 matrix from left to right is the red sub-pixel, the green sub-pixel, the blue sub-pixel and the yellow sub-pixel. In the RGBW pixel 42G, the sequence of the sub-pixels in the 1×4 matrix from left to right is the red sub-pixel, the blue sub-pixel, the green sub-pixel and the white sub-pixel.

Figure 16D:
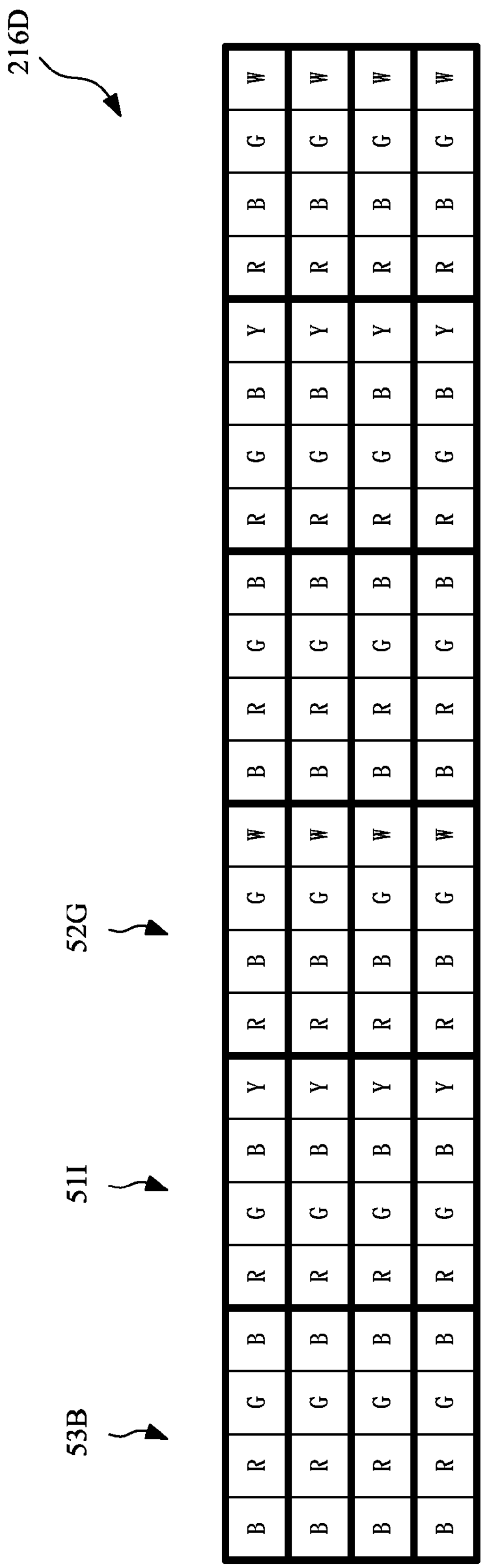
FIG. 16D shows an image device according to an embodiment of the invention.

Referring to FIG. 16D, it shows an image device according to an embodiment of the invention. The image device 216D includes a plurality of RGBY pixels 51I, a plurality of RGBW pixels 52G and a plurality of RBGB pixels 53B. In the RGBY pixel 51I, the sequence of the sub-pixels in the 1×4 matrix from left to right is the red sub-pixel, the green sub-pixel, the blue sub-pixel and the yellow sub-pixel. In the RGBW pixel 52G, the sequence of the sub-pixels in the 1×4 matrix from left to right is the red sub-pixel, the blue sub-pixel, the green sub-pixel and the white sub-pixel.

Figure 17A:
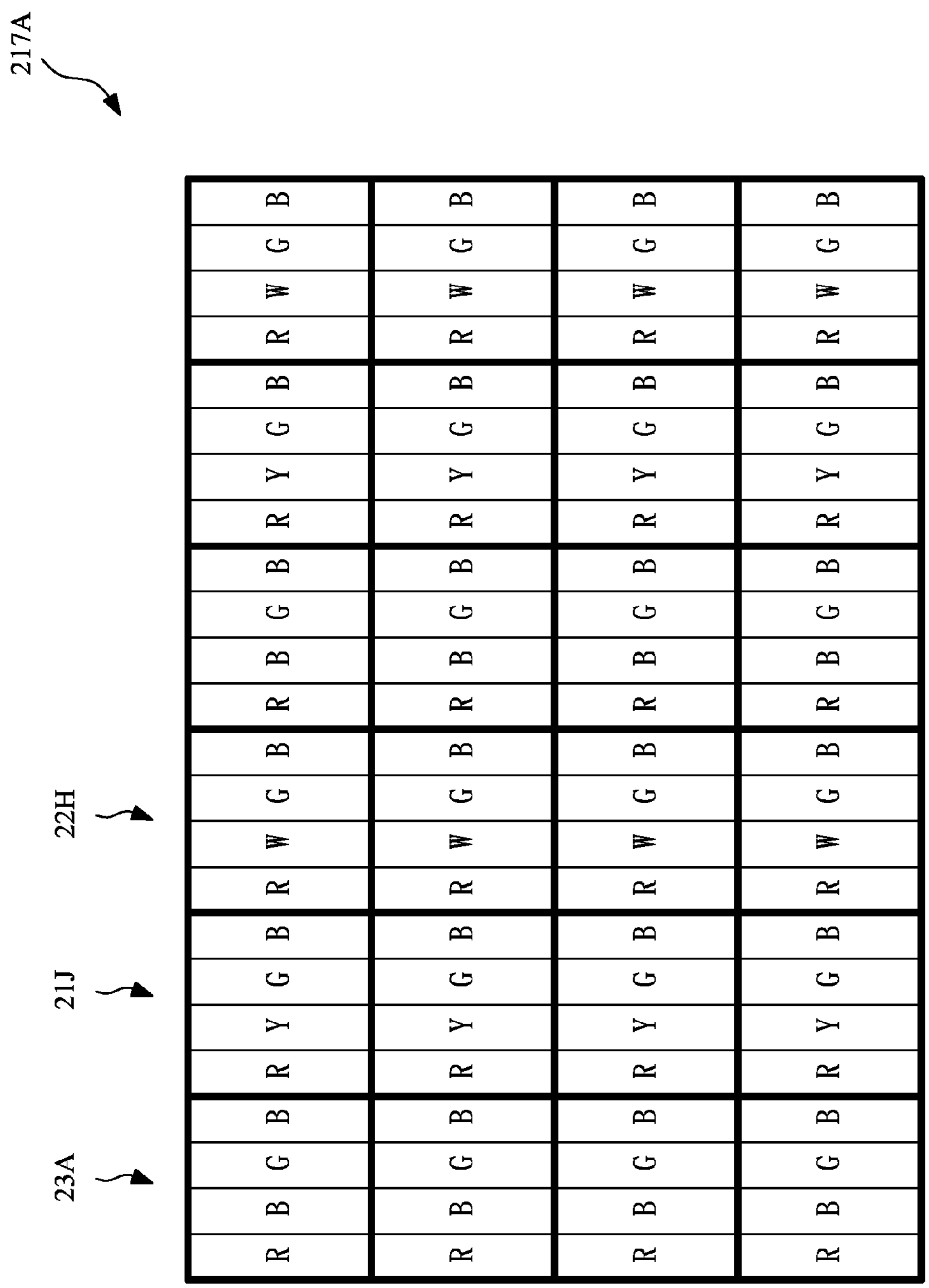
FIG. 17A shows an image device according to an embodiment of the invention.

Referring to FIG. 17A, it shows an image device according to an embodiment of the invention. The image device 217A includes a plurality of RGBY pixels 21J, a plurality of RGBW pixels 22H and a plurality of RBGB pixels 23A. In the RGBY pixel 21J, the sequence of the sub-pixels in the 1×4 matrix from left to right is the red sub-pixel, the yellow sub-pixel, the green sub-pixel and the blue sub-pixel. In the RGBW pixel 22H, the sequence of the sub-pixels in the 1×4 matrix from left to right is the red sub-pixel, the white sub-pixel, the green sub-pixel and the blue sub-pixel.

In an embodiment, in the image device 217A, any group of four adjacent sub-pixels of at least two different colors can produce any colors, and any group of four adjacent sub-pixels of at least two different colors can produce a white color.

Figure 17B:
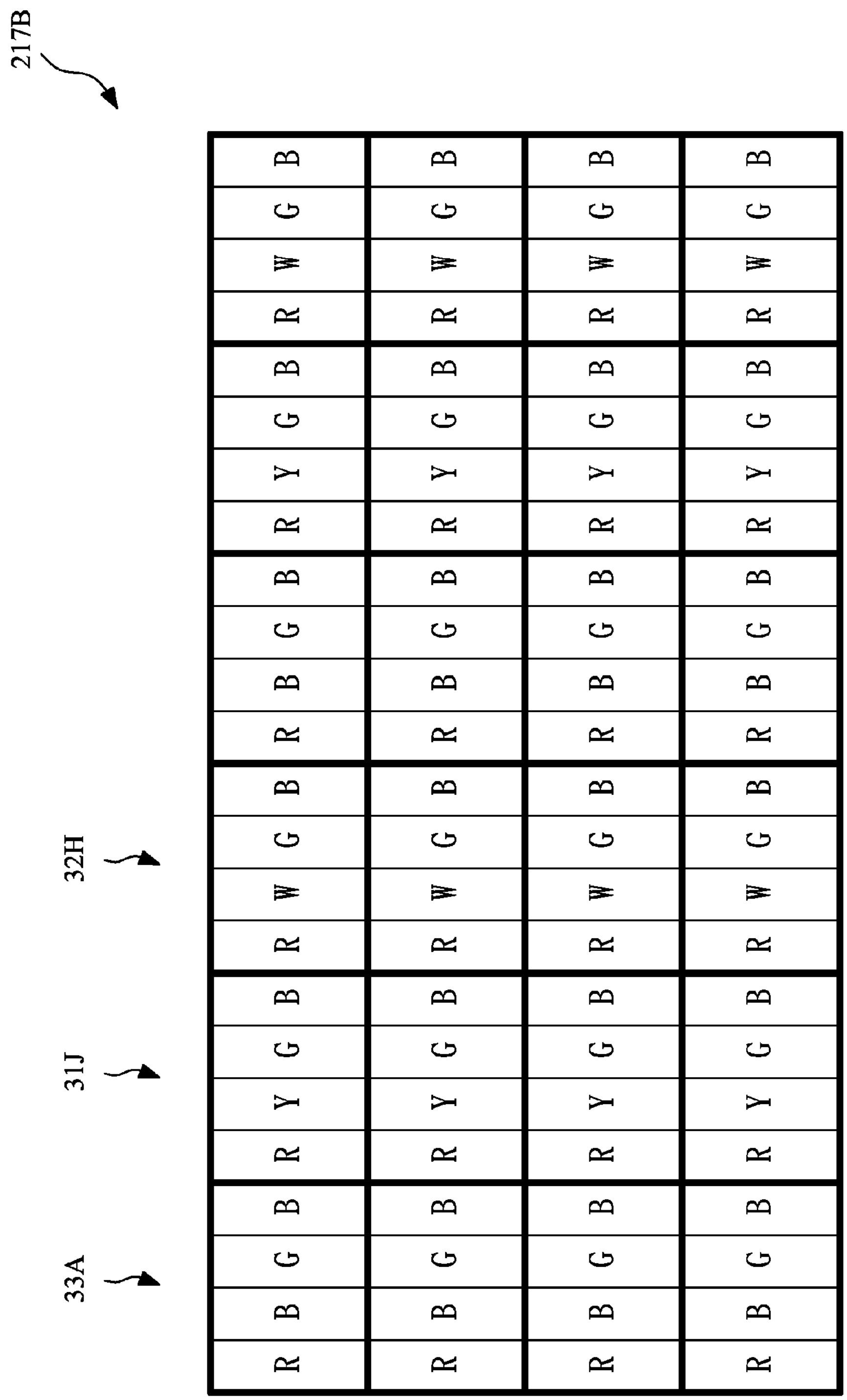
FIG. 17B shows an image device according to an embodiment of the invention.

Referring to FIG. 17B, it shows an image device according to an embodiment of the invention. The image device 217B includes a plurality of RGBY pixels 31J, a plurality of RGBW pixels 32H and a plurality of RBGB pixels 23A. In the RGBY pixel 31J, the sequence of the sub-pixels in the 1×4 matrix from left to right is the red sub-pixel, the yellow sub-pixel, the green sub-pixel and the blue sub-pixel. In the RGBW pixel 32H, the sequence of the sub-pixels in the 1×4 matrix from left to right is the red sub-pixel, the white sub-pixel, the green sub-pixel and the blue sub-pixel.

Figure 17C:
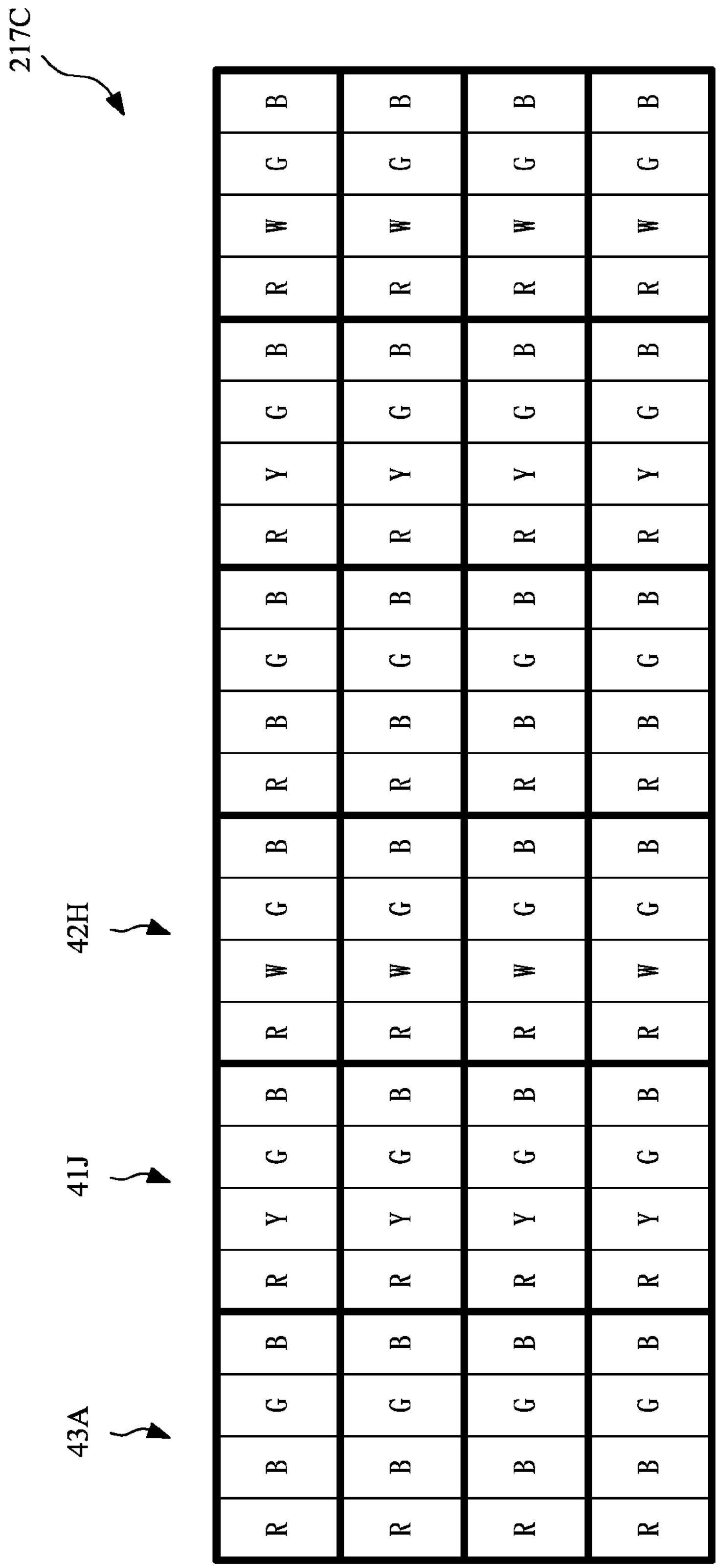
FIG. 17C shows an image device according to an embodiment of the invention.

Referring to FIG. 17C, it shows an image device according to an embodiment of the invention. The image device 217C includes a plurality of RGBY pixels 41J, a plurality of RGBW pixels 42H and a plurality of RBGB pixels 43A. In the RGBY pixel 41J, the sequence of the sub-pixels in the 1×4 matrix from left to right is the red sub-pixel, the yellow sub-pixel, the green sub-pixel and the blue sub-pixel. In the RGBW pixel 42H, the sequence of the sub-pixels in the 1×4 matrix from left to right is the red sub-pixel, the white sub-pixel, the green sub-pixel and the blue sub-pixel.

Figure 17D:
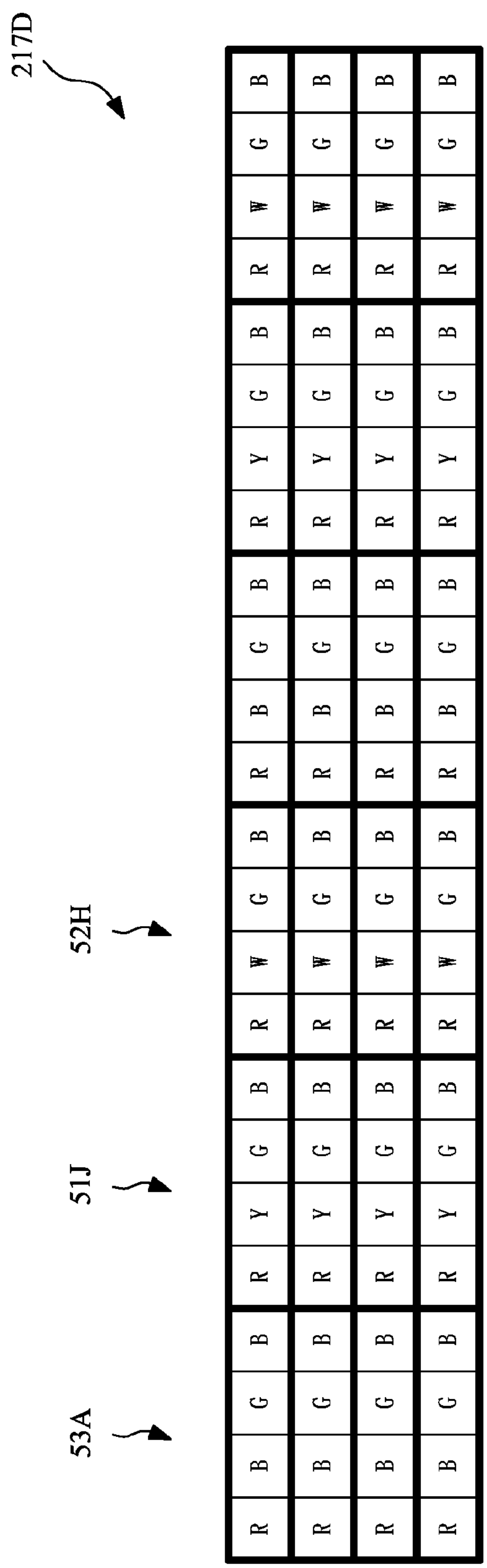
FIG. 17D shows an image device according to an embodiment of the invention.

Referring to FIG. 17D, it shows an image device according to an embodiment of the invention. The image device 217D includes a plurality of RGBY pixels 51J, a plurality of RGBW pixels 52H and a plurality of RBGB pixels 53A. In the RGBY pixel 51J, the sequence of the sub-pixels in the 1×4 matrix from left to right is the red sub-pixel, the yellow sub-pixel, the green sub-pixel and the blue sub-pixel. In the RGBW pixel 52H, the sequence of the sub-pixels in the 1×4 matrix from left to right is the red sub-pixel, the white sub-pixel, the green sub-pixel and the blue sub-pixel.

Figure 18A:
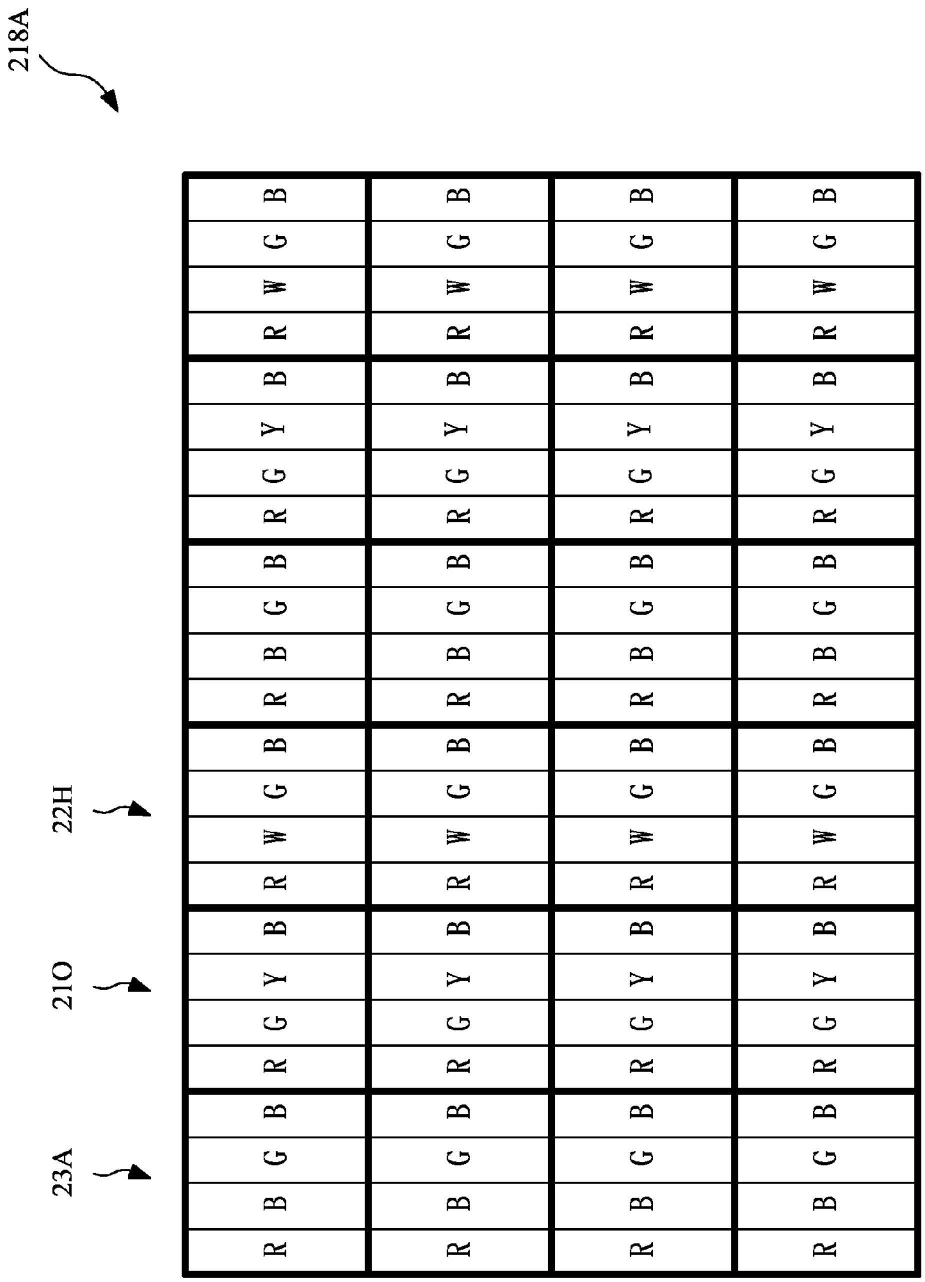
FIG. 18A shows an image device according to an embodiment of the invention.

Referring to FIG. 18A, it shows an image device according to an embodiment of the invention. The image device 218A includes a plurality of RGBY pixels 21O, a plurality of RGBW pixels 22H and a plurality of RBGB pixels 23A. In the RGBY pixel 21O, the sequence of the sub-pixels in the 1×4 matrix from left to right is the red sub-pixel, the green sub-pixel, the yellow sub-pixel and the blue sub-pixel.

Figure 18B:
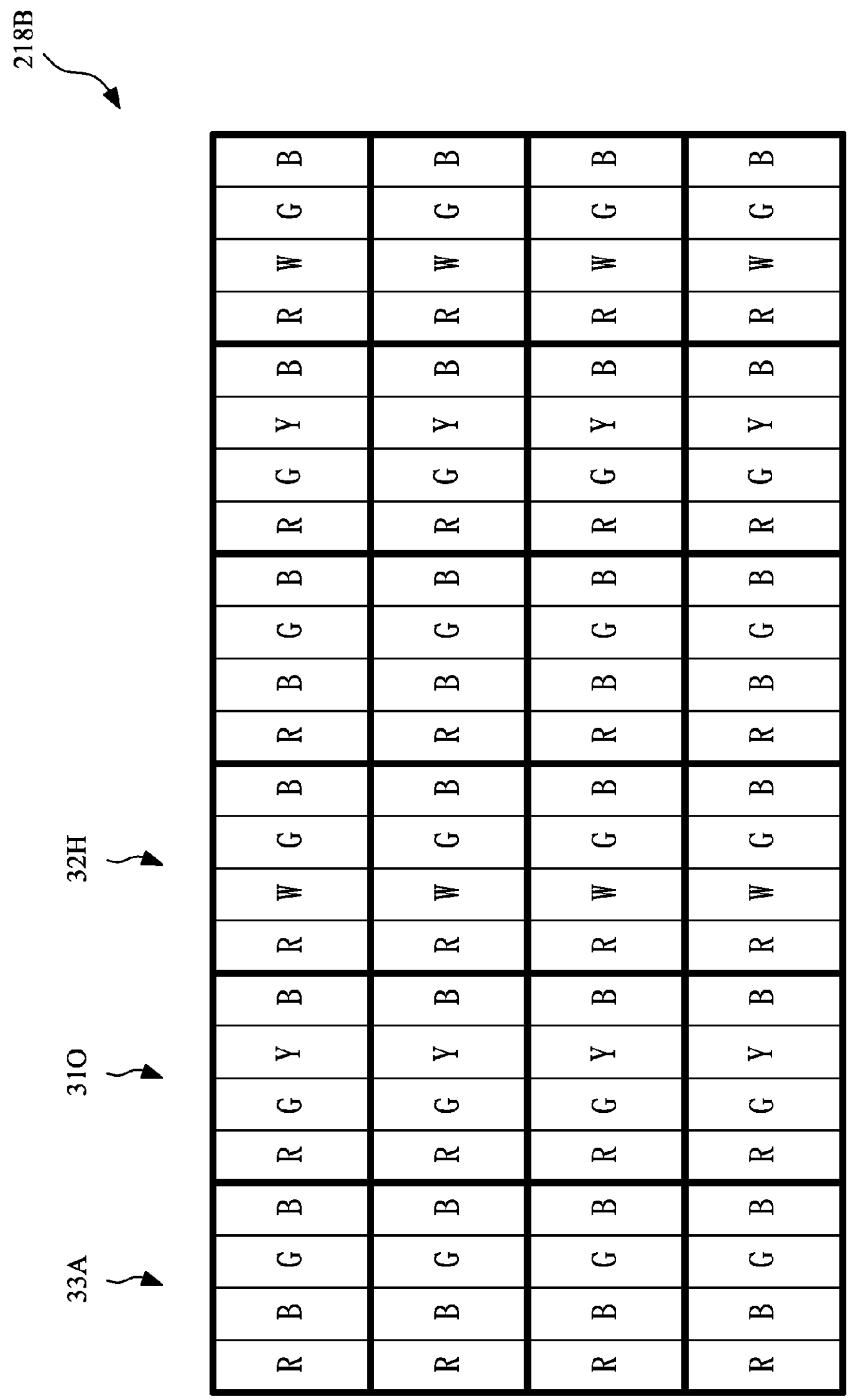
FIG. 18B shows an image device according to an embodiment of the invention.

Referring to FIG. 18B, it shows an image device according to an embodiment of the invention. The image device 218B includes a plurality of RGBY pixels 31O, a plurality of RGBW pixels 32H and a plurality of RBGB pixels 33A. In the RGBY pixel 31O, the sequence of the sub-pixels in the 1×4 matrix from left to right is the red sub-pixel, the green sub-pixel, the yellow sub-pixel and the blue sub-pixel.

Figure 18C:
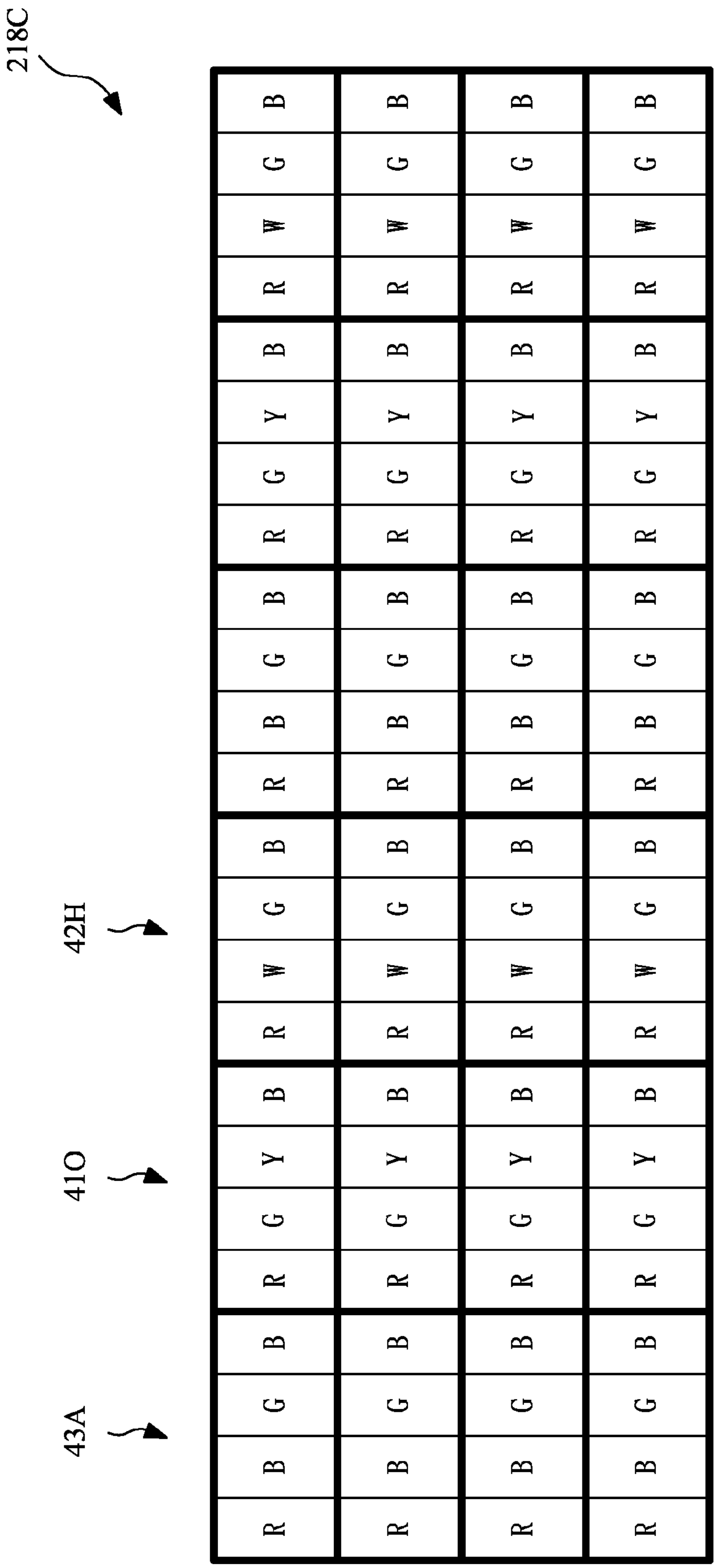
FIG. 18C shows an image device according to an embodiment of the invention.

Referring to FIG. 18C, it shows an image device according to an embodiment of the invention. The image device 218C includes a plurality of RGBY pixels 41O, a plurality of RGBW pixels 42H and a plurality of RBGB pixels 43A.

In the RGBY pixel 41O, the sequence of the sub-pixels in the 1×4 matrix from left to right is the red sub-pixel, the green sub-pixel, the yellow sub-pixel and the blue sub-pixel.

Figure 18D:
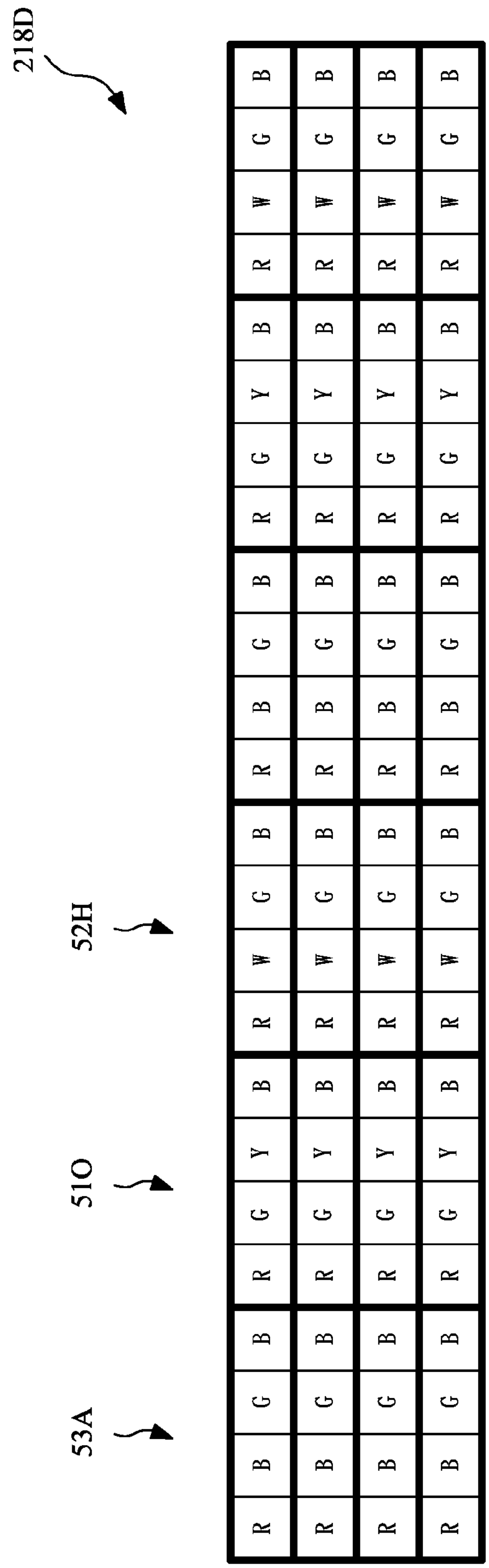
FIG. 18D shows an image device according to an embodiment of the invention.

Referring to FIG. 18D, it shows an image device according to an embodiment of the invention. The image device 218D includes a plurality of RGBY pixels 51O, a plurality of RGBW pixels 52H and a plurality of RBGB pixels 53A. In the RGBY pixel 51O, the sequence of the sub-pixels in the 1×4 matrix from left to right is the red sub-pixel, the green sub-pixel, the yellow sub-pixel and the blue sub-pixel.

Figure 19A:
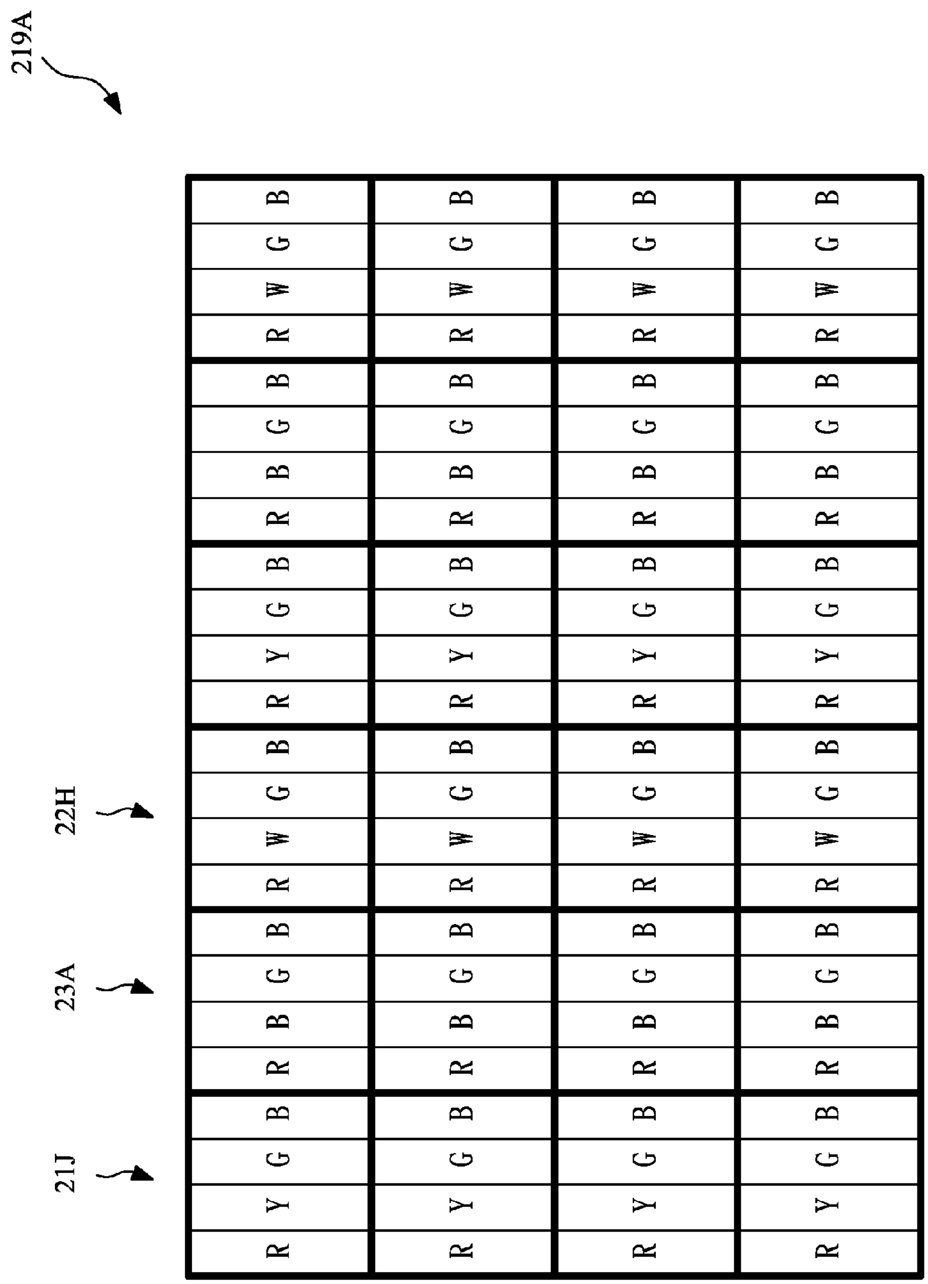
FIG. 19A shows an image device according to an embodiment of the invention.

Referring to FIG. 19A, it shows an image device according to an embodiment of the invention. The image device 219A includes a plurality of RGBY pixels 21J, a plurality of RGBW pixels 22H and a plurality of RBGB pixels 23A. In the image device 219A, the sequence of the pixels from left to right is the RGBY pixel 21J, the RBGB pixel 23A and the RGBW pixel 22H.

Figure 19B:
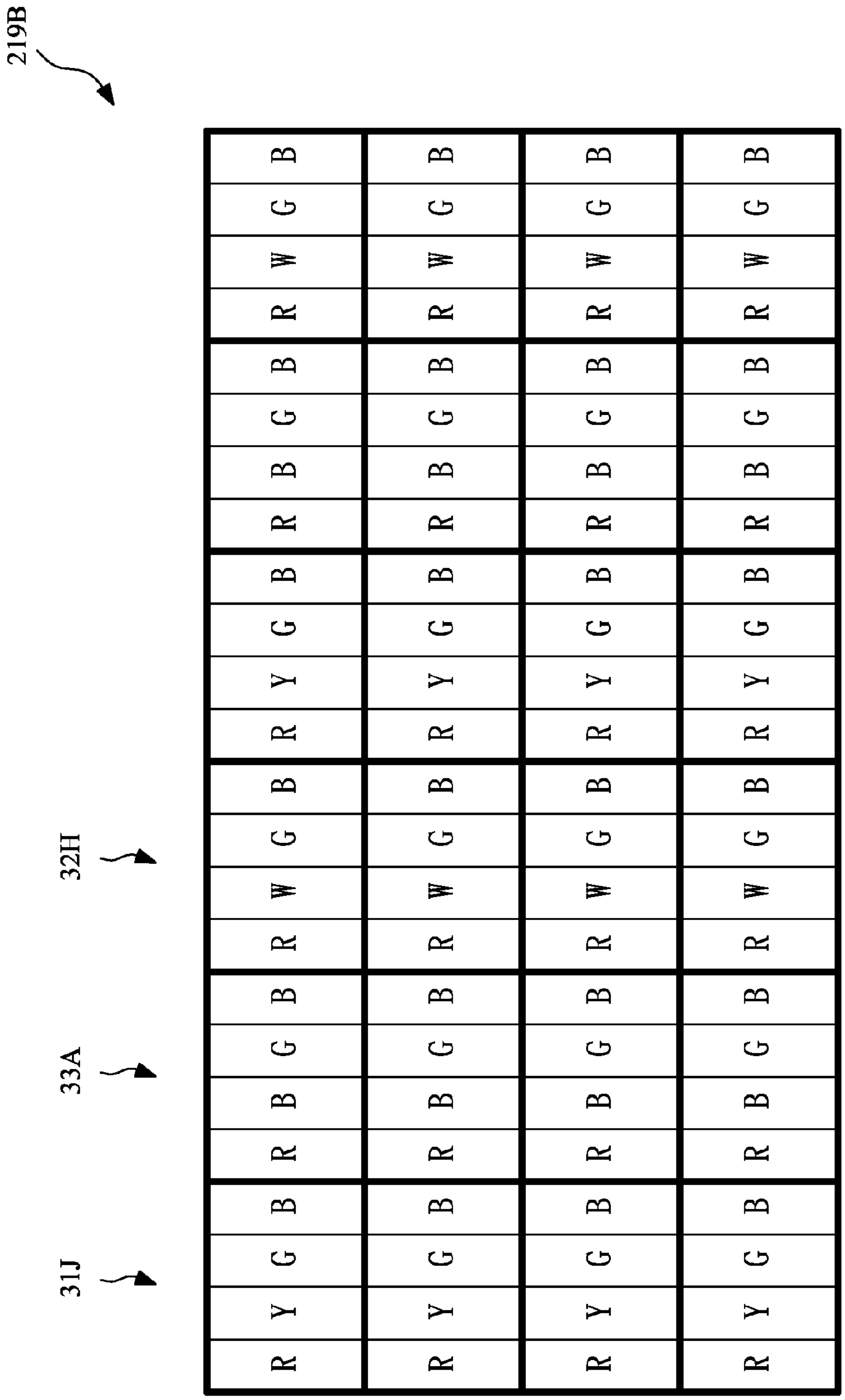
FIG. 19B shows an image device according to an embodiment of the invention.

Referring to FIG. 19B, it shows an image device according to an embodiment of the invention. The image device 219B includes a plurality of RGBY pixels 31J, a plurality of RGBW pixels 32H and a plurality of RBGB pixels 33A. In the image device 219B, the sequence of the pixels from left to right is the RGBY pixel 31J, the RBGB pixel 33A and the RGBW pixel 32H.

Figure 19C:
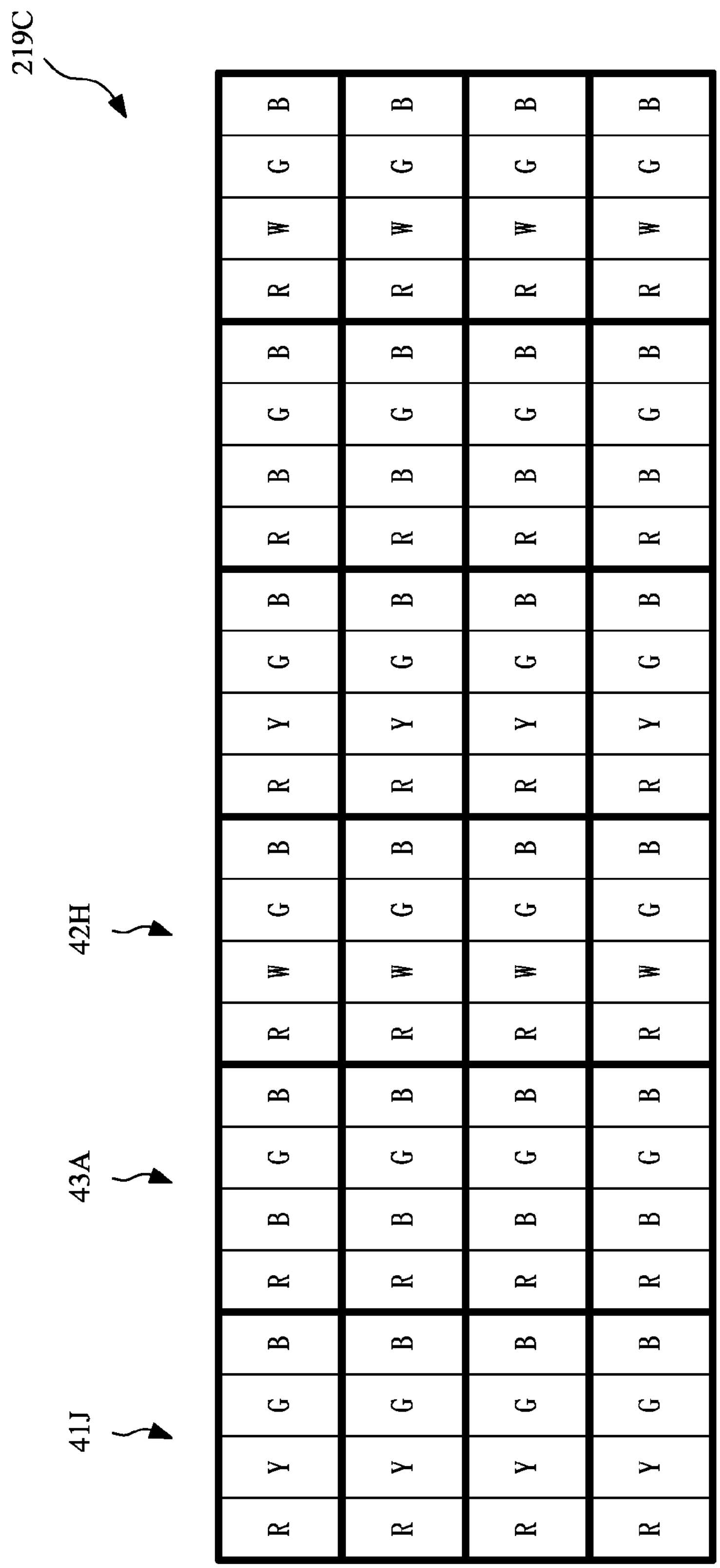
FIG. 19C shows an image device according to an embodiment of the invention.

Referring to FIG. 19C, it shows an image device according to an embodiment of the invention. The image device 219C includes a plurality of RGBY pixels 41J, a plurality of RGBW pixels 42H and a plurality of RBGB pixels 43A. In the image device 219C, the sequence of the pixels from left to right is the RGBY pixel 41J, the RBGB pixel 43A and the RGBW pixel 42H.

Figure 19D:
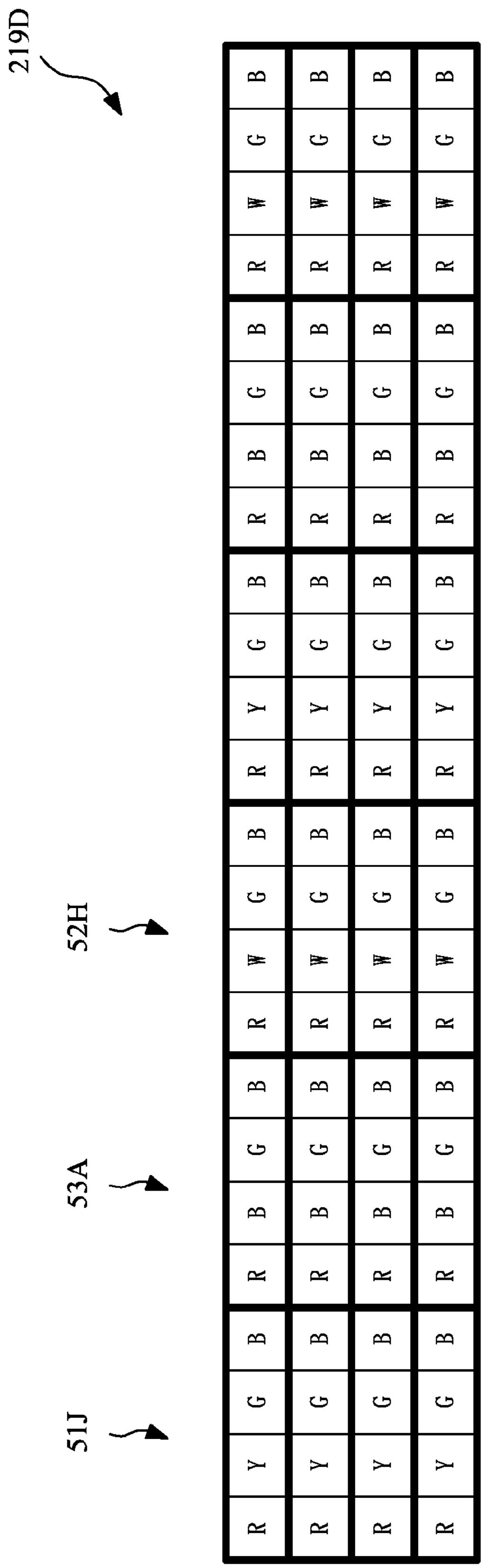
FIG. 19D shows an image device according to an embodiment of the invention.

Referring to FIG. 19D, it shows an image device according to an embodiment of the invention. The image device 219D includes a plurality of RGBY pixels 51J, a plurality of RGBW pixels 52H and a plurality of RBGB pixels 53A. In the image device 219D, the sequence of the pixels from left to right is the RGBY pixel 51J, the RBGB pixel 53A and the RGBW pixel 52H.

Figure 20A:
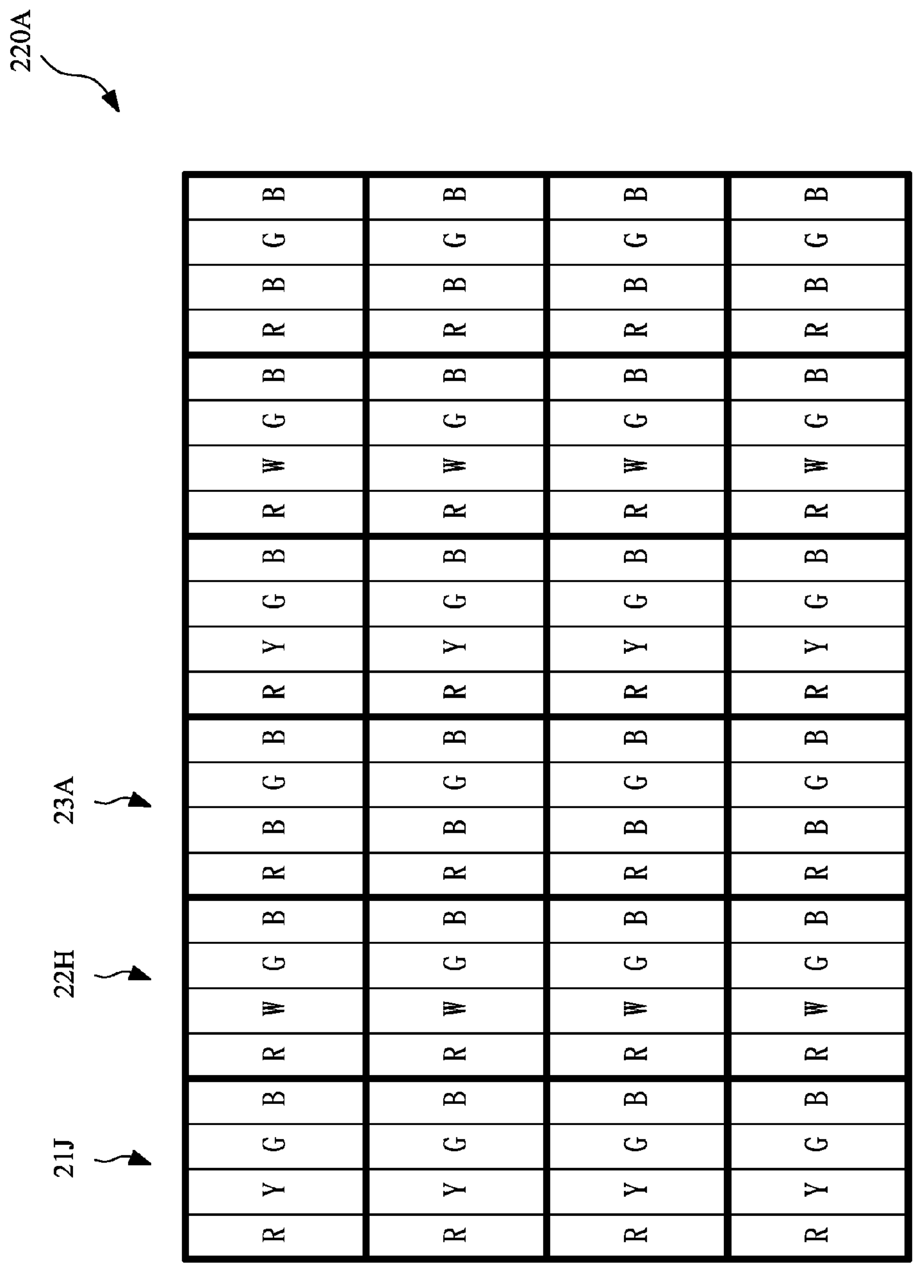
FIG. 20A shows an image device according to an embodiment of the invention.

Referring to FIG. 20A, it shows an image device according to an embodiment of the invention. The image device 220A includes a plurality of RGBY pixels 21J, a plurality of RGBW pixels 22H and a plurality of RBGB pixels 23A. In the image device 220A, the sequence of the pixels from left to right is the RGBY pixel 21J, the RGBW pixel 22H and the RBGB pixel 23A.

Figure 20B:
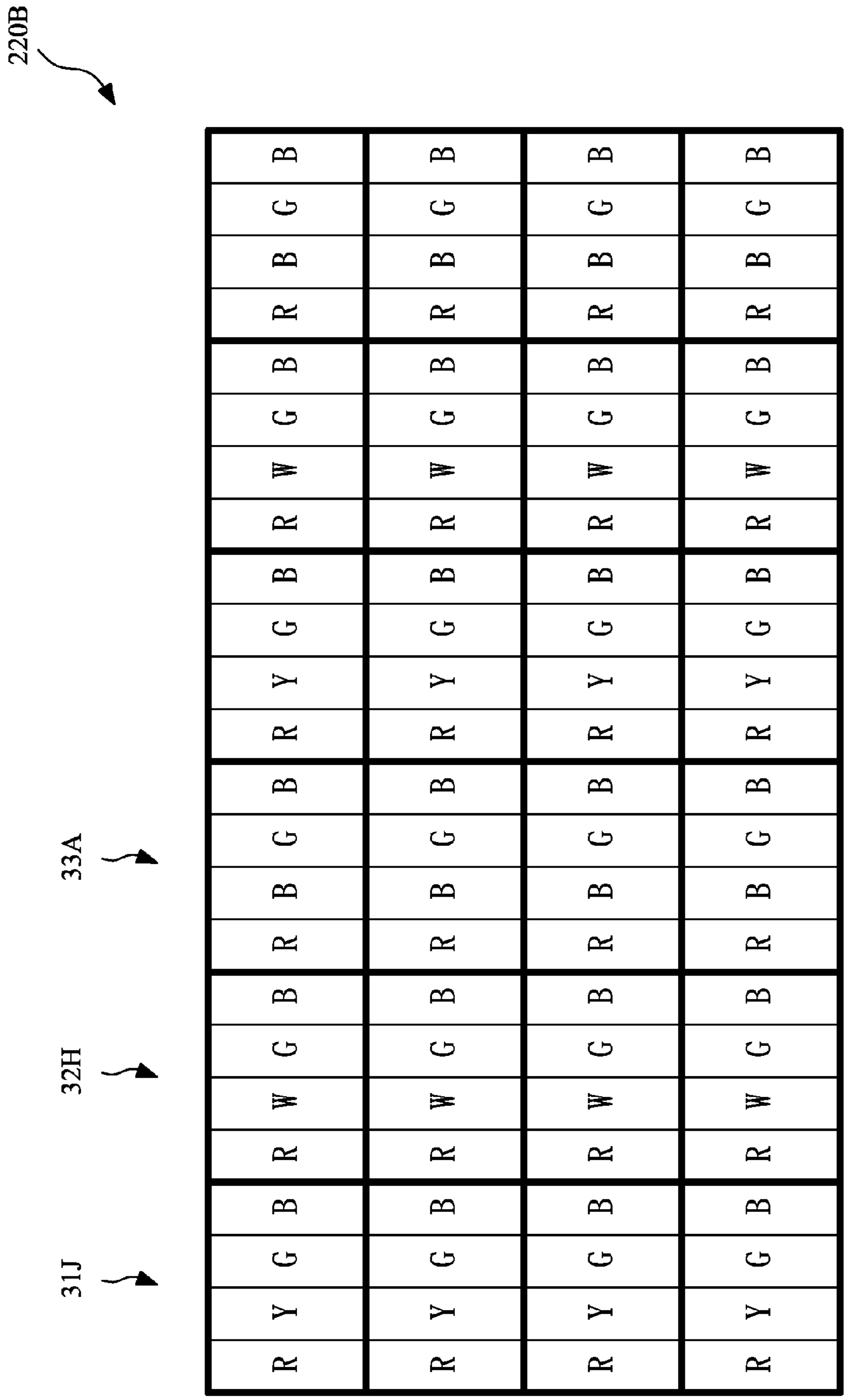
FIG. 20B shows an image device according to an embodiment of the invention.

Referring to FIG. 20B, it shows an image device according to an embodiment of the invention. The image device 220B includes a plurality of RGBY pixels 31J, a plurality of RGBW pixels 32H and a plurality of RBGB pixels 33A. In the image device 220B, the sequence of the pixels from left to right is the RGBY pixel 31J, the RGBW pixel 32H and the RBGB pixel 33A.

Figure 20C:
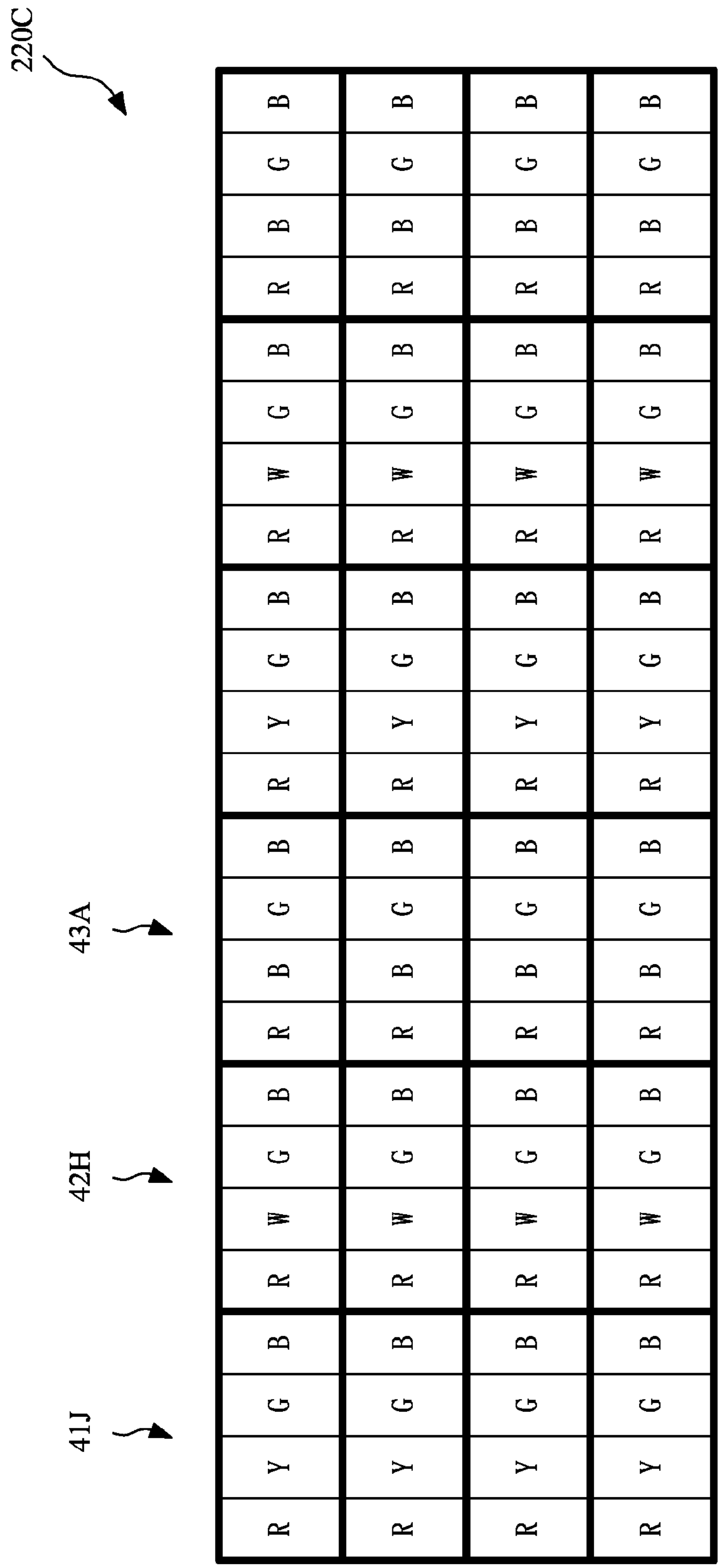
FIG. 20C shows an image device according to an embodiment of the invention.

Referring to FIG. 20C, it shows an image device according to an embodiment of the invention. The image device 220C includes a plurality of RGBY pixels 41J, a plurality of RGBW pixels 42H and a plurality of RBGB pixels 43A. In the image device 220C, the sequence of the pixels from left to right is the RGBY pixel 41J, the RGBW pixel 42H and the RBGB pixel 43A.

Figure 20D:
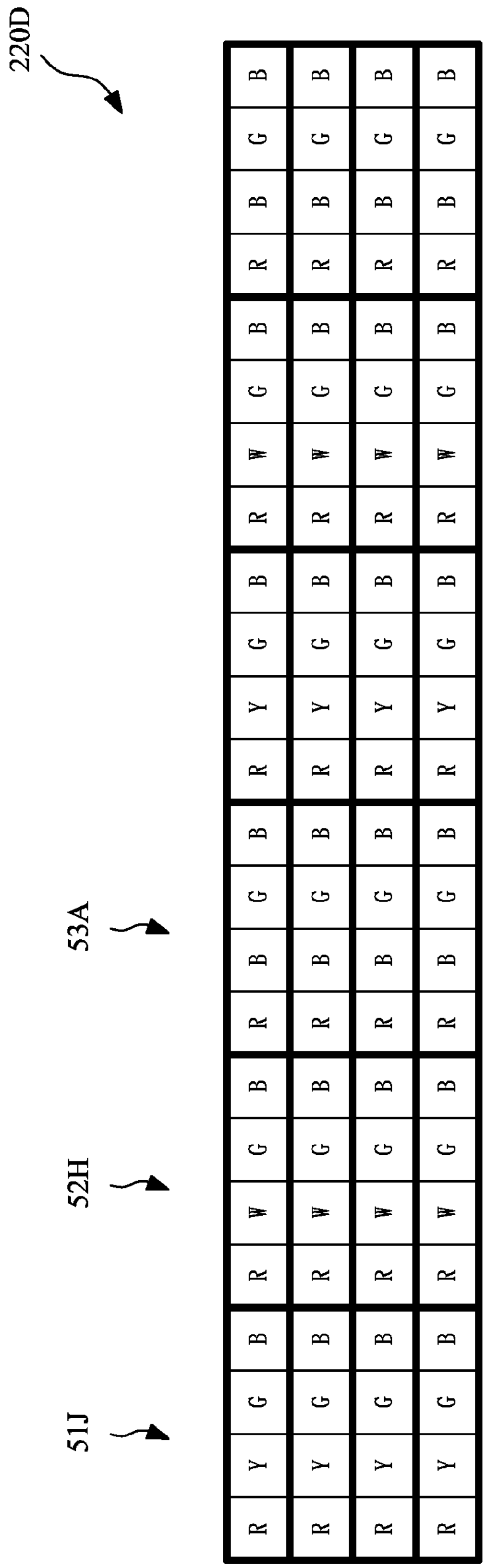
FIG. 20D shows an image device according to an embodiment of the invention.

Referring to FIG. 20D, it shows an image device according to an embodiment of the invention. The image device 220D includes a plurality of RGBY pixels 51J, a plurality of RGBW pixels 52H and a plurality of RBGB pixels 53A. In the image device 220D, the sequence of the pixels from left to right is the RGBY pixel 51J, the RGBW pixel 52H and the RBGB pixel 53A.

Figure 21A:
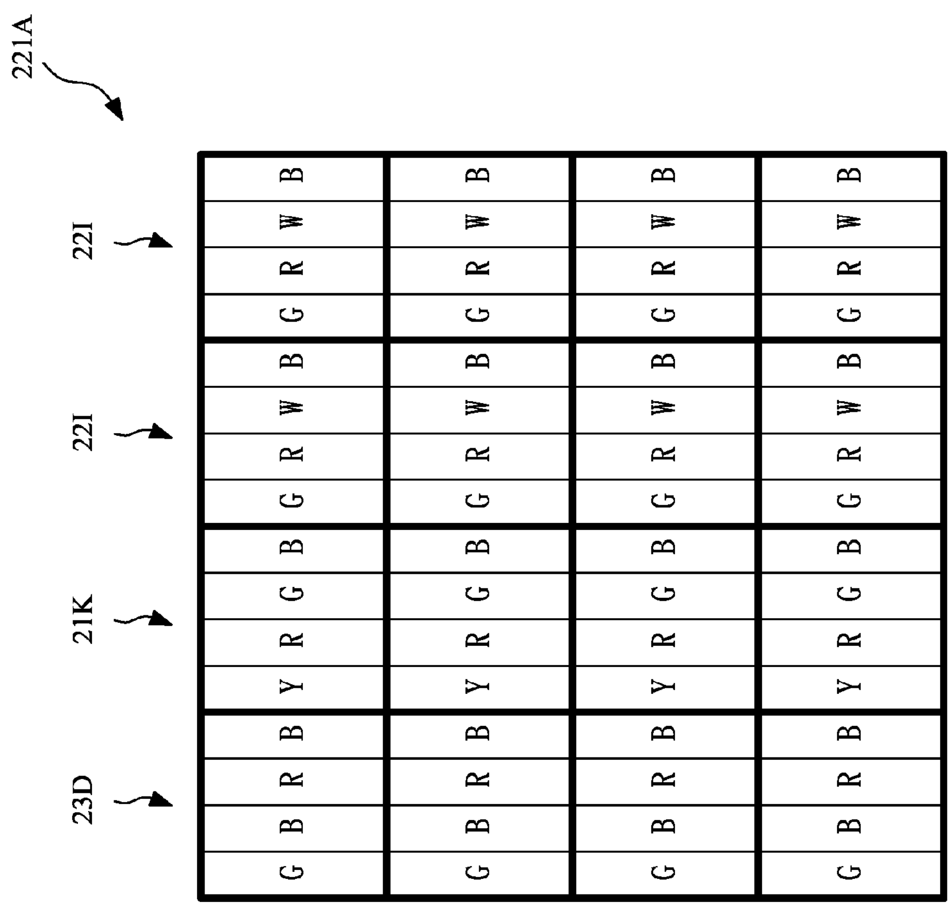
FIG. 21A shows an image device according to an embodiment of the invention.

Referring to FIG. 21A, it shows an image device according to an embodiment of the invention. The image device 221A includes a plurality of RGBY pixels 21K, a plurality of RGBW pixels 22I and a plurality of RBGB pixels 23D. In the RGBY pixel 21K, the sequence of the sub-pixels in the 1×4 matrix from left to right is the yellow sub-pixel, the red sub-pixel, the green sub-pixel and the blue sub-pixel. In the RGBW pixel 22I, the sequence of the sub-pixels in the 1×4 matrix from left to right is the green sub-pixel, the red sub-pixel, the white sub-pixel and the blue sub-pixel. In the image device 221A, the sequence of the pixels from left to right is the RBGB pixel 23D, the RGBY pixel 21K, the RGBW pixel 22I and the RGBW pixel 22I.

In an embodiment, in the image device 221A, the ratio of the number of red sub-pixels to the number of green sub-pixels to the number of blue sub-pixels to the number of white sub-pixels and to the number of yellow sub-pixels is about 4:4:5:2:1.

In an embodiment, in the image device 221A, any group of four adjacent sub-pixels of at least two different colors can produce a white color.

Figure 21B:
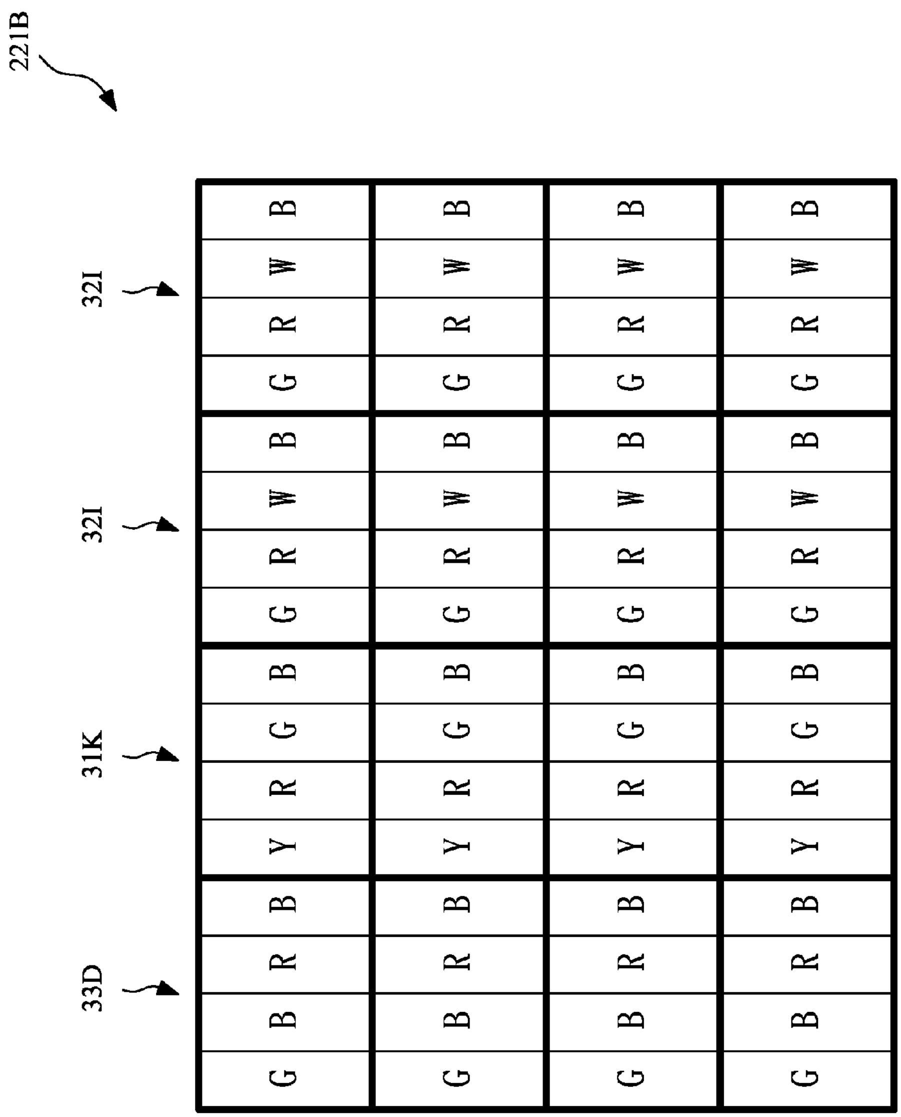
FIG. 21B shows an image device according to an embodiment of the invention.

Referring to FIG. 21B, it shows an image device according to an embodiment of the invention. The image device 221B includes a plurality of RGBY pixels 31K, a plurality of RGBW pixels 32I and a plurality of RBGB pixels 33D. In the RGBY pixel 31K, the sequence of the sub-pixels in the 1×4 matrix from left to right is the yellow sub-pixel, the red sub-pixel, the green sub-pixel and the blue sub-pixel. In the RGBW pixel 32I, the sequence of the sub-pixels in the 1×4 matrix from left to right is the green sub-pixel, the red sub-pixel, the white sub-pixel and the blue sub-pixel. In the image device 221B, the sequence of the pixels from left to right is the RBGB pixel 33D, the RGBY pixel 31K, the RGBW pixel 32I and the RGBW pixel 32I.

Figure 21C:
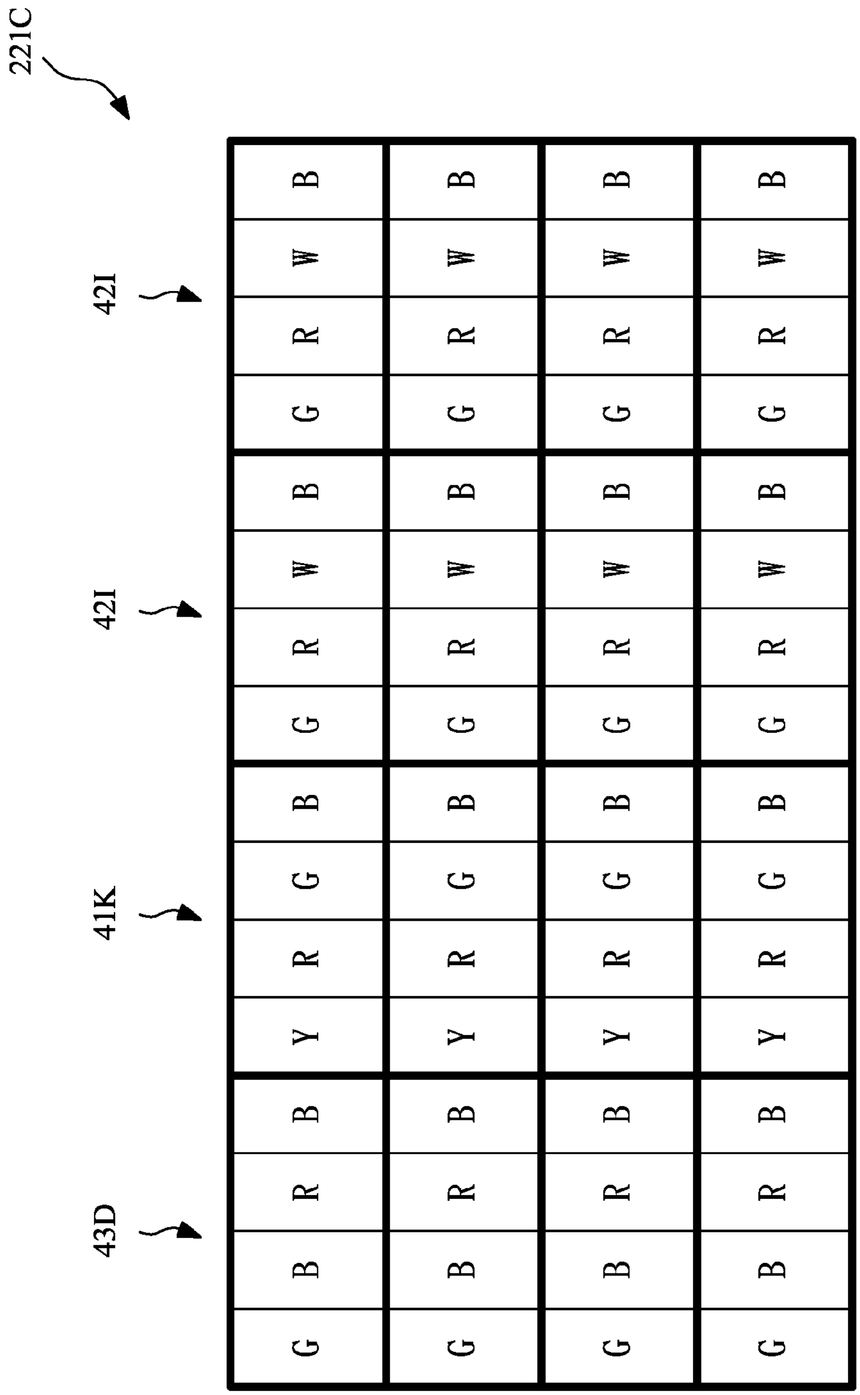
FIG. 21C shows an image device according to an embodiment of the invention.

Referring to FIG. 21C, it shows an image device according to an embodiment of the invention. The image device 221C includes a plurality of RGBY pixels 41K, a plurality of RGBW pixels 42I and a plurality of RBGB pixels 43D. In the RGBY pixel 41K, the sequence of the sub-pixels in the 1×4 matrix from left to right is the yellow sub-pixel, the red sub-pixel, the green sub-pixel and the blue sub-pixel. In the RGBW pixel 42I, the sequence of the sub-pixels in the 1×4 matrix from left to right is the green sub-pixel, the red sub-pixel, the white sub-pixel and the blue sub-pixel. In the image device 221C, the sequence of the pixels from left to right is the RBGB pixel 43D, the RGBY pixel 41K, the RGBW pixel 42I and the RGBW pixel 42I.

Figure 21D:
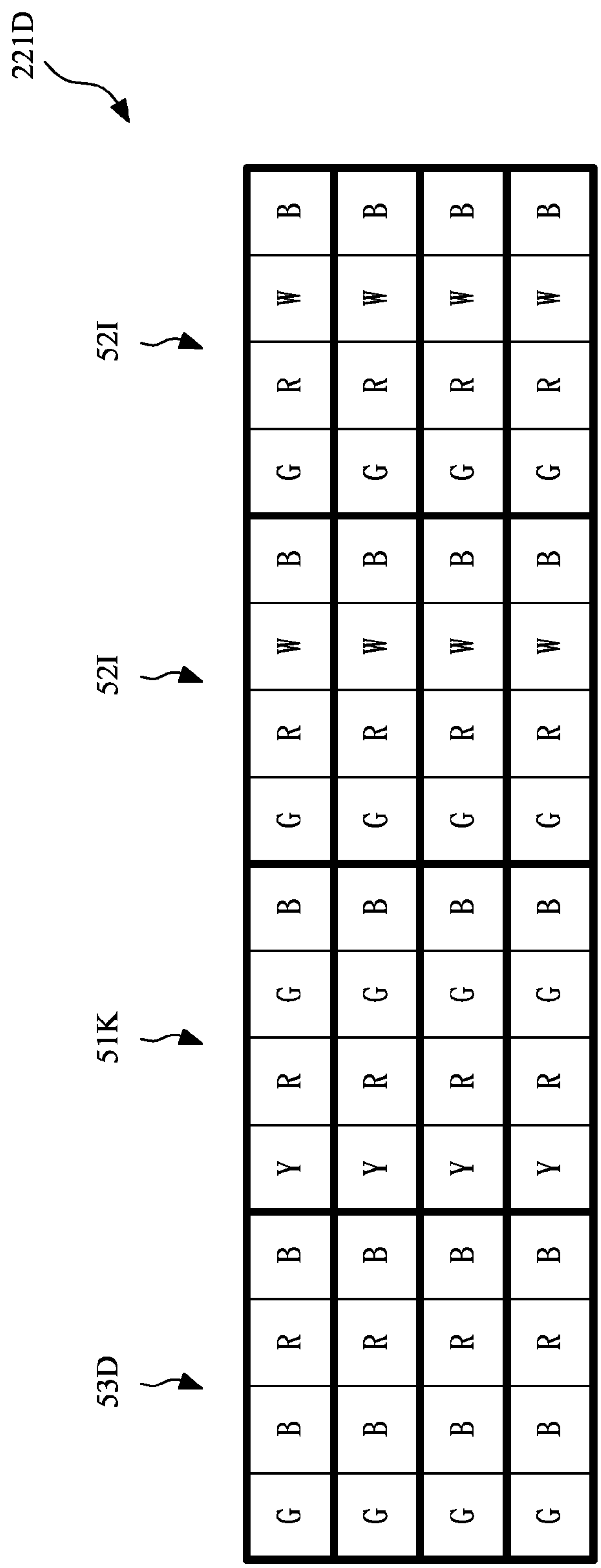
FIG. 21D shows an image device according to an embodiment of the invention.

Referring to FIG. 21D, it shows an image device according to an embodiment of the invention. The image device 221D includes a plurality of RGBY pixels 51K, a plurality of RGBW pixels 52I and a plurality of RBGB pixels 53D. In the RGBY pixel 51K, the sequence of the sub-pixels in the 1×4 matrix from left to right is the yellow sub-pixel, the red sub-pixel, the green sub-pixel and the blue sub-pixel. In the RGBW pixel 52I, the sequence of the sub-pixels in the 1×4 matrix from left to right is the green sub-pixel, the red sub-pixel, the white sub-pixel and the blue sub-pixel. In the image device 221D, the sequence of the pixels from left to right is the RBGB pixel 53D, the RGBY pixel 51K, the RGBW pixel 52I and the RGBW pixel 52I.

Figure 22A:
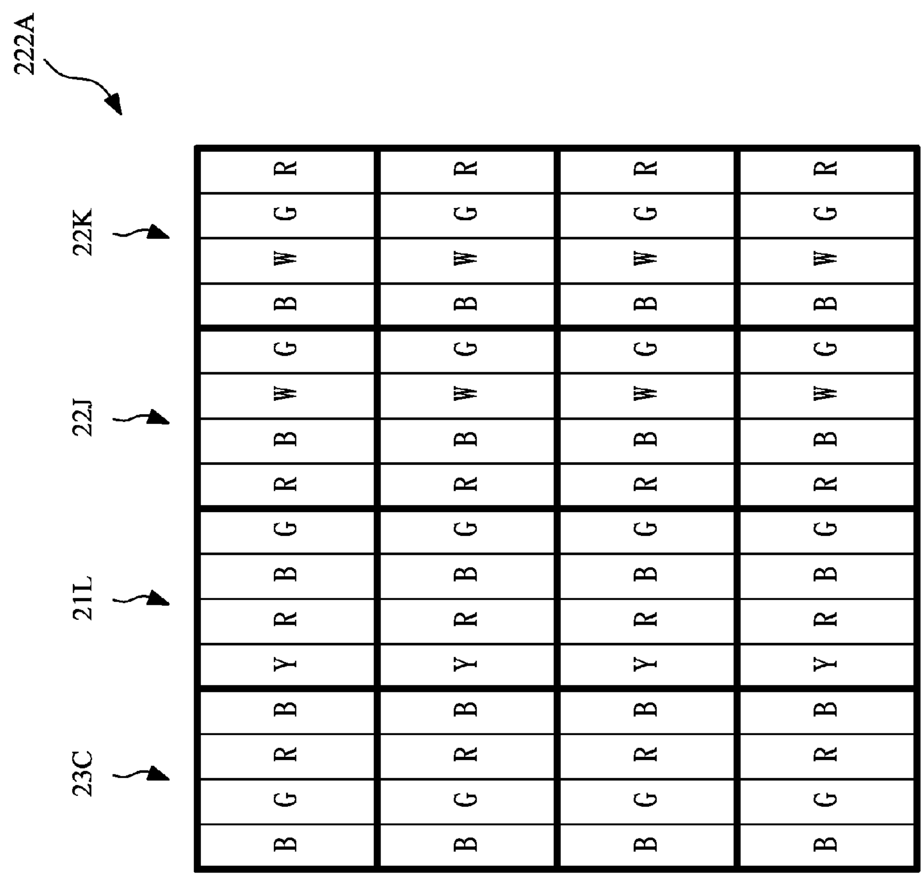
FIG. 22A shows an image device according to an embodiment of the invention.

Referring to FIG. 22A, it shows an image device according to an embodiment of the invention. The image device 222A includes a plurality of RGBY pixels 21L, a plurality of RGBW pixels 22J, 22K and a plurality of RBGB pixels 23C. In the RGBY pixel 21L, the sequence of the sub-pixels in the 1×4 matrix from left to right is the yellow sub-pixel, the red sub-pixel, the blue sub-pixel and the green sub-pixel. In the RGBW pixel 22J, the sequence of the sub-pixels in the 1×4 matrix from left to right is the red sub-pixel, the blue sub-pixel, the green sub-pixel and the white sub-pixel. In the RGBW pixel 22K, the sequence of the sub-pixels in the 1×4 matrix from left to right is the blue sub-pixel, the white sub-pixel, the green sub-pixel and the red sub-pixel. In the image device 222A, the sequence of the pixels from left to right is the RBGB pixel 23C, the RGBY pixel 21L, the RGBW pixel 22J and the RGBW pixel 22K.

In an embodiment, in the image device 222A, any group of three adjacent sub-pixels of at least two different colors can produce a white color, and any group of four adjacent sub-pixels of at least two different colors can produce a white color.

Figure 22B:
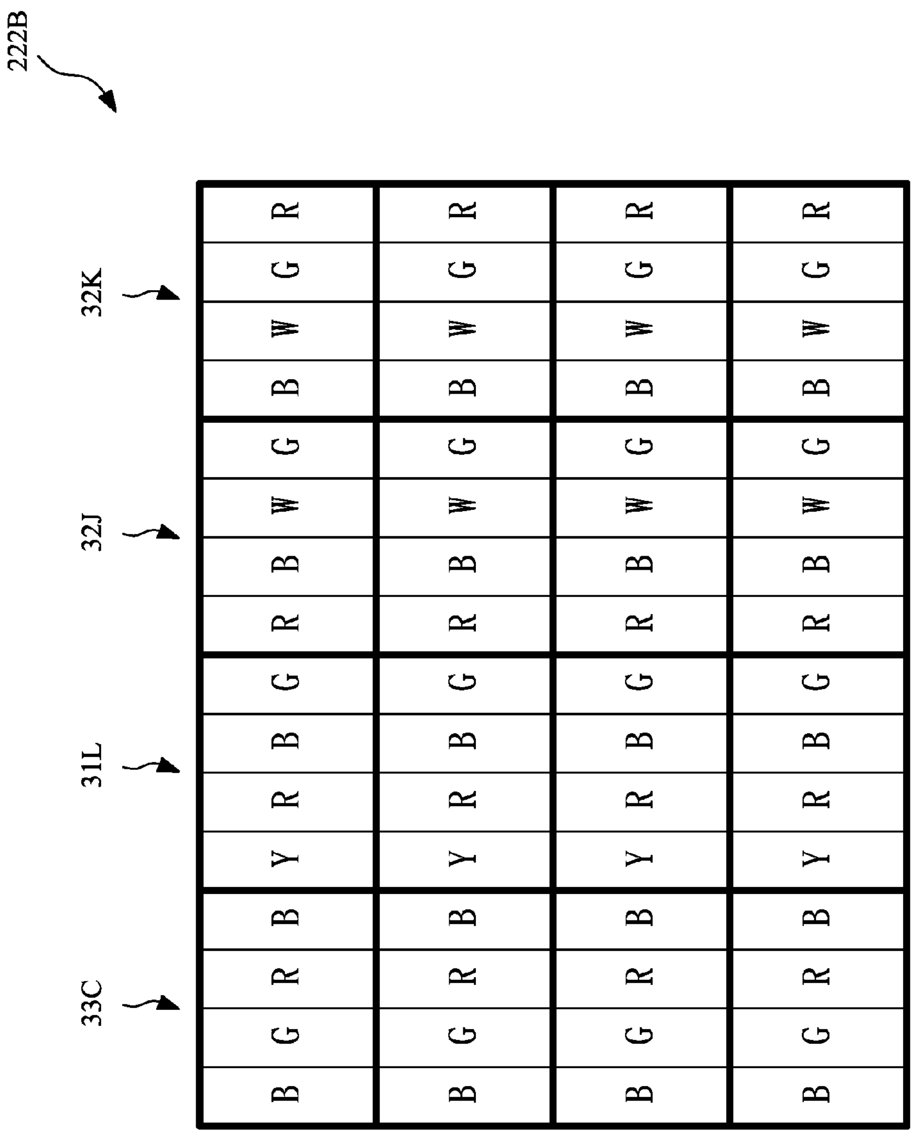
FIG. 22B shows an image device according to an embodiment of the invention.

Referring to FIG. 22B, it shows an image device according to an embodiment of the invention. The image device 222B includes a plurality of RGBY pixels 31L, a plurality of RGBW pixels 32J, 32K and a plurality of RBGB pixels 33C. In the RGBY pixel 31L, the sequence of the sub-pixels in the 1×4 matrix from left to right is the yellow sub-pixel, the red sub-pixel, the blue sub-pixel and the green sub-pixel. In the RGBW pixel 32J, the sequence of the sub-pixels in the 1×4 matrix from left to right is the red sub-pixel, the blue sub-pixel, the green sub-pixel and the white sub-pixel. In the RGBW pixel 32K, the sequence of the sub-pixels in the 1×4 matrix from left to right is the blue sub-pixel, the white sub-pixel, the green sub-pixel and the red sub-pixel. In the image device 222B, the sequence of the pixels from left to right is the RBGB pixel 33C, the RGBY pixel 31L, the RGBW pixel 32J and the RGBW pixel 32K.

Figure 22C:
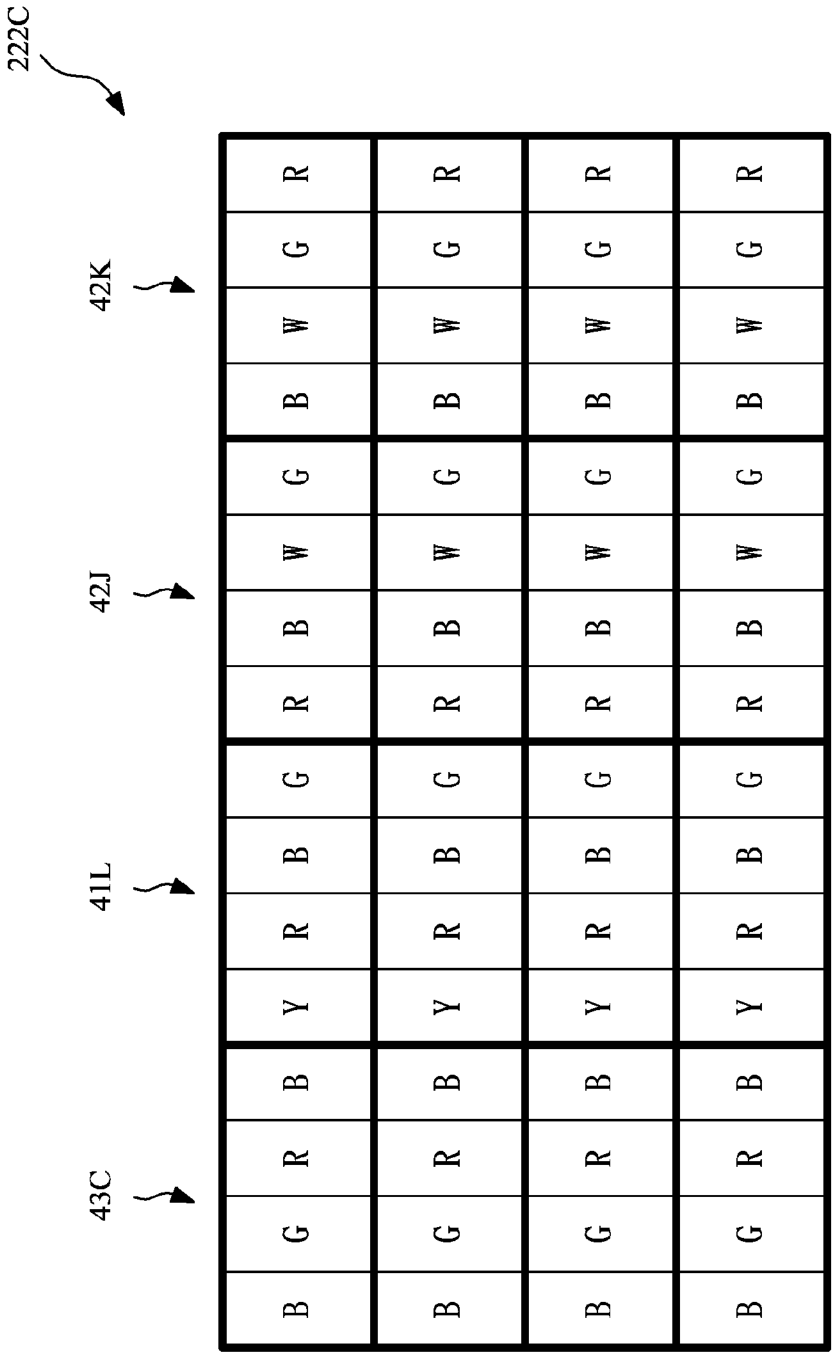
FIG. 22C shows an image device according to an embodiment of the invention.

Referring to FIG. 22C, it shows an image device according to an embodiment of the invention. The image device 222C includes a plurality of RGBY pixels 41L, a plurality of RGBW pixels 42J, 42K and a plurality of RBGB pixels 43C. In the RGBY pixel 41L, the sequence of the sub-pixels in the 1×4 matrix from left to right is the yellow sub-pixel, the red sub-pixel, the blue sub-pixel and the green sub-pixel. In the RGBW pixel 42J, the sequence of the sub-pixels in the 1×4 matrix from left to right is the red sub-pixel, the blue sub-pixel, the green sub-pixel and the white sub-pixel. In the RGBW pixel 42K, the sequence of the sub-pixels in the 1×4 matrix from left to right is the blue sub-pixel, the white sub-pixel, the green sub-pixel and the red sub-pixel. In the image device 222C, the sequence of the pixels from left to right is the RBGB pixel 43C, the RGBY pixel 41L, the RGBW pixel 42J and the RGBW pixel 42K.

Figure 22D:
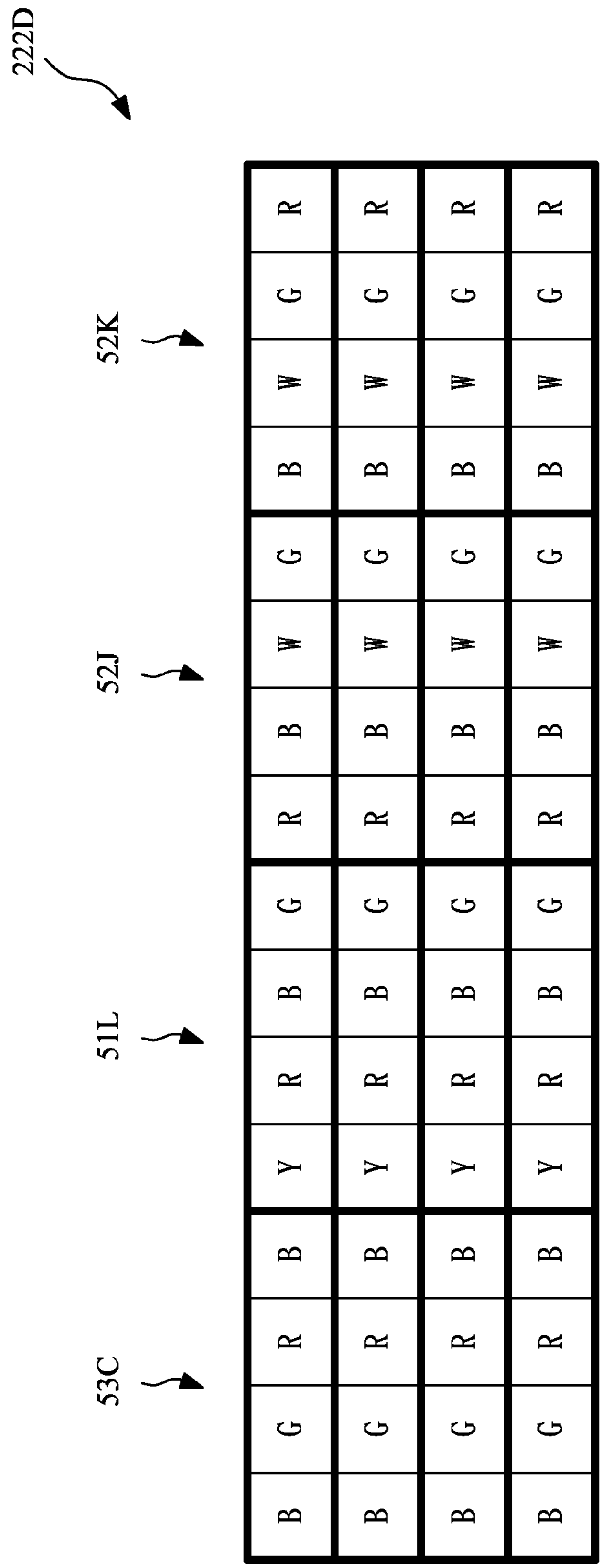
FIG. 22D shows an image device according to an embodiment of the invention.

Referring to FIG. 22D, it shows an image device according to an embodiment of the invention. The image device 222D includes a plurality of RGBY pixels 51L, a plurality of RGBW pixels 52J, 52K and a plurality of RBGB pixels 53C. In the RGBY pixel 51L, the sequence of the sub-pixels in the 1×4 matrix from left to right is the yellow sub-pixel, the red sub-pixel, the blue sub-pixel and the green sub-pixel. In the RGBW pixel 52J, the sequence of the sub-pixels in the 1×4 matrix from left to right is the red sub-pixel, the blue sub-pixel, the green sub-pixel and the white sub-pixel. In the RGBW pixel 52K, the sequence of the sub-pixels in the 1×4 matrix from left to right is the blue sub-pixel, the white sub-pixel, the green sub-pixel and the red sub-pixel. In the image device 222D, the sequence of the pixels from left to right is the RBGB pixel 53C, the RGBY pixel 51L, the RGBW pixel 52J and the RGBW pixel 52K.

Figure 23A:
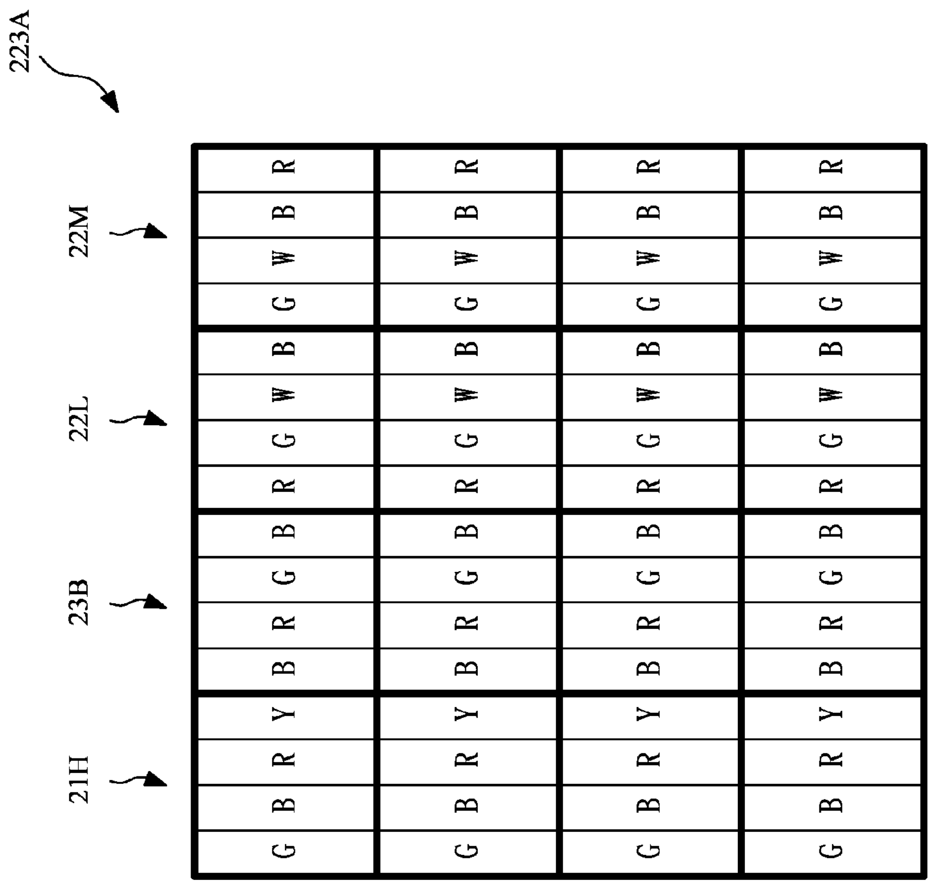
FIG. 23A shows an image device according to an embodiment of the invention.

Referring to FIG. 23A, it shows an image device according to an embodiment of the invention. The image device 223A includes a plurality of RGBY pixels 21H, a plurality of RGBW pixels 22L, 22M and a plurality of RBGB pixels 23B. In the RGBW pixel 22L, the sequence of the sub-pixels in the 1×4 matrix from left to right is the red sub-pixel, the green sub-pixel, the white sub-pixel and the blue sub-pixel. In the RGBW pixel 22M, the sequence of the sub-pixels in the 1×4 matrix from left to right is the green sub-pixel, the white sub-pixel, the blue sub-pixel and the red sub-pixel. In the image device 223A, the sequence of the pixels from left to right is the RGBY pixel 21H, the RBGB pixel 23B, the RGBW pixel 22L and the RGBW pixel 22M.

Figure 23B:
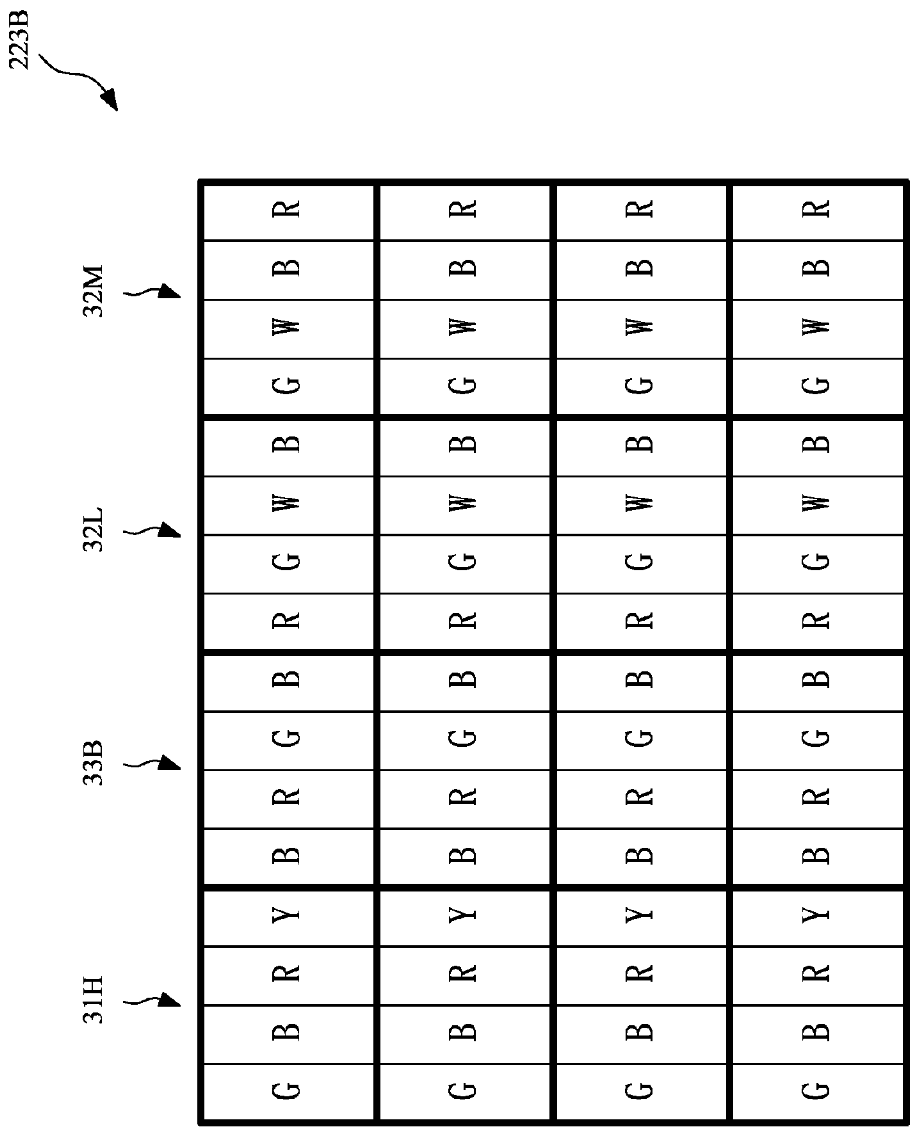
FIG. 23B shows an image device according to an embodiment of the invention.

Referring to FIG. 23B, it shows an image device according to an embodiment of the invention. The image device 223B includes a plurality of RGBY pixels 31H, a plurality of RGBW pixels 32L, 32M and a plurality of RBGB pixels 33B. In the RGBW pixel 32L, the sequence of the sub-pixels in the 1×4 matrix from left to right is the red sub-pixel, the green sub-pixel, the white sub-pixel and the blue sub-pixel. In the RGBW pixel 32M, the sequence of the sub-pixels in the 1×4 matrix from left to right is the green sub-pixel, the white sub-pixel, the blue sub-pixel and the red sub-pixel. In the image device 223B, the sequence of the pixels from left to right is the RGBY pixel 31H, the RBGB pixel 33B, the RGBW pixel 32L and the RGBW pixel 32M.

Figure 23C:
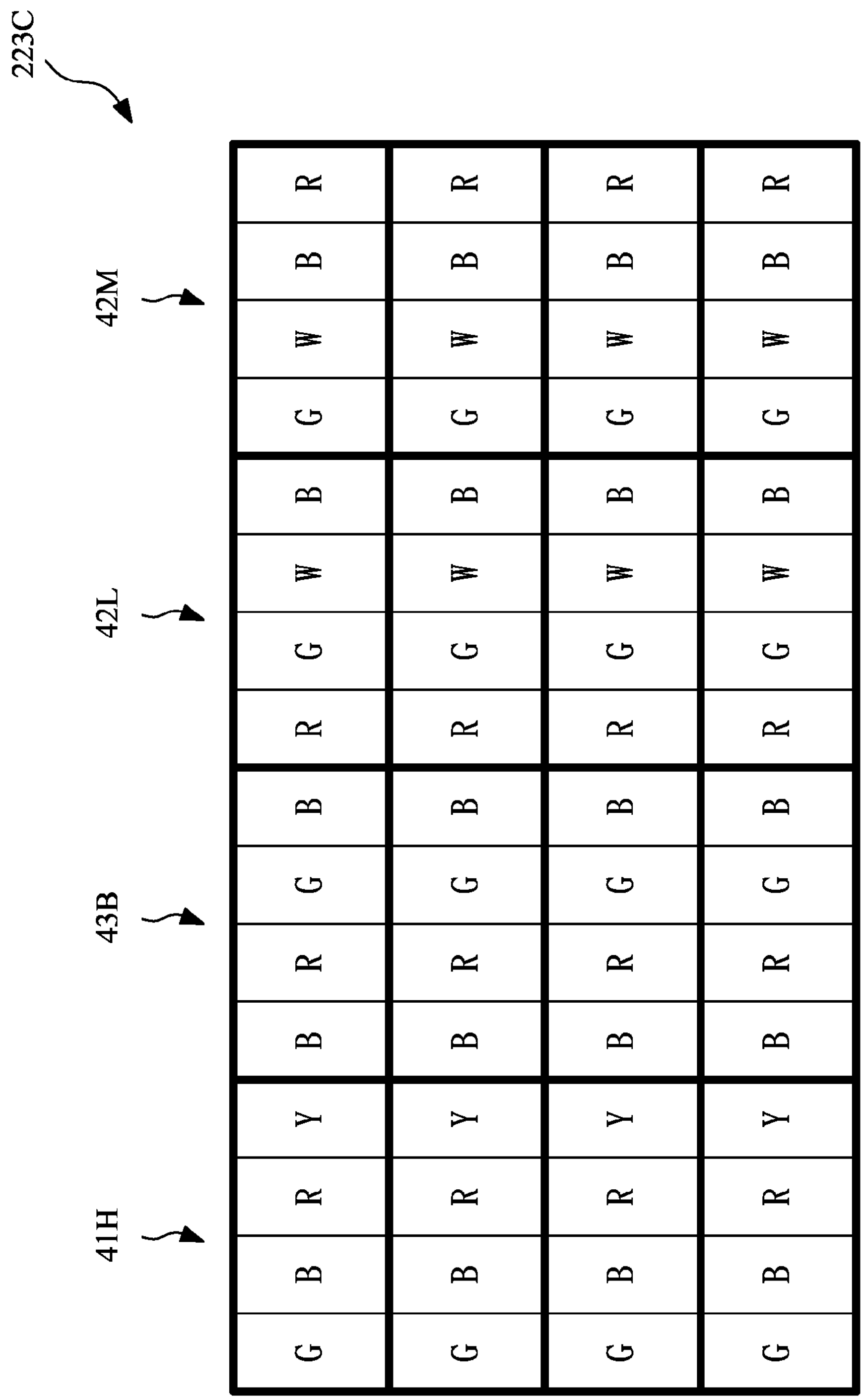
FIG. 23C shows an image device according to an embodiment of the invention.

Referring to FIG. 23C, it shows an image device according to an embodiment of the invention. The image device 223C includes a plurality of RGBY pixels 41H, a plurality of RGBW pixels 42L, 42M and a plurality of RBGB pixels 43B. In the RGBW pixel 42L, the sequence of the sub-pixels in the 1×4 matrix from left to right is the red sub-pixel, the green sub-pixel, the white sub-pixel and the blue sub-pixel. In the RGBW pixel 42M, the sequence of the sub-pixels in the 1×4 matrix from left to right is the green sub-pixel, the white sub-pixel, the blue sub-pixel and the red sub-pixel. In the image device 223C, the sequence of the pixels from left to right is the RGBY pixel 41H, the RBGB pixel 43B, the RGBW pixel 42L and the RGBW pixel 42M.

Figure 23D:
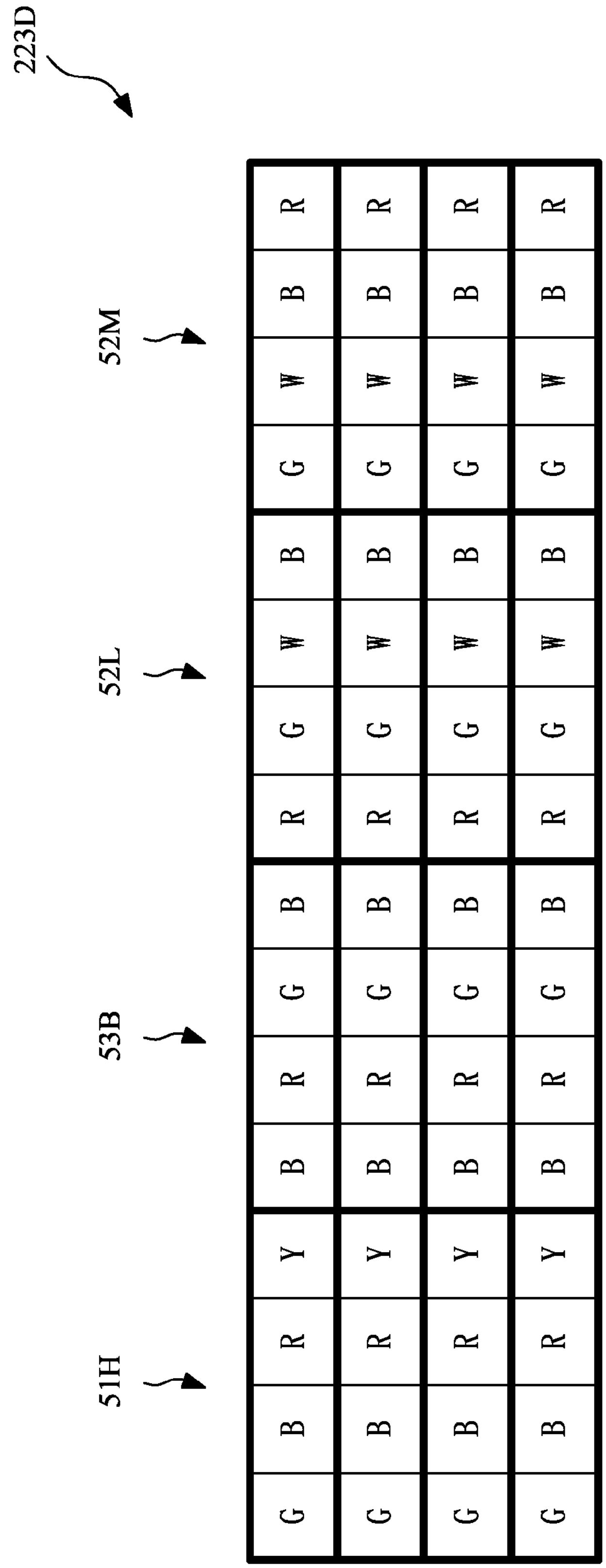
FIG. 23D shows an image device according to an embodiment of the invention.

Referring to FIG. 23D, it shows an image device according to an embodiment of the invention. The image device 223D includes a plurality of RGBY pixels 51H, a plurality of RGBW pixels 52L, 52M and a plurality of RBGB pixels 53B. In the RGBW pixel 52L, the sequence of the sub-pixels in the 1×4 matrix from left to right is the red sub-pixel, the green sub-pixel, the white sub-pixel and the blue sub-pixel. In the RGBW pixel 52M, the sequence of the sub-pixels in the 1×4 matrix from left to right is the green sub-pixel, the white sub-pixel, the blue sub-pixel and the red sub-pixel. In the image device 223D, the sequence of the pixels from left to right is the RGBY pixel 51H, the RBGB pixel 53B, the RGBW pixel 52L and the RGBW pixel 52M.

Figure 24A:
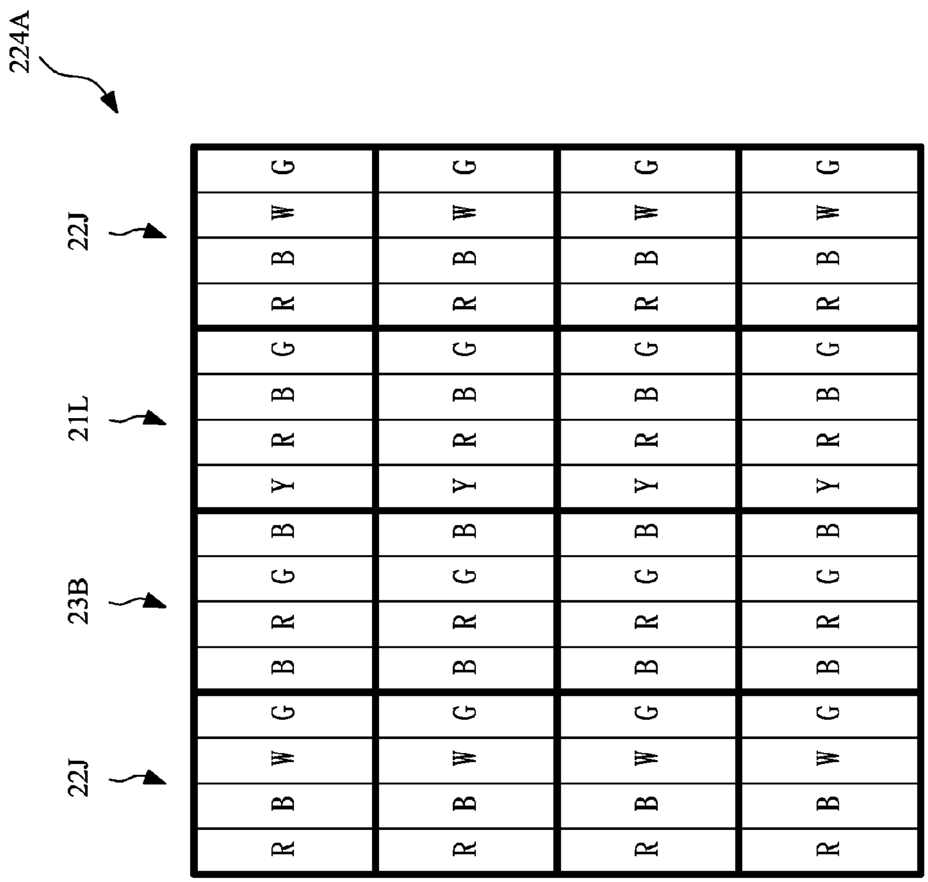
FIG. 24A shows an image device according to an embodiment of the invention.

Referring to FIG. 24A, it shows an image device according to an embodiment of the invention. The image device 224A includes a plurality of RGBY pixels 21L, a plurality of RGBW pixels 22J and a plurality of RBGB pixels 23B. In the image device 224A, the sequence of the pixels from left to right is the RGBW pixel 22J, the RBGB pixel 23B, the RGBY pixel 21L and the RGBW pixel 22J.

Figure 24B:
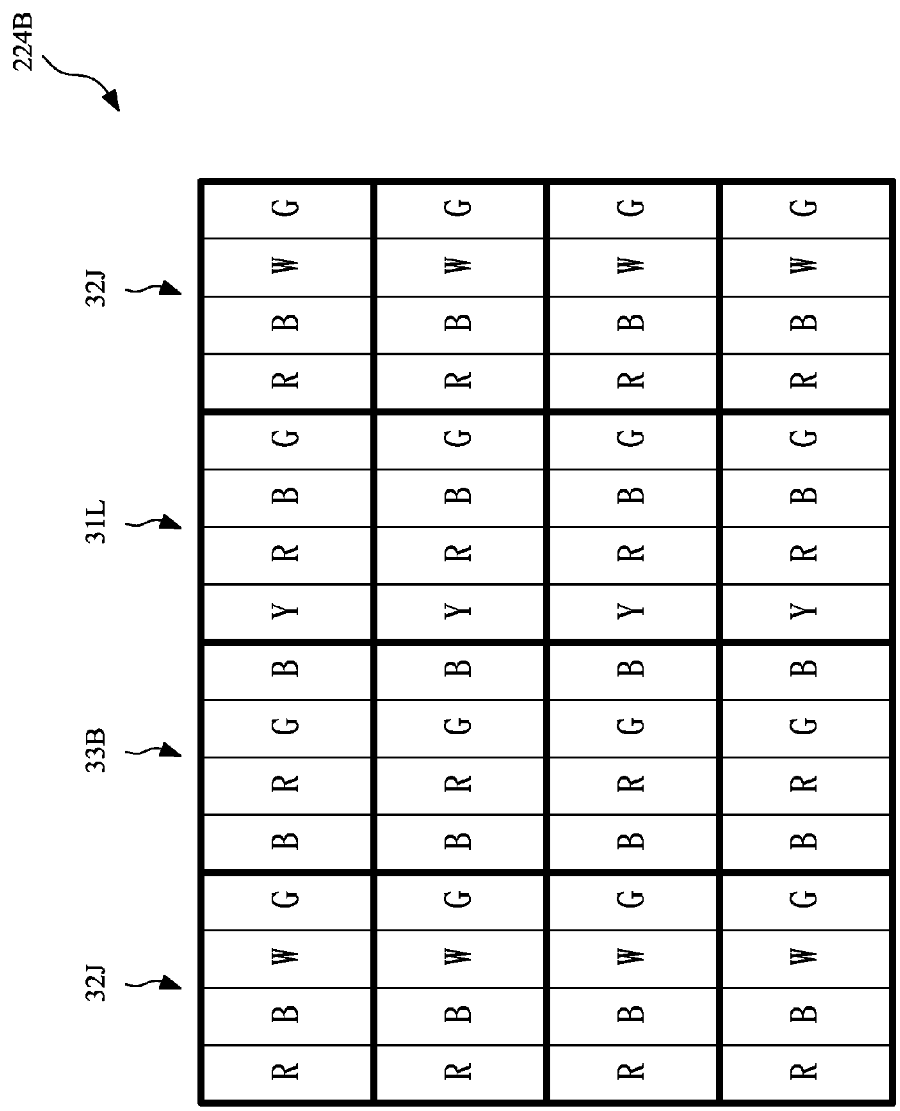
FIG. 24B shows an image device according to an embodiment of the invention.

Referring to FIG. 24B, it shows an image device according to an embodiment of the invention. The image device 224B includes a plurality of RGBY pixels 31L, a plurality of RGBW pixels 32J and a plurality of RBGB pixels 33B. In the image device 224B, the sequence of the pixels from left to right is the RGBW pixel 32J, the RBGB pixel 33B, the RGBY pixel 31L and the RGBW pixel 32J.

Figure 24C:
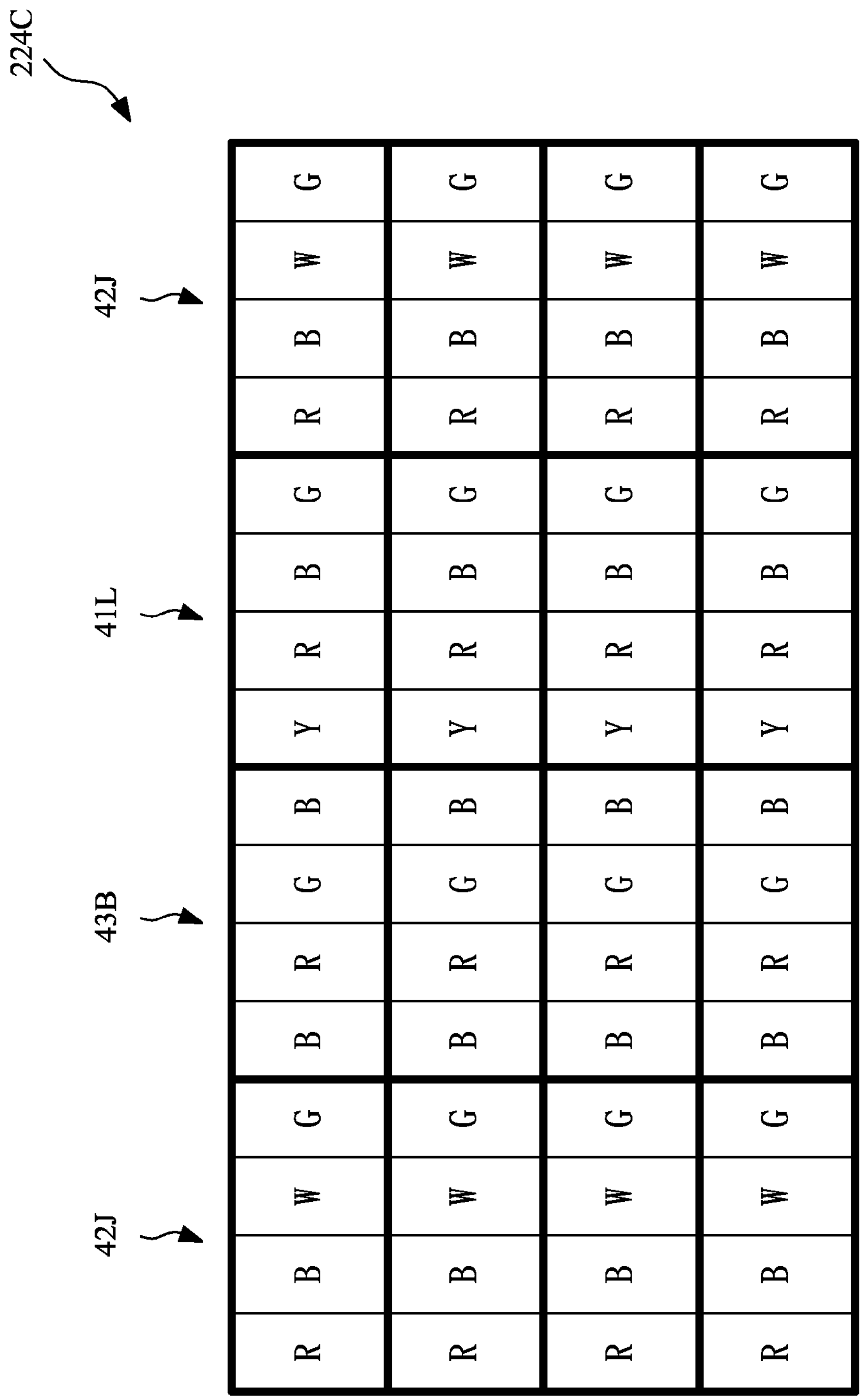
FIG. 24C shows an image device according to an embodiment of the invention.

Referring to FIG. 24C, it shows an image device according to an embodiment of the invention. The image device 224C includes a plurality of RGBY pixels 41L, a plurality of RGBW pixels 42J and a plurality of RBGB pixels 43B. In the image device 224C, the sequence of the pixels from left to right is the RGBW pixel 42J, the RBGB pixel 43B, the RGBY pixel 41L and the RGBW pixel 42J.

Figure 24D:
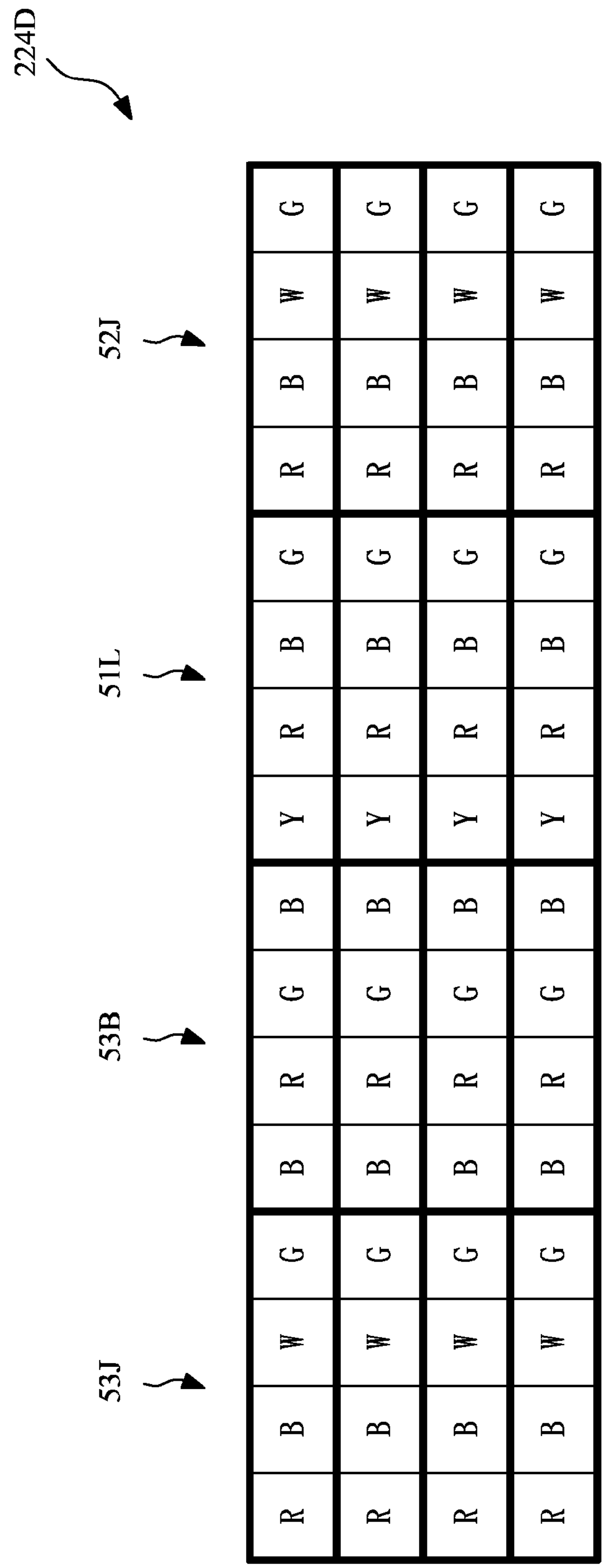
FIG. 24D shows an image device according to an embodiment of the invention.

Referring to FIG. 24D, it shows an image device according to an embodiment of the invention. The image device 224D includes a plurality of RGBY pixels 51L, a plurality of RGBW pixels 52J and a plurality of RBGB pixels 53B. In the image device 224D, the sequence of the pixels from left to right is the RGBW pixel 52J, the RBGB pixel 53B, the RGBY pixel 51L and the RGBW pixel 52J.

Figure 25A:
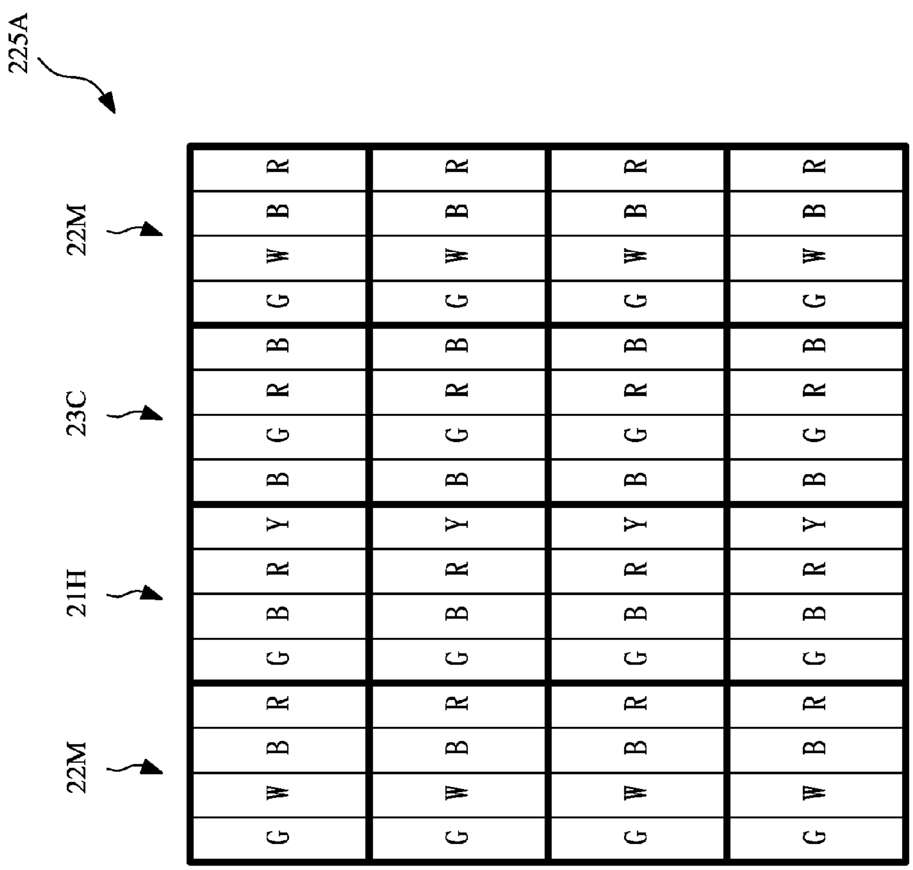
FIG. 25A shows an image device according to an embodiment of the invention.

Referring to FIG. 25A, it shows an image device according to an embodiment of the invention. The image device 225A includes a plurality of RGBY pixels 21H, a plurality of RGBW pixels 22M and a plurality of RBGB pixels 23C. In the image device 225A, the sequence of the pixels from left to right is the RGBW pixel 22M, the RGBY pixel 21H, the RBGB pixel 23C and the RGBW pixel 22M.

Figure 25B:
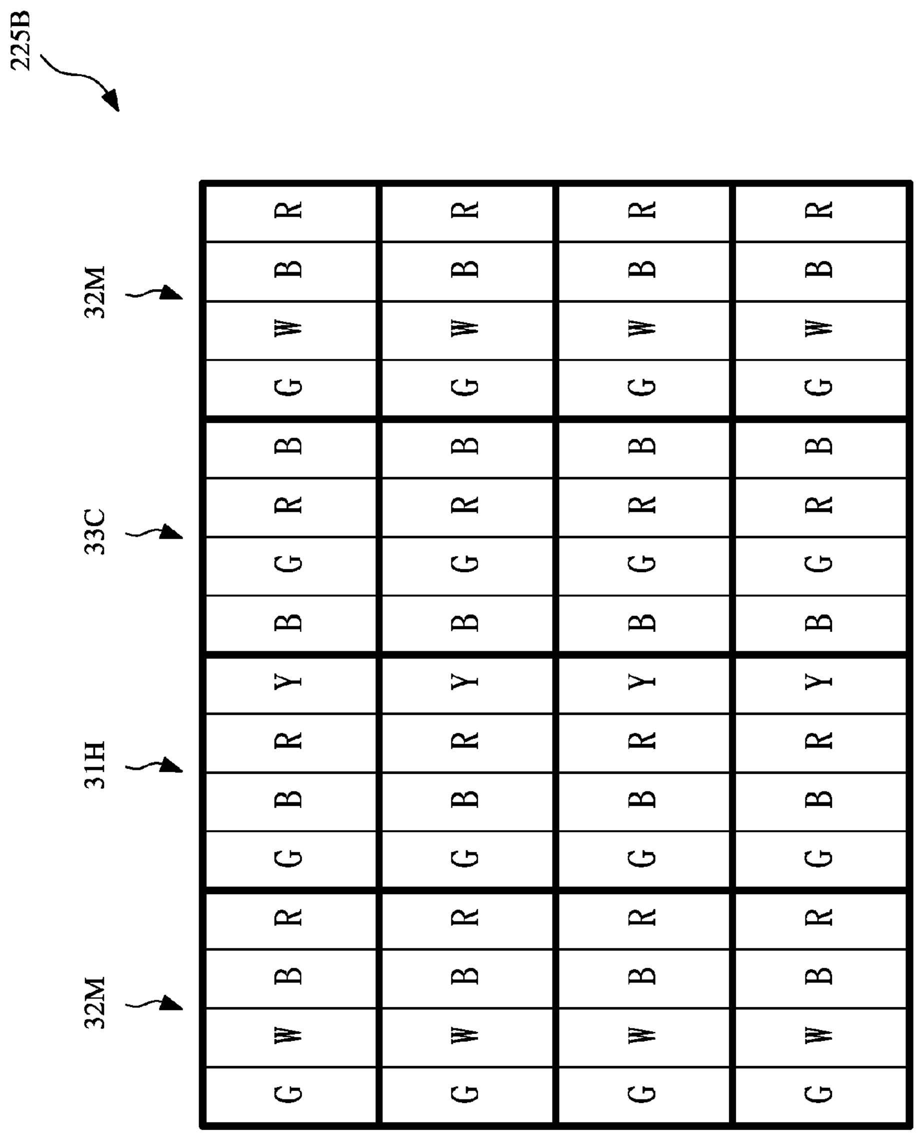
FIG. 25B shows an image device according to an embodiment of the invention.

Referring to FIG. 25B, it shows an image device according to an embodiment of the invention. The image device 225B includes a plurality of RGBY pixels 31H, a plurality of RGBW pixels 32M and a plurality of RBGB pixels 33C. In the image device 225B, the sequence of the pixels from left to right is the RGBW pixel 32M, the RGBY pixel 31H, the RBGB pixel 33C and the RGBW pixel 32M.

Figure 25C:
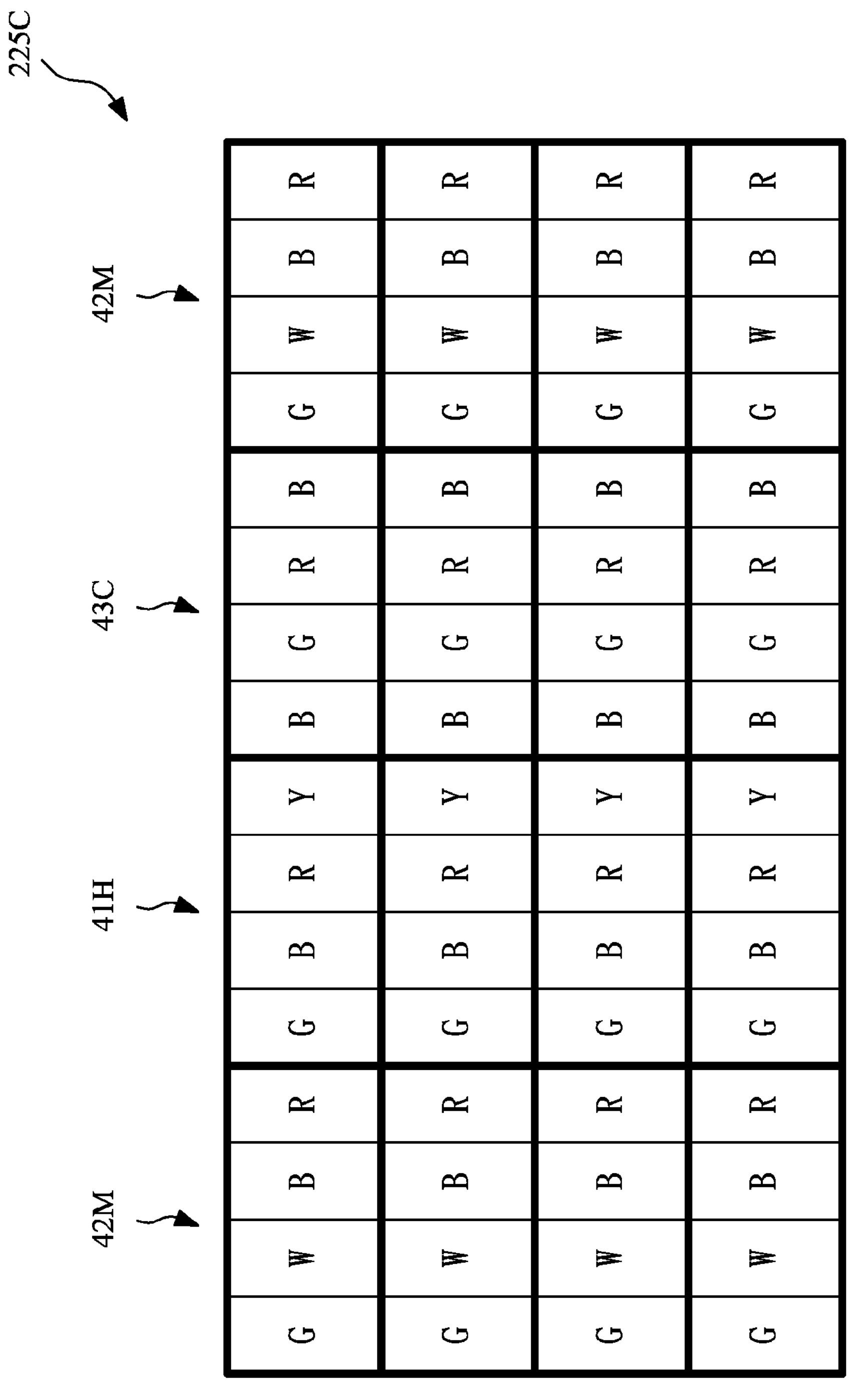
FIG. 25C shows an image device according to an embodiment of the invention.

Referring to FIG. 25C, it shows an image device according to an embodiment of the invention. The image device 225C includes a plurality of RGBY pixels 41H, a plurality of RGBW pixels 42M and a plurality of RBGB pixels 43C. In the image device 225C, the sequence of the pixels from left to right is the RGBW pixel 42M, the RGBY pixel 41H, the RBGB pixel 43C and the RGBW pixel 42M.

Figure 25D:
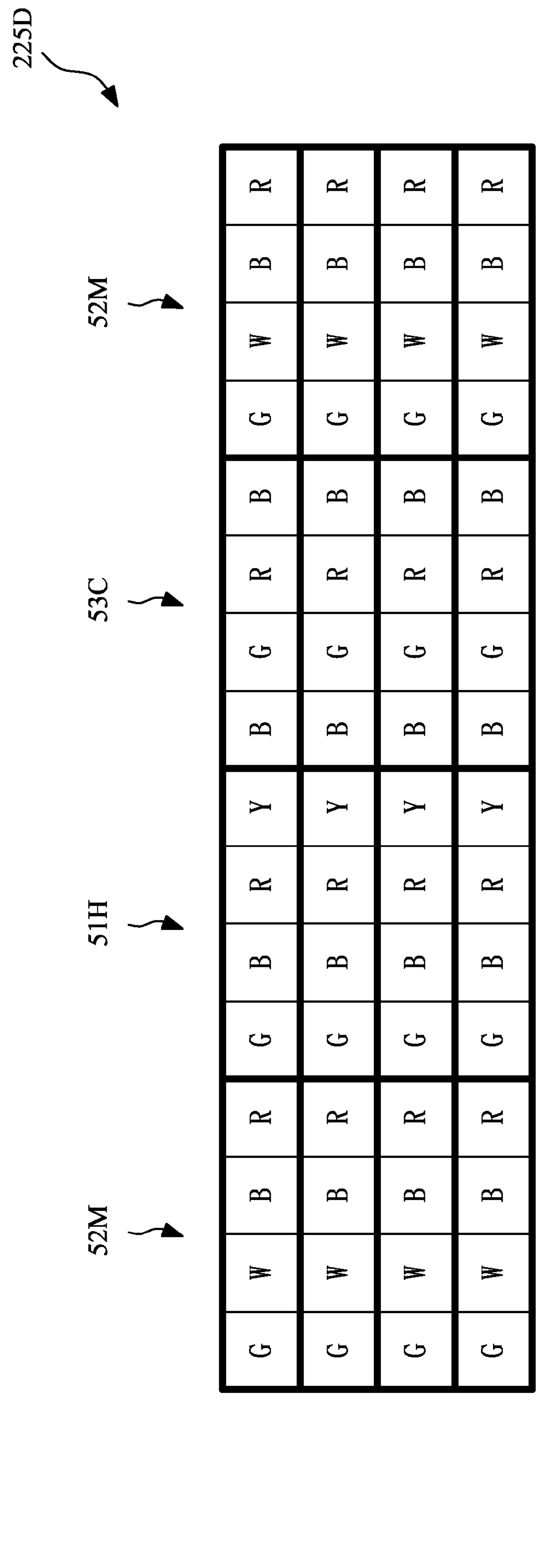
FIG. 25D shows an image device according to an embodiment of the invention.

Referring to FIG. 25D, it shows an image device according to an embodiment of the invention. The image device 225D includes a plurality of RGBY pixels 51H, a plurality of RGBW pixels 52M and a plurality of RBGB pixels 53C. In the image device 225D, the sequence of the pixels from left to right is the RGBW pixel 52M, the RGBY pixel 51H, the RBGB pixel 53C and the RGBW pixel 52M.

Figure 26A:
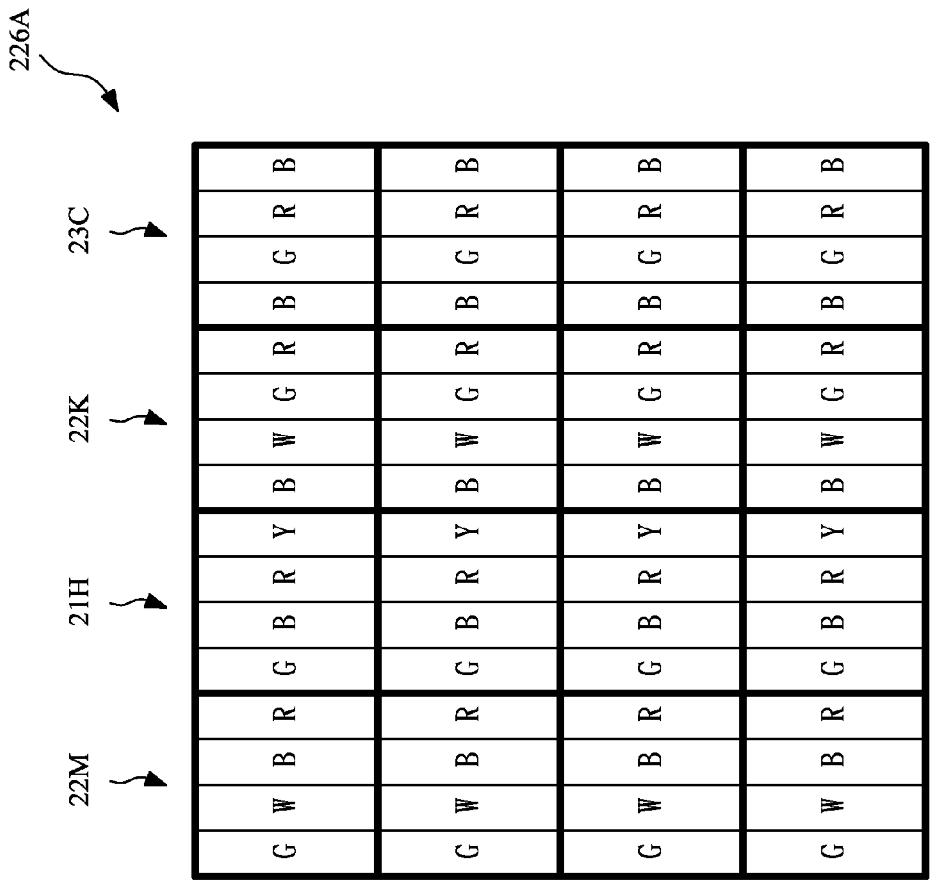
FIG. 26A shows an image device according to an embodiment of the invention.

Referring to FIG. 26A, it shows an image device according to an embodiment of the invention. The image device 226A includes a plurality of RGBY pixels 21I4, a plurality of RGBW pixels 22M, 22K and a plurality of RBGB pixels 23C. In the image device 226A, the sequence of the pixels from left to right is the RGBW pixel 22M, the RGBY pixel 21H, the RGBW pixel 22K and the RBGB pixel 23C.

Figure 26B:
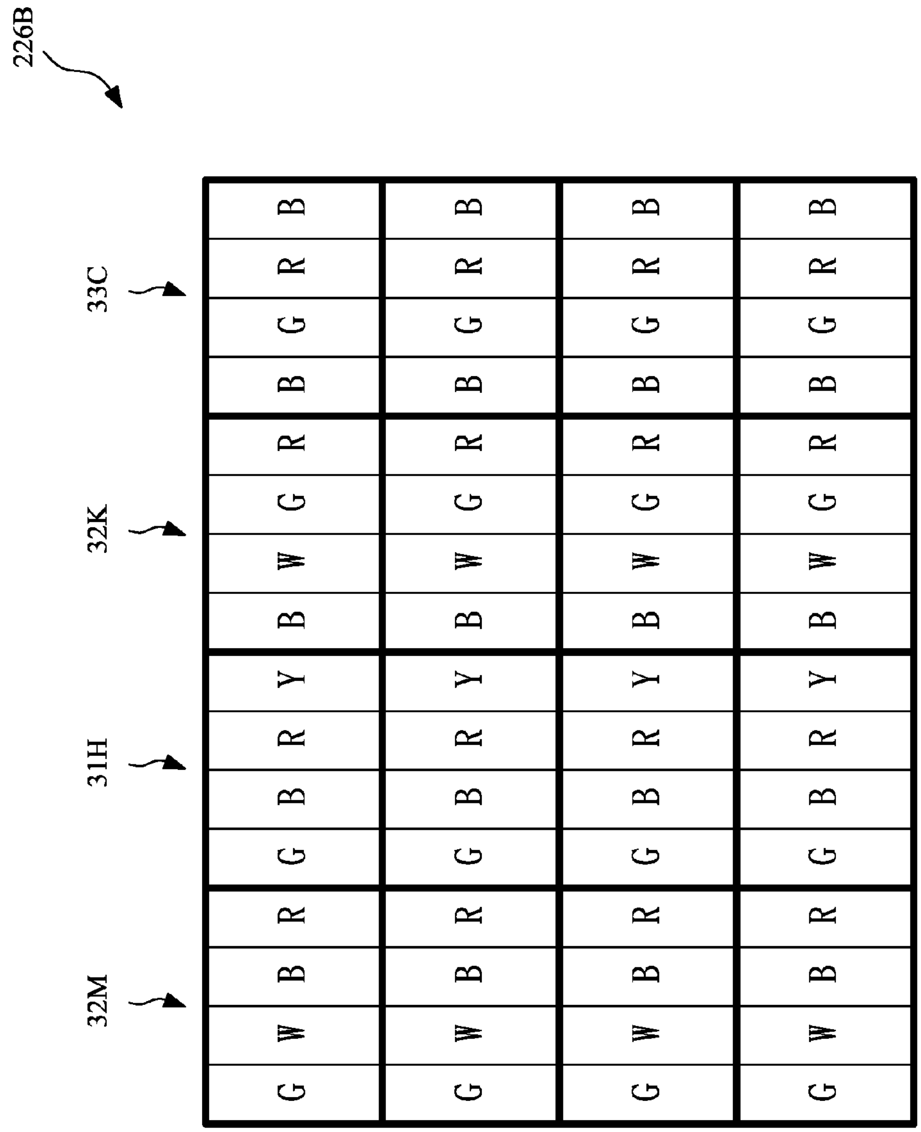
FIG. 26B shows an image device according to an embodiment of the invention.

Referring to FIG. 26B, it shows an image device according to an embodiment of the invention. The image device 226B includes a plurality of RGBY pixels 31H, a plurality of RGBW pixels 32M, 32K and a plurality of RBGB pixels 33C. In the image device 226B, the sequence of the pixels from left to right is the RGBW pixel 32M, the RGBY pixel 31I1, the RGBW pixel 32K and the RBGB pixel 33C.

Figure 26C:
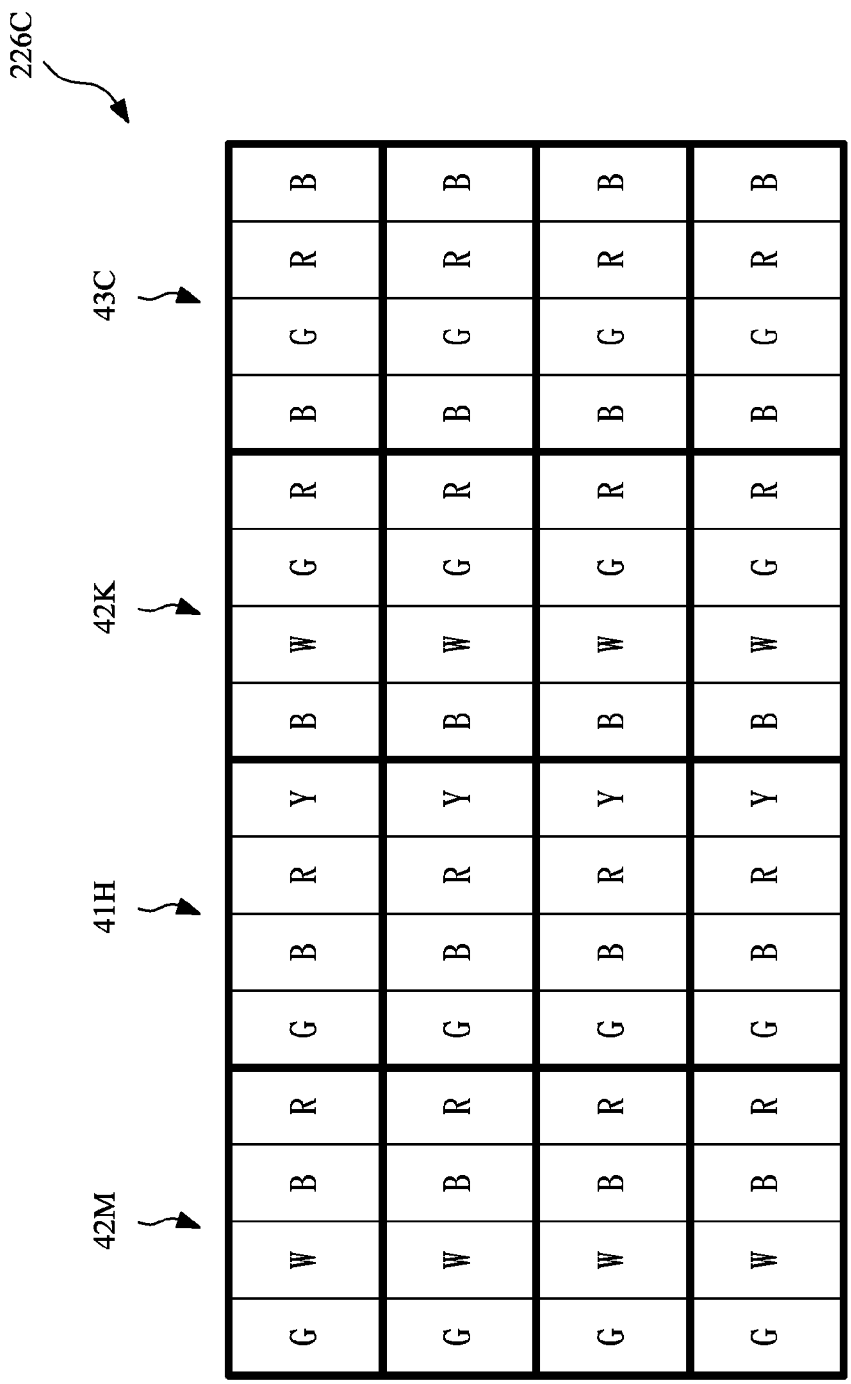
FIG. 26C shows an image device according to an embodiment of the invention.

Referring to FIG. 26C, it shows an image device according to an embodiment of the invention. The image device 226C includes a plurality of RGBY pixels 41H, a plurality of RGBW pixels 42M, 42K and a plurality of RBGB pixels 43C. In the image device 226C, the sequence of the pixels from left to right is the RGBW pixel 42M, the RGBY pixel 41H, the RGBW pixel 42K and the RBGB pixel 43C.

Figure 26D:
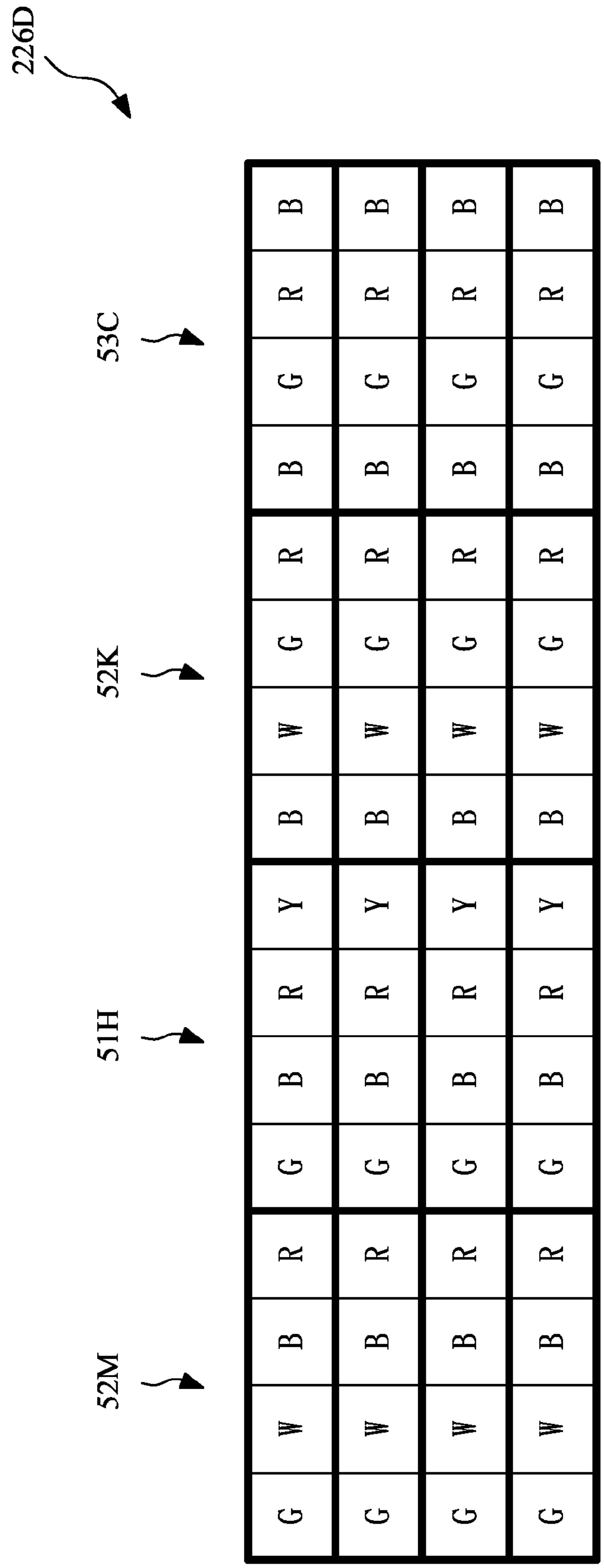
FIG. 26D shows an image device according to an embodiment of the invention.

Referring to FIG. 26D, it shows an image device according to an embodiment of the invention. The image device 226D includes a plurality of RGBY pixels 51H, a plurality of RGBW pixels 52M, 52K and a plurality of RBGB pixels 53C. In the image device 226D, the sequence of the pixels from left to right is the RGBW pixel 52M, the RGBY pixel 51H, the RGBW pixel 52K and the RBGB pixel 53C.

Figure 27A:
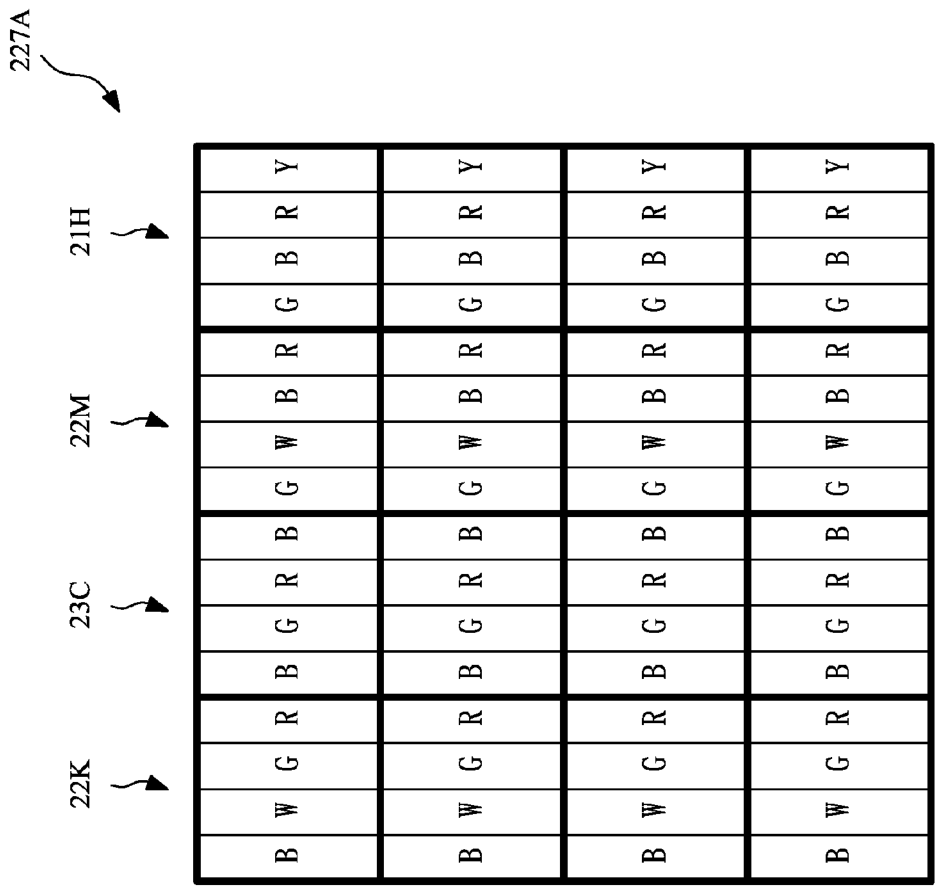
FIG. 27A shows an image device according to an embodiment of the invention.

Referring to FIG. 27A, it shows an image device according to an embodiment of the invention. The image device 227A includes a plurality of RGBY pixels 21H, a plurality of RGBW pixels 22M, 22K and a plurality of RBGB pixels 23C. In the image device 227A, the sequence of the pixels from left to right is the RGBW pixel 22K, the RBGB pixel 23C, the RGBW pixel 22M and the RGBY pixel 21H.

Figure 27B:
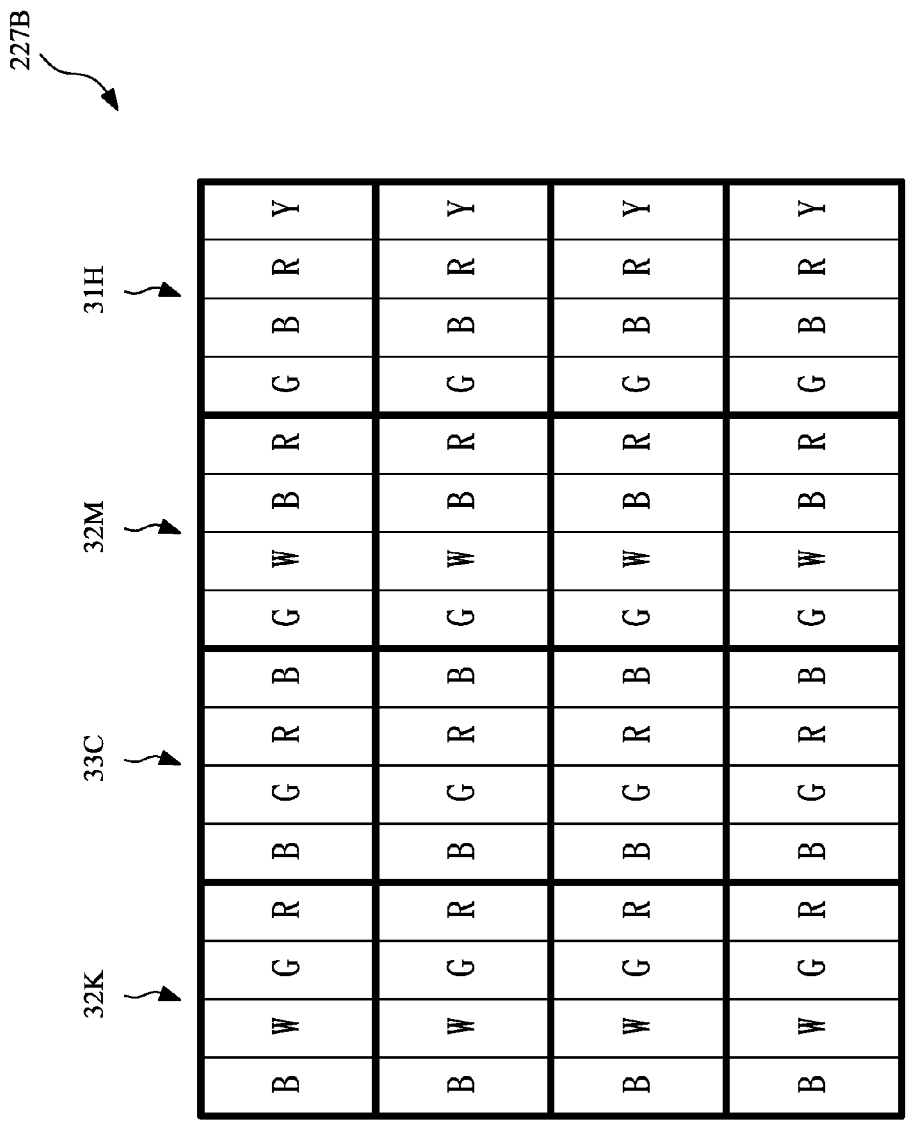
FIG. 27B shows an image device according to an embodiment of the invention.

Referring to FIG. 27B, it shows an image device according to an embodiment of the invention. The image device 227B includes a plurality of RGBY pixels 31H, a plurality of RGBW pixels 32M, 32K and a plurality of RBGB pixels 33C. In the image device 227B, the sequence of the pixels from left to right is the RGBW pixel 32K, the RBGB pixel 33C, the RGBW pixel 32M and the RGBY pixel 31H.

Figure 27C:
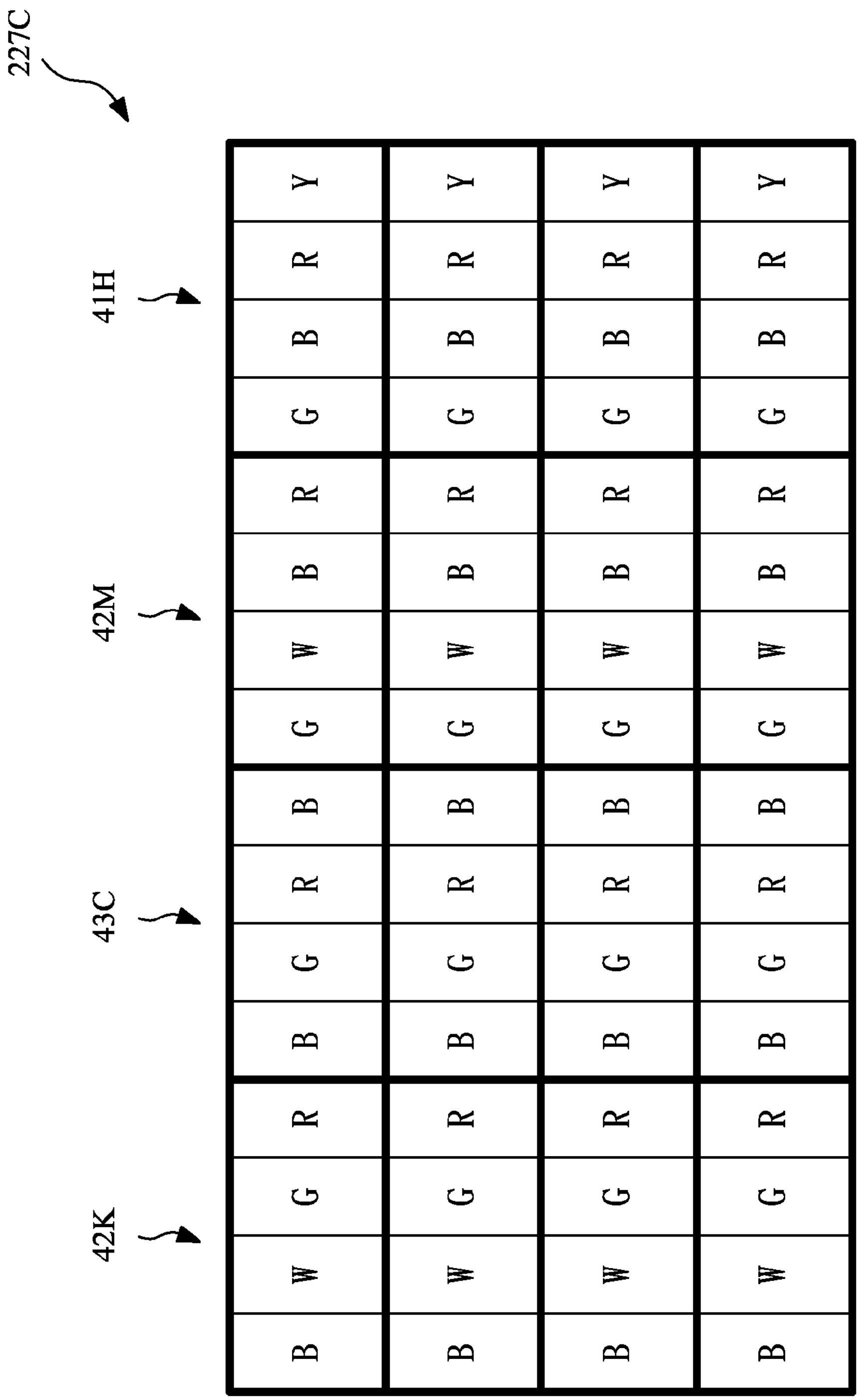
FIG. 27C shows an image device according to an embodiment of the invention.

Referring to FIG. 27C, it shows an image device according to an embodiment of the invention. The image device 227C includes a plurality of RGBY pixels 41H, a plurality of RGBW pixels 42M, 42K and a plurality of RBGB pixels 43C. In the image device 227C, the sequence of the pixels from left to right is the RGBW pixel 42K, the RBGB pixel 43C, the RGBW pixel 42M and the RGBY pixel 41H.

Figure 27D:
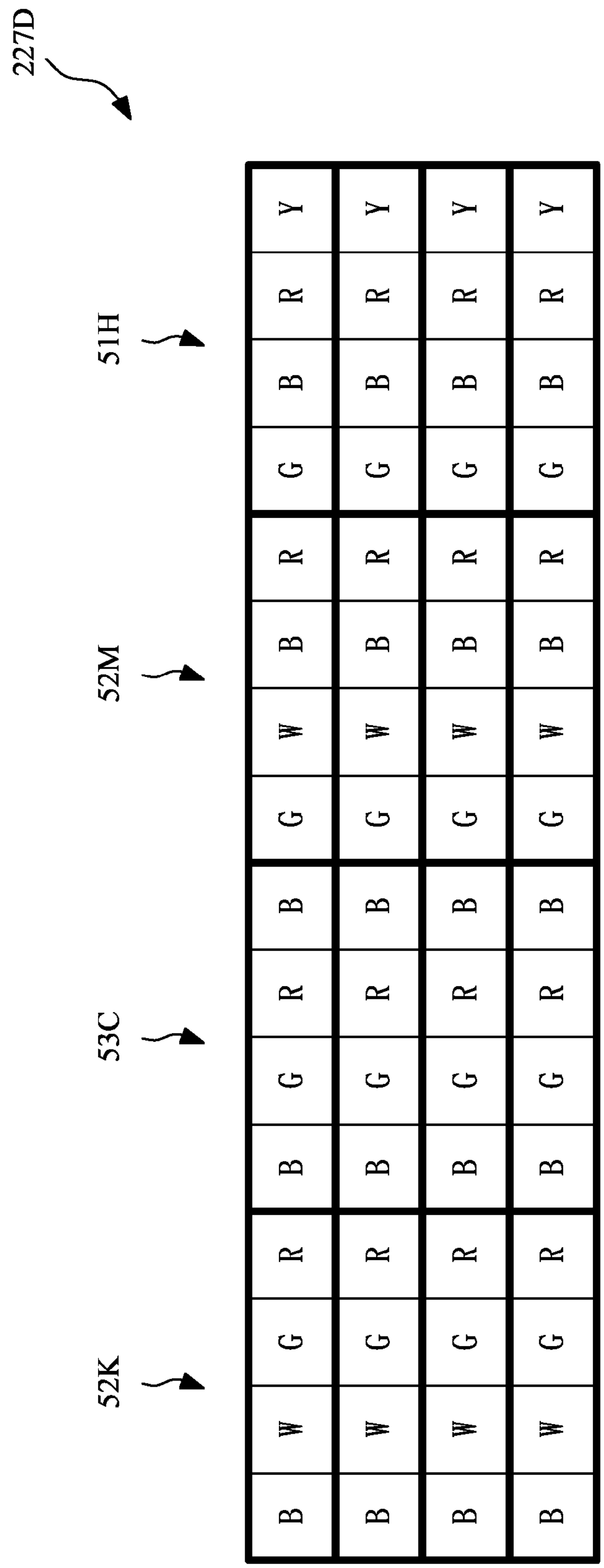
FIG. 27D shows an image device according to an embodiment of the invention.

Referring to FIG. 27D, it shows an image device according to an embodiment of the invention. The image device 227D includes a plurality of RGBY pixels 51H, a plurality of RGBW pixels 52M, 52K and a plurality of RBGB pixels 53C. In the image device 227D, the sequence of the pixels from left to right is the RGBW pixel 52K, the RBGB pixel 53C, the RGBW pixel 52M and the RGBY pixel 51H.

Figure 28A:
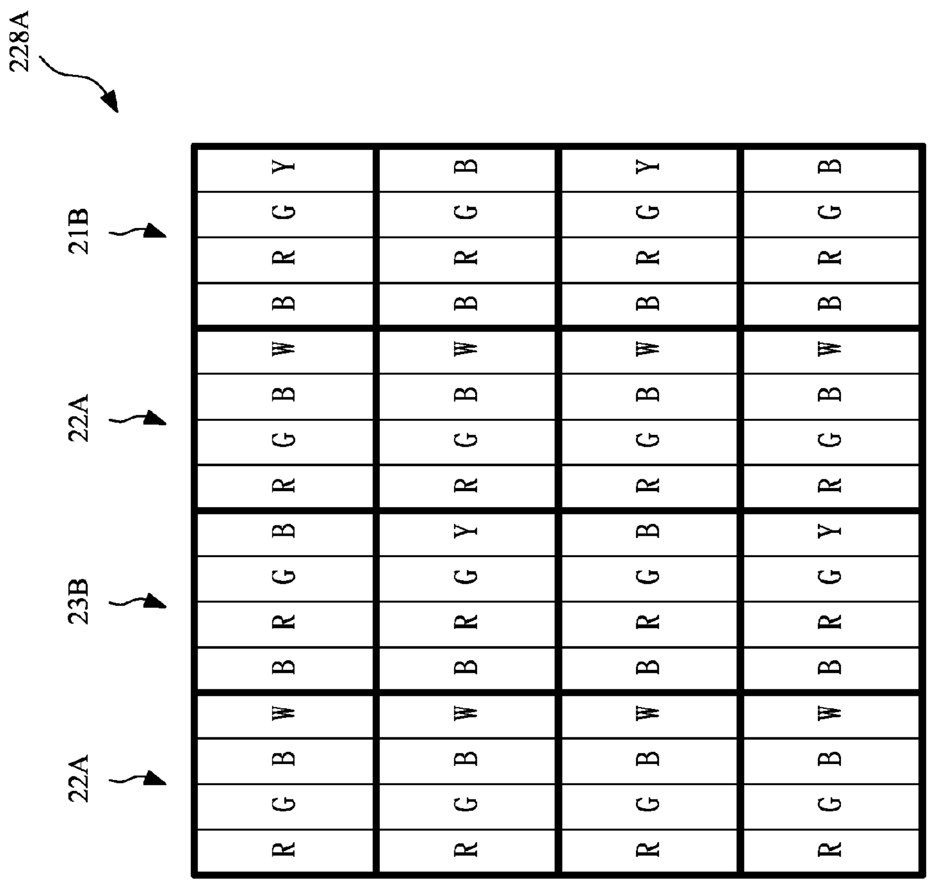
FIG. 28A shows an image device according to an embodiment of the invention.

Referring to FIG. 28A, it shows an image device according to an embodiment of the invention. The image device 228A includes a plurality of RGBY pixels 21B, a plurality of RGBW pixels 22A and a plurality of RBGB pixels 23B. In the first row of the image device 228A, the sequence of the pixels from left to right is the RGBW pixel 22A, the RBGB pixel 23B, the RGBW pixel 22A and the RGBY pixel 21B. In the second row of the image device 228A, the sequence of the pixels from left to right is the RGBW pixel 22A, the RGBY pixel 21B, the RGBW pixel 22A and the RBGB pixel 23B.

Figure 28B:
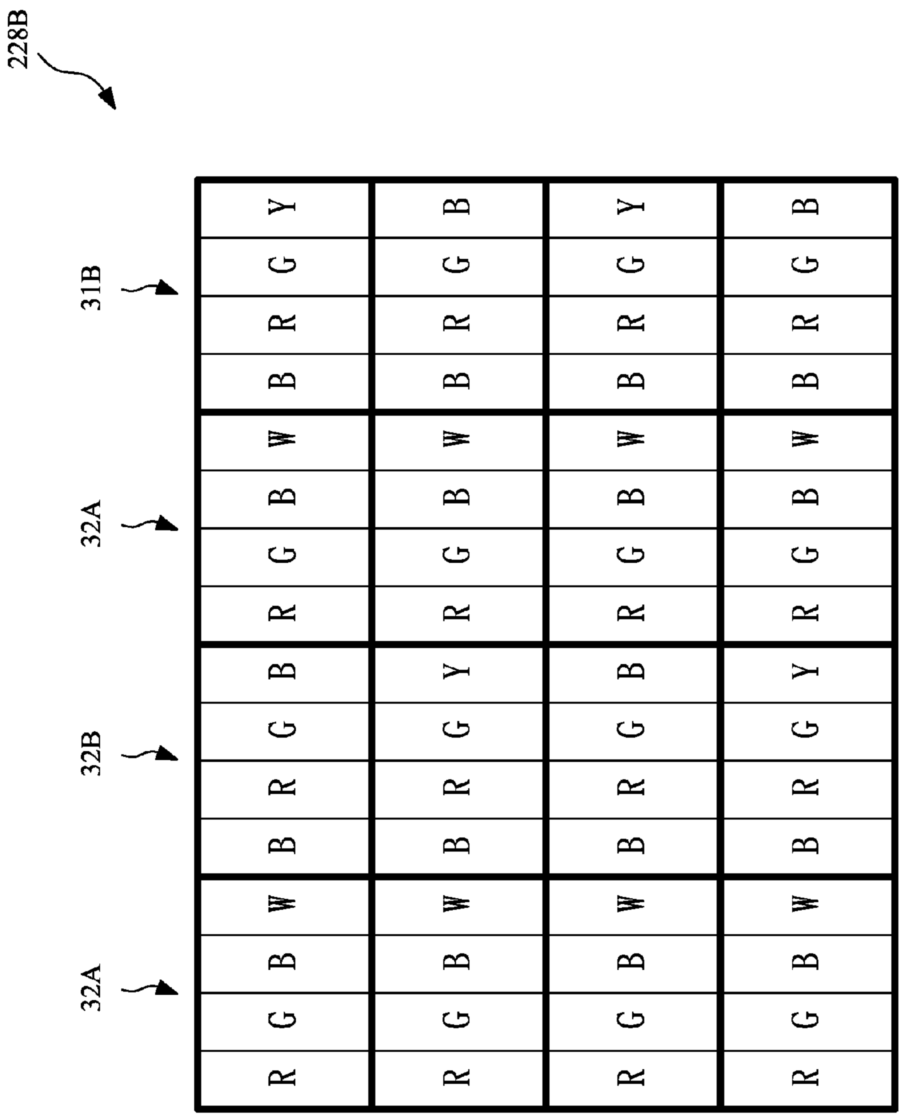
FIG. 28B shows an image device according to an embodiment of the invention.

Referring to FIG. 28B, it shows an image device according to an embodiment of the invention. The image device 228B includes a plurality of RGBY pixels 31B, a plurality of RGBW pixels 32A and a plurality of RBGB pixels 33B. In the first row of the image device 228B, the sequence of the pixels from left to right is the RGBW pixel 32A, the RBGB pixel 33B, the RGBW pixel 32A and the RGBY pixel 31B. In the second row of the image device 228B, the sequence of the pixels from left to right is the RGBW pixel 32A, the RGBY pixel 31B, the RGBW pixel 32A and the RBGB pixel 33B.

Figure 28C:
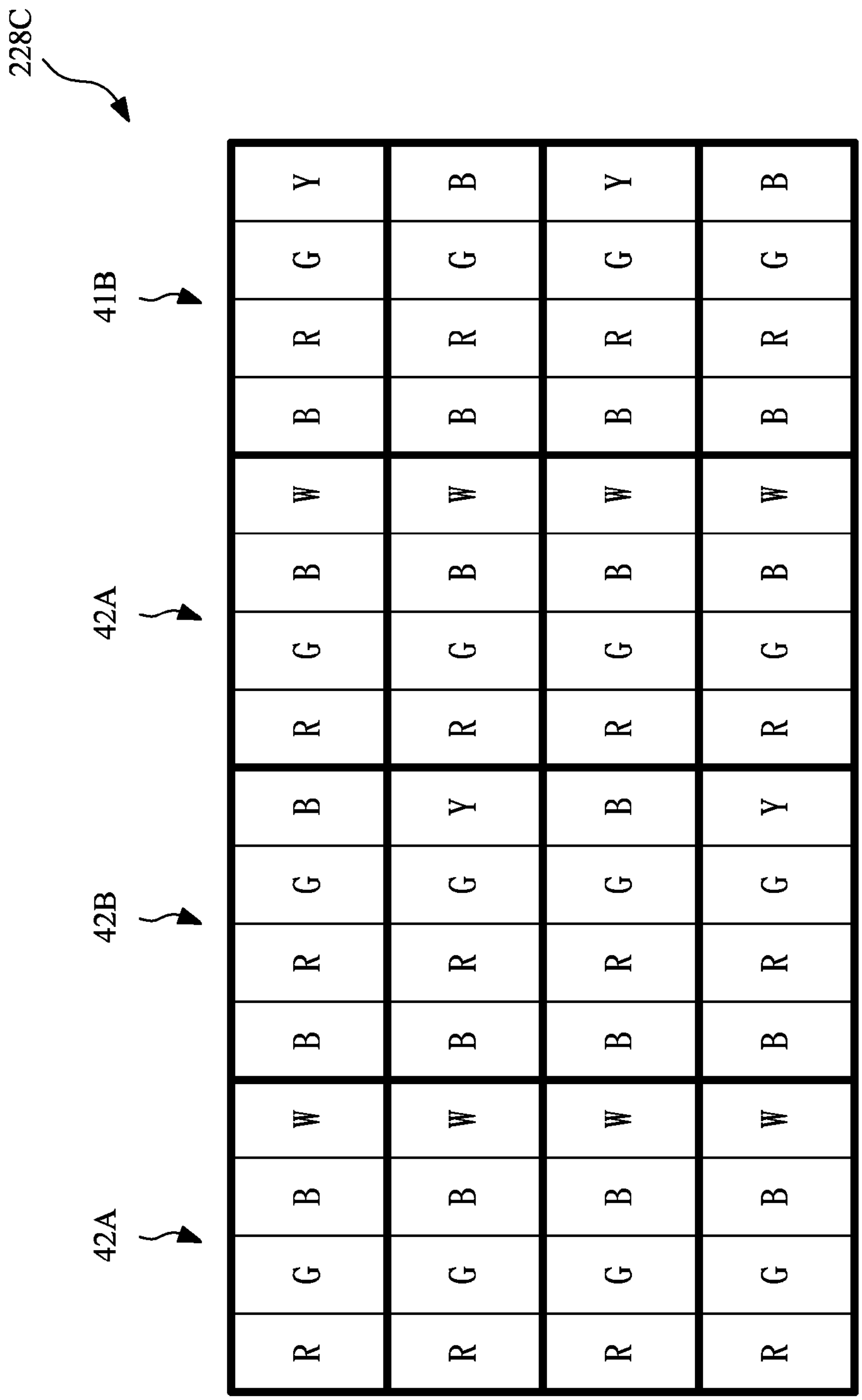
FIG. 28C shows an image device according to an embodiment of the invention.

Referring to FIG. 28C, it shows an image device according to an embodiment of the invention. The image device 228C includes a plurality of RGBY pixels 41B, a plurality of RGBW pixels 42A and a plurality of RBGB pixels 43B. In the first row of the image device 228C, the sequence of the pixels from left to right is the RGBW pixel 42A, the RBGB pixel 43B, the RGBW pixel 42A and the RGBY pixel 41B. In the second row of the image device 228C, the sequence of the pixels from left to right is the RGBW pixel 42A, the RGBY pixel 41B, the RGBW pixel 42A and the RBGB pixel 43B.

Figure 28D:
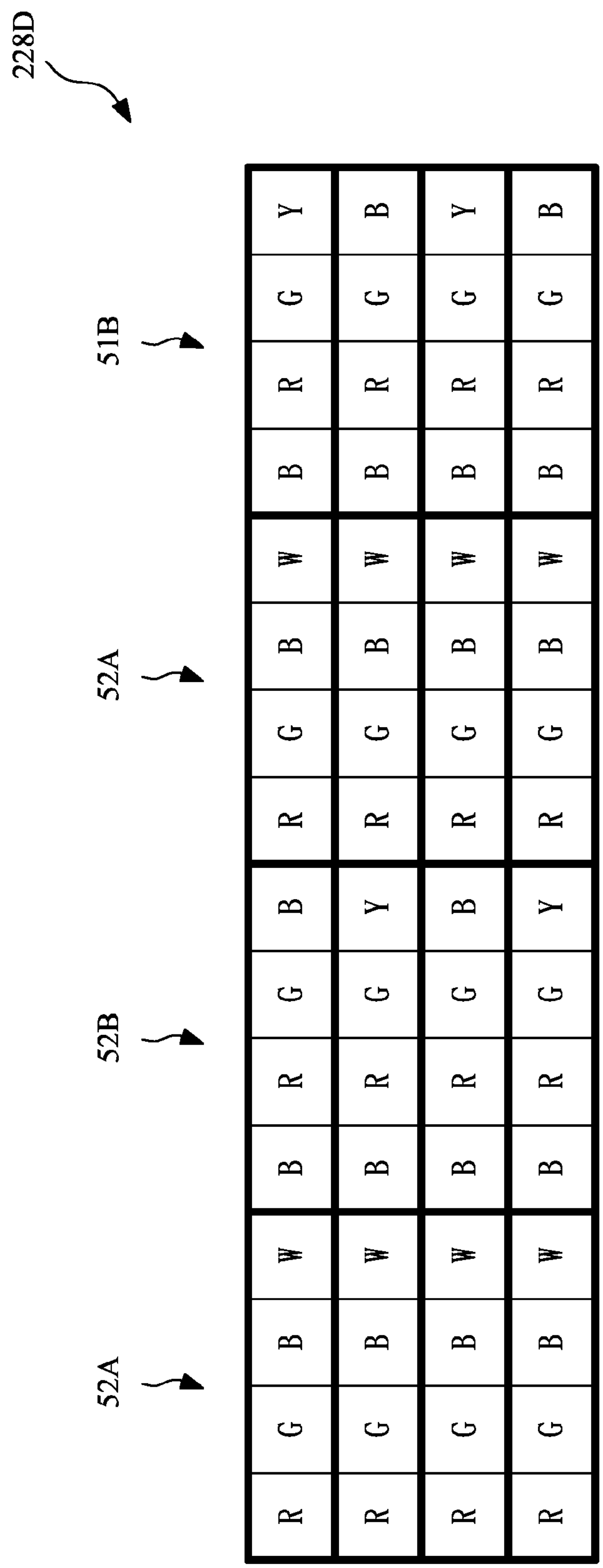
FIG. 28D shows an image device according to an embodiment of the invention.

Referring to FIG. 28D, it shows an image device according to an embodiment of the invention. The image device 228D includes a plurality of RGBY pixels 51B, a plurality of RGBW pixels 52A and a plurality of RBGB pixels 53B. In the first row of the image device 228D, the sequence of the pixels from left to right is the RGBW pixel 52A, the RBGB pixel 53B, the RGBW pixel 52A and the RGBY pixel 51B. In the second row of the image device 228D, the sequence of the pixels from left to right is the RGBW pixel 52A, the RGBY pixel 51B, the RGBW pixel 52A and the RBGB pixel 53B.

Figure 29A:
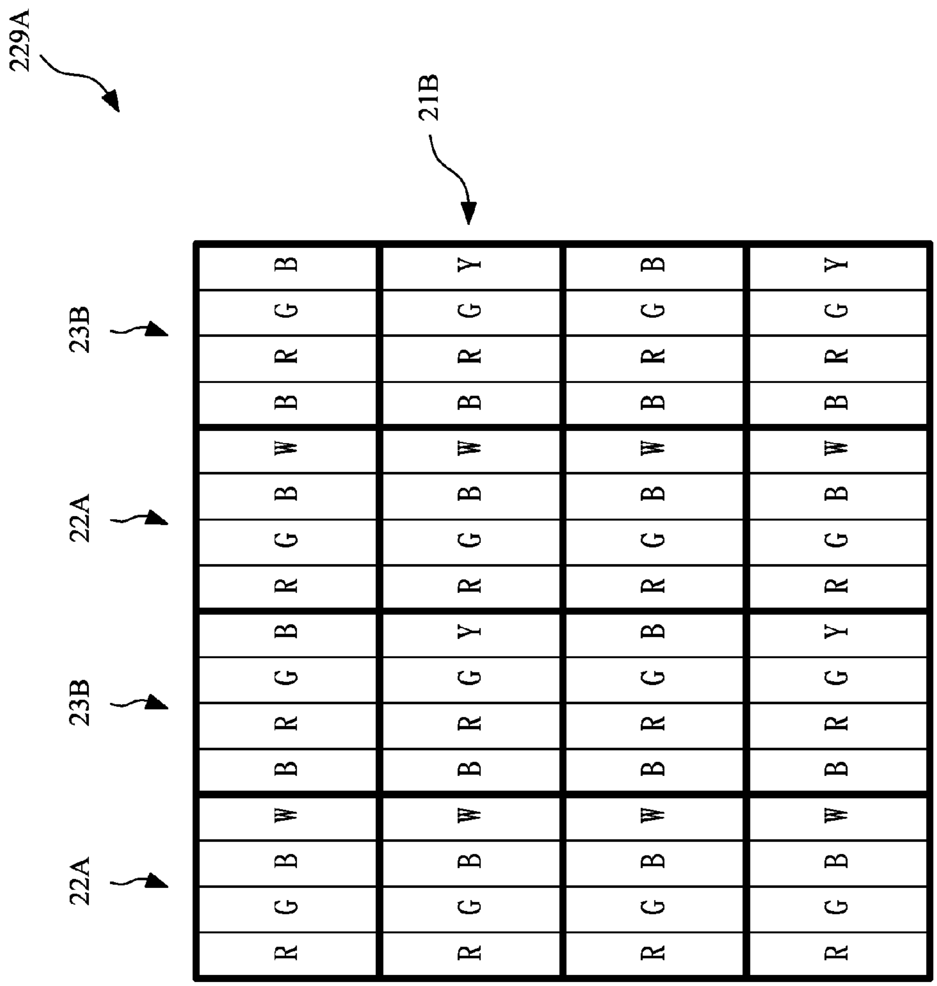
FIG. 29A shows an image device according to an embodiment of the invention.

Referring to FIG. 29A, it shows an image device according to an embodiment of the invention. The image device 229A includes a plurality of RGBY pixels 21B, a plurality of RGBW pixels 22A and a plurality of RBGB pixels 23B. In the first row of the image device 229A, the sequence of the pixels from left to right is the RGBW pixel 22A, the RBGB pixel 23B, the RGBW pixel 22A and the RBGB pixel 23B. In the second row of the image device 229A, the sequence of the pixels from left to right is the RGBW pixel 22A, the RGBY pixel 21B, the RGBW pixel 22A and the RGBY pixel 21B.

Figure 29B:
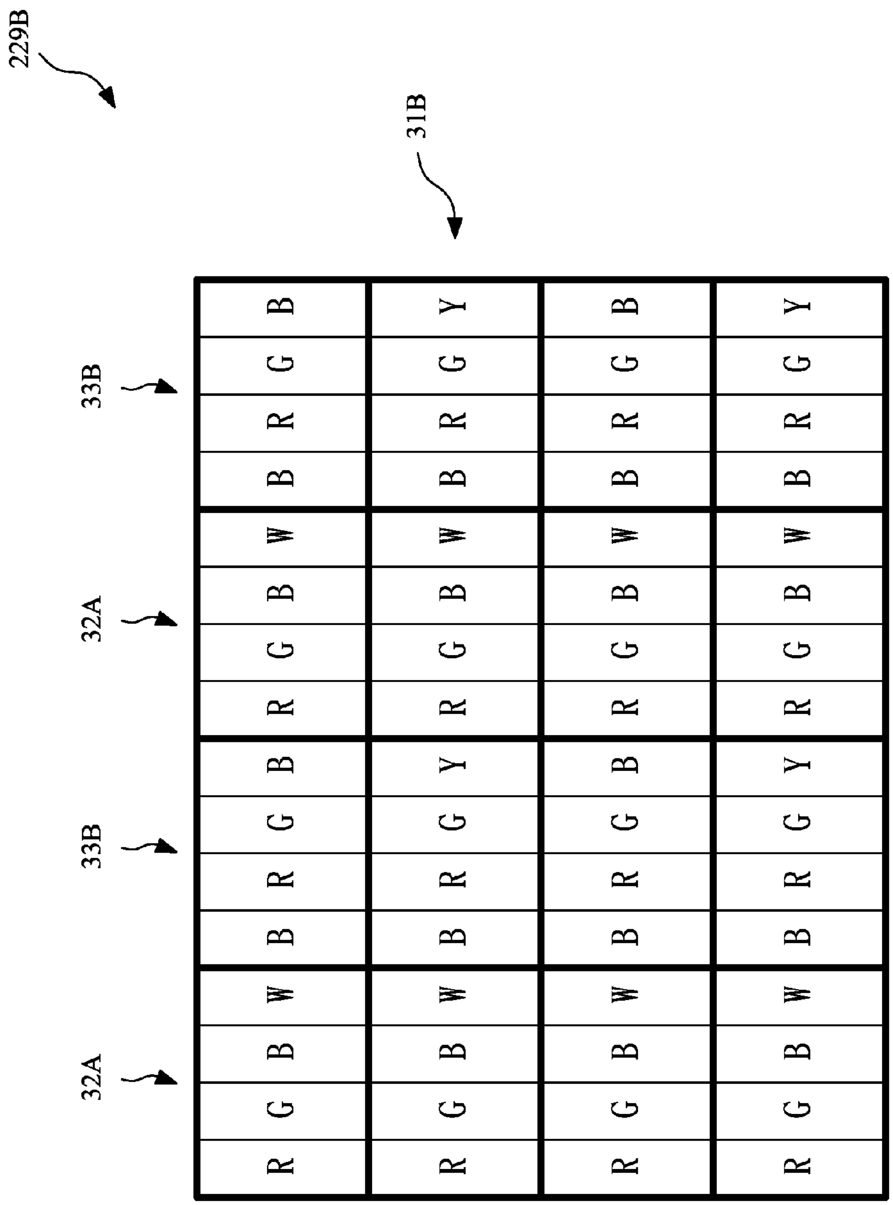
FIG. 29B shows an image device according to an embodiment of the invention.

Referring to FIG. 29B, it shows an image device according to an embodiment of the invention. The image device 229B includes a plurality of RGBY pixels 31B, a plurality of RGBW pixels 32A and a plurality of RBGB pixels 33B. In the first row of the image device 229B, the sequence of the pixels from left to right is the RGBW pixel 32A, the RBGB pixel 33B, the RGBW pixel 32A and the RBGB pixel 33B. In the second row of the image device 229B, the sequence of the pixels from left to right is the RGBW pixel 32A, the RGBY pixel 31B, the RGBW pixel 32A and the RGBY pixel 31B.

Figure 29C:
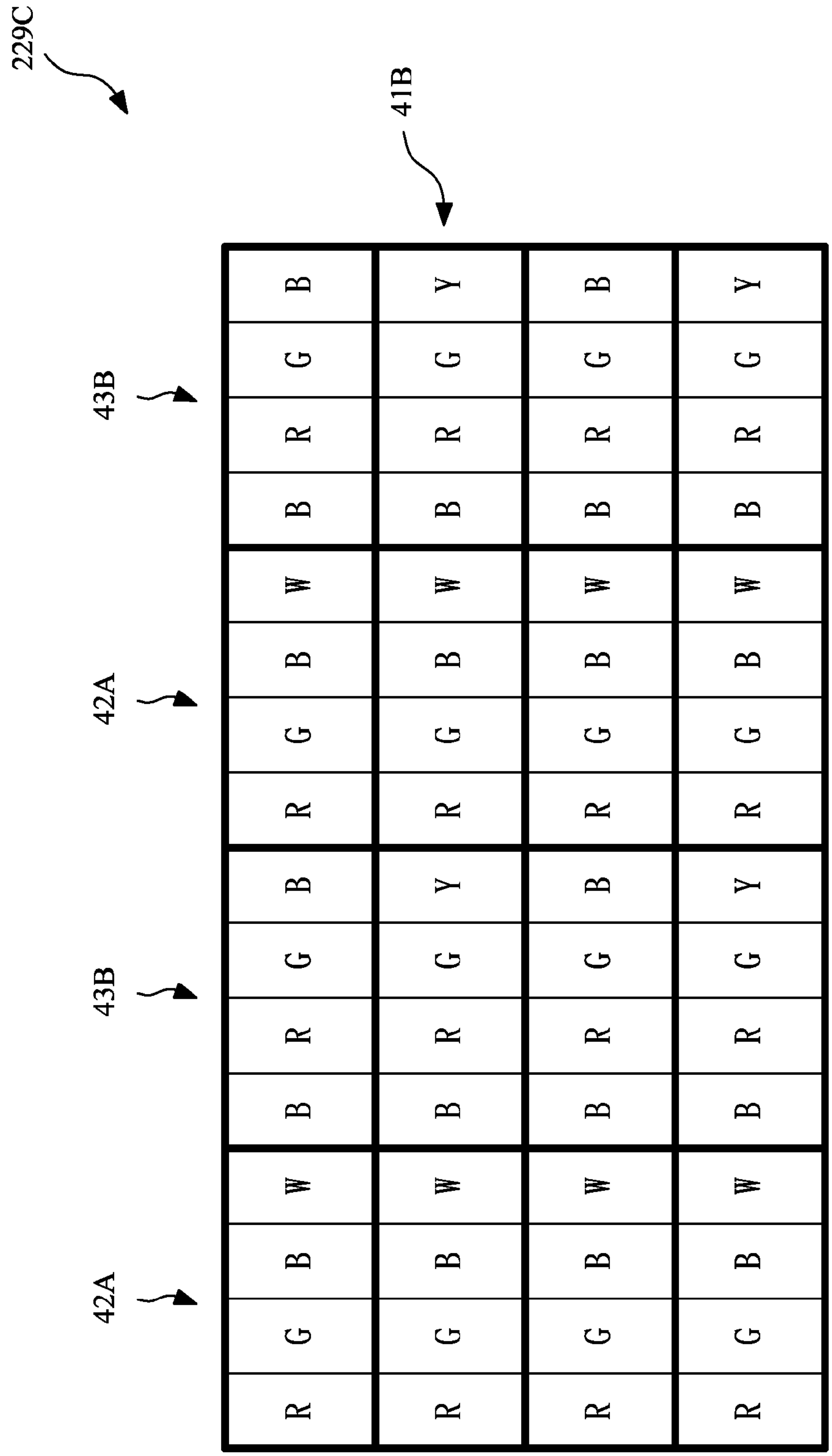
FIG. 29C shows an image device according to an embodiment of the invention.

Referring to FIG. 29C, it shows an image device according to an embodiment of the invention. The image device 229C includes a plurality of RGBY pixels 41B, a plurality of RGBW pixels 42A and a plurality of RBGB pixels 43B. In the first row of the image device 229C, the sequence of the pixels from left to right is the RGBW pixel 42A, the RBGB pixel 43B, the RGBW pixel 42A and the RBGB pixel 43B. In the second row of the image device 229C, the sequence of the pixels from left to right is the RGBW pixel 42A, the RGBY pixel 41B, the RGBW pixel 42A and the RGBY pixel 41B.

Figure 29D:
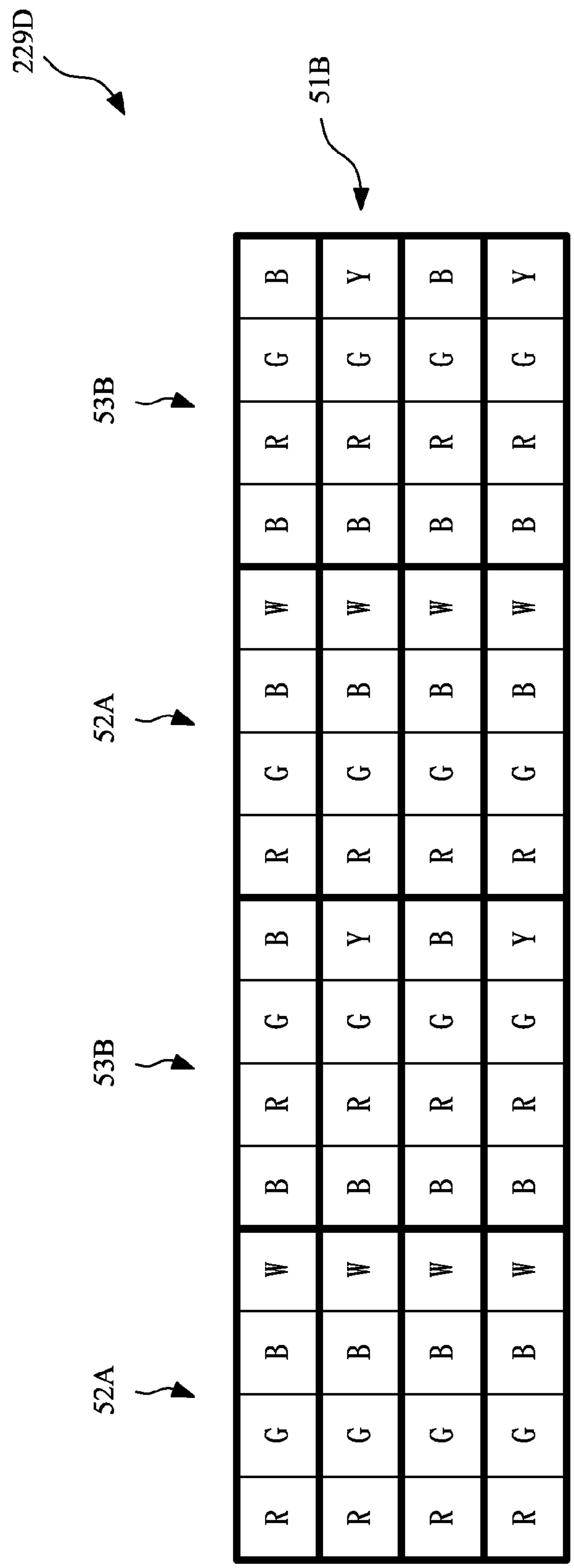
FIG. 29D shows an image device according to an embodiment of the invention.

Referring to FIG. 29D, it shows an image device according to an embodiment of the invention. The image device 229D includes a plurality of RGBY pixels 51B, a plurality of RGBW pixels 52A and a plurality of RBGB pixels 53B. In the first row of the image device 229D, the sequence of the pixels from left to right is the RGBW pixel 52A, the RBGB pixel 23B, the RGBW pixel 52A and the RBGB pixel 53B. In the second row of the image device 229D, the sequence of the pixels from left to right is the RGBW pixel 52A, the RGBY pixel 51B, the RGBW pixel 52A and the RGBY pixel 51B.

Figure 30A:
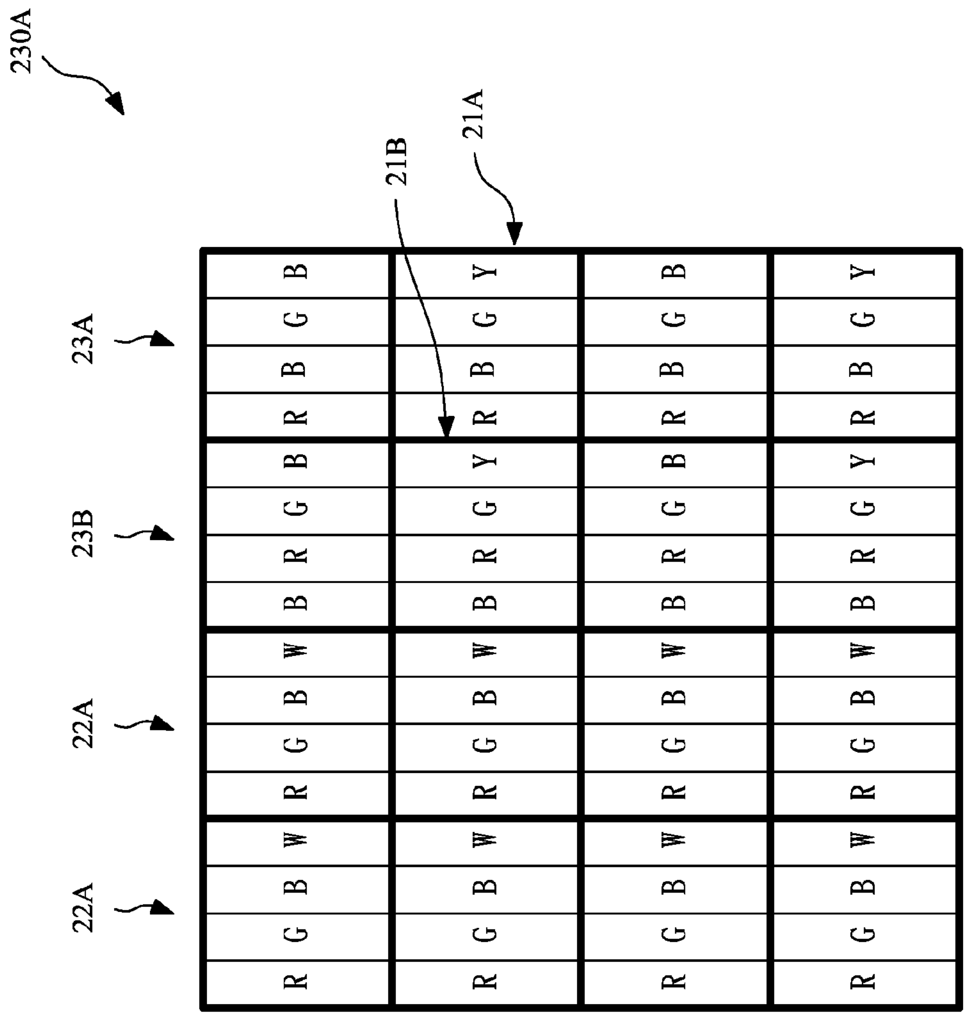
FIG. 30A shows an image device according to an embodiment of the invention.

Referring to FIG. 30A, it shows an image device according to an embodiment of the invention. The image device 230A includes a plurality of RGBY pixels 21A, 21B, a plurality of RGBW pixels 22A and a plurality of RBGB pixels 23A, 23B. In the first row of the image device 230A, the sequence of the pixels from left to right is the RGBW pixel 22A, the RGBW pixel 22A, the RBGB pixel 23B and the RBGB pixel 23A. In the second row of the image device 230A, the sequence of the pixels from left to right is the RGBW pixel 22A, the RGBW pixel 22A, the RGBY pixel 21B and the RGBY pixel 21A.

Figure 30B:
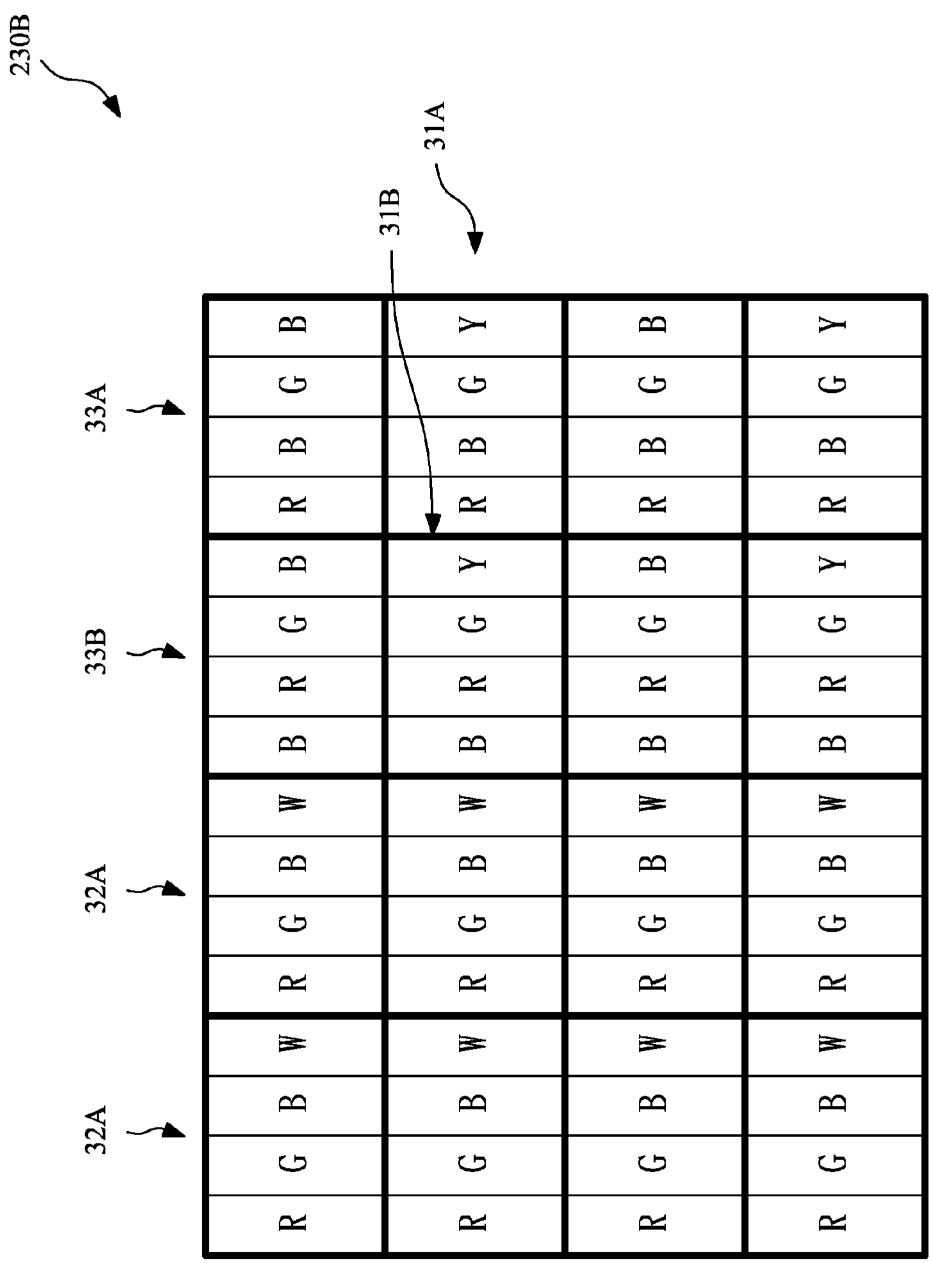
FIG. 30B shows an image device according to an embodiment of the invention.

Referring to FIG. 30B, it shows an image device according to an embodiment of the invention. The image device 230B includes a plurality of RGBY pixels 31A, 31B, a plurality of RGBW pixels 32A and a plurality of RBGB pixels 33A, 33B. In the first row of the image device 230B, the sequence of the pixels from left to right is the RGBW pixel 32A, the RGBW pixel 32A, the RBGB pixel 33B and the RBGB pixel 33A. In the second row of the image device 230B, the sequence of the pixels from left to right is the RGBW pixel 32A, the RGBW pixel 32A, the RGBY pixel 31B and the RGBY pixel 31A.

Figure 30C:
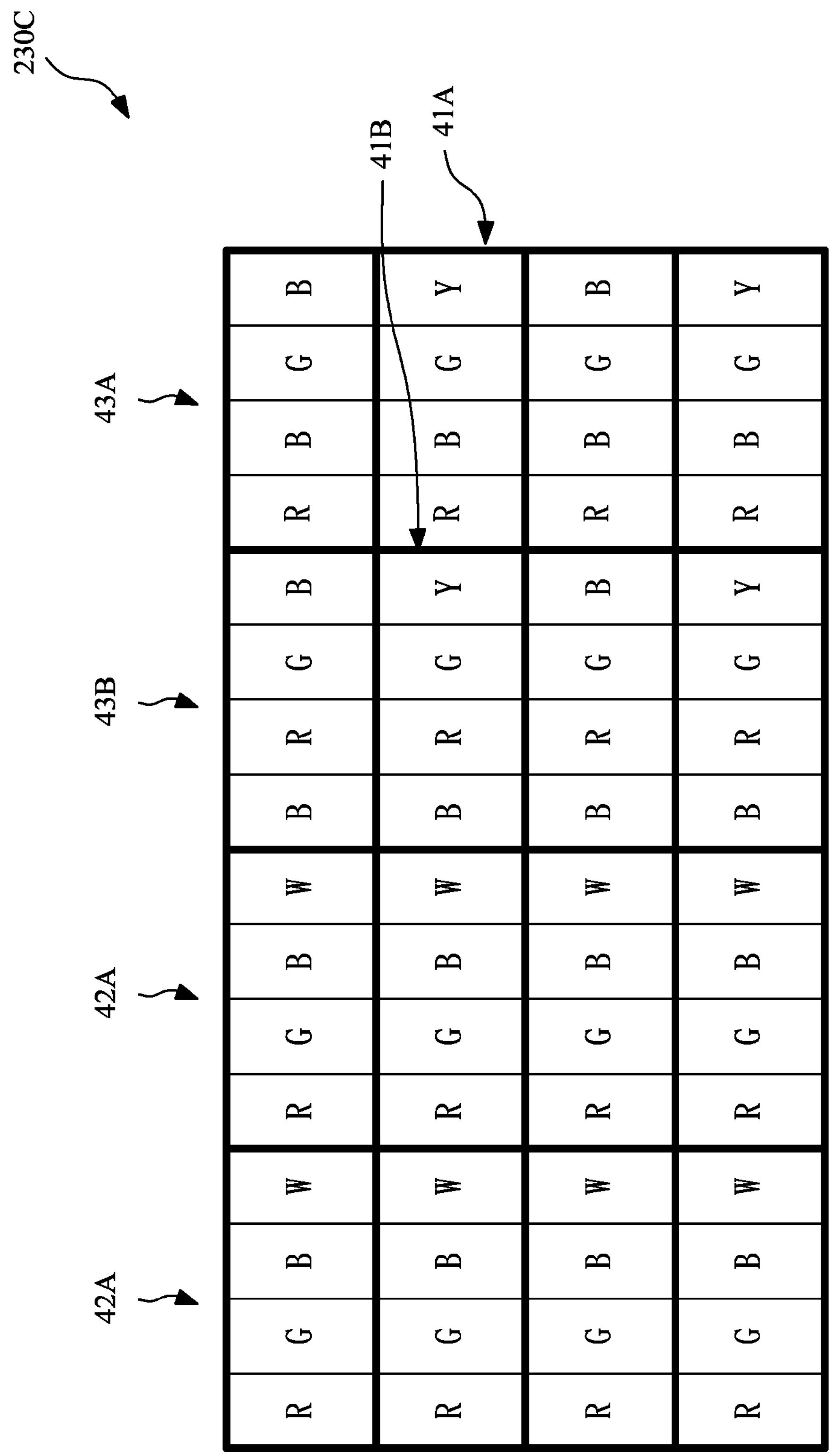

Referring to FIG. 30C, it shows an image device according to an embodiment of the invention. The image device 230C includes a plurality of RGBY pixels 41A, 41B, a plurality of RGBW pixels 42A and a plurality of RBGB pixels 43A, 43B. In the first row of the image device 230C, the sequence of the pixels from left to right is the RGBW pixel 42A, the RGBW pixel 42A, the RBGB pixel 43B and the RBGB pixel 43A. In the second row of the image device 230C, the sequence of the pixels from left to right is the RGBW pixel 42A, the RGBW pixel 42A, the RGBY pixel 41B and the RGBY pixel 41A.

Figure 30D:
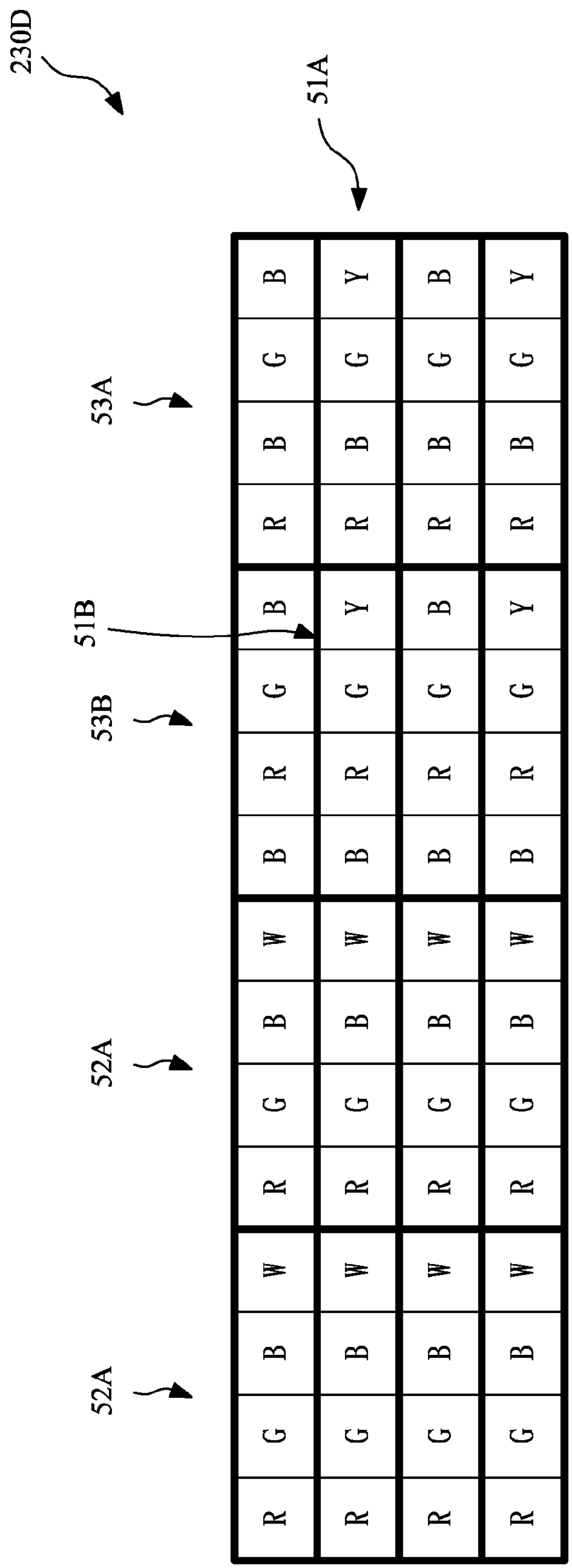

Referring to FIG. 30D, it shows an image device according to an embodiment of the invention. The image device 230D includes a plurality of RGBY pixels 51A, 51B, a plurality of RGBW pixels 52A and a plurality of RBGB pixels 53A, 53B. In the first row of the image device 230D, the sequence of the pixels from left to right is the RGBW pixel 52A, the RGBW pixel 52A, the RBGB pixel 53B and the RBGB pixel 53A. In the second row of the image device 230D, the sequence of the pixels from left to right is the RGBW pixel 52A, the RGBW pixel 52A, the RGBY pixel 51B and the RGBY pixel 51A.

Figure 31A:
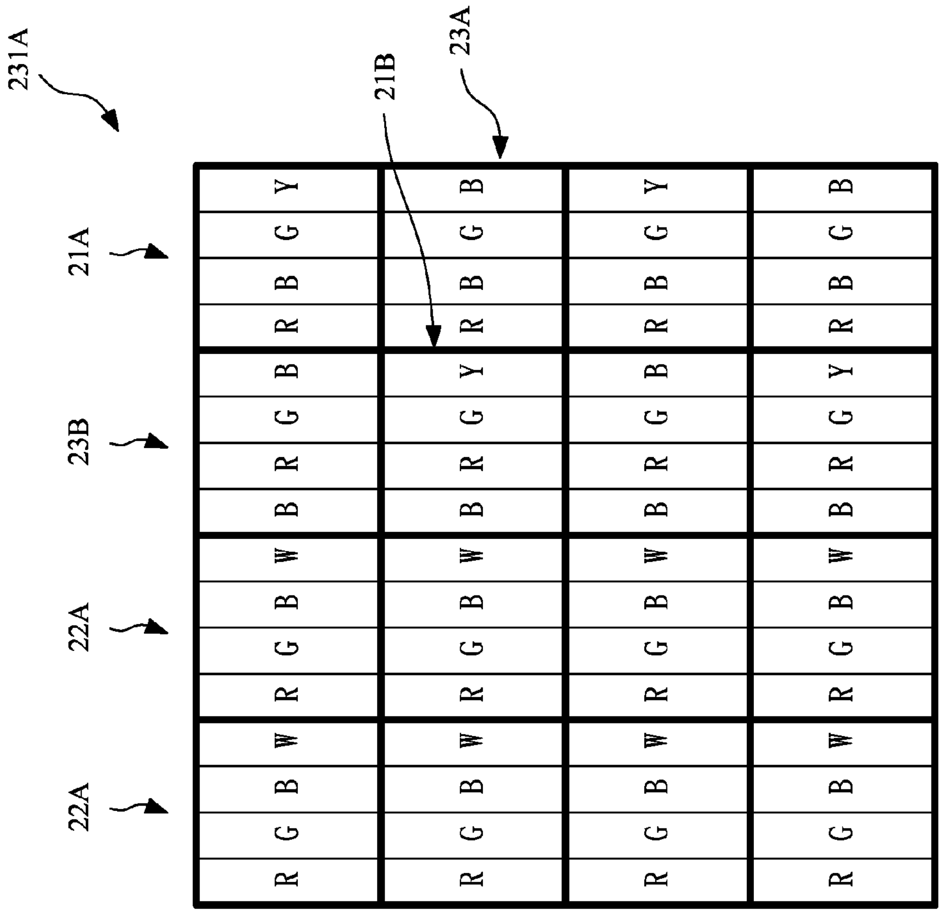

Referring to FIG. 31A, it shows an image device according to an embodiment of the invention. The image device 231A includes a plurality of RGBY pixels 21A, 21B, a plurality of RGBW pixels 22A and a plurality of RBGB pixels 23A, 23B. In the first row of the image device 231A, the sequence of the pixels from left to right is the RGBW pixel 22A, the RGBW pixel 22A, the RBGB pixel 23B and the RGBY pixel 21A. In the second row of the image device 231A, the sequence of the pixels from left to right is the RGBW pixel 22A, the RGBW pixel 22A, the RGBY pixel 21B and the RBGB pixel 23A.

Figure 31B:
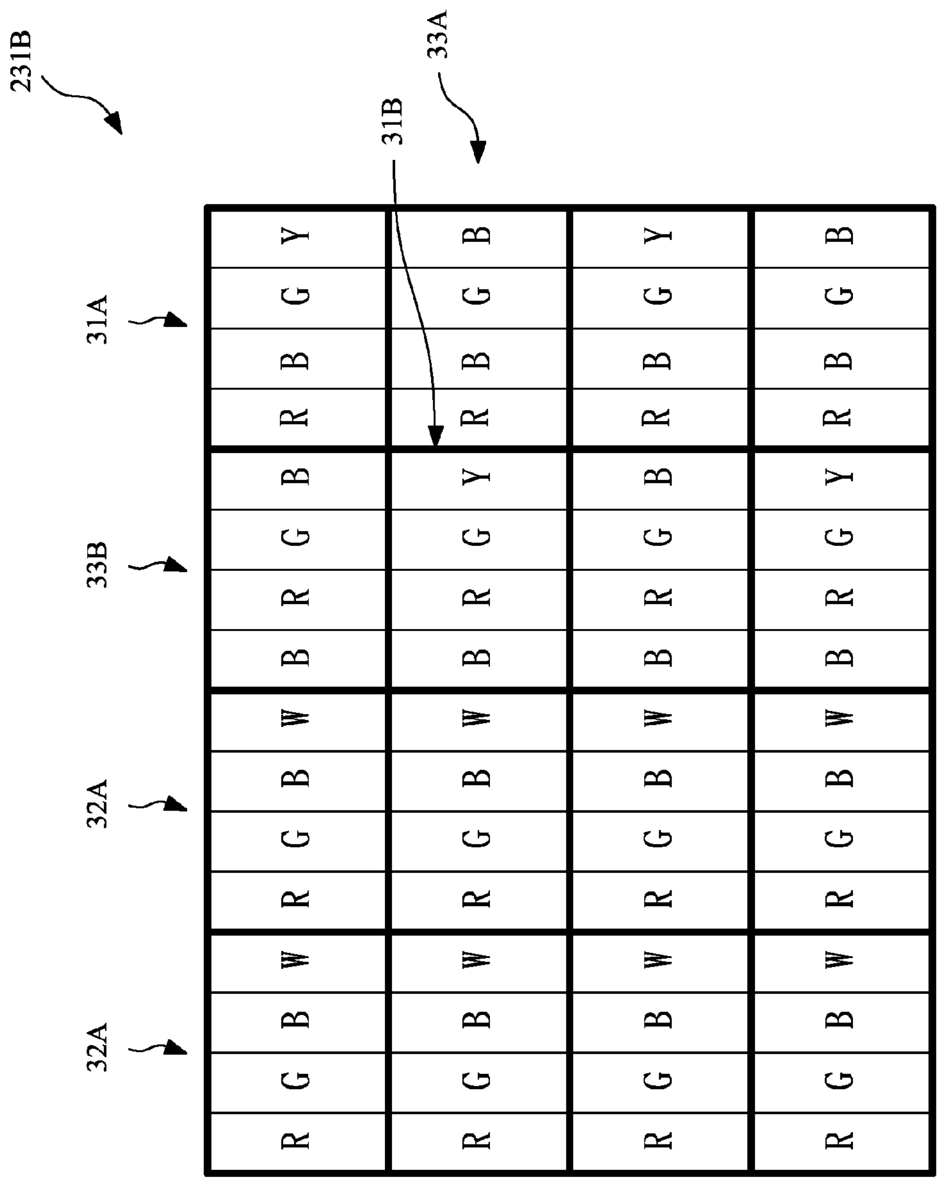

Referring to FIG. 31B, it shows an image device according to an embodiment of the invention. The image device 231B includes a plurality of RGBY pixels 31A, 31B, a plurality of RGBW pixels 32A and a plurality of RBGB pixels 33A, 33B. In the first row of the image device 231B, the sequence of the pixels from left to right is the RGBW pixel 32A, the RGBW pixel 32A, the RBGB pixel 33B and the RGBY pixel 31A. In the second row of the image device 231B, the sequence of the pixels from left to right is the RGBW pixel 32A, the RGBW pixel 32A, the RGBY pixel 31B and the RBGB pixel 33A.

Figure 31C:
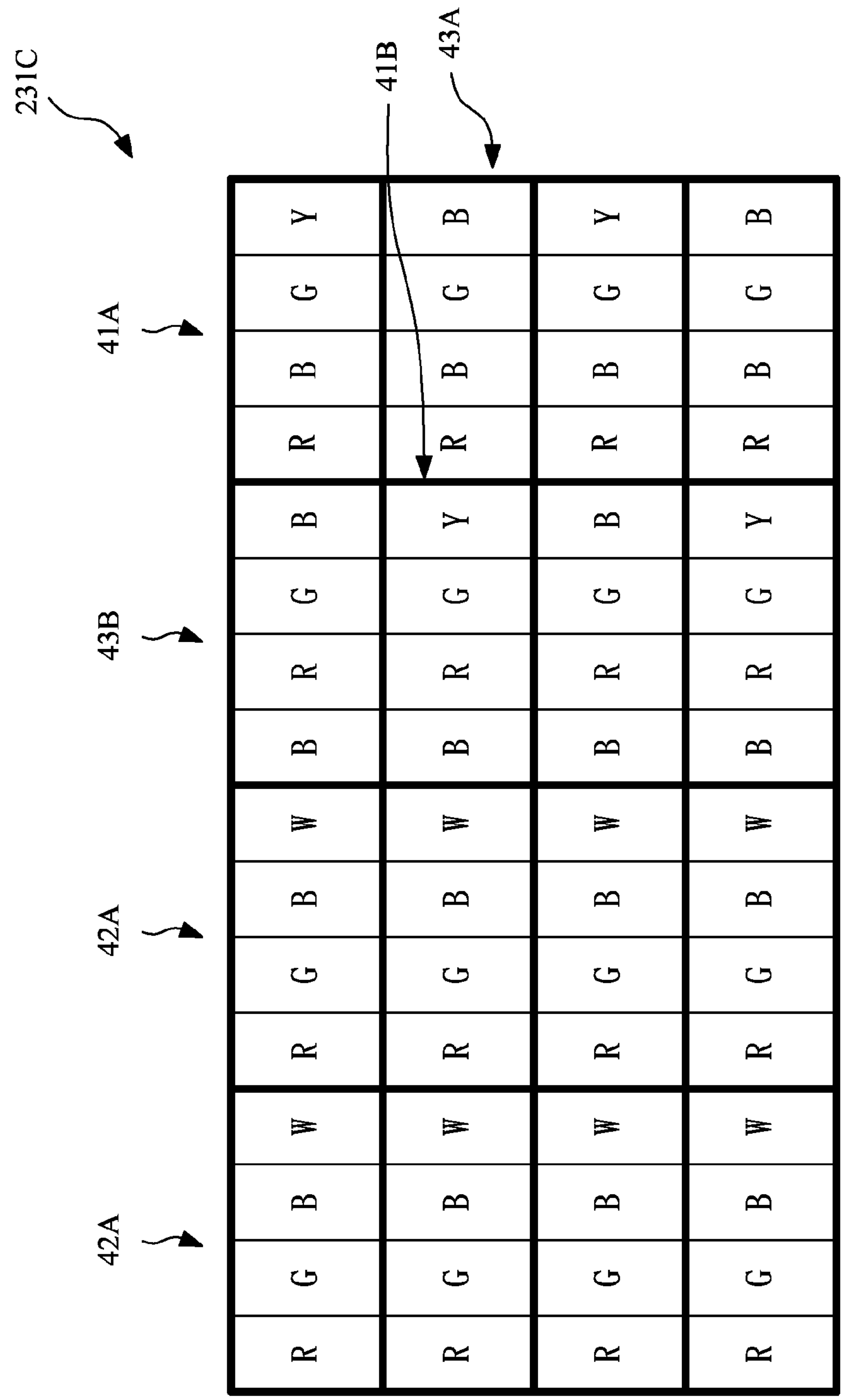

Referring to FIG. 31C, it shows an image device according to an embodiment of the invention. The image device 231C includes a plurality of RGBY pixels 41A, 41B, a plurality of RGBW pixels 42A and a plurality of RBGB pixels 43A, 43B. In the first row of the image device 231C, the sequence of the pixels from left to right is the RGBW pixel 42A, the RGBW pixel 42A, the RBGB pixel 43B and the RGBY pixel 41A. In the second row of the image device 231C, the sequence of the pixels from left to right is the RGBW pixel 42A, the RGBW pixel 42A, the RGBY pixel 41B and the RBGB pixel 43A.

Figure 31D:
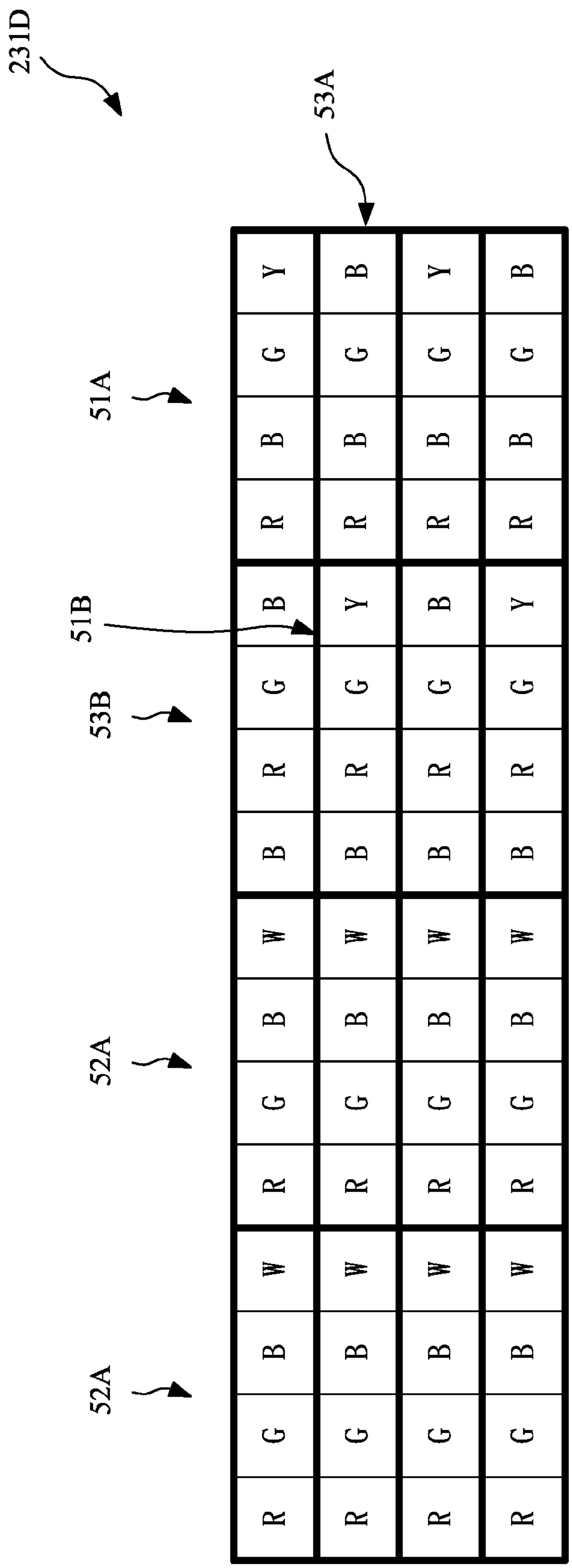

Referring to FIG. 31D, it shows an image device according to an embodiment of the invention. The image device 231D includes a plurality of RGBY pixels 51A, 51B, a plurality of RGBW pixels 52A and a plurality of RBGB pixels 53A, 53B. In the first row of the image device 231D, the sequence of the pixels from left to right is the RGBW pixel 52A, the RGBW pixel 52A, the RBGB pixel 53B and the RGBY pixel 51A. In the second row of the image device 231D, the sequence of the pixels from left to right is the RGBW pixel 52A, the RGBW pixel 52A, the RGBY pixel 51B and the RBGB pixel 53A.

Figure 32A:
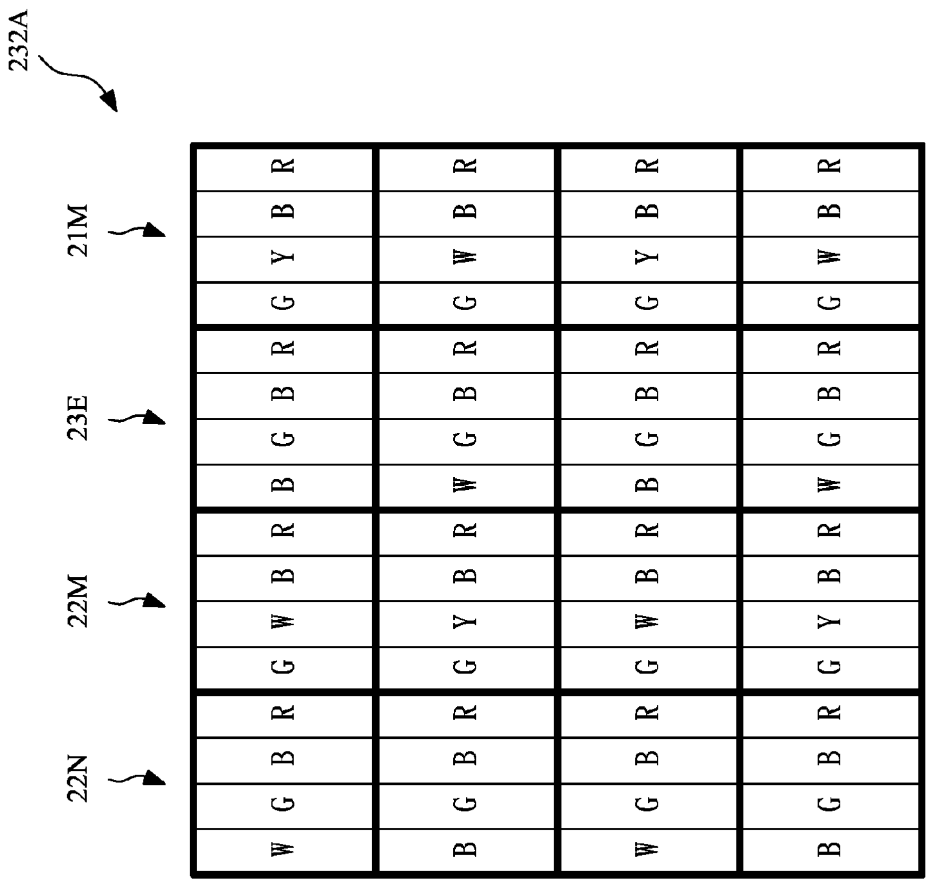

Referring to FIG. 32A, it shows an image device according to an embodiment of the invention. The image device 232A includes a plurality of RGBY pixels 21M, a plurality of RGBW pixels 22M, 22N and a plurality of RBGB pixels 23E. In the RGBY pixel 21M, the sequence of the sub-pixels in the 1×4 matrix from left to right is the green sub-pixel, the yellow sub-pixel, the blue sub-pixel and the red sub-pixel. In the RGBW pixel 22N, the sequence of the sub-pixels in the 1×4 matrix from left to right is the white sub-pixel, the green sub-pixel, the blue sub-pixel and the red sub-pixel. In the RBGB pixel 23E, the sequence of the sub-pixels in the 1×4 matrix from left to right is the blue sub-pixel, the green sub-pixel, the blue sub-pixel and the red sub-pixel. In the first row of the image device 232A, the sequence of the pixels from left to right is the RGBW pixel 22N, the RGBW pixel 22M, the RBGB pixel 23E and the RGBY pixel 21M. In the second row of the image device 232A, the sequence of the pixels from left to right is the RBGB pixel 23E, the RGBY pixel 21M, the RGBW pixel 22N and the RGBW pixel 22M.

Figure 32B:
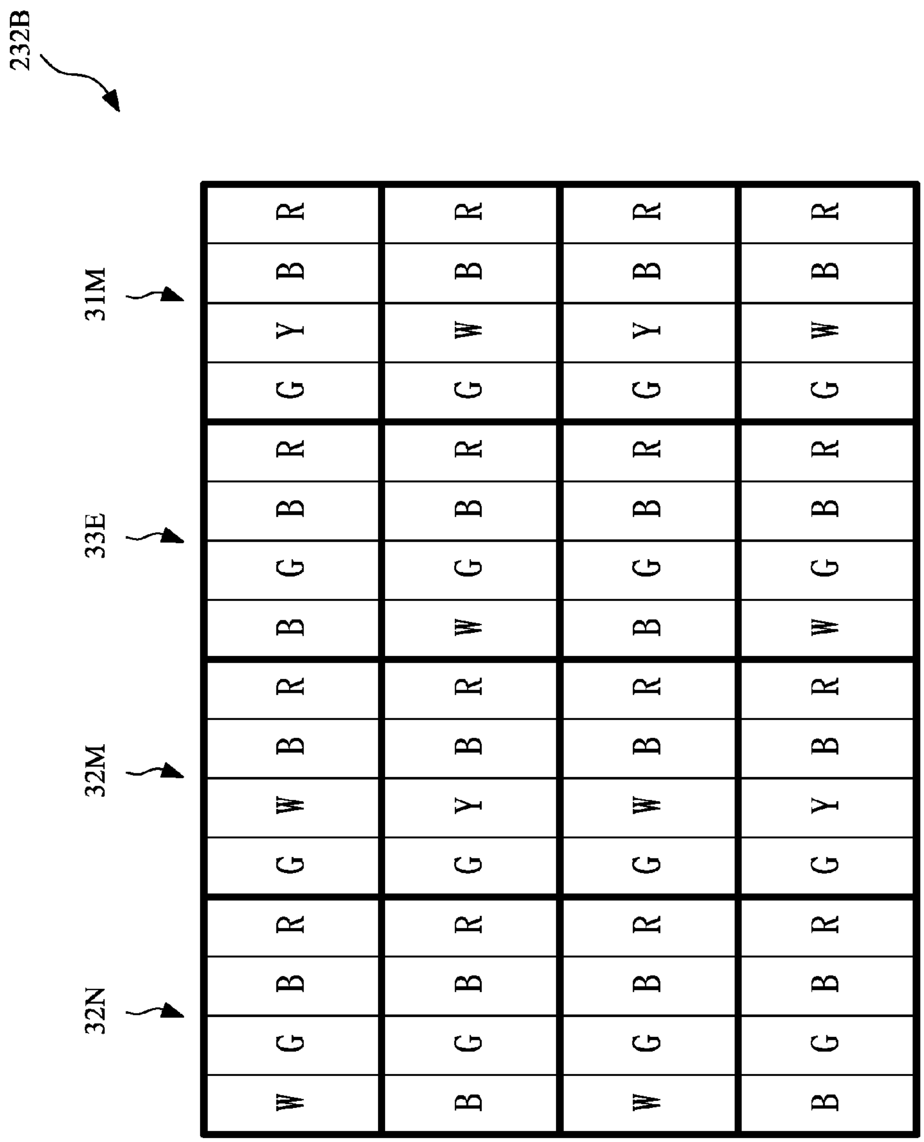

Referring to FIG. 32B, it shows an image device according to an embodiment of the invention. The image device 232B includes a plurality of RGBY pixels 31M, a plurality of RGBW pixels 32M, 32N and a plurality of RBGB pixels 33E. In the RGBY pixel 31M, the sequence of the sub-pixels in the 1×4 matrix from left to right is the green sub-pixel, the yellow sub-pixel, the blue sub-pixel and the red sub-pixel. In the RGBW pixel 32N, the sequence of the sub-pixels in the 1×4 matrix from left to right is the white sub-pixel, the green sub-pixel, the blue sub-pixel and the red sub-pixel. In the RBGB pixel 33E, the sequence of the sub-pixels in the 1×4 matrix from left to right is the blue sub-pixel, the green sub-pixel, the blue sub-pixel and the red sub-pixel. In the first row of the image device 232B, the sequence of the pixels from left to right is the RGBW pixel 32N, the RGBW pixel 32M, the RBGB pixel 33E and the RGBY pixel 31M. In the second row of the image device 232B, the sequence of the pixels from left to right is the RBGB pixel 33E, the RGBY pixel 31M, the RGBW pixel 32N and the RGBW pixel 32M.

Figure 32C:
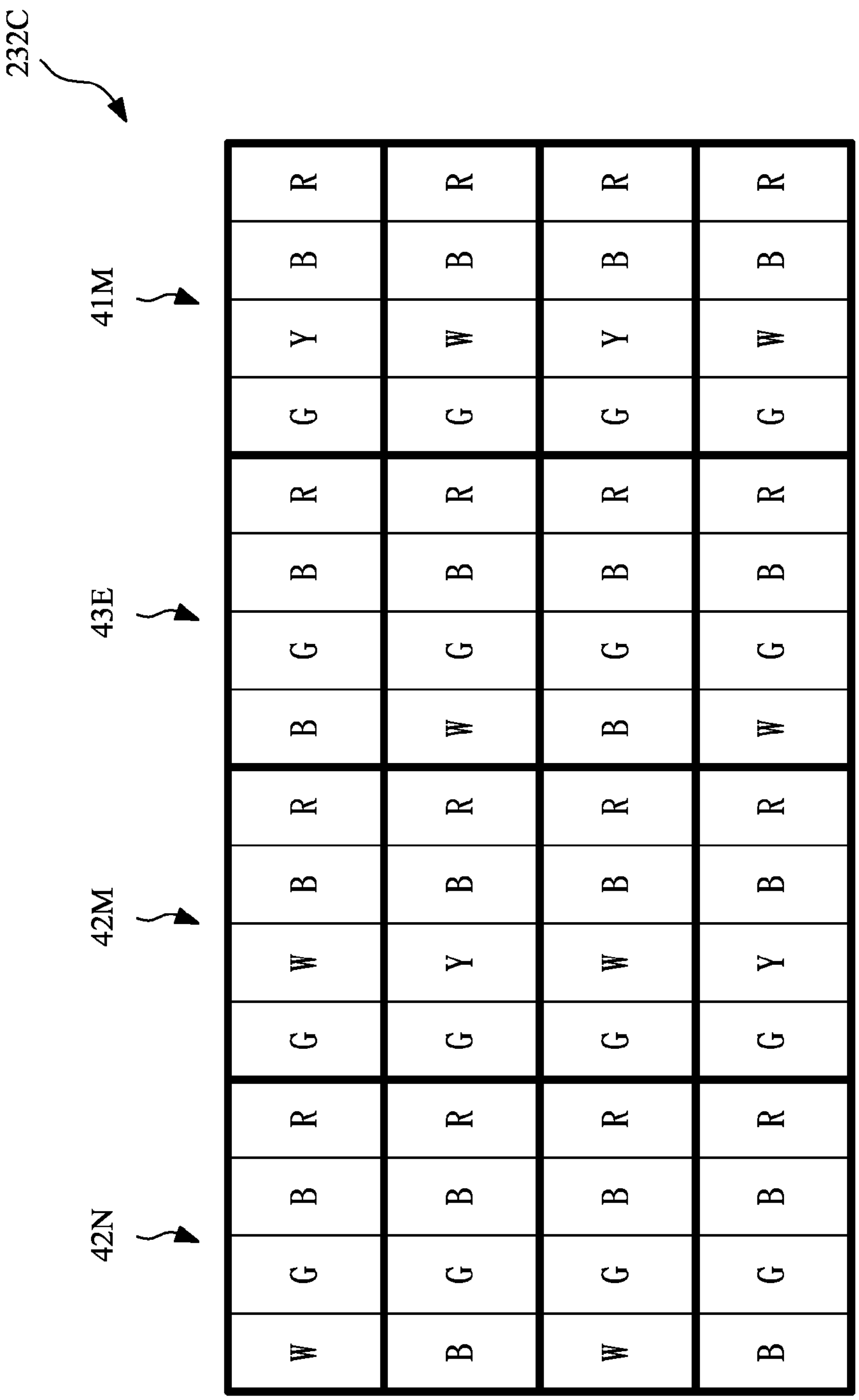

Referring to FIG. 32C, it shows an image device according to an embodiment of the invention. The image device 232C includes a plurality of RGBY pixels 41M, a plurality of RGBW pixels 42M, 42N and a plurality of RBGB pixels 43E. In the RGBY pixel 41M, the sequence of the sub-pixels in the 1×4 matrix from left to right is the green sub-pixel, the yellow sub-pixel, the blue sub-pixel and the red sub-pixel. In the RGBW pixel 42N, the sequence of the sub-pixels in the 1×4 matrix from left to right is the white sub-pixel, the green sub-pixel, the blue sub-pixel and the red sub-pixel. In the RBGB pixel 43E, the sequence of the sub-pixels in the 1×4 matrix from left to right is the blue sub-pixel, the green sub-pixel, the blue sub-pixel and the red sub-pixel. In the first row of the image device 232C, the sequence of the pixels from left to right is the RGBW pixel 42N, the RGBW pixel 42M, the RBGB pixel 43E and the RGBY pixel 41M. In the second row of the image device 232C, the sequence of the pixels from left to right is the RBGB pixel 43E, the RGBY pixel 41M, the RGBW pixel 42N and the RGBW pixel 42M.

Figure 32D:
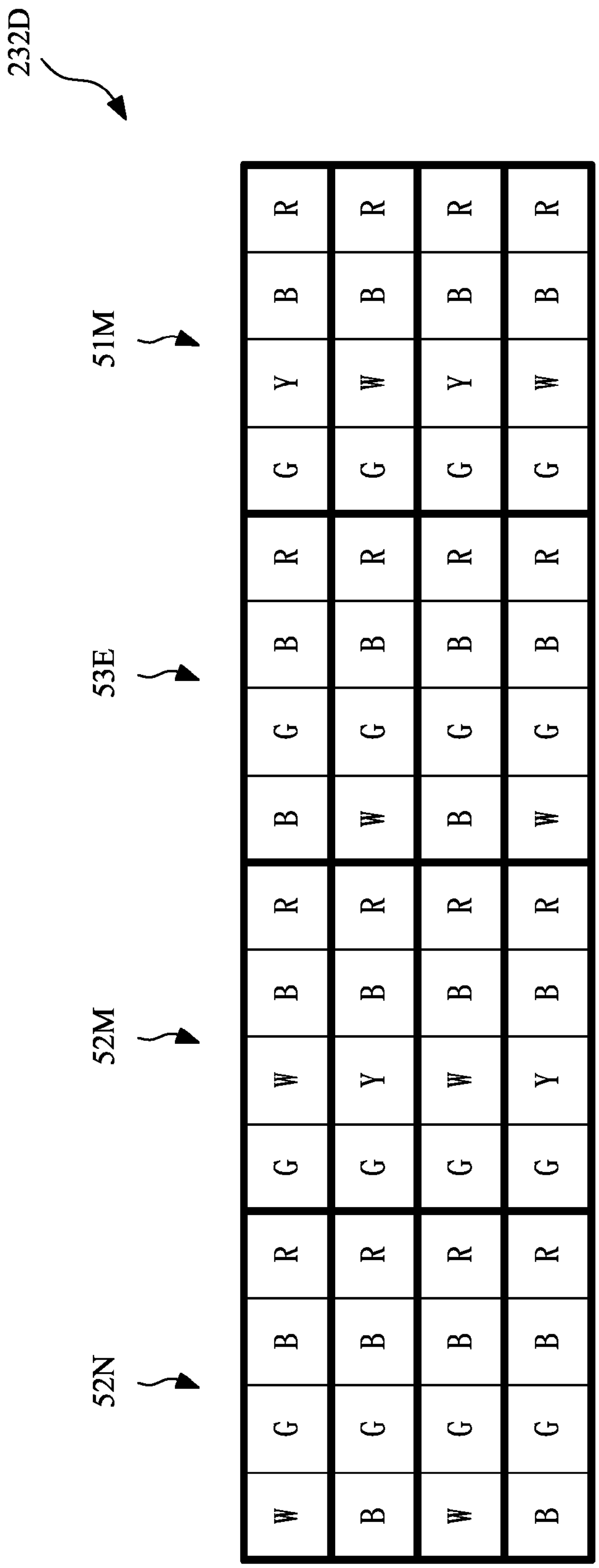

Referring to FIG. 32D, it shows an image device according to an embodiment of the invention. The image device 232D includes a plurality of RGBY pixels 51M, a plurality of RGBW pixels 52M, 52N and a plurality of RBGB pixels 53E. In the RGBY pixel 51M, the sequence of the sub-pixels in the 1×4 matrix from left to right is the green sub-pixel, the yellow sub-pixel, the blue sub-pixel and the red sub-pixel. In the RGBW pixel 52N, the sequence of the sub-pixels in the 1×4 matrix from left to right is the white sub-pixel, the green sub-pixel, the blue sub-pixel and the red sub-pixel. In the RBGB pixel 53E, the sequence of the sub-pixels in the 1×4 matrix from left to right is the blue sub-pixel, the green sub-pixel, the blue sub-pixel and the red sub-pixel. In the first row of the image device 232D, the sequence of the pixels from left to right is the RGBW pixel 52N, the RGBW pixel 52M, the RBGB pixel 53E and the RGBY pixel 51M. In the second row of the image device 232D, the sequence of the pixels from left to right is the RBGB pixel 53E, the RGBY pixel 51M, the RGBW pixel 52N and the RGBW pixel 52M.

Referring to FIG. 33A, it shows an image device according to an embodiment of the invention. The image device 233A includes a plurality of RGBY pixels 21M, a plurality of RGBW pixels 22M, 22N and a plurality of RBGB pixels 23E. In the first row of the image device 233A, the sequence of the pixels from left to right is the RGBW pixel 22M, the RGBW pixel 22N, the RGBY pixel 21M and the RBGB pixel 23E. In the second row of the image device 233A, the sequence of the pixels from left to right is the RGBY pixel 21M, the RBGB pixel 23E, the RGBW pixel 22M and the RGBW pixel 22N.

Referring to FIG. 33B, it shows an image device according to an embodiment of the invention. The image device 233B includes a plurality of RGBY pixels 31M, a plurality of RGBW pixels 32M, 32N and a plurality of RBGB pixels 33E. In the first row of the image device 233B, the sequence of the pixels from left to right is the RGBW pixel 32M, the RGBW pixel 32N, the RGBY pixel 31M and the RBGB pixel 33E. In the second row of the image device 233B, the sequence of the pixels from left to right is the RGBY pixel 31M, the RBGB pixel 33E, the RGBW pixel 32M and the RGBW pixel 32N.

Referring to FIG. 33C, it shows an image device according to an embodiment of the invention. The image device 233C includes a plurality of RGBY pixels 41M, a plurality of RGBW pixels 42M, 42N and a plurality of RBGB pixels 43E. In the first row of the image device 233C, the sequence of the pixels from left to right is the RGBW pixel 42M, the RGBW pixel 42N, the RGBY pixel 41M and the RBGB pixel 43E. In the second row of the image device 233C, the sequence of the pixels from left to right is the RGBY pixel 41M, the RBGB pixel 43E, the RGBW pixel 42M and the RGBW pixel 42N.

Referring to FIG. 33D, it shows an image device according to an embodiment of the invention. The image device 233D includes a plurality of RGBY pixels 51M, a plurality of RGBW pixels 52M, 52N and a plurality of RBGB pixels 53E. In the first row of the image device 233D, the sequence of the pixels from left to right is the RGBW pixel 52M, the RGBW pixel 52N, the RGBY pixel 51M and the RBGB pixel 53E. In the second row of the image device 233D, the sequence of the pixels from left to right is the RGBY pixel 51M, the RBGB pixel 53E, the RGBW pixel 52M and the RGBW pixel 52N.

Referring to FIG. 34A, it shows an image device according to an embodiment of the invention. The image device 234A includes a plurality of RGBY pixels 21M, a plurality of RGBW pixels 22M, 22N and a plurality of RBGB pixels 23E. In the first row of the image device 234A, the sequence of the pixels from left to right is the RGBW pixel 22M, the RGBW pixel 22N, the RBGB pixel 23E and the RGBY pixel 21M. In the second row of the image device 234A, the sequence of the pixels from left to right is the RGBY pixel 21M, the RBGB pixel 23E, the RGBW pixel 22M and the RGBW pixel 22N.

Referring to FIG. 34B, it shows an image device according to an embodiment of the invention. The image device 234B includes a plurality of RGBY pixels 31M, a plurality of RGBW pixels 32M, 32N and a plurality of RBGB pixels 33E. In the first row of the image device 234B, the sequence of the pixels from left to right is the RGBW pixel 32M, the RGBW pixel 32N, the RBGB pixel 33E and the RGBY pixel 31M. In the second row of the image device 234B, the sequence of the pixels from left to right is the RGBY pixel 31M, the RBGB pixel 33E, the RGBW pixel 32M and the RGBW pixel 32N.

Referring to FIG. 34C, it shows an image device according to an embodiment of the invention. The image device 234C includes a plurality of RGBY pixels 41M, a plurality of RGBW pixels 42M, 42N and a plurality of RBGB pixels 43E. In the first row of the image device 234C, the sequence of the pixels from left to right is the RGBW pixel 42M, the RGBW pixel 42N, the RBGB pixel 43E and the RGBY pixel 41M. In the second row of the image device 234C, the sequence of the pixels from left to right is the RGBY pixel 41M, the RBGB pixel 43E, the RGBW pixel 42M and the RGBW pixel 42N.

Referring to FIG. 34D, it shows an image device according to an embodiment of the invention. The image device 234D includes a plurality of RGBY pixels 51M, a plurality of RGBW pixels 52M, 52N and a plurality of RBGB pixels 53E. In the first row of the image device 234D, the sequence of the pixels from left to right is the RGBW pixel 52M, the RGBW pixel 52N, the RBGB pixel 53E and the RGBY pixel 51M. In the second row of the image device 234D, the sequence of the pixels from left to right is the RGBY pixel 51M, the RBGB pixel 53E, the RGBW pixel 52M and the RGBW pixel 52N.

Referring to FIG. 35A, it shows an image device according to an embodiment of the invention. The image device 235A includes a plurality of RGBY pixels 21M, a plurality of RGBW pixels 22M, 22N and a plurality of RBGB pixels 23E. In the first row of the image device 235A, the sequence of the pixels from left to right is the RGBW pixel 22N, the RGBW pixel 22M, the RGBY pixel 21M and the RBGB pixel 23E. In the second row of the image device 235A, the sequence of the pixels from left to right is the RBGB pixel 23E, the RGBY pixel 21M, the RGBW pixel 22M and the RGBW pixel 22N.

Referring to FIG. 35B, it shows an image device according to an embodiment of the invention. The image device 235B includes a plurality of RGBY pixels 31M, a plurality of RGBW pixels 32M, 32N and a plurality of RBGB pixels 33E. In the first row of the image device 235B, the sequence of the pixels from left to right is the RGBW pixel 32N, the RGBW pixel 32M, the RGBY pixel 31M and the RBGB pixel 33E. In the second row of the image device 235B, the sequence of the pixels from left to right is the RBGB pixel 33E, the RGBY pixel 31M, the RGBW pixel 32M and the RGBW pixel 32N.

Referring to FIG. 35C, it shows an image device according to an embodiment of the invention. The image device 235C includes a plurality of RGBY pixels 41M, a plurality of RGBW pixels 42M, 42N and a plurality of RBGB pixels 43E. In the first row of the image device 235C, the sequence of the pixels from left to right is the RGBW pixel 42N, the RGBW pixel 42M, the RGBY pixel 41M and the RBGB pixel 43E. In the second row of the image device 235C, the sequence of the pixels from left to right is the RBGB pixel 43E, the RGBY pixel 41M, the RGBW pixel 42M and the RGBW pixel 42N.

Referring to FIG. 35D, it shows an image device according to an embodiment of the invention. The image device 235D includes a plurality of RGBY pixels 51M, a plurality of RGBW pixels 52M, 52N and a plurality of RBGB pixels 53E. In the first row of the image device 235D, the sequence of the pixels from left to right is the RGBW pixel 52N, the RGBW pixel 52M, the RGBY pixel 51M and the RBGB pixel 53E. In the second row of the image device 235D, the sequence of the pixels from left to right is the RBGB pixel 53E, the RGBY pixel 51M, the RGBW pixel 52M and the RGBW pixel 52N.

Referring to FIG. 36A, it shows an image device according to an embodiment of the invention. The image device 236A includes a plurality of RGBY pixels 21A, a plurality of RGBW pixels 22G and a plurality of RBGB pixels 23A. In the first row of the image device 236A, the sequence of the pixels from left to right is the RGBY pixel 21A, the RGBW pixel 22G, the RBGB pixel 23A and the RGBW pixel 22G. In the second row of the image device 236A, the sequence of the pixels from left to right is the RBGB pixel 23A, the RGBW pixel 22G, the RGBY pixel 21A, and the RGBW pixel 22G.

Referring to FIG. 36B, it shows an image device according to an embodiment of the invention. The image device 236B includes a plurality of RGBY pixels 31A, a plurality of RGBW pixels 32G and a plurality of RBGB pixels 33A. In the first row of the image device 236B, the sequence of the pixels from left to right is the RGBY pixel 31A, the RGBW pixel 32G, the RBGB pixel 33A and the RGBW pixel 32G. In the second row of the image device 236B, the sequence of the pixels from left to right is the RBGB pixel 33A, the RGBW pixel 32G, the RGBY pixel 31A, and the RGBW pixel 32G.

Referring to FIG. 36C, it shows an image device according to an embodiment of the invention. The image device 236C includes a plurality of RGBY pixels 41A, a plurality of RGBW pixels 42G and a plurality of RBGB pixels 43A. In the first row of the image device 236C, the sequence of the pixels from left to right is the RGBY pixel 41A, the RGBW pixel 42G, the RBGB pixel 43A and the RGBW pixel 42G. In the second row of the image device 236C, the sequence of the pixels from left to right is the RBGB pixel 43A, the RGBW pixel 42G, the RGBY pixel 41A, and the RGBW pixel 42G.

Referring to FIG. 36D, it shows an image device according to an embodiment of the invention. The image device 236D includes a plurality of RGBY pixels 51A, a plurality of RGBW pixels 52G and a plurality of RBGB pixels 53A. In the first row of the image device 236D, the sequence of the pixels from left to right is the RGBY pixel 51A, the RGBW pixel 52G, the RBGB pixel 53A and the RGBW pixel 52G. In the second row of the image device 236D, the sequence of the pixels from left to right is the RBGB pixel 53A, the RGBW pixel 52G, the RGBY pixel 51A, and the RGBW pixel 52G.

Referring to FIG. 37A, it shows an image device according to an embodiment of the invention. The image device 237A includes a plurality of RGBY pixels 21H, a plurality of RGBW pixels 22F and a plurality of RBGB pixels 23D. In the first row of the image device 237A, the sequence of the pixels from left to right is the RGBY pixel 21H, the RGBW pixel 22F, the RBGB pixel 23D and the RGBW pixel 22F. In the second row of the image device 237A, the sequence of the pixels from left to right is the RBGB pixel 23D, the RGBW pixel 22F, the RGBY pixel 21H, and the RGBW pixel 22F.

Referring to FIG. 37B, it shows an image device according to an embodiment of the invention. The image device 237B includes a plurality of RGBY pixels 31H, a plurality of RGBW pixels 32F and a plurality of RBGB pixels 33D. In the first row of the image device 237B, the sequence of the pixels from left to right is the RGBY pixel 31H, the RGBW pixel 32F, the RBGB pixel 33D and the RGBW pixel 32F. In the second row of the image device 237B, the sequence of the pixels from left to right is the RBGB pixel 33D, the RGBW pixel 32F, the RGBY pixel 31H, and the RGBW pixel 32F.

Referring to FIG. 37C, it shows an image device according to an embodiment of the invention. The image device 237C includes a plurality of RGBY pixels 41H, a plurality of RGBW pixels 42F and a plurality of RBGB pixels 43D. In the first row of the image device 237C, the sequence of the pixels from left to right is the RGBY pixel 41H, the RGBW pixel 42F, the RBGB pixel 43D and the RGBW pixel 42F. In the second row of the image device 237C, the sequence of the pixels from left to right is the RBGB pixel 43D, the RGBW pixel 42F, the RGBY pixel 41H, and the RGBW pixel 42F.

Referring to FIG. 37D, it shows an image device according to an embodiment of the invention. The image device 237D includes a plurality of RGBY pixels 51H, a plurality of RGBW pixels 52F and a plurality of RBGB pixels 53D. In the first row of the image device 237D, the sequence of the pixels from left to right is the RGBY pixel 51H, the RGBW pixel 52F, the RBGB pixel 53D and the RGBW pixel 52F. In the second row of the image device 237D, the sequence of the pixels from left to right is the RBGB pixel 53D, the RGBW pixel 52F, the RGBY pixel 51H, and the RGBW pixel 52F.

Referring to FIG. 38A, it shows an image device according to an embodiment of the invention. The image device 238A includes a plurality of RGBY pixels 21A, a plurality of RGBW pixels 22G and a plurality of RBGB pixels 23A. In the first row of the image device 238A, the sequence of the pixels from left to right is the RGBY pixel 21A, the RGBW pixel 22G, the RGBY pixel 21A and the RGBW pixel 22G. In the second row of the image device 238A, the sequence of the pixels from left to right is the RBGB pixel 23A, the RGBW pixel 22G, the RBGB pixel 23A, and the RGBW pixel 22G.

Referring to FIG. 38B, it shows an image device according to an embodiment of the invention. The image device 238B includes a plurality of RGBY pixels 31A, a plurality of RGBW pixels 32G and a plurality of RBGB pixels 33A. In the first row of the image device 238B, the sequence of the pixels from left to right is the RGBY pixel 31A, the RGBW pixel 32G, the RGBY pixel 31A and the RGBW pixel 32G. In the second row of the image device 238B, the sequence of the pixels from left to right is the RBGB pixel 33A, the RGBW pixel 32G, the RBGB pixel 33A, and the RGBW pixel 32G.

Referring to FIG. 38C, it shows an image device according to an embodiment of the invention. The image device 238C includes a plurality of RGBY pixels 41A, a plurality of RGBW pixels 42G and a plurality of RBGB pixels 43A. In the first row of the image device 238C, the sequence of the pixels from left to right is the RGBY pixel 41A, the RGBW pixel 42G, the RGBY pixel 41A and the RGBW pixel 42G. In the second row of the image device 238C, the sequence of the pixels from left to right is the RBGB pixel 43A, the RGBW pixel 42G, the RBGB pixel 43A, and the RGBW pixel 42G.

Referring to FIG. 38D, it shows an image device according to an embodiment of the invention. The image device 238D includes a plurality of RGBY pixels 51A, a plurality of RGBW pixels 52G and a plurality of RBGB pixels 53A. In the first row of the image device 238D, the sequence of the pixels from left to right is the RGBY pixel 51A, the RGBW pixel 52G, the RGBY pixel 51A and the RGBW pixel 52G. In the second row of the image device 238D, the sequence of the pixels from left to right is the RBGB pixel 53A, the RGBW pixel 52G, the RBGB pixel 53A, and the RGBW pixel 52G.

Referring to FIG. 39A, it shows an image device according to an embodiment of the invention. The image device 239A includes a plurality of RGBY pixels 21H, a plurality of RGBW pixels 22F and a plurality of RBGB pixels 23D. In the first row of the image device 239A, the sequence of the pixels from left to right is the RGBY pixel 21H, the RGBW pixel 22F, the RGBY pixel 21H and the RGBW pixel 22F. In the second row of the image device 239A, the sequence of the pixels from left to right is the RBGB pixel 23D, the RGBW pixel 22F, the RBGB pixel 23D, and the RGBW pixel 22F.

Referring to FIG. 39B, it shows an image device according to an embodiment of the invention. The image device 239B includes a plurality of RGBY pixels 31H, a plurality of RGBW pixels 32F and a plurality of RBGB pixels 33D. In the first row of the image device 239B, the sequence of the pixels from left to right is the RGBY pixel 31H, the RGBW pixel 32F, the RGBY pixel 31H and the RGBW pixel 32F. In the second row of the image device 239B, the sequence of the pixels from left to right is the RBGB pixel 33D, the RGBW pixel 32F, the RBGB pixel 33D, and the RGBW pixel 32F.

Referring to FIG. 39C, it shows an image device according to an embodiment of the invention. The image device 239C includes a plurality of RGBY pixels 41H, a plurality of RGBW pixels 42F and a plurality of RBGB pixels 43D. In the first row of the image device 239C, the sequence of the pixels from left to right is the RGBY pixel 41H, the RGBW pixel 42F, the RGBY pixel 41H and the RGBW pixel 42F. In the second row of the image device 239C, the sequence of the pixels from left to right is the RBGB pixel 43D, the RGBW pixel 42F, the RBGB pixel 43D, and the RGBW pixel 42F.

Referring to FIG. 39D, it shows an image device according to an embodiment of the invention. The image device 239D includes a plurality of RGBY pixels 51H, a plurality of RGBW pixels 52F and a plurality of RBGB pixels 53D. In the first row of the image device 239D, the sequence of the pixels from left to right is the RGBY pixel 51H, the RGBW pixel 52F, the RGBY pixel 51H and the RGBW pixel 52F. In the second row of the image device 239D, the sequence of the pixels from left to right is the RBGB pixel 53D, the RGBW pixel 52F, the RBGB pixel 53D, and the RGBW pixel 52F.

Referring to FIG. 40A, it shows an image device according to an embodiment of the invention. The image device 240A includes a plurality of RGBY pixels 21J, a plurality of RGBW pixels 22H and a plurality of RBGB pixels 23A. In the first row of the image device 240A, the sequence of the pixels from left to right is the RGBY pixel 21J, the RGBW pixel 22H, the RBGB pixel 23A and the RGBW pixel 22H. In the second row of the image device 240A, the sequence of the pixels from left to right is the RBGB pixel 23A, the RGBW pixel 22I4, the RGBY pixel 21J, and the RGBW pixel 22H.

Referring to FIG. 40B, it shows an image device according to an embodiment of the invention. The image device 240B includes a plurality of RGBY pixels 31J, a plurality of RGBW pixels 32H and a plurality of RBGB pixels 33A. In the first row of the image device 240B, the sequence of the pixels from left to right is the RGBY pixel 31J, the RGBW pixel 32H, the RBGB pixel 33A and the RGBW pixel 32H. In the second row of the image device 240B, the sequence of the pixels from left to right is the RBGB pixel 33A, the RGBW pixel 32H, the RGBY pixel 31J, and the RGBW pixel 32H.

Referring to FIG. 40C, it shows an image device according to an embodiment of the invention. The image device 240A includes a plurality of RGBY pixels 41J, a plurality of RGBW pixels 42H and a plurality of RBGB pixels 43A. In the first row of the image device 240C, the sequence of the pixels from left to right is the RGBY pixel 41J, the RGBW pixel 42H, the RBGB pixel 43A and the RGBW pixel 42H. In the second row of the image device 240C, the sequence of the pixels from left to right is the RBGB pixel 43A, the RGBW pixel 42H, the RGBY pixel 41J, and the RGBW pixel 42H.

Referring to FIG. 40D, it shows an image device according to an embodiment of the invention. The image device 240D includes a plurality of RGBY pixels 51J, a plurality of RGBW pixels 52H and a plurality of RBGB pixels 53A. In the first row of the image device 240D, the sequence of the pixels from left to right is the RGBY pixel 51J, the RGBW pixel 52H, the RBGB pixel 53A and the RGBW pixel 52H. In the second row of the image device 240D, the sequence of the pixels from left to right is the RBGB pixel 53A, the RGBW pixel 52H, the RGBY pixel 51J, and the RGBW pixel 52H.

Referring to FIG. 41A, it shows an image device according to an embodiment of the invention. The image device 241A includes a plurality of RGBY pixels 21N, a plurality of RGBW pixels 22O and a plurality of RBGB pixels 23D. In the RGBY pixel 21N, the sequence of the sub-pixels in the 1×4 matrix from left to right is the green sub-pixel, the yellow sub-pixel, the red sub-pixel and the blue sub-pixel. In the RGBW pixel 22O, the sequence of the sub-pixels in the 1×4 matrix from left to right is the green sub-pixel, the white sub-pixel, the red sub-pixel and the blue sub-pixel. In the first row of the image device 241A, the sequence of the pixels from left to right is the RGBY pixel 21N, the RGBW pixel 22O, the RBGB pixel 23D and the RGBW pixel 22O. In the second row of the image device 241A, the sequence of the pixels from left to right is the RBGB pixel 23D, the RGBW pixel 22O, the RGBY pixel 21N, and the RGBW pixel 22O.

Referring to FIG. 41B, it shows an image device according to an embodiment of the invention. The image device 241B includes a plurality of RGBY pixels 31N, a plurality of RGBW pixels 32O and a plurality of RBGB pixels 33D. In the RGBY pixel 31N, the sequence of the sub-pixels in the 1×4 matrix from left to right is the green sub-pixel, the yellow sub-pixel, the red sub-pixel and the blue sub-pixel. In the RGBW pixel 32O, the sequence of the sub-pixels in the 1×4 matrix from left to right is the green sub-pixel, the white sub-pixel, the red sub-pixel and the blue sub-pixel. In the first row of the image device 241B, the sequence of the pixels from left to right is the RGBY pixel 31N, the RGBW pixel 32O, the RBGB pixel 33D and the RGBW pixel 32O. In the second row of the image device 241B, the sequence of the pixels from left to right is the RBGB pixel 33D, the RGBW pixel 32O, the RGBY pixel 31N, and the RGBW pixel 32O.

Referring to FIG. 41C, it shows an image device according to an embodiment of the invention. The image device 241C includes a plurality of RGBY pixels 41N, a plurality of RGBW pixels 42O and a plurality of RBGB pixels 43D. In the RGBY pixel 41N, the sequence of the sub-pixels in the 1×4 matrix from left to right is the green sub-pixel, the yellow sub-pixel, the red sub-pixel and the blue sub-pixel. In the RGBW pixel 42O, the sequence of the sub-pixels in the 1×4 matrix from left to right is the green sub-pixel, the white sub-pixel, the red sub-pixel and the blue sub-pixel. In the first row of the image device 241C, the sequence of the pixels from left to right is the RGBY pixel 41N, the RGBW pixel 42O, the RBGB pixel 43D and the RGBW pixel 42O. In the second row of the image device 241C, the sequence of the pixels from left to right is the RBGB pixel 43D, the RGBW pixel 42O, the RGBY pixel 41N, and the RGBW pixel 42O.

Referring to FIG. 41D, it shows an image device according to an embodiment of the invention. The image device 241D includes a plurality of RGBY pixels 51N, a plurality of RGBW pixels 52O and a plurality of RBGB pixels 53D. In the RGBY pixel 51N, the sequence of the sub-pixels in the 1×4 matrix from left to right is the green sub-pixel, the yellow sub-pixel, the red sub-pixel and the blue sub-pixel. In the RGBW pixel 52O, the sequence of the sub-pixels in the 1×4 matrix from left to right is the green sub-pixel, the white sub-pixel, the red sub-pixel and the blue sub-pixel. In the first row of the image device 241D, the sequence of the pixels from left to right is the RGBY pixel 51N, the RGBW pixel 52O, the RBGB pixel 53D and the RGBW pixel 52O. In the second row of the image device 241D, the sequence of the pixels from left to right is the RBGB pixel 53D, the RGBW pixel 52O, the RGBY pixel 51N, and the RGBW pixel 52O.

Referring to FIG. 42A, it shows an image device according to an embodiment of the invention. The image device 242A includes a plurality of RGBY pixels 21J, a plurality of RGBW pixels 22H and a plurality of RBGB pixels 23A. In the first row of the image device 242A, the sequence of the pixels from left to right is the RGBY pixel 21J, the RGBW pixel 22H, the RGBY pixel 21J and the RGBW pixel 22H. In the second row of the image device 242A, the sequence of the pixels from left to right is the RBGB pixel 23A, the RGBW pixel 22H, the RBGB pixel 23A, and the RGBW pixel 22H.

Referring to FIG. 42B, it shows an image device according to an embodiment of the invention. The image device 242B includes a plurality of RGBY pixels 31J, a plurality of RGBW pixels 32H and a plurality of RBGB pixels 33A. In the first row of the image device 242B, the sequence of the pixels from left to right is the RGBY pixel 31J, the RGBW pixel 32H, the RGBY pixel 31J and the RGBW pixel 32H. In the second row of the image device 242B, the sequence of the pixels from left to right is the RBGB pixel 33A, the RGBW pixel 32H, the RBGB pixel 33A, and the RGBW pixel 32H.

Referring to FIG. 42C, it shows an image device according to an embodiment of the invention. The image device 242C includes a plurality of RGBY pixels 41J, a plurality of RGBW pixels 42H and a plurality of RBGB pixels 43A. In the first row of the image device 242C, the sequence of the pixels from left to right is the RGBY pixel 41J, the RGBW pixel 42H, the RGBY pixel 41J and the RGBW pixel 42H. In the second row of the image device 242C, the sequence of the pixels from left to right is the RBGB pixel 43A, the RGBW pixel 42H, the RBGB pixel 43A, and the RGBW pixel 42H.

Referring to FIG. 42D, it shows an image device according to an embodiment of the invention. The image device 242D includes a plurality of RGBY pixels 51J, a plurality of RGBW pixels 52H and a plurality of RBGB pixels 53A. In the first row of the image device 242D, the sequence of the pixels from left to right is the RGBY pixel 51J, the RGBW pixel 52H, the RGBY pixel 51J and the RGBW pixel 52H. In the second row of the image device 242D, the sequence of the pixels from left to right is the RBGB pixel 53A, the RGBW pixel 52H, the RBGB pixel 53A, and the RGBW pixel 52H.

Referring to FIG. 43A, it shows an image device according to an embodiment of the invention. The image device 243A includes a plurality of RGBY pixels 21N, a plurality of RGBW pixels 22O and a plurality of RBGB pixels 23D. In the first row of the image device 243A, the sequence of the pixels from left to right is the RGBY pixel 21N, the RGBW pixel 22O, the RGBY pixel 21N and the RGBW pixel 22O. In the second row of the image device 243A, the sequence of the pixels from left to right is the RBGB pixel 23D, the RGBW pixel 22O, the RBGB pixel 23D, and the RGBW pixel 22O.

Referring to FIG. 43B, it shows an image device according to an embodiment of the invention. The image device 243B includes a plurality of RGBY pixels 31N, a plurality of RGBW pixels 32O and a plurality of RBGB pixels 33D. In the first row of the image device 243B, the sequence of the pixels from left to right is the RGBY pixel 31N, the RGBW pixel 32O, the RGBY pixel 31N and the RGBW pixel 32O. In the second row of the image device 243B, the sequence of the pixels from left to right is the RBGB pixel 33D, the RGBW pixel 32O, the RBGB pixel 33D, and the RGBW pixel 32O.

Referring to FIG. 43C, it shows an image device according to an embodiment of the invention. The image device 243C includes a plurality of RGBY pixels 41N, a plurality of RGBW pixels 42O and a plurality of RBGB pixels 43D. In the first row of the image device 243C, the sequence of the pixels from left to right is the RGBY pixel 41N, the RGBW pixel 42O, the RGBY pixel 41N and the RGBW pixel 42O. In the second row of the image device 243C, the sequence of the pixels from left to right is the RBGB pixel 43D, the RGBW pixel 42O, the RBGB pixel 43D, and the RGBW pixel 42O.

Referring to FIG. 43D, it shows an image device according to an embodiment of the invention. The image device 243D includes a plurality of RGBY pixels 51N, a plurality of RGBW pixels 52O and a plurality of RBGB pixels 53D. In the first row of the image device 243D, the sequence of the pixels from left to right is the RGBY pixel 51N, the RGBW pixel 52O, the RGBY pixel 51N and the RGBW pixel 52O. In the second row of the image device 243D, the sequence of the pixels from left to right is the RBGB pixel 53D, the RGBW pixel 52O, the RBGB pixel 53D, and the RGBW pixel 52O.

Referring to FIG. 44A, it shows an image device according to an embodiment of the invention. The image device 244A includes a plurality of RGBY pixels 21A, a plurality of RGBW pixels 22G and a plurality of RBGB pixels 23A. In the image device 244A, the sequence of the pixels from left to right is the RGBW pixel 22G, the RBGB pixel 23A and the RGBY pixel 21A.

In an embodiment, in the image device 244A, the distance of a red sub-pixel to the next red sub-pixel in at least one row or in at least one column is about the same, the distance of a green sub-pixel to the next green sub-pixel in at least one row or in at least one column is about the same, the distance of a yellow sub-pixel to the next yellow sub-pixel in at least one row or in at least one column is about the same, and the distance of a white sub-pixel to the next white sub-pixel in at least one row or in at least one column is about the same.

Referring to FIG. 44B, it shows an image device according to an embodiment of the invention. The image device 244B includes a plurality of RGBY pixels 31A, a plurality of RGBW pixels 32G and a plurality of RBGB pixels 33A. In the image device 244B, the sequence of the pixels from left to right is the RGBW pixel 32G, the RBGB pixel 33A and the RGBY pixel 31A.

Referring to FIG. 44C, it shows an image device according to an embodiment of the invention. The image device 244C includes a plurality of RGBY pixels 41A, a plurality of RGBW pixels 42G and a plurality of RBGB pixels 43A. In the image device 244C, the sequence of the pixels from left to right is the RGBW pixel 42G, the RBGB pixel 43A and the RGBY pixel 41A.

Referring to FIG. 44D, it shows an image device according to an embodiment of the invention. The image device 244D includes a plurality of RGBY pixels 51A, a plurality of RGBW pixels 52G and a plurality of RBGB pixels 53A. In the image device 244D, the sequence of the pixels from left to right is the RGBW pixel 52G, the RBGB pixel 53A and the RGBY pixel 51A.

Referring to FIG. 45A, it shows an image device according to an embodiment of the invention. The image device 245A includes a plurality of RGBY pixels 21H, a plurality of RGBW pixels 22F and a plurality of RBGB pixels 23D. In the image device 245A, the sequence of the pixels from left to right is the RGBW pixel 22F, the RBGB pixel 23D and the RGBY pixel 21H.

Referring to FIG. 45B, it shows an image device according to an embodiment of the invention. The image device 245B includes a plurality of RGBY pixels 31H, a plurality of RGBW pixels 32F and a plurality of RBGB pixels 33D. In the image device 245B, the sequence of the pixels from left to right is the RGBW pixel 32F, the RBGB pixel 33D and the RGBY pixel 31H.

Referring to FIG. 45C, it shows an image device according to an embodiment of the invention. The image device 245C includes a plurality of RGBY pixels 41H, a plurality of RGBW pixels 42F and a plurality of RBGB pixels 43D. In the image device 245C, the sequence of the pixels from left to right is the RGBW pixel 42F, the RBGB pixel 43D and the RGBY pixel 41H.

Referring to FIG. 45D, it shows an image device according to an embodiment of the invention. The image device 245D includes a plurality of RGBY pixels 51H, a plurality of RGBW pixels 52F and a plurality of RBGB pixels 53D. In the image device 245D, the sequence of the pixels from left to right is the RGBW pixel 52F, the RBGB pixel 53D and the RGBY pixel 51H.

Referring to FIG. 46A, it shows an image device according to an embodiment of the invention. The image device 246A includes a plurality of RGBY pixels 21A, a plurality of RGBW pixels 22G and a plurality of RBGB pixels 23A. In the image device 246A, the sequence of the pixels from left to right is the RGBW pixel 22G, the RGBY pixel 21A and the RBGB pixel 23A.

Referring to FIG. 46B, it shows an image device according to an embodiment of the invention. The image device 246B includes a plurality of RGBY pixels 31A, a plurality of RGBW pixels 32G and a plurality of RBGB pixels 33A.

In the image device 246B, the sequence of the pixels from left to right is the RGBW pixel 32G, the RGBY pixel 31A and the RBGB pixel 33A.

Referring to FIG. 46C, it shows an image device according to an embodiment of the invention. The image device 246C includes a plurality of RGBY pixels 41A, a plurality of RGBW pixels 42G and a plurality of RBGB pixels 43A. In the image device 246C, the sequence of the pixels from left to right is the RGBW pixel 42G, the RGBY pixel 41A and the RBGB pixel 43A.

Referring to FIG. 46D, it shows an image device according to an embodiment of the invention. The image device 246D includes a plurality of RGBY pixels 51A, a plurality of RGBW pixels 52G and a plurality of RBGB pixels 53A. In the image device 246D, the sequence of the pixels from left to right is the RGBW pixel 52G, the RGBY pixel 51A and the RBGB pixel 53A.

Referring to FIG. 47A, it shows an image device according to an embodiment of the invention. The image device 247A includes a plurality of RGBY pixels 21H, a plurality of RGBW pixels 22F and a plurality of RBGB pixels 23D. In the image device 247A, the sequence of the pixels from left to right is the RGBW pixel 22F, the RGBY pixel 21H and the RBGB pixel 23D.

Referring to FIG. 47B, it shows an image device according to an embodiment of the invention. The image device 247B includes a plurality of RGBY pixels 31H, a plurality of RGBW pixels 32F and a plurality of RBGB pixels 33D. In the image device 247B, the sequence of the pixels from left to right is the RGBW pixel 32F, the RGBY pixel 31H and the RBGB pixel 33D.

Referring to FIG. 47C, it shows an image device according to an embodiment of the invention. The image device 247C includes a plurality of RGBY pixels 41H, a plurality of RGBW pixels 42F and a plurality of RBGB pixels 43D. In the image device 247C, the sequence of the pixels from left to right is the RGBW pixel 42F, the RGBY pixel 41H and the RBGB pixel 43D.

Referring to FIG. 47D, it shows an image device according to an embodiment of the invention. The image device 247D includes a plurality of RGBY pixels 51H, a plurality of RGBW pixels 52F and a plurality of RBGB pixels 53D. In the image device 247D, the sequence of the pixels from left to right is the RGBW pixel 52F, the RGBY pixel 51H and the RBGB pixel 53D.

Referring to FIG. 48A, it shows an image device according to an embodiment of the invention. The image device 248A includes a plurality of RGBY pixels 21J, a plurality of RGBW pixels 22H and a plurality of RBGB pixels 23A. In the image device 248A, the sequence of the pixels from left to right is the RGBW pixel 22H, the RBGB pixel 23A and the RGBY pixel 21J.

Referring to FIG. 48B, it shows an image device according to an embodiment of the invention. The image device 248B includes a plurality of RGBY pixels 31J, a plurality of RGBW pixels 32H and a plurality of RBGB pixels 33A. In the image device 248B, the sequence of the pixels from left to right is the RGBW pixel 32H, the RBGB pixel 33A and the RGBY pixel 31J.

Referring to FIG. 48C, it shows an image device according to an embodiment of the invention. The image device 248C includes a plurality of RGBY pixels 41J, a plurality of RGBW pixels 42H and a plurality of RBGB pixels 43A. In the image device 248C, the sequence of the pixels from left to right is the RGBW pixel 42H, the RBGB pixel 43A and the RGBY pixel 41J.

Referring to FIG. 48D, it shows an image device according to an embodiment of the invention. The image device 248D includes a plurality of RGBY pixels 51J, a plurality of RGBW pixels 52H and a plurality of RBGB pixels 53A. In the image device 248D, the sequence of the pixels from left to right is the RGBW pixel 52H, the RBGB pixel 53A and the RGBY pixel 51J.

Referring to FIG. 49A, it shows an image device according to an embodiment of the invention. The image device 249A includes a plurality of RGBY pixels 21N, a plurality of RGBW pixels 22O and a plurality of RBGB pixels 23D. In the image device 249A, the sequence of the pixels from left to right is the RGBW pixel 22O, the RBGB pixel 23D and the RGBY pixel 21N.

Referring to FIG. 49B, it shows an image device according to an embodiment of the invention. The image device 249B includes a plurality of RGBY pixels 31N, a plurality of RGBW pixels 32O and a plurality of RBGB pixels 33D. In the image device 249B, the sequence of the pixels from left to right is the RGBW pixel 32O, the RBGB pixel 33D and the RGBY pixel 31N.

Referring to FIG. 49C, it shows an image device according to an embodiment of the invention. The image device 249C includes a plurality of RGBY pixels 41N, a plurality of RGBW pixels 42O and a plurality of RBGB pixels 43D. In the image device 249C, the sequence of the pixels from left to right is the RGBW pixel 42O, the RBGB pixel 43D and the RGBY pixel 41N.

Referring to FIG. 49D, it shows an image device according to an embodiment of the invention. The image device 249D includes a plurality of RGBY pixels 51N, a plurality of RGBW pixels 52O and a plurality of RBGB pixels 53D. In the image device 249D, the sequence of the pixels from left to right is the RGBW pixel 52O, the RBGB pixel 53D and the RGBY pixel 51N.

Referring to FIG. 50A, it shows an image device according to an embodiment of the invention. The image device 250A includes a plurality of RGBY pixels 21J, a plurality of RGBW pixels 22H and a plurality of RBGB pixels 23A. In the image device 250A, the sequence of the pixels from left to right is the RGBW pixel 22H, the RGBY pixel 21J and the RBGB pixel 23A.

Referring to FIG. 50B, it shows an image device according to an embodiment of the invention. The image device 250B includes a plurality of RGBY pixels 31J, a plurality of RGBW pixels 32H and a plurality of RBGB pixels 33A. In the image device 250B, the sequence of the pixels from left to right is the RGBW pixel 32H, the RGBY pixel 31J and the RBGB pixel 33A.

Referring to FIG. 50C, it shows an image device according to an embodiment of the invention. The image device 250C includes a plurality of RGBY pixels 41J, a plurality of RGBW pixels 42H and a plurality of RBGB pixels 43A. In the image device 250C, the sequence of the pixels from left to right is the RGBW pixel 42H, the RGBY pixel 41J and the RBGB pixel 43A.

Referring to FIG. 50D, it shows an image device according to an embodiment of the invention. The image device 250D includes a plurality of RGBY pixels 51J, a plurality of RGBW pixels 52H and a plurality of RBGB pixels 53A. In the image device 250D, the sequence of the pixels from left to right is the RGBW pixel 52H, the RGBY pixel 51J and the RBGB pixel 53A.

Referring to FIG. 51A, it shows an image device according to an embodiment of the invention. The image device 251A includes a plurality of RGBY pixels 21N, a plurality of RGBW pixels 22O and a plurality of RBGB pixels 23D.

In the image device 251A, the sequence of the pixels from left to right is the RGBW pixel 22O, the RGBY pixel 21N and the RBGB pixel 23D.

Referring to FIG. 51B, it shows an image device according to an embodiment of the invention. The image device 251B includes a plurality of RGBY pixels 31N, a plurality of RGBW pixels 32O and a plurality of RBGB pixels 33D. In the image device 251B, the sequence of the pixels from left to right is the RGBW pixel 32O, the RGBY pixel 31N and the RBGB pixel 33D.

Referring to FIG. 51C, it shows an image device according to an embodiment of the invention. The image device 251C includes a plurality of RGBY pixels 41N, a plurality of RGBW pixels 42O and a plurality of RBGB pixels 43D. In the image device 251C, the sequence of the pixels from left to right is the RGBW pixel 42O, the RGBY pixel 41N and the RBGB pixel 43D.

Referring to FIG. 51D, it shows an image device according to an embodiment of the invention. The image device 251D includes a plurality of RGBY pixels 51N, a plurality of RGBW pixels 52O and a plurality of RBGB pixels 53D. In the image device 251D, the sequence of the pixels from left to right is the RGBW pixel 52O, the RGBY pixel 51N and the RBGB pixel 53D.

By the addition of RGBY pixels, the problem of dark yellow in the conventional RGBW display can be solved and chrominance quality can be improved. The present invention adds both RGBY pixels and RBGB pixels. The RBGB pixels are used to offset the chrominance change caused by the addition of RGBY pixels. The present invention thus can solve the dark yellow problem of conventional RGBW display and at the same time achieve a white balance status.

While embodiments of the present invention have been illustrated and described, various modifications and improvements can be made by persons skilled in the art. It is intended that the present invention is not limited to the particular forms as illustrated, and that all modifications not departing from the spirit and scope of the present invention are within the scope as defined in the following claims.

What is claimed is:

1. An image device, comprising:

a plurality of RGBW pixels, each of the RGBW pixels comprising a red sub-pixel, a green sub-pixel, a blue sub-pixel and a white sub-pixel;

a plurality of RGBY pixels, each of the RGBY pixels comprising a red sub-pixel, a green sub-pixel, a blue sub-pixel and a yellow sub-pixel, and a plurality of RBGB pixels, each of the RBGB pixels comprising a red sub-pixel, a green sub-pixel, and two blue sub-pixels;

wherein at least one row or at least one column comprises sub-pixels having a same first color;

wherein the RGBW pixels and the RGBY pixels and the RBGB pixels are mixed in the image device.

2. The image device according to claim 1, wherein at least a second row or at least a second column comprises sub-pixels having a same second color.

3. The image device according to claim 2, wherein at least a third row or at least a third column comprises sub-pixels having a same third color.

4. The image device according to claim 3, wherein at least a fourth row or at least a fourth column comprises sub-pixels having a same fourth color.

5. The image device according to claim 4, wherein each of the first, second, third and fourth colors are any of red, green, blue and white.

6. The image device according to claim 4, wherein each of the first, second, third and fourth colors are any of red, green, blue and yellow.

7. The image device according to claim 1, wherein a ratio of a number of red sub-pixels to a number of green sub-pixels to a number of blue sub-pixels to a number of white sub-pixels and to a number of yellow sub-pixels is about 4:4:5:2:1.

8. The image device according to claim 1, wherein a ratio of a total area of red sub-pixels to a total area of green sub-pixels to a total area of blue sub-pixels to a total area of white sub-pixels and to a total area of yellow sub-pixels is about 4:4:5:2:1.

9. The image device according to claim 1, wherein a ratio of a number of red sub-pixels to a number of green sub-pixels to a number of blue sub-pixels to a number of white sub-pixels and to a number of yellow sub-pixels is about 3:3:4:1:1.

10. The image device according to claim 1, wherein a ratio of a total area of red sub-pixels to a total area of green sub-pixels to a total area of blue sub-pixels to a total area of white sub-pixels and to a total area of yellow sub-pixels is about 3:3:4:1:1.

11. The image device according to claim 1, wherein each of the sub-pixels is formed as about a square shape.

12. The image device according to claim 1, wherein each of the sub-pixels is formed as about a rectangular shape.

13. The image device according to claim 12, wherein any two of the sub-pixels adjacent to each other along a longer border are formed as about a square shape.

14. The image device according to claim 12, wherein any three of the sub-pixels adjacent to each other along a longer border are formed as about a square shape.

15. The image device according to claim 12, wherein any four of the sub-pixels adjacent to each other along a longer border are formed as about a square shape.

16. The image device according to claim 1, wherein the at least one row or the at least one column comprises the yellow sub-pixels and the blue sub-pixels arranged alternately.

17. The image device according to claim 1, wherein the at least one row or the at least one column comprises at least one of the yellow sub-pixels adjacent to at least one of the blue sub-pixels.

18. The image device according to claim 1, wherein each of the RGBW pixels comprises the red sub-pixel, the green sub-pixel, the blue sub-pixel and the white sub-pixel arranged in a 1×4 matrix.

19. The image device according to claim 18, wherein a sequence of the sub-pixels in the 1×4 matrix is the red sub-pixel, the green sub-pixel, the blue sub-pixel and the white sub-pixel.

20. The image device according to claim 18, wherein a sequence of the sub-pixels in the 1×4 matrix is the green sub-pixel, the red sub-pixel, the blue sub-pixel and the white sub-pixel.

21. The image device according to claim 18, wherein a sequence of the sub-pixels in the 1×4 matrix is the blue sub-pixel, the white sub-pixel, the red sub-pixel and the green sub-pixel.

22. The image device according to claim 18, wherein a sequence of the sub-pixels in the 1×4 matrix is the white sub-pixel, the blue sub-pixel, the green sub-pixel and the red sub-pixel.

23. The image device according to claim 18, wherein a sequence of the sub-pixels in the 1×4 matrix is the white sub-pixel, the red sub-pixel, the green sub-pixel and the blue sub-pixel.

24. The image device according to claim 18, wherein a sequence of the sub-pixels in the 1×4 matrix is the green sub-pixel, the blue sub-pixel, the red sub-pixel and the white sub-pixel.

25. The image device according to claim 18, wherein a sequence of the sub-pixels in the 1×4 matrix is the red sub-pixel, the blue sub-pixel, the white sub-pixel and the green sub-pixel.

26. The image device according to claim 18, wherein a sequence of the sub-pixels in the 1×4 matrix is the red sub-pixel, the white sub-pixel, the green sub-pixel and the blue sub-pixel.

27. The image device according to claim 18, wherein a sequence of the sub-pixels in the 1×4 matrix is the red sub-pixel, the blue sub-pixel, the green sub-pixel and the white sub-pixel.

28. The image device according to claim 18, wherein a sequence of the sub-pixels in the 1×4 matrix is the red sub-pixel, the green sub-pixel, the white sub-pixel and the blue sub-pixel.

29. The image device according to claim 18, wherein a sequence of the sub-pixels in the 1×4 matrix is the blue sub-pixel, the white sub-pixel, the green sub-pixel and the red sub-pixel.

30. The image device according to claim 18, wherein a sequence of the sub-pixels in the 1×4 matrix is the green sub-pixel, the red sub-pixel, the white sub-pixel and the green sub-pixel.

31. The image device according to claim 18, wherein a sequence of the sub-pixels in the 1×4 matrix is the green sub-pixel, the white sub-pixel, the blue sub-pixel and the red sub-pixel.

32. The image device according to claim 1, wherein each of the RGBY pixels comprises the red sub-pixel, the green sub-pixel, the blue sub-pixel and the yellow sub-pixel arranged in a 1×4 matrix.

33. The image device according to claim 32, wherein a sequence of the sub-pixels in the 1×4 matrix is the red sub-pixel, the blue sub-pixel, the green sub-pixel and the yellow sub-pixel.

34. The image device according to claim 32, wherein a sequence of the sub-pixels in the 1×4 matrix is the blue sub-pixel, the red sub-pixel, the green sub-pixel and the yellow sub-pixel.

35. The image device according to claim 32, wherein a sequence of the sub-pixels in the 1×4 matrix is the blue sub-pixel, the green sub-pixel, the red sub-pixel and the yellow sub-pixel.

36. The image device according to claim 32, wherein a sequence of the sub-pixels in the 1×4 matrix is the yellow sub-pixel, the blue sub-pixel, the green sub-pixel and the red sub-pixel.

37. The image device according to claim 32, wherein a sequence of the sub-pixels in the 1×4 matrix is the green sub-pixel, the red sub-pixel, the blue sub-pixel and the yellow sub-pixel.

38. The image device according to claim 32, wherein a sequence of the sub-pixels in the 1×4 matrix is the yellow sub-pixel, the green sub-pixel, the blue sub-pixel and the red sub-pixel.

39. The image device according to claim 32, wherein a sequence of the sub-pixels in the 1×4 matrix is the green sub-pixel, the blue sub-pixel, the yellow sub-pixel and the red sub-pixel.

40. The image device according to claim 32, wherein a sequence of the sub-pixels in the 1×4 matrix is the green sub-pixel, the blue sub-pixel, the red sub-pixel and the yellow sub-pixel.

41. The image device according to claim 32, wherein a sequence of the sub-pixels in the 1×4 matrix is the yellow sub-pixel, the red sub-pixel, the green sub-pixel and the blue sub-pixel.

42. The image device according to claim 32, wherein a sequence of the sub-pixels in the 1×4 matrix is the yellow sub-pixel, the red sub-pixel, the blue sub-pixel and the green sub-pixel.

43. The image device according to claim 32, wherein a sequence of the sub-pixels in the 1×4 matrix is the red sub-pixel, the yellow sub-pixel, the green sub-pixel and the blue sub-pixel.

44. The image device according to claim 32, wherein a sequence of the sub-pixels in the 1×4 matrix is the red sub-pixel, the green sub-pixel, the blue sub-pixel and the yellow sub-pixel.

45. The image device according to claim 1, wherein each of the RBGB pixels comprises the red sub-pixel, the first blue sub-pixel, the green sub-pixel and the second blue sub-pixel arranged in a 1×4 matrix.

46. The image device according to claim 45, wherein a sequence of the sub-pixels in the 1×4 matrix is the red sub-pixel, the first blue sub-pixel, the green sub-pixel and the second blue sub-pixel.

47. The image device according to claim 45, wherein a sequence of the sub-pixels in the 1×4 matrix is the first blue sub-pixel, the red sub-pixel, the green sub-pixel and the second blue sub-pixel.

48. The image device according to claim 45, wherein a sequence of the sub-pixels in the 1×4 matrix is the first blue sub-pixel, the green sub-pixel, the red sub-pixel and the second blue sub-pixel.

49. The image device according to claim 45, wherein a sequence of the sub-pixels in the 1×4 matrix is the green sub-pixel, the first blue sub-pixel, the red sub-pixel and the second blue sub-pixel.

50. The image device according to claim 1, wherein the at least one row or the at least one column comprises at least one of the RGBW pixels and at least one of the RBGB pixels.

51. The image device according to claim 1, wherein the at least one row or the at least one column comprises at least one of the RGBW pixels and at least one of the RGBY pixels.

52. The image device according to claim 1, wherein the at least one row or the at least one column comprises at least one of the RBGB pixels and at least one of the RGBY pixels.

53. The image device according to claim 1, wherein the at least one row or the at least one column comprises at least one of the RBGB pixels, at least one of the RGBY pixels, and at least one of the RGBW pixels.

54. The image device according to claim 1, wherein any group of three adjacent ones of the sub-pixels of at least two different colors can produce a white color.

55. The image device according to claim 1, wherein any group of four adjacent ones of the sub-pixels of at least two different colors can produce a white color.

56. The image device according to claim 1, wherein any group of four adjacent ones of the sub-pixels of at least two different colors can produce any colors.

57. The image device according to claim 1, wherein the at least one row or the at least one column comprises the yellow sub-pixels and the white sub-pixels arranged alternately.

58. The image device according to claim 1, wherein the at least one row or the at least one column comprises the blue sub-pixels and the white sub-pixels arranged alternately.

59. The image device according to claim 1, wherein a distance of each one of the red sub-pixels to a next one of the red sub-pixels in the at least one rows or in the at least one column is about equal.

60. The image device according to claim 1, wherein a distance of each one of the green sub-pixel to a next one of the green sub-pixels in the at least one row or in the at least one column is about equal.

61. The image device according to claim 1, wherein a distance of each one of the yellow sub-pixels to a next one of the yellow sub-pixels in the at least one row or in the at least one column is about equal.

62. The image device according to claim 1, wherein a distance of each one a white sub-pixels to a next one of the white sub-pixels in the at least one row or in the at least one column is about equal.

* * * * *